US012642730B2

(12) United States Patent
Kiser et al.

(10) Patent No.: US 12,642,730 B2
(45) Date of Patent: Jun. 2, 2026

(54) FITNESS DEVICES

(71) Applicant: Spine Care Technologies, Inc., Glen Head, NY (US)

(72) Inventors: Roland Kiser, Glen Head, NY (US); David Cuccia, Syosset, NY (US); Alan Squillante, Kings Park, NY (US)

(73) Assignee: Spine Care Technologies, Inc., Glen Head, NY (US)

( * ) Notice: Subject to any disclaimer, the term of this patent is extended or adjusted under 35 U.S.C. 154(b) by 1231 days.

(21) Appl. No.: 17/612,689

(22) PCT Filed: May 29, 2020

(86) PCT No.: PCT/US2020/035246

§ 371 (c)(1),
(2) Date: Nov. 19, 2021

(87) PCT Pub. No.: WO2020/243516

PCT Pub. Date: Dec. 3, 2020

(65) Prior Publication Data

US 2022/0218553 A1 Jul. 14, 2022

Related U.S. Application Data

(60) Provisional application No. 62/855,086, filed on May 31, 2019.

(51) Int. Cl.
*A61H 1/02* (2006.01)

(52) U.S. Cl.
CPC ......... *A61H 1/0292* (2013.01); *A61H 1/0218* (2013.01); *A61H 2201/1642* (2013.01)

(58) Field of Classification Search
CPC .................... A61H 1/02; A61H 1/0218; A61H 2201/1664; A61H 2201/1676; A61H 2201/1671; A61H 1/0292
See application file for complete search history.

(56) References Cited

U.S. PATENT DOCUMENTS 3,568,669 A 3/1971 Stites
3,612,519 A 10/1971 Larson
(Continued)

FOREIGN PATENT DOCUMENTS

CN 200948323 Y * 9/2007
CN 102579226 A 7/2012
(Continued)

OTHER PUBLICATIONS

First Office Action and Search Report in Chinese Application No. 202080050024.1, dated Oct. 28, 2023, 29 pages.
(Continued)

*Primary Examiner* — Brandy S Lee
*Assistant Examiner* — Mishal Zahra Hussain
(74) *Attorney, Agent, or Firm* — Ryan, Mason & Lewis, LLP

(57) ABSTRACT

A fitness device includes a base assembly, a table coupled to the base assembly, and a foot restraint coupled to the base assembly. The foot restraint is configured, responsive to a change in a relative position of the foot restraint with respect to the table, to apply a resistive force to at least one of one or more feet and one or more ankles of a user positioned in the fitness device. The fitness device may also include a controller that is configured to adjust at least one of (i) a height of the table utilizing one or more height actuators of the fitness device, and (ii) a rotation of the table utilizing one or more rotation actuators of the fitness device.

38 Claims, 87 Drawing Sheets

(56) References Cited

U.S. PATENT DOCUMENTS

| | | | | |
|---|---|---|---|---|
| 4,722,328 | A * | 2/1988 | Scott | A61G 13/009 606/245 |
| 4,846,461 | A | 7/1989 | Robards, Jr. et al. | |
| 4,915,101 | A | 4/1990 | Cuccia | |
| 5,324,247 | A | 6/1994 | Lepley | |
| 5,505,691 | A | 4/1996 | Fenkell | |
| 5,645,516 | A | 7/1997 | Foster | |
| 5,718,660 | A | 2/1998 | Chen | |
| 5,807,210 | A | 9/1998 | Devlin | |
| 5,840,001 | A * | 11/1998 | Schedel | A61H 1/0218 606/244 |
| 5,922,011 | A | 7/1999 | Cuccia | |
| 5,989,168 | A * | 11/1999 | See | A61H 1/0292 482/145 |
| 6,213,924 | B1 | 4/2001 | Kaiyoorawongs | |
| 6,283,897 | B1 | 9/2001 | Patton | |
| 6,402,669 | B1 | 6/2002 | Olstad | |
| 6,547,706 | B1 | 4/2003 | Chek | |
| 6,547,809 | B1 * | 4/2003 | Cuccia | A61G 13/009 606/244 |
| 6,905,508 | B2 | 6/2005 | Cuccia | |
| 6,923,825 | B2 | 8/2005 | Cuccia | |
| 7,118,519 | B2 | 10/2006 | Slowinski | |
| 7,309,347 | B2 | 12/2007 | Cuccia | |
| 7,314,436 | B1 | 1/2008 | Rubin | |
| 7,335,117 | B2 | 2/2008 | Reason-Kerkhoff | |
| 7,563,207 | B1 * | 7/2009 | Burek | A61H 1/0218 482/131 |
| 7,575,541 | B2 | 8/2009 | Chen | |
| 7,857,741 | B1 | 12/2010 | Hsiung | |
| 7,862,491 | B1 | 1/2011 | Wang | |
| 7,892,154 | B1 | 2/2011 | Alexa | |
| 7,896,790 | B1 | 3/2011 | Wei | |
| 7,931,573 | B2 * | 4/2011 | Shinomiya | A63B 21/00178 482/142 |
| 7,951,054 | B2 | 5/2011 | Snow et al. | |
| 7,955,240 | B2 | 6/2011 | Nadim | |
| 8,012,073 | B2 | 9/2011 | Barnett | |
| 8,057,362 | B2 | 11/2011 | Nadim | |
| 8,663,076 | B2 | 3/2014 | Chou | |
| 9,089,468 | B2 | 7/2015 | Wang | |
| 9,597,546 | B2 | 3/2017 | Maholmes | |
| 9,750,659 | B2 | 9/2017 | Wang | |
| 9,750,972 | B1 | 9/2017 | Liu et al. | |
| 2003/0125172 | A1 | 7/2003 | Slowinski | |
| 2005/0010145 | A1 | 1/2005 | Fenkell | |
| 2005/0209055 | A1 * | 9/2005 | Anders | A61H 1/0218 482/92 |
| 2006/0030466 | A1 | 2/2006 | Chen | |
| 2006/0234816 | A1 | 10/2006 | Reason-Kerkhoff | |
| 2006/0287173 | A1 | 12/2006 | Guadagno | |
| 2007/0040078 | A1 | 2/2007 | Wang | |
| 2007/0161935 | A1 * | 7/2007 | Torrie | A61G 13/12 602/32 |
| 2007/0265150 | A1 | 11/2007 | Teeter et al. | |
| 2007/0298948 | A1 | 12/2007 | Chen | |
| 2008/0020915 | A1 | 1/2008 | Pacheco et al. | |
| 2008/0061615 | A1 | 3/2008 | McBride et al. | |
| 2008/0167684 | A1 * | 7/2008 | Cuccia | A61H 1/0229 606/241 |
| 2009/0054216 | A1 | 2/2009 | Teeter | |
| 2009/0054217 | A1 | 2/2009 | Teeter | |
| 2010/0004101 | A1 | 1/2010 | Solow et al. | |
| 2010/0087302 | A1 | 4/2010 | Fukunaga | |
| 2011/0130248 | A1 * | 6/2011 | Yoshikawa | A63B 22/0056 482/4 |
| 2011/0137343 | A1 | 6/2011 | Vitko | |
| 2013/0029816 | A1 | 1/2013 | Park | |
| 2013/0079823 | A1 * | 3/2013 | Kao | A61H 1/0222 606/237 |
| 2013/0150219 | A1 | 6/2013 | Chang | |
| 2013/0197415 | A1 | 8/2013 | Piaget | |
| 2013/0337984 | A1 * | 12/2013 | Lung | A63B 21/068 482/140 |
| 2015/0164730 | A1 | 6/2015 | Chen | |
| 2015/0230748 | A1 * | 8/2015 | Marcandelli | A61B 5/1121 600/587 |
| 2016/0263424 | A1 | 9/2016 | LaCaze | |
| 2017/0119612 | A1 | 5/2017 | Wang | |
| 2017/0252253 | A1 | 9/2017 | Kim | |

FOREIGN PATENT DOCUMENTS

| | | | |
|---|---|---|---|
| EP | 2147700 | A1 | 1/2010 |
| JP | 3017652 | U | 10/1995 |
| JP | 2009045415 | A | 3/2009 |
| KR | 20110085919 | A | 7/2011 |
| KR | 101885057 | B1 | 8/2018 |
| WO | PCT/US2020/035246 | | 9/2020 |

OTHER PUBLICATIONS

Extended European Search Report in European Application No. 20815632.3, dated May 22, 2023, 9 pages.

Second Office Action and Search Report in Chinese Application No. 202080050024.1, dated Apr. 12, 2024, 31 pages.

Examination Report in European Application No. 20815632.3, dated Apr. 24, 2024, 8 pages.

Bella Physical Therapy, "3D Active Trac Physical Therapy," https://www.youtube.com/watch?v=y5Oe13Ti9Ms, May 30, 2017, 1 page.

* cited by examiner

FITNESS DEVICES

CROSS-REFERENCE TO RELATED APPLICATION

The present application is an international application which claims the benefit of and priority to U.S. Provisional Application Ser. No. 62/855,086, filed May 31, 2019 and entitled "Fitness Devices," which is incorporated by reference herein in its entirety.

BACKGROUND

The present application relates to fitness devices. Various types of fitness devices are designed for use by fitness practitioners or users to perform a variety of different types of exercises. Such fitness devices may be used in different environments, including but not limited to gyms, residential homes, hotels, recreational facilities, airports, malls, sports training facilities, orthopedic and rehabilitation facilities, physiotherapeutic and chiropractic facilities, etc. There is a need for improved fitness devices configured to provide assisted stretching and other types of exercises.

SUMMARY

Embodiments of the invention provide fitness devices for performing assisted stretching and other types of exercises.

In some embodiments, a fitness device comprises a base assembly, a table or other rigid support platform coupled to the base assembly, and a foot restraint coupled to the base assembly. The foot restraint is configured, responsive to a change in a relative position of the foot restraint with respect to the table, to apply a resistive force to at least one of one or more feet and one or more ankles of a user positioned in the fitness device.

The fitness device may further comprise one or more rotation actuators comprised within at least one of the base assembly and the table, and a controller configured to adjust a rotation of the table relative to the foot restraint utilizing the one or more rotation actuators. The fitness device may also comprise an elevation assembly coupled between the base assembly and the table, wherein at least one of the one or more rotation actuators is comprised at least partially within the elevation assembly.

The fitness device may further comprise one or more height actuators comprised within at least one of the base assembly, the table, and the foot restraint, and a controller configured to adjust a height of the table relative to the foot restraint utilizing the one or more height actuators. The fitness device may also comprise an elevation assembly coupled between the base assembly and the table, wherein at least one of the one or more height actuators is comprised at least partially within the elevation assembly.

The fitness device may further comprise one or more height actuators comprised within at least one of the base assembly and the foot restraint, one or more rotation actuators comprised within at least one of the base assembly and the table, and a controller configured to adjust at least one of (i) a height of the table utilizing the one or more height actuators and (ii) a rotation of the table utilizing the one or more rotation actuators. The fitness device may also comprise an elevation assembly coupled between the base assembly and the table, wherein at least one of the one or more rotation actuators and the one or more height actuators is comprised at least partially within the elevation assembly.

The fitness device may further comprise one or more sensors, the controller being configured to adjust said at least one of the height of the table and the rotation of the table based at least in part on readings obtained from the one or more sensors.

The one or more sensors comprise at least one force sensor configured to obtain one or more measurements of the resistive force applied by the foot restraint, and wherein adjusting said at least one of the height of the table and the rotation of the table is based at least in part on the one or more measurements of the resistive force applied by the foot restraint. The controller may be configured to adjust said at least one of the height of the table and the rotation of the table based at least in part on the one or more measurements of the resistive force applied by the foot restraint to maintain the resistive force applied by the foot restraint within a specified range.

The controller may be configured to adjust said at least one of the height of the table and the rotation of the table based at least in part on the one or more measurements of the resistive force applied by the foot restraint to maintain the resistive force applied by the foot restraint within the specified range during a sequence of motion of the user positioned in the fitness device. The sequence of motion of the user positioned in the fitness device may comprise raising a height of the table to provide a linear stretch on the user, and rotating the table after the linear stretch to apply additional stretch to a targeted area of a torso of the user. The sequence of motion of the user positioned in the fitness device may further comprise at least one of reversing a rotation of the table and lowering the height of the table. The additional stretch may comprise at least one of flexion, extension and lateral flexion of the torso of the user.

The fitness device may further comprise a cushion assembly coupled to the table, and the sequence of motion of the user positioned in the fitness device may further comprise displacing at least a portion of the cushion assembly based at least in part on a rotation of the table to provide further stretch of the targeted area of the torso of the user.

The one or more sensors may further comprise at least one height sensor configured to obtain one or more measurements of a displacement height of the table. The controller may be further configured to generate one or more height compensation values based at least in part on a comparison of the one or more measurements of the resistive force applied by the foot restraint and a maximum allowable resistive force, and to adjust said at least one of the height of the table and the rotation of the table based at least in part on the one or more measurements of the displacement height of the table and the generated one or more height compensation values.

The one or more sensors may comprise at least one rotation sensor configured to obtain one or more measurements of rotational displacement of the table. The controller may be further configured to generate a measured rotation angle of the table based at least in part on the one or more measurements of the rotational displacement of the table. The controller may be further configured to generate a reference rotation angle based at least in part on a maximum rotation angle of the table, a number of exercise repetitions of an exercise being performed by the user, and input controls, to determine a difference between the reference rotation angle and the measured rotation angle, and to adjust said at least one of the height of the table and the rotation of the table based at least in part on the determined difference between the reference rotation angle and the measured rotation angle.

The input controls may comprise a first input control and at least a second input control. The reference rotation angle may comprise a value larger than the measured rotation angle responsive to user activation of the first input control and the second input control. The reference rotation angle may comprise the measured rotation angle responsive to user activation of one of the first input control and the second input control. The reference rotation angle may comprise a value smaller than the measured rotation angle responsive to user deactivation of the first input control and the second input control.

The fitness device may further comprise a cushion assembly coupled to the table, at least a given portion of the cushion assembly being configured to tilt relative to the table, and one or more tilt actuators comprised within at least one of the table and the cushion assembly. The controller may be further configured to adjust a tilt of the given portion of the cushion assembly based at least in part on the obtained sensor readings. The given portion of the cushion assembly may comprise at least one of a pelvic cushion and a lumbar cushion of the cushion assembly.

The one or more sensors may comprise at least one tilt sensor configured to obtain one or more measurements of linear displacement of the given portion of the cushion assembly. The controller may be further configured to generate a measurement of a tilt angle of the given portion of the cushion assembly based at least in part on the one or more measurements of linear displacement of the given portion of the cushion assembly. The controller may be further configured to generate a reference rotation angle based at least in part on a maximum rotation angle of the table, a number of exercise repetitions of an exercise being performed by the user, and input controls, and to adjust the tilt of the given portion of the cushion assembly based at least in part on the reference rotation angle and the measured tilt angle.

The table may be configured for lateral rotation about a craniocaudal axis of the user positioned in the fitness device.

At least a portion of the foot restraint may be removably coupled to the base assembly.

The foot restraint may comprise a user attachment portion coupled to a base assembly mounting portion.

The user attachment portion may comprise at least one of one or more sets of adjustable parallel bars, one or more adjustable cuffs, one or more adjustable boots, one or more adjustable straps, one or more adjustable elastic bands, and one or more adjustable springs.

The base assembly mounting portion may be coupled to one or more fixed points on a platform of the base assembly.

The base assembly mounting portion may comprise a rounded plate rotatably affixed to a platform of the base assembly. The base assembly mounting portion may further comprise a ball joint coupling the user attachment portion to the rounded plate, the ball joint being configured for at least one of rotation and linear travel of the user attachment portion relative to the platform of the base assembly.

The base assembly mounting portion may comprise one or more sliding tracks affixed to a platform of the base assembly. The base assembly mounting portion may further comprise at least one of one or more straps and one or more elastic bands coupling the user attachment portion to the one or more sliding tracks, the one or more sliding tracks being configured for linear travel of the user attachment portion relative to the platform of the base assembly.

In some embodiments, a method of operating a fitness device comprises detecting, by a controller of the fitness device, a change in a relative position of a foot restraint with respect to a table of the fitness device, the foot restraint being coupled to a base assembly of the fitness device. The method also comprises, responsive to detecting the change in the relative position of the foot restraint with respect to the table, adjusting, using the controller of the fitness device, at least one of (i) a height of the table and (ii) a rotation of the table to apply a resistive force with the foot restraint to at least one of one or more feet and one or more ankles of a user positioned in the fitness device.

Adjusting said at least one of the height of the table and the rotation of the table may be based at least in part on readings obtained from one or more sensors of the fitness device. The one or more sensors may comprise at least one force sensor configured to obtain one or more measurements of the resistive force applied by the foot restraint, and adjusting said at least one of the height of the table and the rotation of the table may be based at least in part on the one or more measurements of the resistive force applied by the foot restraint.

In some embodiments, a computer program product comprises a non-transitory processor-readable storage medium having stored therein program code of one or more software programs. The program code when executed by a controller of a fitness device causes the controller to perform the step of detecting a change in a relative position of a foot restraint with respect to a table of the fitness device, the foot restraint being coupled to a base assembly of the fitness device. The program code when executed by the controller of the fitness device further causes the controller to perform the step of, responsive to detecting the change in the relative position of the foot restraint with respect to the table, adjusting at least one of (i) a height of the table and (ii) a rotation of the table to apply a resistive force with the foot restraint to at least one of one or more feet and one or more ankles of a user positioned in the fitness device.

Adjusting said at least one of the height of the table and the rotation of the table may be based at least in part on readings obtained from one or more sensors of the fitness device. The one or more sensors may comprise at least one force sensor configured to obtain one or more measurements of the resistive force applied by the foot restraint, and adjusting said at least one of the height of the table and the rotation of the table may be based at least in part on the one or more measurements of the resistive force applied by the foot restraint.

DETAILED DESCRIPTION

Figure 1A:
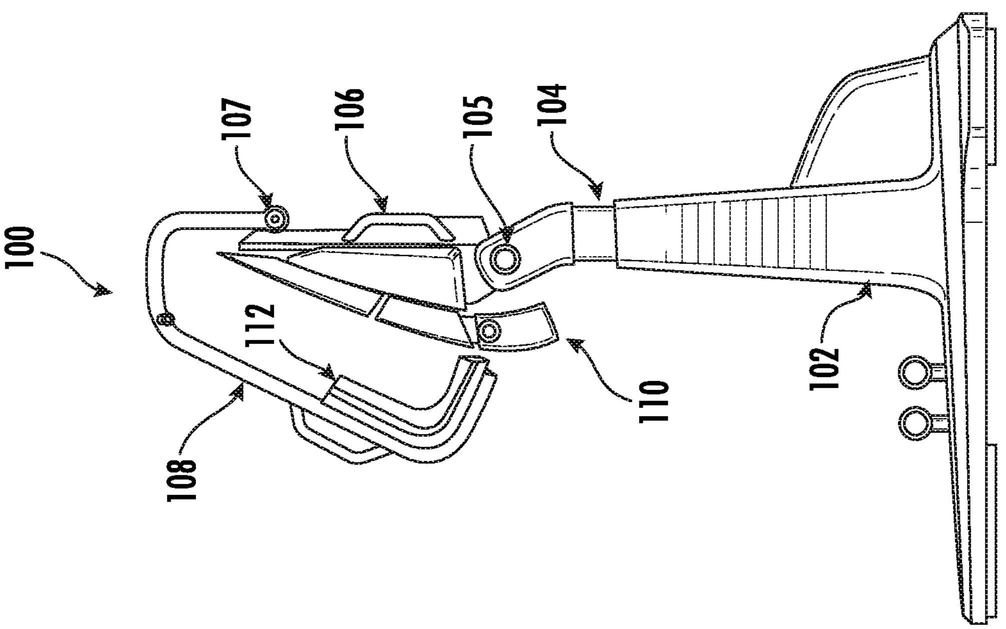
FIGS. 1A-1F depict a fitness device, according to an embodiment of the invention.

Illustrative embodiments of the invention will be described herein in the context of illustrative fitness devices, along with illustrative apparatus, systems and methods for utilizing such fitness devices. However, it is to be understood that embodiments of the invention are not limited to the illustrative methods, apparatus, systems and devices but instead are more broadly applicable to other suitable methods, apparatus, systems and devices.

In some embodiments, a fitness device or unit is provided for performing assisted stretching exercises, including assisted back stretching. The fitness device is designed for use by fitness practitioners, also referred to as users, for back stretching and other exercises. The fitness devices described herein are configured for use in a gym environment, a physical training facility, etc. A fitness device, in some embodiments, is configured as a mobile unit to facilitate use in a training facility environment and other use cases.

It is anticipated that users will be trained to operate the fitness devices described herein, such as through one-on-one interaction with a certified trainer, through self-instruction via instruction cards affixed to the fitness devices, via training pamphlets, videos, etc.

The fitness devices described herein may be utilized to impart various exercise actions on a user, including the application of an angular displacement about the lumbar region, for the purpose of lumbar flexion and extension. To use the fitness device, the user situates their body facing toward the fitness device (e.g., prone), facing away from the fitness device (e.g., supine) or facing sideways (e.g., lateral) to the fitness device, and then locates their feet in a footrest or foot support of the fitness device. In some embodiments, the footrest includes foot restraints with resistive motion capability, to enhance stretching of one or more of the user's back, trunk, legs, thighs, upper and lower extremities, etc. It should be noted, however, that the fitness device may be used without the footrest as desired, even in cases where the footrest is installed or attached to the fitness device.

In the various orientations (e.g., prone, supine, lateral), the user's arms may be positioned to rest on an arm support of the fitness device. The user's arms and other portions thereof may also or alternatively be supported with the assistance of a chest harness or other strapping from the underarms to some attachment point on a rotating table of the fitness device. This may include, in some embodiments, the user of special hand-wrist supports with integral hooks for attachment to an overhead bar or other portion of the fitness device.

The arm supports in some embodiments include hand grips with controls for enabling powered rotation of the entire assembly, providing full body stretching with the user. Such full body stretching may include positions of body flexion and extension of the human torso, including allowing the lower body mass and restrained feet of the user to undergo muscular stretching, aiding range of motion of all of the body's joints, including the spine or back of the user. In addition to the arm supports or rests, an overhead bar may be provided on the fitness device allowing the user to support their weight. The arm supports or rests and overhead bar, either individual or in combination, may also or alternatively provide the ability for the user to perform active isotonic exercise and stretching. The use of an overhead bar, however, is optional and not required.

Figure 2:
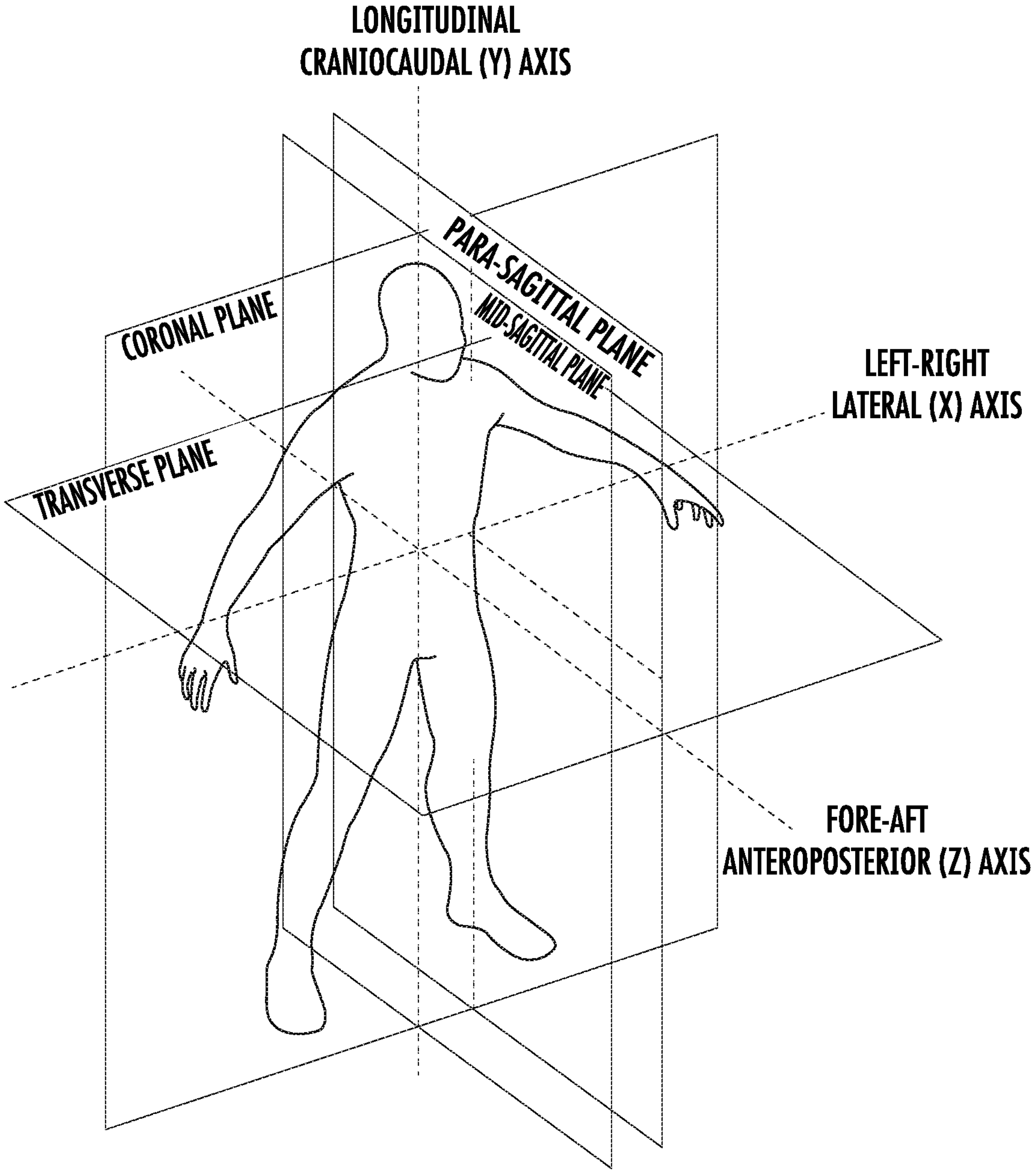
FIG. 2 depicts planes and axes relative to a user, according to an embodiment of the invention.

Throughout the description, the following terms are used to describe planes and axes. FIG. 2 shows the various planes and axes described below. Descriptions relative to the ground are described with the user standing. Descriptions relative to the user's body remain regardless of the user's orientation relative to the ground.

The anteroposterior axis refers to the human body axis (z-axis) which runs horizontally fore and aft through the human body, approximately through the vertical mid-point, parallel to the ground and perpendicular to the coronal plane. The anteroposterior axis is also referred to as the dorsoventral axis.

The coronal plane refers to the vertical plane which divides the human body between its forward (ventral) and rear (dorsal) portions. This plane contains the lateral (x) axis and craniocaudal (y) axis, perpendicular to the anteroposterior (z) axis.

The craniocaudal axis refers to the human body axis (y-axis) which runs vertically through the human body, perpendicular to the transverse plane.

The lateral axis refers to the human body axis (x-axis) which runs laterally (e.g., left/right) through the human body, roughly through the vertical mid-point, parallel to the ground and perpendicular to the sagittal plane.

The median plane refers to the sagittal plane located midway in the human body. The median plane contains the craniocaudal (y) axis and the anteroposterior (z) axis, perpendicular to the lateral (x) axis. The median plane is also referred to as the mid-sagittal plane.

The sagittal plane refers to any vertical plane which divides the human body into lateral (e.g., left and right) segments.

The transverse plane refers to the horizontal plane which approximately divides the human body between its upper and lower portions. The transverse plane contains the lateral (x) axis and anteroposterior (z) axis, perpendicular to the craniocaudal (y) axis. The transverse plane is also parallel to the ground with the person in a vertical position (e.g., standing upright).

The x-axis refers to the left-right axis through the human body. See the discussion above regarding the lateral axis.

The y-axis refers to the longitudinal (e.g., up/down) axis through the human body. See the discussion above regarding the craniocaudal axis.

The z-axis refers to the fore-aft axis through the human body. See the discussion above regarding the anteroposterior axis.

In the description herein, unless otherwise noted, motions will be referenced to a Cartesian coordinate system fixed to the body of the user of the fitness device, using the x-, y- and z-axis nomenclature. Further, measurement units unless otherwise noted are specified using the International System of Units (SI). Equivalent values are also specified (e.g., in parentheses) using the United States Customary System (USCS) as reference.

As described above, a fitness device in some embodiments is configured for use in the prone, supine and lateral positions. In some embodiments, a fitness device may include an additional pivot point that is located approximately mid-way between a lumbar support and a pelvic support, just superior to a main table pivot point and its attachment to an elevation assembly, base assembly or table of the fitness device. The additional pivot point advantageously enables partial rotation into a fixed pre-selected angle (e.g., of 0-45 degrees), preceding flexion, extension and lateral flexion stretching. The additional pivot point also enables active isotonic exercise and motion around the variable adjusted resistive pivot point along the craniocaudal (y) axis as a standalone exercise independent of rotation of the table. The table is also referred to herein as a rigid support platform of the fitness device. The additional pivot point may be solenoid released, mechanically released manually, etc.

For user safety and comfort, the fitness device is configured with one or more mechanisms for halting operation of the fitness device in the event of malfunction or user discomfort. Such mechanisms may include one or more emergency stop buttons, activation of which will cut supply power to the fitness device. Such mechanisms may also or alternatively include one or more user interface features and controls (e.g., on the hand grips, on the overhead bar, etc.) allowing the user to pause or stop operation of the fitness device.

In some embodiments, a fitness device is configured to meet one or more of the following user requirements:

The user is able to approach the fitness device and orient their body relative to the fitness device, in preparation for executing one or more exercise sequences, where the orientation of the user may be supine (facing away from the fitness device), prone (facing toward the fitness device), or lateral (sideways), and, if desired, in all the above positions in rotation;

The user is able to adjust the fitness device such that the overall height, position of the hand grips, position of the lumbar and thoracic cushions, and position of the overhead bar are located properly to fit their body size;

The user is able to increase and decrease the backrest angle, lumbar angle or the degree of extension of the lumbar backrest in the anteroposterior (z) axis plane, and supplemental resistive force of the fitness device to realize a desired degree of lumbar flexion, extension and lateral flexion and rotation during stretching or other exercise;

The user is able to secure their feet, as desired, to allow application of resistive force to enhance exercise as will be described in further detail below;

The user is provided with a mechanism for prescribing desired exercise parameters, including mode of operation, backrest angle, flexion and/or extension rate, resistive force, number of repetitions, etc.;

The user is provided with a feedback mechanism for providing feedback regarding progress status of one or more exercises and for evaluating utility of the one or more exercises;

The user is provided with a mechanism for starting and stopping exercise regimens;

The user is provided with instructional material, for initial and refresher training relating to the safe operation of the fitness device;

The user is able to interrupt all power to the fitness device in the event of malfunction of the fitness device or discomfort of the user;

The user is provided with assurance of physical safety during operation of the fitness device; and The user is able to operate the fitness device in various operating environments, including but not limited to gyms, training facilities, etc.

In some embodiments, a fitness device is configured to meet one or more of the following functional requirements:

The fitness device provides one or more mechanisms for applying flexion, extension, lateral flexion and rotation of the user human torso, upon user control, via powered angular displacement (fore/aft) of the user torso with respect to the legs (about the x-axis);

The fitness device provides one or more mechanisms for applying supplemental flexion/extension of the user human torso, upon user control, via powered angular displacement (fore/aft) of the user pelvis with respect to the torso (pelvic tilt, about the x-axis), coordinated with the rotation motion;

The fitness device provides one or more mechanisms for applying supplemental resistive force at the user feet, upon user control;

The fitness device provides one or more mechanisms for a user to orient their physical position relative to the fitness device such that the user may be prone (facing the fitness device), supine (facing away from the fitness device), or lateral (facing sideways relative to the fitness device), and laterally flexed in varying degrees of rotation along the craniocaudal (y) axis;

The fitness device provides one or more mechanisms for users to locate their feet, in any of the defined orientations, such that supplemental resistive force can be applied if desired by the user;

The fitness device provides one or more mechanisms for the user to locate their hands in front of their body (e.g., via hand grips), when they are in the prone or supine position;

The fitness device provides one or more mechanisms for the user to locate their hands above their body (e.g., via an overhead bar), when they are in the prone, supine, or lateral position;

The fitness device provides one or more mechanisms for the user to halt motion of the fitness device during execution of one or more exercise sequences;

The fitness device provides one or more mechanisms for adjustment of the overall device height, to accommodate variations in user leg length;

The fitness device provides one or more mechanisms for up/down adjustment of the overhead bar, parallel to the coronal plane, in the direction of the y-axis;

The fitness device provides one or more mechanisms for in/out adjustment of the overhead bar, parallel to the lateral plane, in the direction of the z-axis;

The fitness device provides one or more mechanisms for up/down adjustment of the arm supports;

The fitness device provides one or more mechanisms for lateral adjustment of the arm supports (about the y-axis), to accommodate users of varying girth;

The fitness device provides one or more mechanisms for restraining the feet of the user, with allowance for motion both upward (perpendicular to the ground plane) and outward along the user dorsoventral axis (z-axis);

The fitness device provides for two or more modes of operation, including a manual mode of operation and repetition mode of operation, selectable via a user interface of the fitness device, where the manual mode of operation provides the user with controls to start and stop one or more exercise motions on command and to control an amount of applied resistive force, and the repetition mode of operation provides the user with controls to start and stop one or more sequences of repetitive exercise motions and to control an amount of applied resistive force;

The fitness device, on user command of an emergency stop, de-energizes all sources of user exercise motions, including application of resistive force applied to the feet, and may return the user to an upright position and allow the user to physically remove themselves from tension; and The fitness device provides one or more mechanisms for, upon user command, returning all motions to a starting position and releasing any applied forces.

In some embodiments, the fitness device is configured to provide one or more of the following performance requirements:

The fitness device is configured to apply rotation of the human torso, in various degrees of rotation over a continuous range from 0 degrees (deg) (upright) to 60 deg (fully extended);

The fitness device is configured to apply prone, supine and lateral flexion of the human torso, at an angular rate of approximately 0 to 30 degrees per second (deg/sec);

The fitness device is configured to apply supplemental flexion/extension (pelvic tilt) and extension along the z-axis, of the user human torso, over a continuous range from 0 deg (aligned with torso) to 30 deg (forward);

The fitness device is configured to apply supplemental flexion/extension (pelvic tilt) of the user human torso, at an angular rate not exceeding 0 to 10 deg/sec;

The fitness device is configured to provide pelvic tilt coordinated with rotation, at user command;

The fitness device is configured to apply supplemental resistive force at the user feet, over a range from 0 to 890 Newtons (N) (200 pound-force (lbf));

The fitness device is configured to enable overall height adjustment to accommodate variations in user leg length over a range from 65 centimeters (cm) (26 inches (in)) to 110 cm (43 in) measured at the inseam;

The fitness device is configured for up/down adjustment of the overhead bar;

The fitness device is configured for in/out adjustment of the overhead bar;

The fitness device is configured for up/down adjustment of the arm support with an adjustment application force not exceeding 90N (20 lbf), or for manual up/down adjustment of the arm support possibly using a counterweight or spring shock;

The fitness device is configured for lateral adjustment of the arm support through a range of ±30 deg (where 0 deg reference is perpendicular to the user coronal plane);

The fitness device is configured to provide free outward motion of the feet along the z-axis; and The fitness device is configured to provide rotational motion of the foot restraint, over from 0 to 360 deg of rotation, about the y-axis.

In some embodiments, the fitness device is also configured to provide one or more interface requirements, including user interface requirements, power interface requirements and physical interface requirements. The user interface includes all mechanisms with which the user can interface with the fitness device, including command and control interfaces and user safety considerations. The power interface includes all mechanisms with which the fitness device can transfer energy to/from the environment, including constraints on power consumption. The physical interface includes all mechanisms with which the fitness device can transfer mechanical and heat energy to/from the environment, including constraints on size and mass.

With regard to user interface requirements, it is assumed in some embodiments that the user is trained in operation of the fitness device. The primary interface between the user and the fitness device in some embodiments is the physical interaction between the user body and the various contact points on the fitness device. These contact points include, but are not limited to, the footrest or other foot support or foot restraint, the lumbar panel, the upper body panel, the arm supports, the hand grips, and the overhead bar. In addition to the user interface, the fitness device in some embodiments provides a control interface for the user, including controls on the hand grips which function as mechanisms for operating the fitness device.

User interface requirements related to physical contact may include one or more of: accommodating users with body mass not exceeding 180 kilograms (kg) (400 pounds (lb)); accommodating users with height not exceeding 214 cm (84 in); accommodating users with height not less than 145 cm (57 in); accommodating users with leg length, measured at inseam, not exceeding 110 cm (43 in); accommodating users with leg length, measured at inseam, not less than 65 cm (26 in); and accommodating users with torso width not exceeding 60 cm (24 in).

User interface requirements related to system control may include one or more of:

The fitness device is configured to provide the user with a user control interface, allowing the user to specify parameters for conducting the exercise motions, where the user interface includes a control panel and/or control buttons (e.g., on the hand grips and/or on the overhead bar);

The fitness device is configured to provide the user with one or more mechanisms for specifying the mode of operation (e.g., manual, repetitive, etc.) at the user control interface;

The fitness device is configured to provide the user with one or more mechanisms for specifying the extent of torso flexion/extension at the user control interface (e.g., using one or more pre-set levels);

The fitness device is configured to provide the user with one or more mechanisms for specifying the extent of supplemental prone, supine and lateral flexion at the user control interface (e.g., using one or more pre-set levels);

The fitness device is configured to provide the user with one or more mechanisms for specifying the number of repetitions to be executed in a repetitive mode of operation at the user control interface;

The fitness device is configured to provide the user with one or more mechanisms for starting one or more exercise motions, at any user position while the user is positioned in the fitness device for exercise, in any position in which the fitness device is used (prone, supine, lateral);

The fitness device is configured to provide the user with one or more mechanisms for stopping the exercise motion, at any user position while the user is positioned in the fitness device for exercise, in any position in which the fitness device is used (prone, supine, lateral); and The fitness device is configured to provide the user with one or more mechanisms for invoking an emergency stop control while the user is positioned in the fitness device for exercise, in any position in which the fitness device is used (prone, supine, lateral).

User safety requirements may include one or more of: the fitness device not exposing the user to surfaces that cause laceration; the fitness device not exposing the user to material that is categorized as hazardous by the Globally Harmonized System (GHS); and the fitness device not exposing the user to device-generated electrical or radiation hazards.

Power interface requirements may include one or more of: the fitness device is configured for operation, fulfilling all functional requirements, using residential-class electrical power as the sole source of power, with electrical power consumption not to exceed 110 volts (V) alternating current (AC)/10 amperes (A) or 220V AC/5 A (single phase).

In some embodiments, the fitness device meets one or more of the following size and weight requirements: an overall width, while in a configuration suitable for transport, not exceeding 90 cm (35 in); an overall height, while in a configuration suitable for intended use, not exceeding 240 cm (95 in); a maximum mass of 90 kg (200 lbm); an interface with the physical environment via the floor, supported at four corners of a base portion with non-slip feet; and the capability for adjusting the height of the floor interface, over a range of ±25 millimeters (mm) (±1 in), to allow compensation for leveling and uneven floor surfaces.

In some embodiments, the fitness device is configured to operate as described herein while in an indoor office-class environment with a temperature in the range of degrees Celsius (° C.) (50-95 degrees Fahrenheit (° F.)) and relative humidity within the range of 10-90%, non-condensing.

In some embodiments, the fitness device is configured to meet one or more transportability requirements including one or more of: providing one or more mechanisms for attaching or deploying wheels, thereby allowing local transportation across smooth, flat, hard indoor surfaces; meeting all operating requirements as described herein when situated in an operating environment such that it is level in all directions; providing one or more mechanisms for stowing or collapsing any protruding components such that a transportable configuration is achieved, to allow compliance with the requirement for maximum transportable width; and meeting all operating requirements after shipping in an environment with temperatures within the range of −10° C. to 40° C. (14-104° F.), and relative humidity within the range of 10-90%, non-condensing.

It is to be appreciated that the various "requirements" described above and elsewhere herein are presented by way of example only, and that in some embodiments a fitness device may conform to some, all or none of these requirements. It should be further appreciated that all material types, dimensions, ranges, etc. described above and elsewhere herein are presented by way of example only and that various other suitable materials, dimensions, ranges, etc. may be used as desired for a particular implementation.

In some embodiments, the fitness device is configured with an expected life greater than 10 years, with availability and reliability requirements including one or more of: minimum fitness device availability of 99% (e.g., less than 10 hours (hrs) of down-time per 1000 hrs of scheduled operation); required preventative maintenance will not exceed 5 hrs per 1000 hrs of operation; mean time between failure (MTBF) greater than 1000 hrs; and mean time to repair (MTTR) less than 5 hrs, with the provision that required parts and trained repair personnel are available at the time of failure.

In some embodiments, fitness devices enable various core muscle stretching activities. The fitness devices described herein are designed to increase user wellness, flexibility and mobility, range of motion, and to improve posture and overall athletic performance. As will be described in further detail below, fitness devices in some embodiments provide power resistance stretching. The disclosed fitness devices are also multi-positional, and provide for self-activated stretch and other exercise of users thereof. Thus, the fitness devices described herein provide an alternative to less effective and time-consuming core stretch regimens. It should be appreciated, however, that the fitness devices described herein may be used as a supplement to other core stretch regimens rather than as a replacement to such other core stretch regimens. The fitness devices described herein are designed to be user-friendly, providing appeal to a wide variety of users (e.g., from beginner exercise enthusiasts to professional athletes).

Advantageously, users of the fitness devices described herein can safely perform a variety of stretch and other exercise programs utilizing three-dimensional (3D) positioning capability. Fitness devices may therefore have custom positioning tailored towards users' individual needs. In some embodiments, fitness devices are equipped with power and manual controls as well as adjustable table height, foot supports or restraints, arm supports, etc. Users can expect increased flexibility, enhanced performance, and improved posture, whether approaching or utilizing the fitness devices in the supine, prone or lateral positioning. In some embodiments, fitness devices are designed to be controlled entirely by the users thereof without requiring supervision. Instructions for use of the fitness devices may be displayed on the fitness device, on a mobile computing device of a user that is coupled or otherwise paired with or connected to the fitness device, etc.

Core muscle stretching may be instrumental for physical success, and is enabled using the fitness devices described herein in illustrative embodiments. Fitness devices are advantageously 3D multi-positional (e.g., supine, prone, lateral), providing self-activated power resistance stretching, enabling increased flexibility, enhanced performance and improved posture. Fitness devices described herein also provide assessment capability, and enable both active and passive user participation (e.g., in isotonic, isometric and isokinetic exercise). The fitness devices described herein may be used for a variety of purposes, including prevention, wellness, and rehabilitation. Further, controls of the fitness devices described herein are user-friendly, motivating and time efficient.

In some embodiments, fitness devices are used for targeted stretching and exercising of specific muscle groups to increase flexibility, mobility and strength of a user thereof. Performance of the user is also enhanced, and posture is improved through stretching. The user can decide to use the fitness device in any desired position (e.g., supine, prone, lateral). The decision is dependent on which specific muscles and joints that the user is targeting. In some embodiments, a quick reference exercise chart is affixed to the device at a side panel thereof, to guide the user to which position is best suited to meet a user's core stretching objective. The quick reference exercise chart may also be output on a display of the fitness device, or a device coupled or otherwise paired or connected thereto (e.g., a smartphone or other mobile computing device of the user). An exercise routine may involve the user utilizing the fitness device in multiple positions. Each position may affect the core muscles of the user differently. The supine position (e.g., facing away from the fitness device) provides an extension position. The prone position (e.g., facing towards the fitness device) provides a flexion position. The lateral position (e.g., facing sideways, both left and right relative to the fitness device) provides a lateral position.

Prior to commencing a stretch or exercise routine, the fitness device may be set up and positioned by the user. Fitness device set up and positioning, in some embodiments, includes adjusting for height of the user. The user, for example, may select a height setting on a control panel of the fitness device, which automatically raises or lowers the rotating frame of the fitness device in order to align the center of a contoured lumbar support thereof to a center of a lower back and pelvis junction of the user. The user may then select, via the control panel, the degree or intensity of the stretching force to be applied. In some embodiments, the stretching force options are graded, ranging from (1) mild to (2) moderate to (3) intense. It should be appreciated, however, that there may be fewer or more than three stretching force options. The control panel, for example, may have a dial or other continuous control range for adjusting the stretching force to more than three stretching force options.

The intensity of the stretch or resistance may be managed by sensors located in an ankle or foot restraint system or component of the fitness device, allowing for consistent measure of resistance during use of the fitness device. One or more sensors may also or alternatively be located on or otherwise be part of a base assembly, elevation assembly, or other component or components of a fitness device. Measurements from such sensors, in addition to managing the intensity of the stretch or resistance provided by the foot restraint system or component, may also or alternatively be used in controlling various other motion or movement of components of a fitness device. In other embodiments, however, adjustment or control of motion or movement of components of a fitness device (e.g., lift and rotation of a table, tilt of portions of a cushion assembly, etc.) may be independent of any feedback from sensors such that the sensors may be omitted.

When included, sensors may provide measurements or feedback of various aspects of the fitness device, including but not limited to height of a table of the fitness device, rotation of the table of the fitness device, tilt or elevation of portions of a cushion assembly, etc. In some embodiments, resistive force applied by a foot restraint provides the necessary sensor feedback to precisely determine the degree of rotation and lift of the table. It should also be noted that the fitness device may include an optional elevation assembly that enables a change in height of the table. The elevation assembly, however, may offer only an attachment point for the rotating table and not a change in height of the table (e.g., the elevation assembly remains at a fixed height). Height adjustment displacement feedback enables the table to variably rotate on its axis, such as within a rotational arch of 0 to 60 degrees, and also limits excessive elevation of the user's foot restraint system from its attachment to the base assembly.

Optimal user positioning may be achieved by the user placing their feet and/or ankles into a foot restraint system or component of the fitness device. Very tall and very short users, in some cases, may need to adjust a height of arm supports of the fitness device to achieve maximum benefit. The foot and ankle restraint system or component combined with the arm supports ensure proper stretching force or resistance.

Fitness devices, in some embodiments, include control buttons or other control interface features conveniently located at handles or hand grips that are operated by the user to initiate rotation and elevation of the upper body support platform of a fitness device to allow for full body stretching. Dynamic motion of the fitness device may be entirely power driven, enabling effective passive stretching of the muscles. A fitness device may also or alternatively be configured for manual driven motion for active stretching of the muscles. A contoured lumbar support section of the fitness device may be configured to at least one of rotate outwardly relative to a thoracic section of the fitness device and extend outwardly as an upper body support platform of the fitness device rotates away from a home position. Both the lumbar support section and the thoracic section may be embodied as cushions of a cushion assembly mounted to a table of the fitness device. The user may fine-tune the stretching experience and reduce the maximum force by limiting the extent of travel of the rotating platform (e.g., a table of the fitness device). This may be accomplished by releasing motion control buttons of the fitness device.

Fitness devices described herein may be programmed to perform various exercise and stretch routines. A given exercise or stretch routine may be associated with parameters for: an exercise cycle; a number of sets; a number of repetitions; and timing. The exercise cycle defines a complete rotation of the fitness device from a vertical home position to the limit of full rotation, and then back to the initial starting position. The user can decide if they want to exercise utilizing one or multiple positions (e.g., prone, supine, lateral) in one or more sets. In some embodiments, exercise cycle parameters are separately set for different positions of use of the fitness device (e.g., there may be a first exercise cycle for the prone position and second exercise cycle for the lateral position, with the first exercise cycle and the second exercise cycle having different ranges or limits of rotation). The number of repetitions in a typical regime may be to exercise between 5 and 10 repetitions in each position. It should be appreciated, however, that the user may select fewer than 5 or greater than 10 repetitions as desired. Timing parameters control the length or duration of each exercise cycle, which is expected to last between 10 and 20 seconds but may be shorter or longer as desired. The user may customize the time length of any given exercise cycle by delaying or prolonging that exercise cycle using hand-control buttons or other control interfaces of the fitness device.

In some embodiments, the fitness device includes an overhead bar facilitating isometric and isotonic stretching. The inclusion of the overhead bar provides the ability to implement upper body superficial and deep core muscle stretching, as well as upper extremity arm, scapular and forearm muscular and joint recruitment during the stretching process if desired.

Any discomfort of the user may be immediately mitigated by the user using the hand-control buttons or other control interfaces of the fitness device to stop or reverse the motion of the rotating platform of the fitness device. As an example, discomfort to resistive ankle or foot restraints, or the perception of stretching, may be mitigated using such controls. The fitness device may also be configured with various emergency stop switches, buttons or other control interfaces conveniently located on or near handle bars and hand grips accessible by the user in the prone, supine and lateral positions.

FIGS. 1A-1F depict a fitness device 100 for use by fitness enthusiasts or other users for exercise, including back exercise and stretching. The fitness device 100 advantageously assists the user by enabling active stretching exercises, which are performed before, during or after one or more other physical exercises. It should be appreciated, however, that the fitness device 100 may also be used independent of other physical exercises instead of being used before, during or after one or more other physical exercises. The active stretching, in some cases, improves the effectiveness of such other physical exercises. In some embodiments, the primary exercise action imparted on the user is the application of an angular displacement about the lumbar region, for the purpose of lumbar flexion and extension exercise.

Figure 1B:
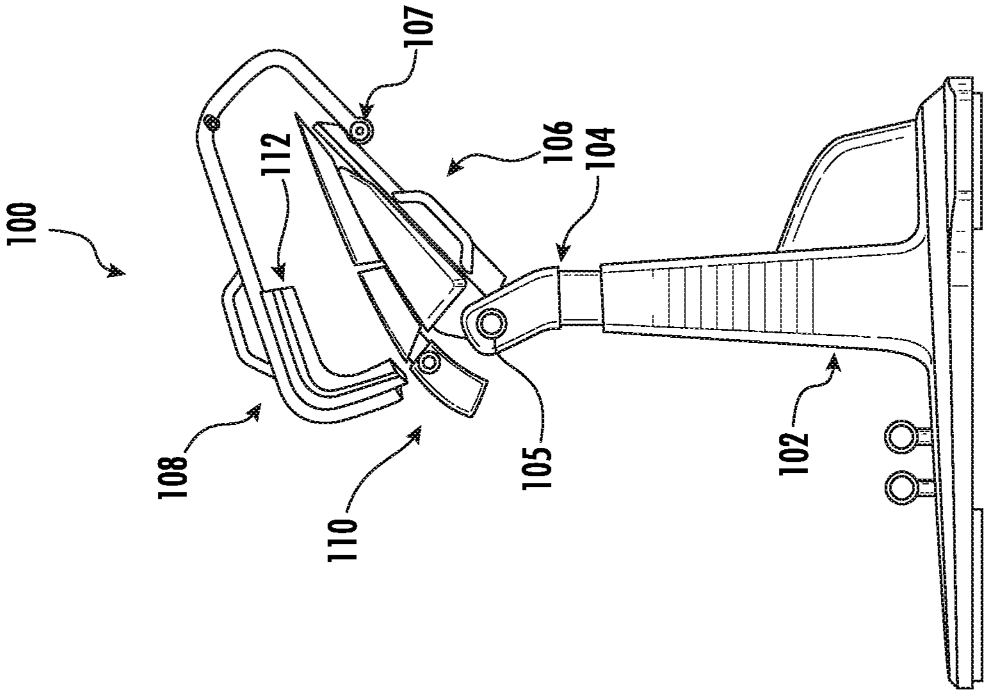

FIGS. 1A and 1B depict the fitness device 100 in starting and rotated positions, respectively. The fitness device 100 includes a base assembly 102 (including an optional foot restraint described in further detail below), an elevation assembly 104, a table 106, a restraint and overhead bar 108 and a cushion assembly 110. The table 106 is configured to rotate about the table rotation axis 105. The restraint and overhead bar 108 is configured to rotate about the restraint and overhead bar rotation axis 107. The restraint and overhead bar 108 also includes underarm supports 112.

The height of the table 106 is configured to increase or decrease as stretch is applied via rotation of the table 106 about the table rotation axis 105. For example, in some embodiments the elevation assembly 104 is actuated to raise or lower the table 106 as it rotates to provide a desired amount of stretch of a user positioned in the fitness device 100 as will be described in further detail below. It should be noted that stretch may be provided by lifting a user positioned in the fitness device 100 (e.g., via elevation assembly 104) instead of rotating the user by rotating the table 106 about the table rotation axis 105. As described above, stretch may also be provided through combinations of lifting the table 106 (e.g., via elevation assembly 104) and rotating the table 106 (e.g., via rotation about the table rotation axis 105).

FIG. 1A shows the fitness device 100 in a starting position, where the table 106 is in a vertical orientation. The starting height of the table 106 is adjusted via elevation assembly 104. The elevation assembly 104 enables manual or powered lift of the table 106. In some embodiments the elevation assembly 104 is configured for manual lift where the user lays back on the table 106 and adjusts the height to provide traction force. In other modes of operation, the fitness device 100 provides vertical movement only without rotation of the table 106, free-floating rotation of the table 106, vertical plus corkscrew motion of the table 106 (e.g., possibly in conjunction with foot restraints as described in further detail below), etc.

It should be appreciated that there are various alternatives to the single-column elevation assembly shown in FIG. 1A, including dual-column elevation assemblies, with various telescoping mechanisms for enabling lift of the table 106. It should further be appreciated that the location of the table rotation axis 105 shown in FIG. 1 is presented by way of example only. In other embodiments, the table rotation axis 105 may be placed higher or lower to achieve different desired amounts and locations of stretch of a user positioned on the fitness device 100. The fitness device 100 may also be configured with multiple table rotation axes, so as to provide further customization of amounts and locations of stretch of a user positioned on the fitness device.

To use the fitness device 100, a user situates their body relative to the fitness device 100 by facing toward the fitness device 100 (e.g., prone), facing away from the fitness device 100 (e.g., supine) or laterally facing the fitness device 100. These different positions of the user relative to the fitness device 100 will be described in further detail below in conjunction with FIGS. 3A-3D.

To restrain the user on the table 106, the user's underarms are positioned to rest on the underarm support 112 coupled to the restraint and overhead bar 108. The user then holds onto hand grips on different portions of the restraint and overhead bar 108 that are available for the particular position of the user relative to the fitness device 100 (e.g., prone, supine, lateral). Different configurations of hand grips on the restraint and overhead bar 108 will be described in further detail below with respect to FIGS. 4A-4G. It is also noted that use of the restraint and overhead bar 108 is optional, and that a fitness device in some embodiments may not utilize an overhead restraint. In other embodiments, a fitness device may be configured with other types of restraints, such as restraint bars that rotate laterally from sides of the table 106, rather than or in addition to using the restraint and overhead bar 108 that rotates about the restraint and overhead bar rotation axis 107 positioned proximate an upper portion of the fitness device 100 (e.g., near to the head of the user when positioned on the fitness device 100).

Once the user is securely positioned on the fitness device 100, the user can utilize controls (e.g., located on the base assembly 102, elevation assembly 104, table 106, restraint and overhead bar 108 including hand grips thereof, etc.) to rotate the table 106 from the starting position shown in FIG. 1A to the rotated position shown in FIG. 1B. Thus, the fitness device 100 is configured to provide exercise via dynamic lifting with simultaneous or coordinated rotation of the user, possibly in conjunction with optional restraints and resistance applied at the lower extremities of the user (e.g., the feet and ankles of the user) as will be described in further detail below.

Controls located on hand grips of the restraint and overhead bar 108 (as well as controls positioned on the table 106 or one or more other sections of the fitness device 100 providing user interface features) allow powered rotation of the table 106, including flexion and extension and lateral flexion positioning of the human torso of the user. The lower body mass and optional foot restraints may be used to provide additional resistance. Gravity acting on the user provides additional benefits for the stretch exercises.

For additional stretch, the user of the fitness device 100 in some embodiments utilizes optional foot restraints which are on or coupled to the base assembly 102. The foot restraint provides mechanisms for attaching and securing the user's feet. Use of the foot restraint also provides resistance to the forces and motions imparted on the user by the elevation and rotational motions applied by the table 106. The foot restraint, in some embodiments, is repositionable (e.g., via rotation, translation along a track, etc.) to allow prone, supine and lateral use. The height of the table 106 in some embodiments is settable or programmable (either powered or non-powered) to compensate for user height and body proportions. It is assumed that the foot restraints described herein are configured for removable attachment or mounting to a fitness device. In some embodiments, however, a foot restraint may be formed integrally with a fitness device such that the foot restraint is not removable.

As noted above, the fitness device 100 includes a base assembly 102, an elevation assembly 104, a table 106 and a restraint and overhead bar 108. The base assembly 102 in some embodiments includes a platform, a foot restraint, a computerized user interface, system controls, a leg force monitor, etc. The elevation assembly 104 includes one or more elevation posts (e.g., telescoping posts) to raise or lower the height of the table 106. The table 106 also provides hand grips and a cushion assembly 110 including different cushions for the head, thoracic and lumbar sections of the body of the user. In some embodiments, the cushion assembly 110 further includes a pelvic cushion, separate from the lumbar cushion, which is rotationally secured to the lumbar cushion supporting the pelvis and thighs of the user. The pelvic and lumbar cushions may be connected for coordinated longitudinal movement and rotational movement. The feet of the user of the fitness device 100 turn with the pelvis of the user (e.g., the feet of the user follow rotational movement of the pelvis of the user). The sizing of the pelvis cushion further facilitates access to the user by an assistant or trainer. The restraint and overhead bar 108 includes underarm supports 112 as well as various hand grips.

The restraint and overhead bar 108 is configured to open (e.g., via rotation about restraint and overheard bar rotation axis 107) in order to facilitate entry of the user into the fitness device 100, and for providing a secure restraint for the user while in the fitness device 100. One or more actuators affixed to the base assembly 102 and/or elevation assembly 104 are configured to raise and lower the table 106. One or more actuators affixed to the elevation assembly 104 and/or the table 106 are configured to allow the table 106 to pivot about the table rotation axis 105. One or more actuators within the table 106 are configured to allow the different sections of the cushion assembly 110 to move relative to one another and the table 106. In some embodiments, such various actuators comprise respective linear actuators, such as linear actuators powered by electric motors. It should be appreciated, however, that various other types of actuators may be used in place or in addition to such electric motor-powered linear actuators.

Figure 1D:
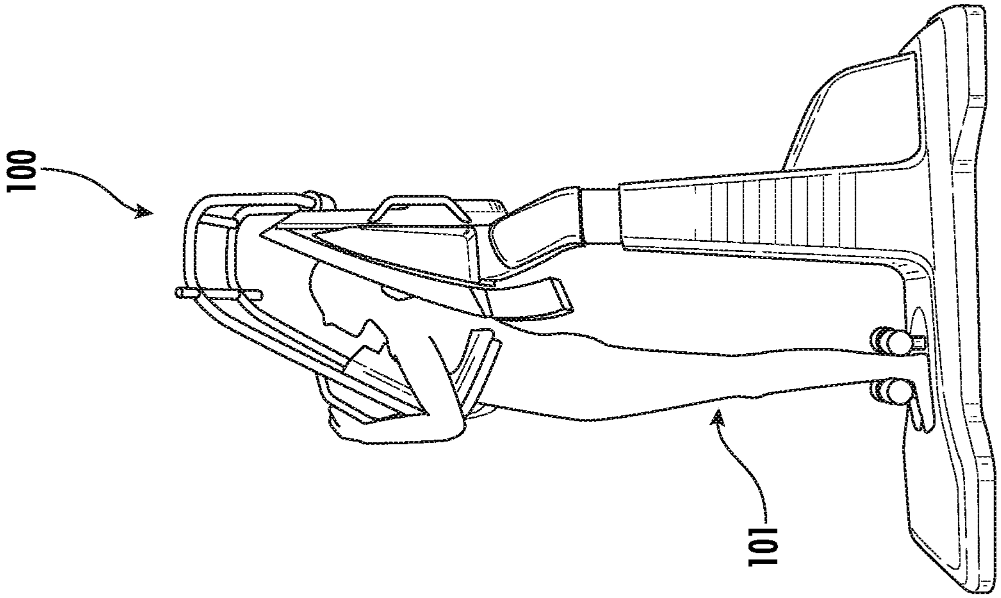
Figure 1C:
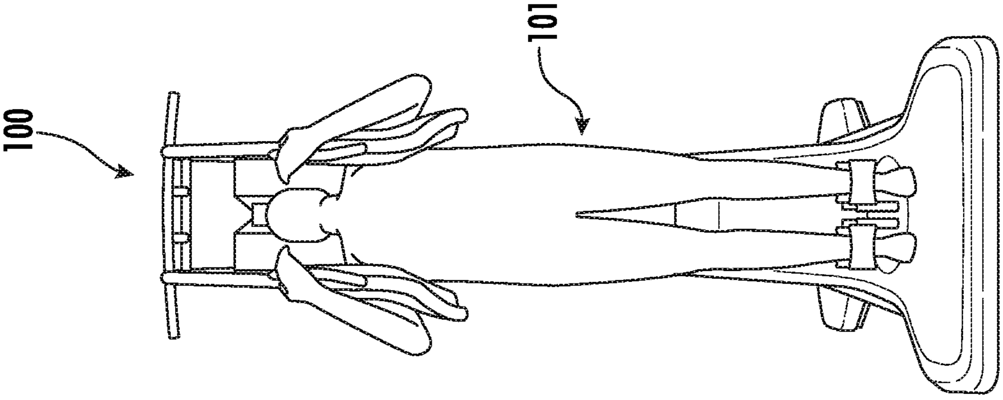
Figure 1E:
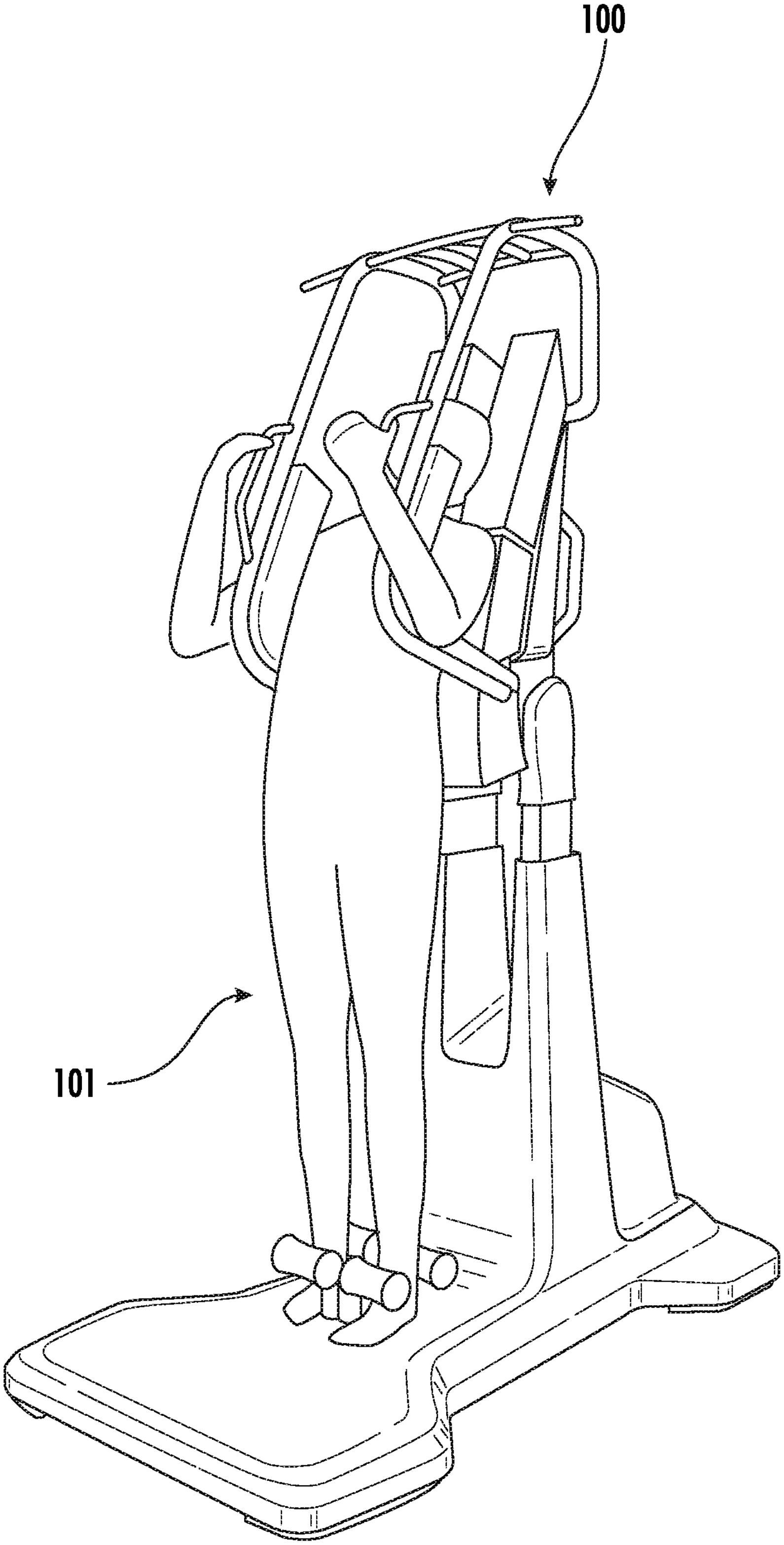
Figure 1F:
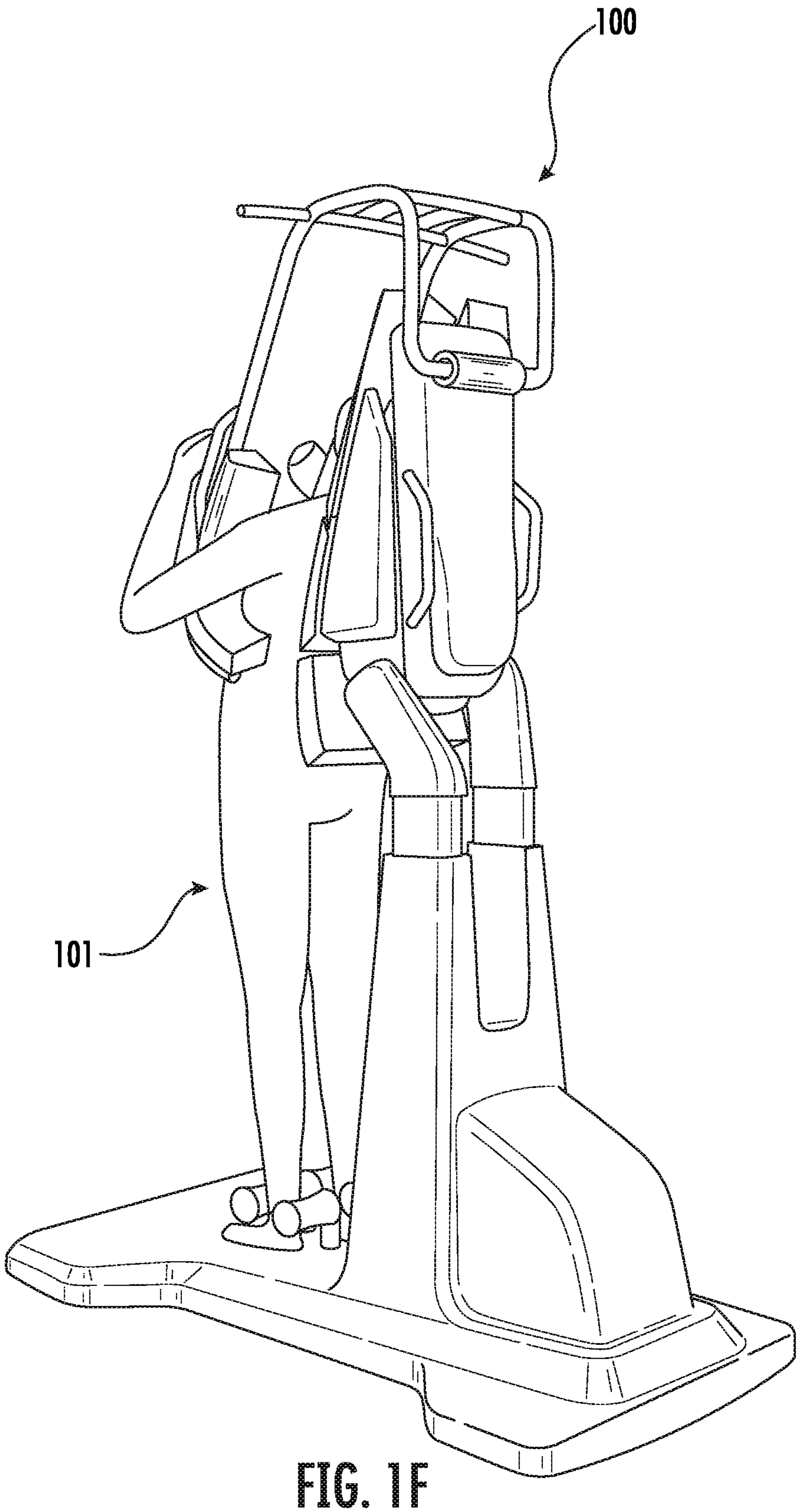

FIGS. 1C, 1D, 1E and 1F illustrate a user 101 positioned in the fitness device 100 in the supine position. More particularly, FIG. 1C shows a front view of the user 101 in the supine position in the fitness device 100, FIG. 1D shows a side view of the user 101 in the supine position in the fitness device 100, and FIGS. 1E and 1F show perspective views of the user 101 in the supine position in the fitness device 100. FIGS. 1C-1F show examples where the user 101 while positioned in the fitness device 100 utilizes an optional foot restraint that is included in or affixed to the base assembly 102. The particular type of foot restraint shown in FIGS. 1C-1F is described in further detail below with respect to the examples of FIGS. 5A and 5B, 12A-12F, and 29A-34C.

FIG. 2 illustrates the various planes axes that are referred to throughout the description, including the left-right lateral (x) axis, the longitudinal craniocaudal (y) axis, the fore-aft anteroposterior (z) axis, the transverse plane, the coronal plane, the mid-sagittal plane, and the para-sagittal plane.

Figure 3B:
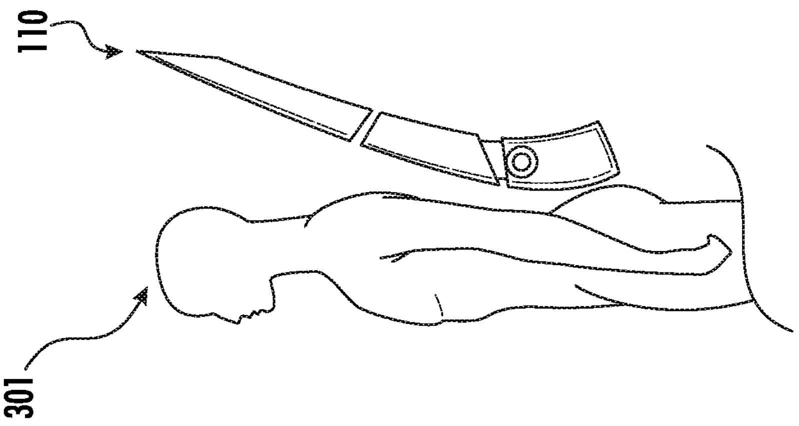
FIGS. 3A-3D depict aspects of a cushion assembly of a fitness device, according to an embodiment of the invention.
Figure 3A:
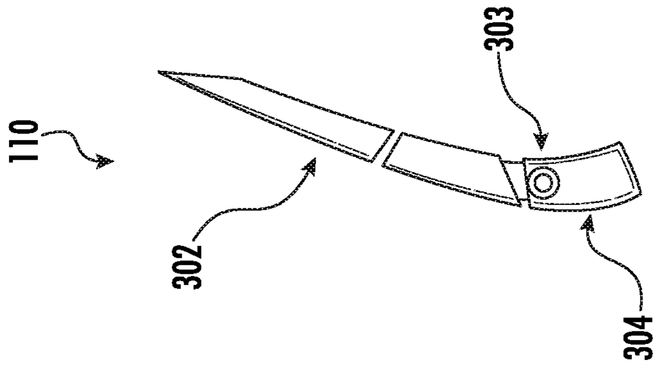
Figure 3D:
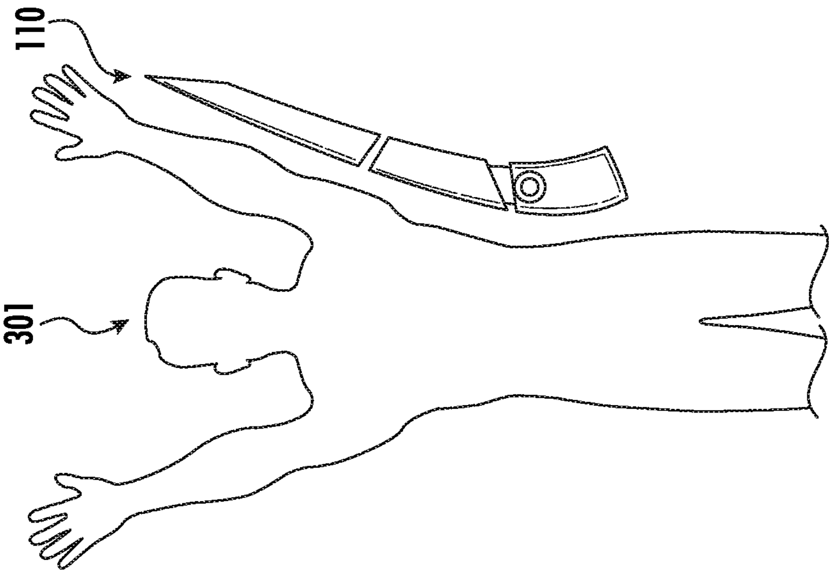
Figure 3C:
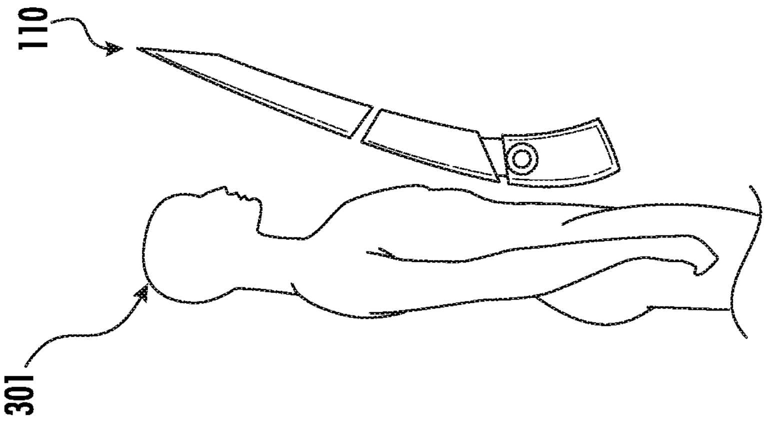

FIGS. 3A-3D illustrate aspects of the cushion assembly 110. FIG. 3A shows an embodiment where the cushion assembly 110 includes a combined thoracic and head cushion 302 and a lumbar cushion 304. In some embodiments, the lumbar cushion 304 is configured to rotate about a lumbar cushion rotation axis 303. As illustrated in FIGS. 1A-1F, the combined thoracic and head cushion 302 may be embodied as two separate cushions (e.g., a head cushion and a thoracic cushion). It should be appreciated, however, that any number of cushions may be used as desired to provide a requisite level of comfort for users of the fitness device 100. Any number of said cushions may be adjustable, either manually or powered via one or more actuators, and may be configured to provide additional exercise benefit in addition to providing improved comfort. FIGS. 3B, 3C and 3D illustrate a user 301 positioned relative to the cushion assembly 110 in the supine, prone and lateral positions, respectively.

Figure 4B:
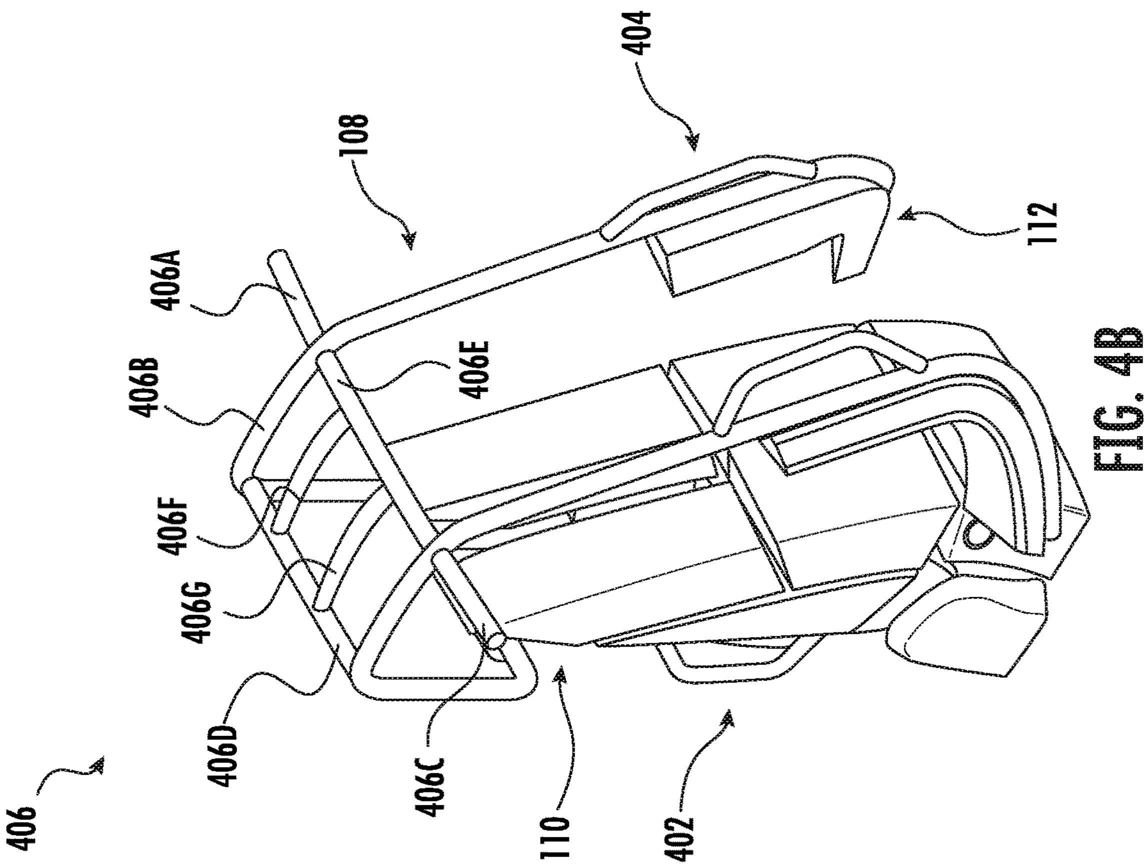
FIGS. 4A-4G depict aspects of operation of an overhead bar of a fitness device, according to an embodiment of the invention.
Figure 4A:
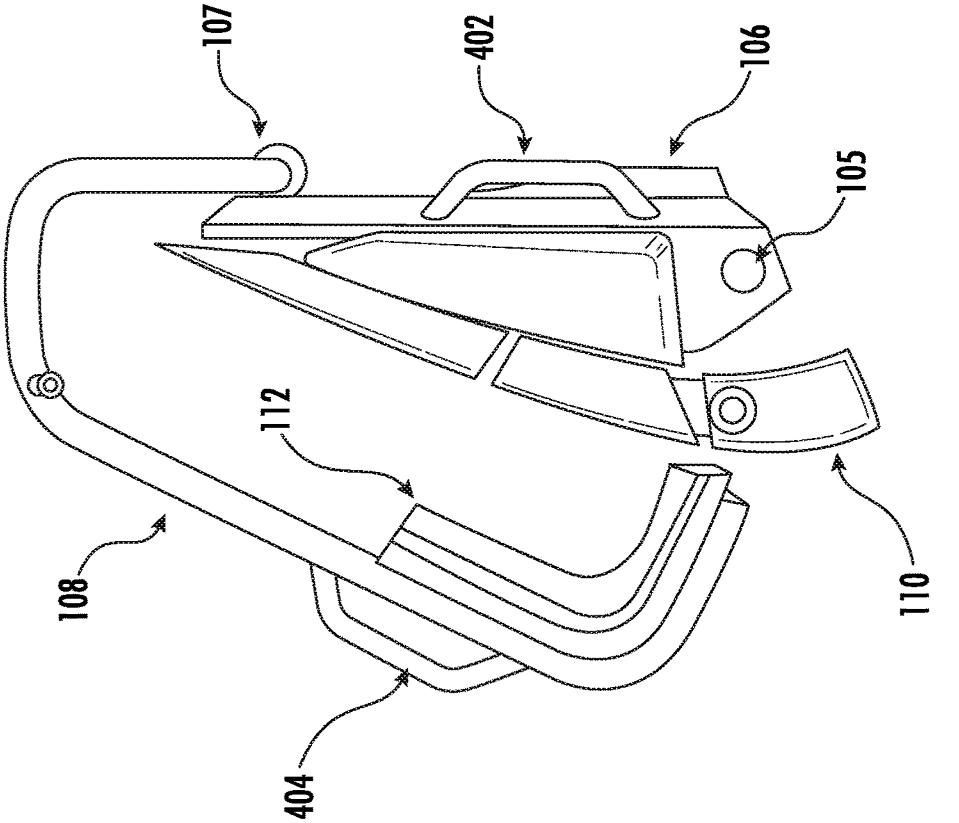

FIGS. 4A-4G illustrate aspects and operation of the restraint and overhead bar 108 of the fitness device 100. FIGS. 4A and 4B show a set of two prone hand grips 402, two supine hand grips 404, and various overhead bar hand grips 406. The hand grips 402, 404 and 406 are positioned for the user to grip while in the fitness device 100 in various positions. For example, the prone hand grips 402 are located for use by the user while in the fitness device 100 in the prone position, the supine hand grips 404 are located for use by the user while in the fitness device 100 in the supine position, and the overhead bar hand grips 406 are located for use by the user in the prone, supine, or lateral position. FIG. 4B more particularly shows various non-limiting example locations 406A, 406B, 406C, 406D, 406E, 406F and 406G for the hand grips on the overhead bar. Some or all of the hand grips 402, 404 and 406 include user interface controls (e.g., buttons, switches, pressure sensors, triggers, etc.) for controlling operation of the fitness device 100. While the hand grips 402, 404 and 406 are located or positioned on the fitness device 100 for easy access in the prone, supine and lateral positions, respectively, it should be appreciated that controls on the hand grips 404, 404 and 406 are not necessarily limited solely for use while the user is in the prone, supine and lateral positions, respectively. Further, while FIGS. 4A-4G illustrate controls that are part of the various hand grips 402, 404 and 406 of the restraint and overhead bar 108, it should be appreciated that the controls, as well as hand grips, may instead by integrated with or affixed to portions of the table 106 and/or the cushion assembly 110 (e.g., such as in embodiments where the restraint and overhead bar 108 is omitted).

In some embodiments, the operation of the fitness device 100 is controlled by a user gripping each of the prone hand grips 402 (or each of the supine hand grips 404, or two of the overhead bar hand grips, or any combination of two of the hand grips 402, 404 and 406) with the user's left and right hands. When the user actuates controls on each of the prone hand grips 402, the table 106 will rotate. When the user actuates controls on just one of the prone hand grips 402, the table 106 stops rotation. When the user does not actuate the controls of either of the prone hand grips 402, the table 106 reverts from a rotated position (e.g., as shown in FIG. 1B) to a starting position (e.g., as shown in FIG. 1A). It should be appreciated that this control scheme is just one example, and that operation of the fitness device 100 may be controlled via different logic using controls on one or more of the hand grips 402, 404 and 406. For example, a user in some embodiments controls the operation of the fitness device 100 (e.g., at least rotation of the table 106 about the table rotation axis 105) using a single hand via controls on one of the hand grips 402, 404 and 406. The controls on the hand grips 402, 404 and 406 in some embodiments are user-programmable, such that a user is enabled to define a desired control scheme for initiating and stopping rotation via a desired sequence of application of controls on the hand grips 402, 404 and 406. In some embodiments, the controls are "clip-on" or removably affixable to desired ones of the hand grips 402, 404 and 406 (or to one or more other portions of the fitness device 100) by the user for easy access in a particular position. The "clip-on" controls may be held by a trainer or instructor to assist in the exercise.

Controls on the hand grips 402, 404 and 406 are not limited to use solely for controlling the rotation of the table 106. Controls on the hand grips 402, 404 and 406 (and controls elsewhere on the fitness device 100) are used to set any combination of the following parameters via a user interface: settable table movements such as translate up, translate down, rotate forward, rotate back, etc.; settable foot restraint resistive exercise force and limits; settable rate of stretch; settable lumbar enhancement level; settable number of repetitions; settable number of sets; automatic return; feedback settings; etc. Automatic return control allows the user to return to the starting position (e.g., as shown in FIG. 1A) once the selected exercise cycle is completed or intentionally canceled by the user. Lumbar enhancement level control allows the user to set a relationship between the table tilt, foot restraint force, and lumbar tilt (e.g., where the lumbar cushion 304 tilts around the lumbar cushion rotation axis 303 to increase the effectiveness of exercise). Lumbar enhancement may also be controlled by the user activating additional controls located on or near one or more of the hand grips 402, 404 and 406.

In some embodiments, the fitness device 100 is programmed with a set of default parameters. The default parameters allow the user: to select limits prior to starting exercise; to have complete control over table movement; and to control exercise using on-board controls. The fitness device 100 is configured to be programmed with one or more presets, such as beginner, intermediate and expert. User-defined profiles for different preset stretching and exercise routines in some embodiments are loaded into the fitness device 100 through a mobile device of the user that is connected to the fitness device 100. In some embodiments, additional incremental control is provided for increased effectiveness.

Feedback settings may take on various forms. In some embodiments, the fitness device 100 is configured to allow the user to set an audible tone to indicate when the user has reached a programmed level of stretch, time at a particular stretch level, etc. The fitness device 100 may also be configured to allow the user to set an audible tone with a beep rate of varying frequency to indicate when the user has reached a programmed level of stretch, time at a particular stretch level, etc. The fitness device 100 is not limited to providing auditory feedback. In other embodiments feedback is provided in the form of haptic feedback or vibration of controls on the hand grips 402, 404 and 406, or on cushions of the cushion assembly 110, etc. In some embodiments, the fitness device 110 also or alternatively includes a display screen or indicator lights for providing this and other feedback.

The fitness device 100 includes a user interface unit, also referred to as a UI, providing the user with the ability to control the parameters of operation of the fitness device 100. In some embodiments, it is expected that settings are set on the UI prior to exercise. In other embodiments, however, the user adjusts settings later during the exercise cycle using the UI. The UI may be located at various positions on the fitness device 100, including but not limited to: on the base assembly 102 in an orientation easily accessible to the user prior to getting onto the fitness device 100; at eye level on the back or side of the table 106 in an orientation easily accessible to the user prior to getting onto the fitness device 100; in an auxiliary unit co-located with the fitness device 100 or remotely located relative to the fitness device 100; in a re-locatable unit such that the user can see a display to track system status, such as exercise session progress, and to modify settings while on the fitness device 100 in the midst of exercise; and in an application provided on a mobile device such as a smartphone, tablet, smartwatch, etc. of the user.

Controls for the UI in some embodiments include one or more of: a graphical user interface (GUI) on a touchscreen; a plurality of buttons and/or switches; a plurality of buttons and/or switches with a display for indicating current selections; and on-board controls accessed at or near one or more of the hand grips 402, 404 and 406, etc. In some embodiments, the on-board controls at or near one or more of the hand grips 402, 404 and 406 include one or more of: control buttons configured for activation by thumbs of the user; trigger-like controls activated by one or more of the fingers of the user; a control activated by squeezing the hand of the user; controls activated by twisting the hand grip (e.g., similar to a motorcycle throttle); a joystick; a sensor that detects whether a hand is holding the hand grip; and one or more secondary buttons for providing independent control of various portions of the fitness device 100, such as a position of one or more portions of the cushion assembly 110 (e.g., a position of the combined thoracic and head cushion 302, a position of the lumbar cushion 304, etc.).

In some embodiments, the UI is configured to store local profiles of different users, so that a user is enabled to save and load customized stretch and other exercise routines while using the fitness device 100. The local profiles may also include information allowing the fitness device 100 to automatically adjust for the height and size of different users.

For control of movements, some embodiments utilize the following control scheme. The control scheme is described for the supine position of the user, but it should be appreciated that the same movement and controls may be used for the prone and lateral positions. The fitness device 100 is configured in some embodiments: to rotate the table 106 backwards (and apply optional foot restraint tension) when controls are activated by both the left and right hand of the user; to hold position of the table 106 (and optional foot restraint tension) constant when either the left hand or the right hand releases the control while the other hand continues to active the control; and to rotate the table 106 forwards (and release optional foot restraint tension) when the user releases the controls from both hands. In another embodiment, one hand is used to control up and down movement of the table 106 while the other hand controls the forward and backward rotation of the table 106. In another embodiment, one rocker switch controls up and down movement of the table 106 while another rocker switch controls forward and backward rotation of the table 106 (where the rocker switches are located for access by a single hand or one by each hand of the user). In other embodiments, any of the above control schemes are utilized with separate lumbar enhancement control located on either or both of the hand grips 402, 404 and 406 being held by the user. In still other embodiments, any of the above control schemes are adjusted such that all controls are accessible and activatable using only one hand.

Figure 4C:
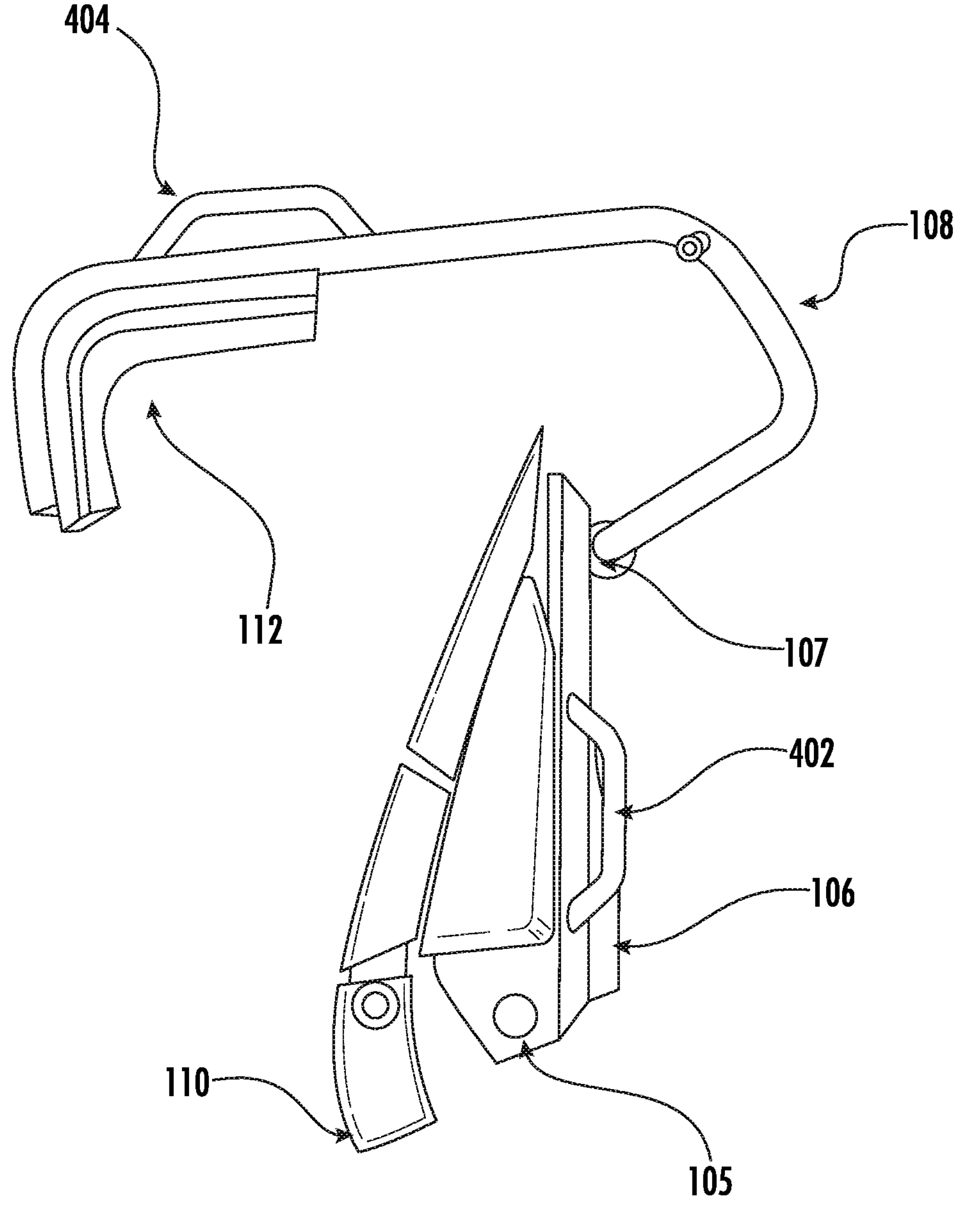
Figure 4D:
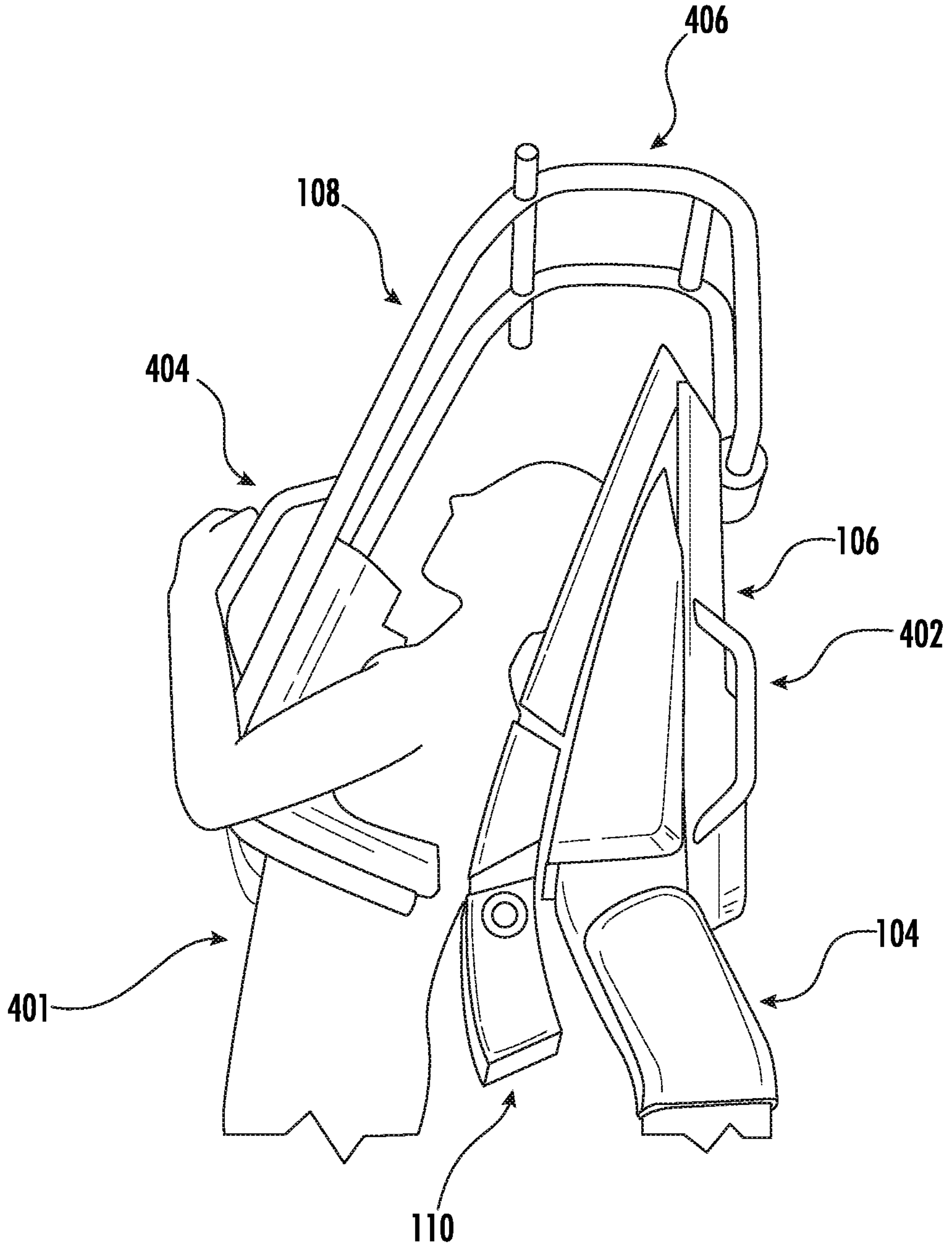

FIG. 4C illustrates rotation of the restraint and overhead bar 108 about the restraint and overhead bar axis 107. The restraint and overhead bar 108 is configured to be raised as shown in FIG. 4C to facilitate user entry onto the fitness device 100, and lowered after the user is suitably positioned on the fitness device 100 to safely secure the user. Gripping the restraint and overhead bar 108 (e.g., overhead bar hand grips 406) provides additional isometric exercise benefits. In other embodiments, the restraint and overhead bar 108 or portions thereof swing out to either side to facilitate user entry onto the fitness device 100. The underarm supports 112 in some embodiments are configured to translate along the x-axis to provide better fit for the user. The restraint and overhead bar 108 is positioned to provide a mechanism for securing the user onto the fitness device 100. FIG. 4D shows a user 401 positioned in the fitness device 100 after rotation of the restraint and overhead bar 108 about the restraint and overhead bar axis 107 as described above.

Figure 4F:
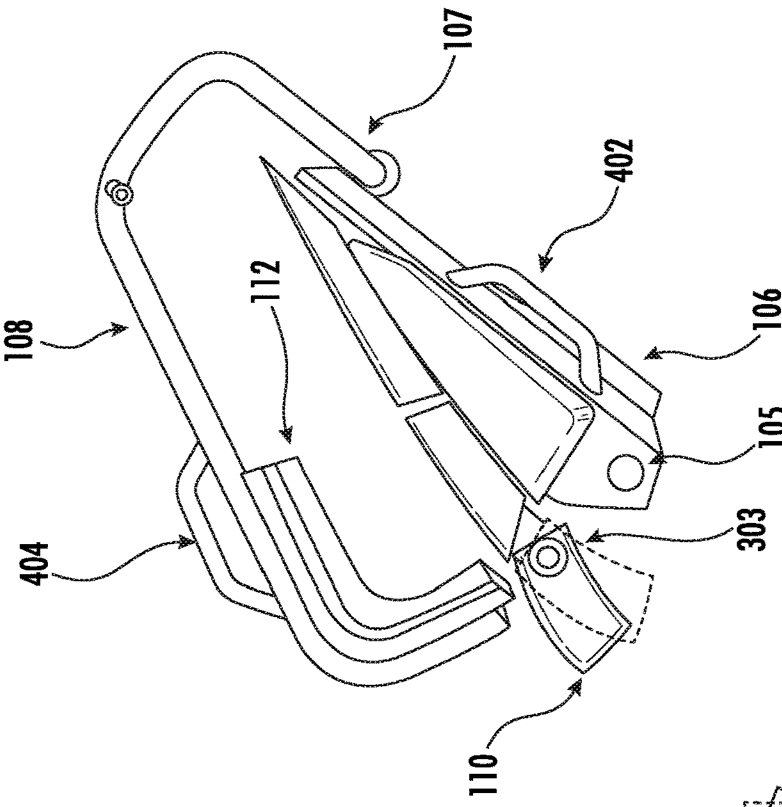
Figure 4G:
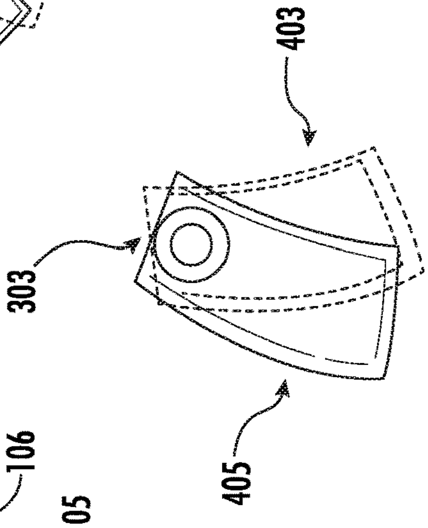
Figure 4E:
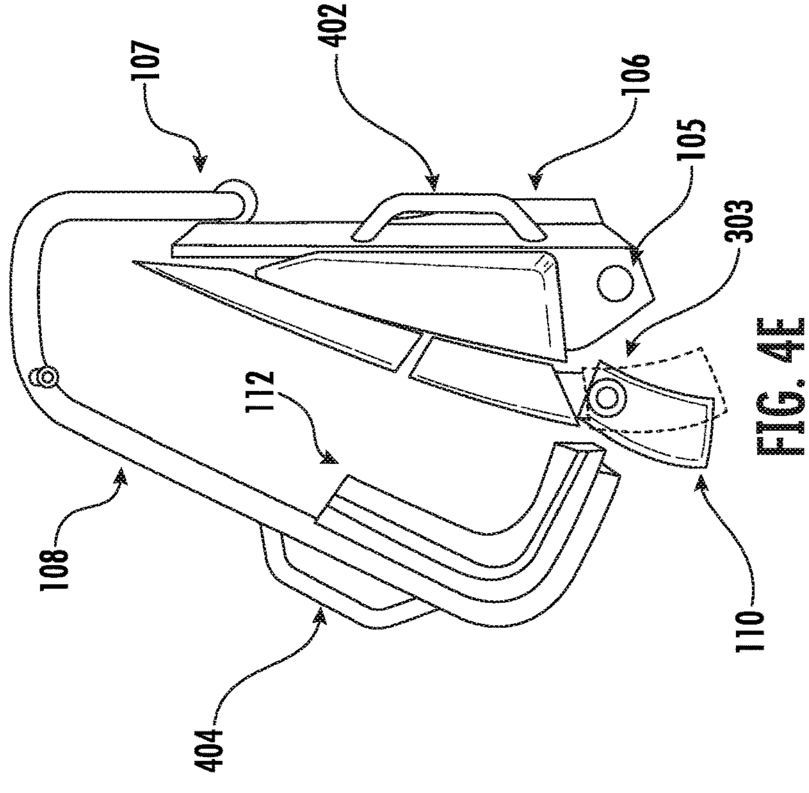

FIGS. 4E and 4F illustrate tilt or rotation of the table 106 and the lumbar cushion 304. The table 106 tilts or rotates about the table rotation axis 105, while the lumbar cushion 304 rotates outward 405 and inward 403 about the lumbar cushion rotation axis 303. The lumbar cushion 304 is rotatable inward and outward in relation to the thoracic and head cushion 302, helping to create a pelvic tilt. The tilt of the lumbar cushion 304 in some embodiments is programmed to be proportional to the tilt of the table 106. The tilt of the lumbar cushion 304 (provided by rotation about the lumbar cushion rotation axis 303) relative to the tilt of the thoracic and head cushion 302 (provided by rotation of the table 106 about table rotation axis 105) can be selected as desired to provide more or less aggressive exercise. In other embodiments, the lumbar cushion 304 tilt can be independent of the thoracic and head cushion 302 tilt. The lumbar cushion 304 tilt control may also be set based on any combination of the user's body type, height and weight. The lumbar cushion 304, in some embodiments, is further configured to translate along the z-axis. The lumbar cushion 304 can also have a combined rotation and translation movement as described above. In some embodiments, the lumbar cushion 304 has an internal Tillable bladder or cavity to provide enhanced stretch (e.g., by filling or emptying the bladder or cavity). The outer surfaces of the cushions of the cushion assembly 110 may be convex, flat or otherwise contoured as desired for user comfort and positioning.

Figure 5B:
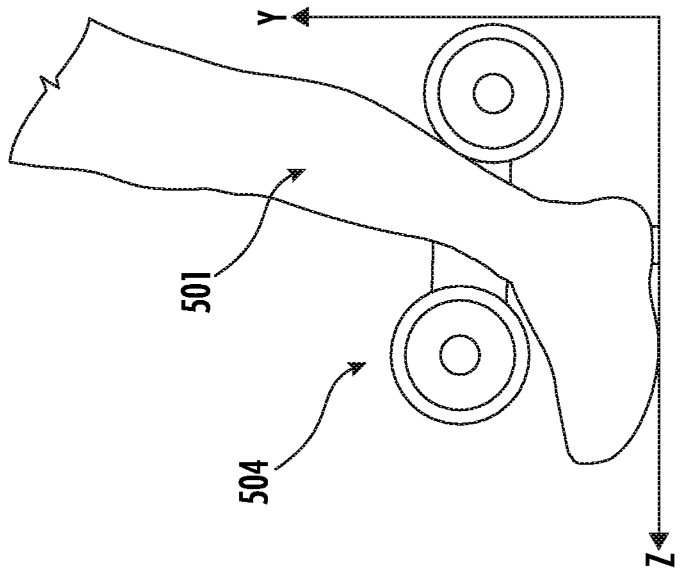
FIGS. 5A and 5B depict aspects of a foot restraint on a base assembly of a fitness device, according to an embodiment of the invention.
Figure 5A:
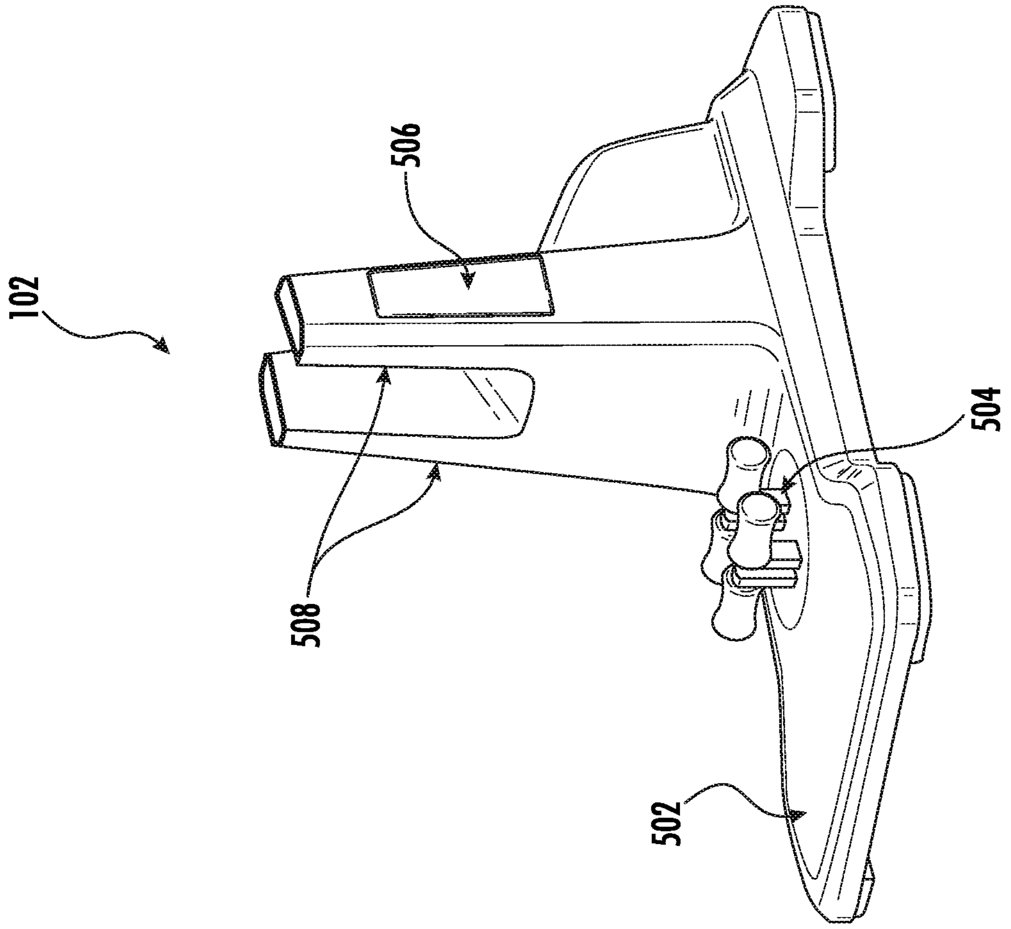

FIGS. 5A and 5B illustrate aspects of the base assembly 102. As shown in FIG. 5A, the base assembly 102 includes a platform 502, a foot restraint 504, a user interface 506, and an interface 508 to the elevation assembly 104. The platform 502 provides a stable base for the fitness device 100, and includes rubber feet on the underside at the four corners. The foot restraint 504 is mounted in the platform 502 as shown. The foot restraint 504 in some embodiments is mounted in the platform 502 using a ball joint or a universal joint providing a pivot point at the base of the feet of the user. The platform 502 includes various sensors at different locations for measuring the forces. Such force measurements from sensors in the platform 502 or elsewhere on the fitness device 100 (or in other fitness devices described herein) may be used for controlling aspects of lift, rotation and other motion and movement of some or all portions or components of the fitness device 100. It should be appreciated, however, that the use of sensors for measuring the forces is not a requirement. In other embodiments, lift, rotation, and other motion and movement of some or all portions of a fitness device may be controlled by limit switches, stroke length of actuators, etc., instead of or in place of software controls or coupled motions based on measurements from sensors.

The pivot point at the base of the feet of the user in some embodiments is counterbalanced with a pivot point at a pelvic support of cushion assembly 110 as described above, where the pivot point of the pelvic support is underneath the pelvic cushion, or below and separate from the pelvic cushion altogether (e.g., on the table 106 or another portion of the fitness device 100). The user interface or UI 506 provides controls for setting exercise parameters and other parameters of the fitness device 100 (e.g., by the user 501 prior to the user 501 being secured onto the fitness device 100).

In the embodiment of FIGS. 5A and 5B, the foot restraint 504 includes sets of cushioned parallel bars or bolsters with the user 501 inserting their feet and ankles between the sets of cushioned parallel bars or bolsters. The foot restraint 504 as shown is mounted to the platform 502 via a circular section that is configured to rotate. Rotation of the foot restraint 504 enables comfortable use in different positions (e.g., prone, supine, lateral) as well as enhanced stretch. The foot restraint 504 includes or is coupled to a force monitor that measures the resistance provided by the foot restraint 504 as the table 106 is elevated and rotated. The force monitor is programmed with logic for adjusting the elevation of the table 106 as the table 106 rotates so as to provide a constant force or resistance on the lower extremities of the user 501. The force monitor in some embodiments is also or alternatively programmed to adjust the force or resistance on the lower extremities of the user 501 as the table 106 elevates and rotates for comfort of the user 501. In some embodiments, it is preferred that the foot restraint 504 provides limited up/down travel so that the feet of the user 501 are not lifted off the ground (or do so minimally). Some embodiments therefore provide the effects of an inversion table without having to lift the user 501 off the ground or tilting the user 501 upside down.

The feet of the user 501 rest between the bolsters of the foot restraint 504 that comfortably grip the feet. The bolsters of the foot restraint 504 may be cylindrical as shown, or may be another shape that is both comfortable and secure (e.g., square or rectangular, elliptical, etc.). In other embodiments described in further detail below, a foot restraint may use straps, clips, boots, etc. instead of bolsters for securing the feet of the user. The foot restraint 504 keeps the soles of the feet in contact with or close to the platform 502 of the base assembly 102, with limited travel in the y-axis direction. In some embodiments, however, it is desired to have at least some travel in the y-axis direction for comfort of the user 501. The foot restraint 504 allows free movement along the z-axis, as well as rotation about the x-axis (e.g., "into" the page). As shown in FIG. 5A, the foot restraint 504 is on a circular platform that couples to the platform 502 of the base assembly 102, with the circular platform rotating about the x-axis (e.g., via a ball joint). The ball joint enabling x-axis rotation can also travel within a slot to enable translation along the z-axis.

In some embodiments, the foot restraint 504 is removably coupled to the base assembly 102 of the fitness device 100. Thus, the foot restraint 504 can be replaced with a wobble board for enabling the user to perform various balance exercises. Thus, the fitness device 100 provides a modular fitness system enabling various types of stretching and other exercise.

In some embodiments, controls of the fitness device 100 are configured to position the elevation and rotation of the table 106 in a manner that maintains a predetermined force (or force range) on the feet of the user 501 without elevating the feet of the user 501. The predetermined force may be constant, or determined according to some defined function (e.g., where the predetermined force or force range is proportional to an amount of rotation, lift, tilt or other stretch experienced by the user) as described in further detail below. As the table 106 of the fitness device 100 rotates backward, the tendency will be to lift the feet of the user 501. The controls of the fitness device 100 will compensate for this tendency, in some embodiments, by lowering the height of the table 106 and/or varying the resistance or force provided by the foot restraint 504, thereby applying a stretch to the body without lifting the feet into the air. The foot restraint 504 includes a force sensing system that feeds into the controls of the fitness device 100 to appropriately position the elevation and tilt of the table 106 to achieve a desired stretch. It should be appreciated that the force sensing system need not be physically housed in the foot restraint 504. In some embodiments, the force sensing system is coupled to or compromised within one or more of the base assembly 102, the elevation assembly 104, the table 106, the restraint and overhead bar 108, etc.

Figure 6B:
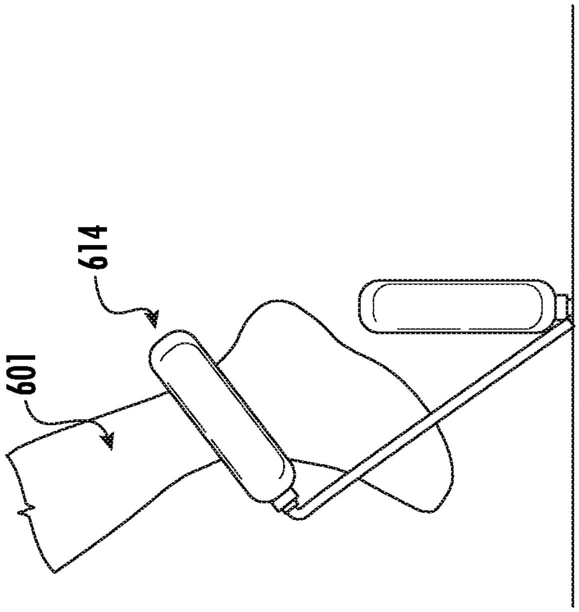
FIGS. 6A-6D depict various foot restraints for use with a base assembly of a fitness device, according to an embodiment of the invention.
Figure 6A:
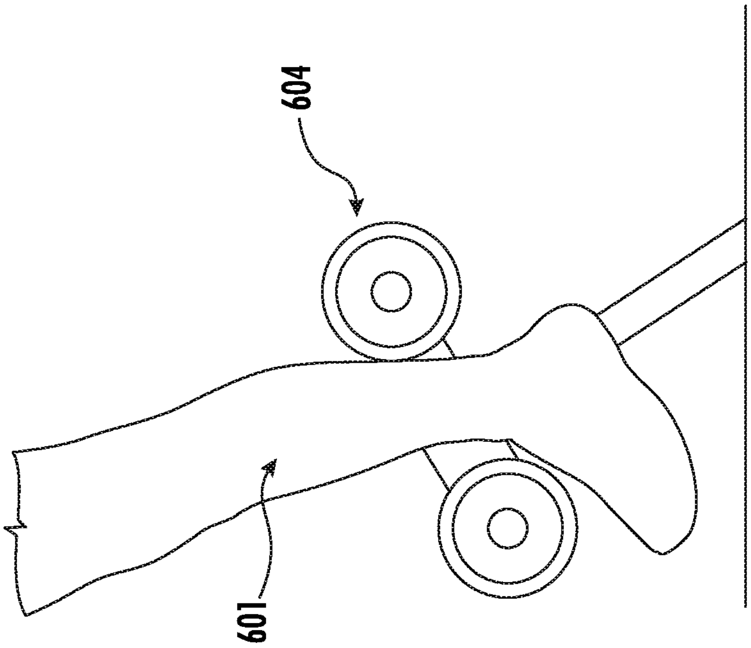
Figure 6D:
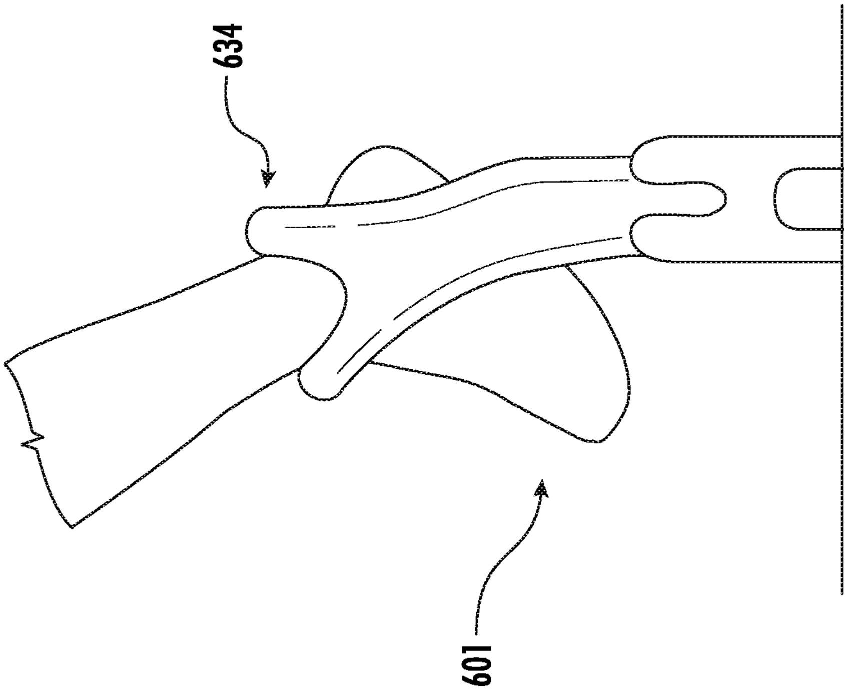
Figure 6C:
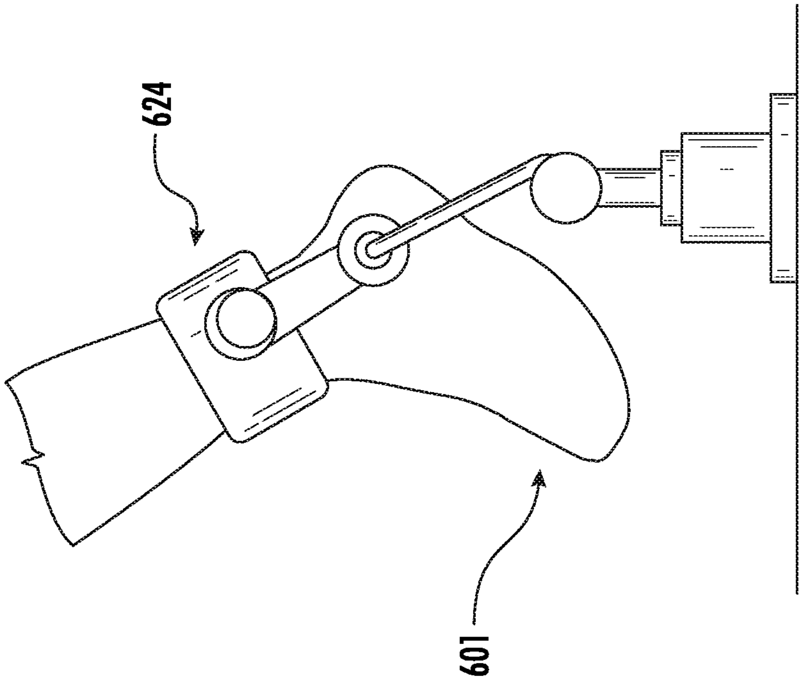

FIGS. 6A-6D illustrate various alternative implementations of a foot restraint for use with the base assembly 102 of the fitness device 100 or other fitness devices described herein. FIG. 6A shows a foot restraint 604 that, similar to the foot restraint 504, holds the feet of the user 601 between bolsters. The foot restraint 604, however, includes a strap or bungee that couples the bolsters to a base allowing some elevation and rotation of the feet of the user 601. FIG. 6B shows a foot restraint 614 that includes cuffs for affixing to the ankle of the user 601, with the cuffs being attached to a base via a strap or bungee that allows some elevation and rotation of the feet of the user 601. FIG. 6C shows a foot restraint 624 that, similar to foot restraint 614, includes cuffs for affixing to the ankle of the user 601. The cuffs of the foot restraint 624, however, are coupled to the base via straps on the sides thereof instead of on the front as in the foot restraint 614. FIG. 6D shows a foot restraint 634 that includes a band with an opening that the user 601 slips their feet into, with ends of the band being affixed to the base. The foot restraint embodiments shown in FIGS. 6A-6D allow the feet of the user 601 to raise off the base, with the force applied by an extending element (e.g., straps coupling the bolsters in FIG. 6A and the cuffs in FIGS. 6B and 6C, the band in FIG. 6D). The extending element is configured to maintain a predetermined force, where the predetermined force may be constant or in accordance with a defined function as described in further detail below. As the feet of the user 601 are lifted due to rotation and/or elevation of the table 106, the force is maintained while allowing generally upward movement of the foot restraints 604, 614, 624 and 634.

Figure 7:
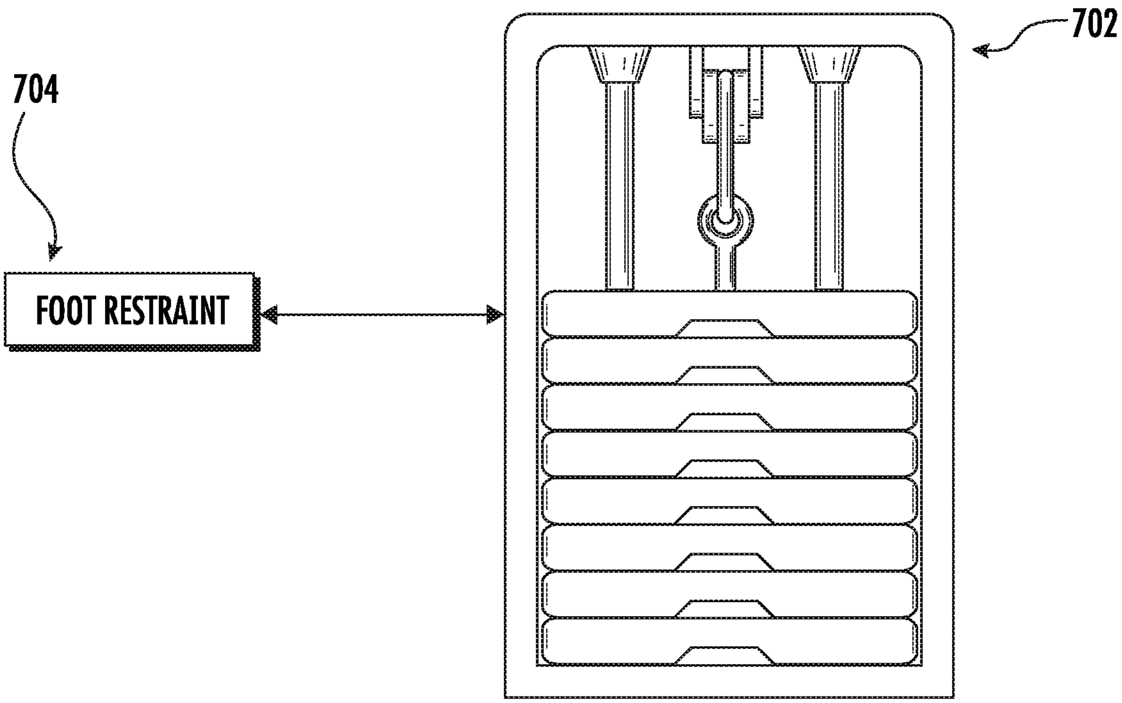
FIG. 7 depicts coupling of a foot restraint to a resistive force, according to an embodiment of the invention.

FIG. 7 illustrates a force application system 702 coupled to a foot restraint 704, where the foot restraint 704 represents any one of foot restraints 504, 604, 614, 624 and 634 described above, as well as other foot restraints described below. The foot restraint 704 is coupled to the force application system 702 via a cable or other mechanical mechanisms. An extending element of the foot restraint 704 is constrained by the force application system 702, which may take various forms. The force application system 702 is visualized in FIG. 7 as a pulley system with stacked weights, though this is not a requirement. The force application system 702 in some embodiments provides a direct connection to a spool on a motor that applies a settable constant or proportional force, provides a connection to a motor that applies a settable constant or proportional force through a pulley system, provides a connection to an elastic member (or a group of elastic members) that applies a selectable force that is constant or proportional to the amount of cable that is let out as a result of movement of the table 106, provides a mechanical or electrical clutch that can be set as a constant resistant force, or as a force that is a selected function related to the amount of the extension of the foot restraint, etc. Various other mechanisms are possible, including magnetic resistance. In some modes of operation, the fitness device 100 provides resistance to a force applied by the user (e.g., for isokinetic exercise through a desired range of motion of the user).

Figure 8B:
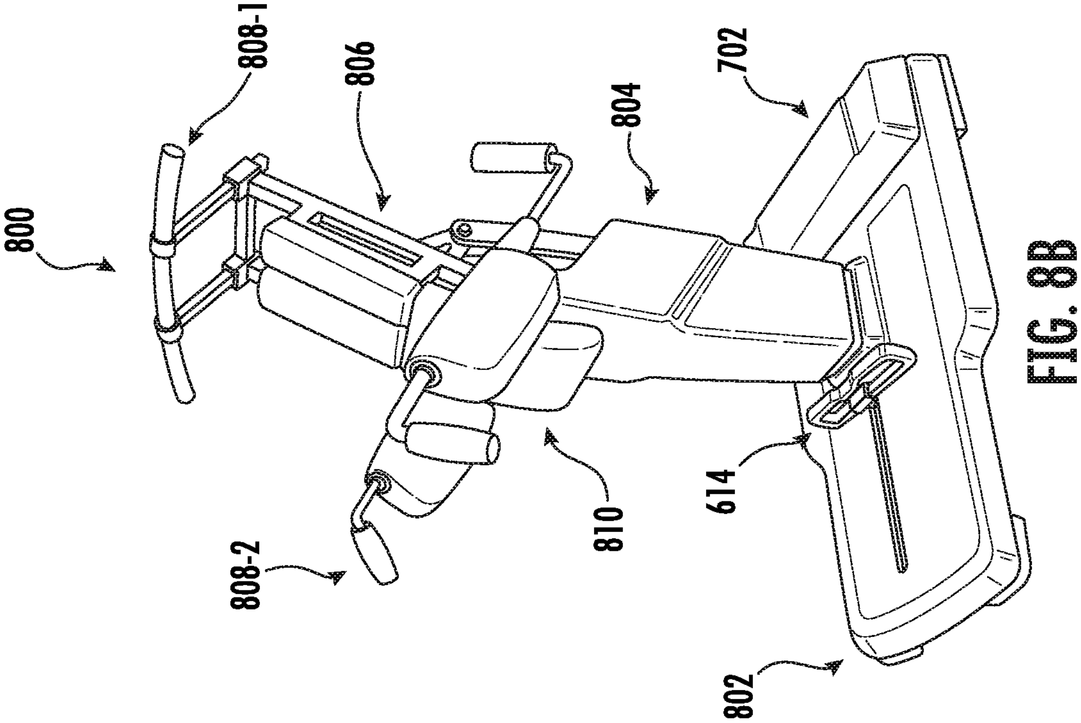
FIGS. 8A-8C depict operation of a foot restraint of a fitness device, according to an embodiment of the invention.
Figure 8A:
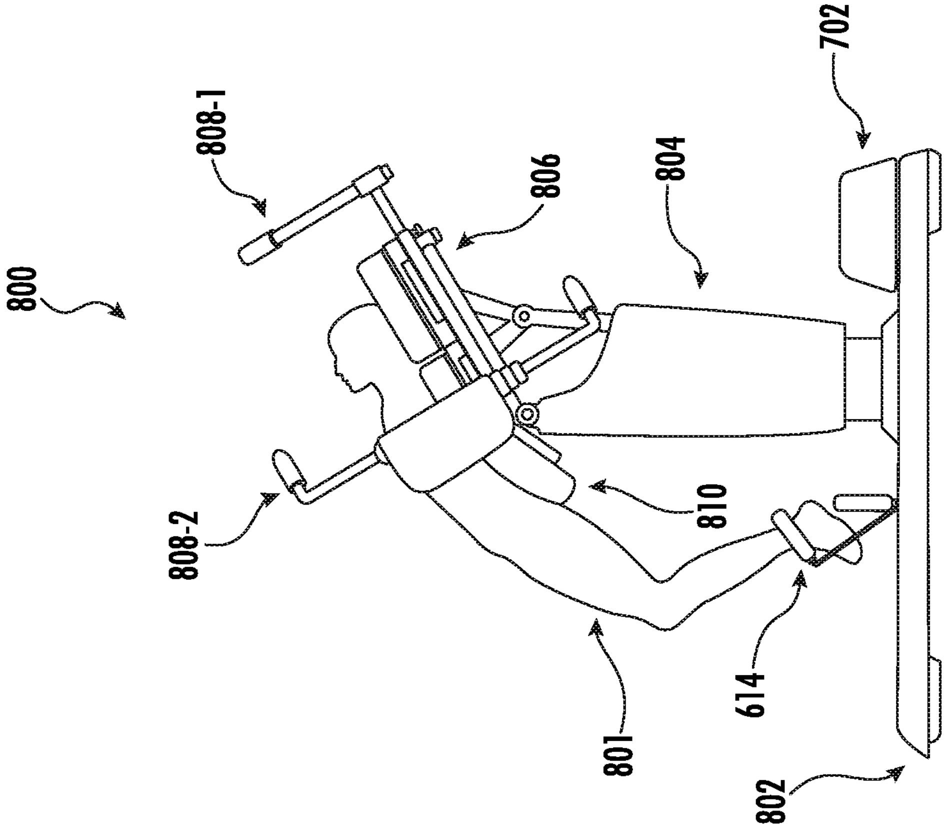
Figure 8C:
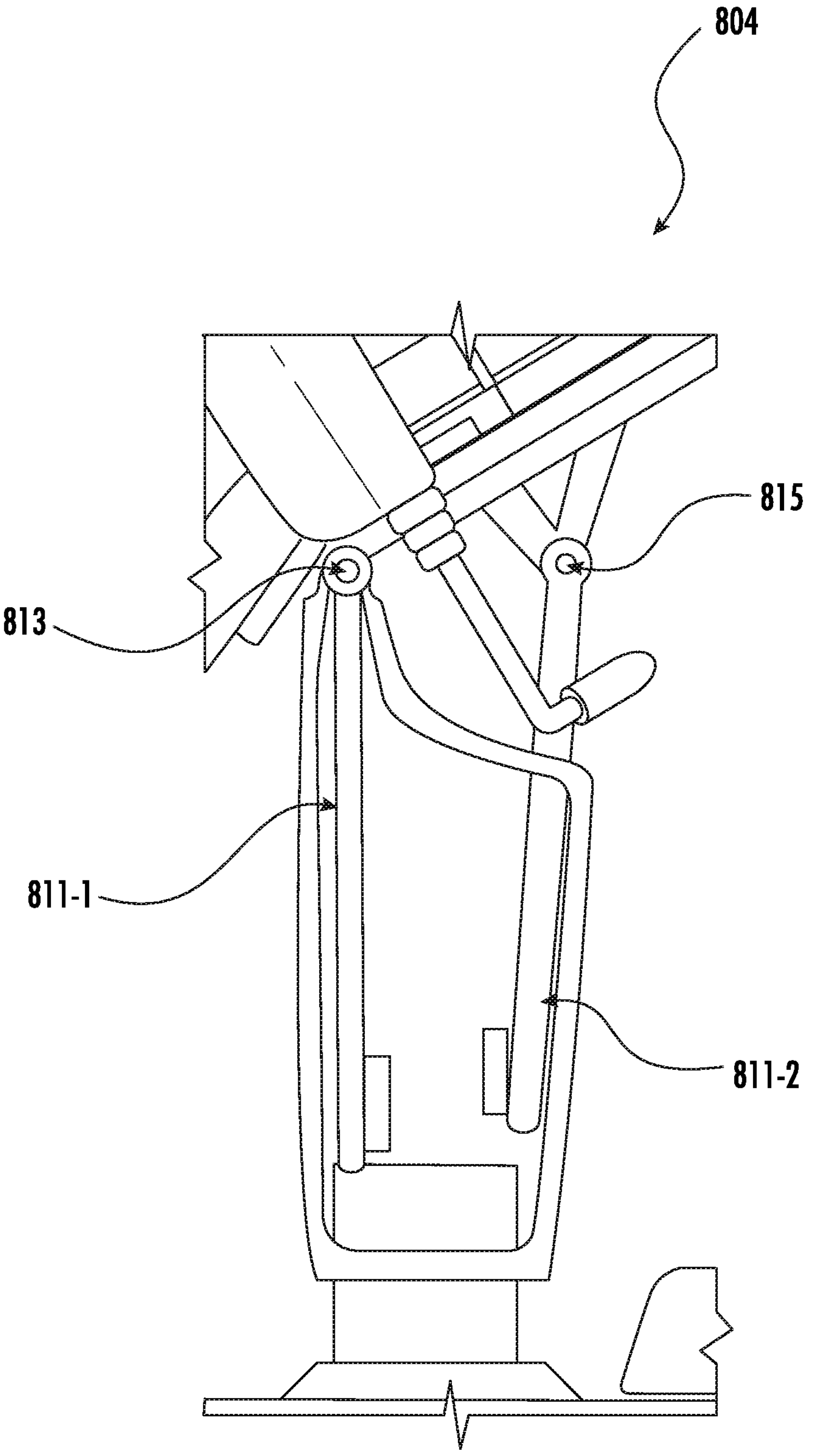

FIGS. 8A-8C illustrate operation of the foot restraint 614 on a fitness device 800 by user 801. The fitness device 800, similar to fitness device 100, includes a base assembly 802, elevation assembly 804, table 806 and cushion assembly 810. Whereas the fitness device 100 includes a single-piece restraint and overhead bar 108, the fitness device 800 includes a two-piece restraint and overhead bar including overhead grip bar 808-1 and underarm support bar 808-2. It should be appreciated that the fitness device 800 may include just one of the overhead grip bar 808-1 and the underarm support bar 808-2. For example, in some embodiments the overhead grip bar 808-1 is not used, or is removably attached to the fitness device 800 as an optional component. The underarm support bar 808-2 may also be optional, and may be removably attached to the fitness device 800. As illustrated in FIGS. 8A and 8B, the placement of hand grips on the two-piece restraint and overhead bar is different than that of the one-piece restraint and overhead bar 108 of the fitness device 100. The fitness device 800 also includes a force application system 702 that is coupled to the foot restraint 614 to provide the selectable force or resistance of the foot restraint 614 as the table 806 lifts and/or rotates. The foot restraint 614 of the fitness device 800, as illustrated in FIG. 8B, provides front and back symmetric foot restraint along a slot or track of the base assembly 802.

As shown in FIG. 8C, the elevation assembly 804 of the fitness device 800 has a lower housing that encloses lift and tilt actuators 811-1 and 811-2, respectively, of the fitness device 800. More particularly, the elevation assembly 804 includes the lift actuator 811-1, which may be an electric motor-powered linear actuator, proximate a "front" of the fitness device 800 (e.g., proximate the foot restraint 614 side) which is anchored to the base assembly 802 and a bottom rotation axis 813 of the table 806 below underarm supports 808-2. The lift actuator 811-1 provides lift for raising the elevation assembly 804. The elevation assembly 804 also includes rotation actuator 811-2, which may also be an electric motor-powered linear actuator, proximate a "rear" of the fitness device 800 near the force application system 702 side which is anchored within the elevation assembly 804 and couples to an upper rear portion of the table 806 about a rotation axis 815 coupling the bar protruding from the top of the rear of elevation assembly 804 to two bars that are coupled to upper rear portion of the table 806. The rotation actuator 811-2 provides rotation of the table 806. The lift actuator 811-1 and the tilt actuator 811-2 may move together so as to provide a desired lift and tilt movement of the table 806.

Figure 9B:
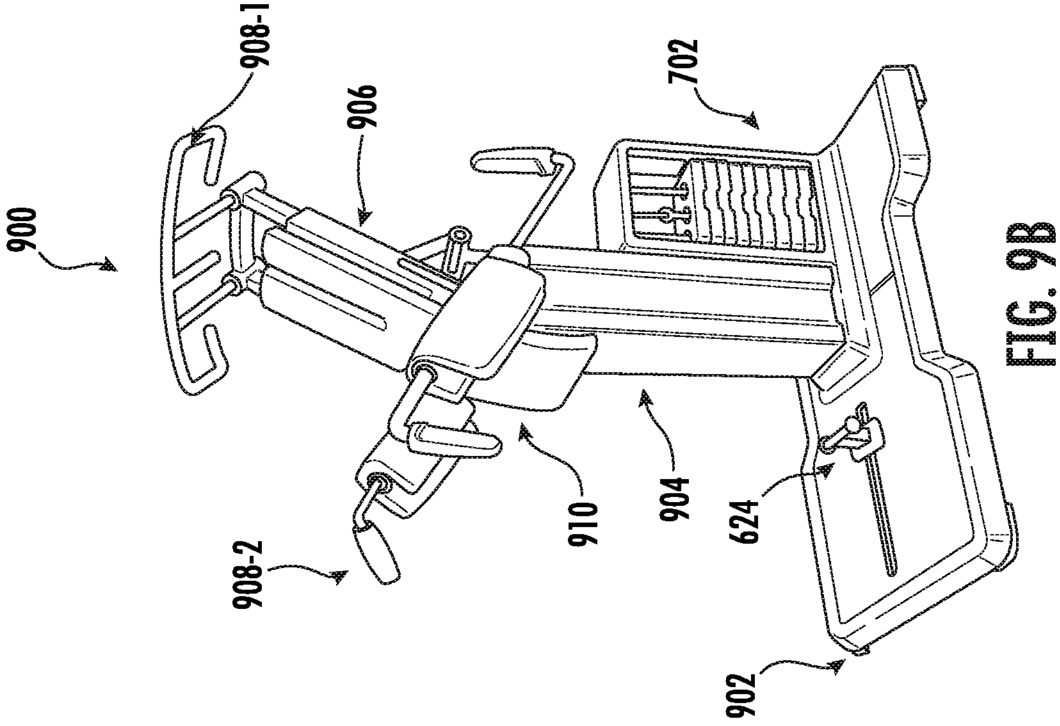
FIGS. 9A and 9B depict operation of a foot restraint of a fitness device, according to an embodiment of the invention.
Figure 9A:
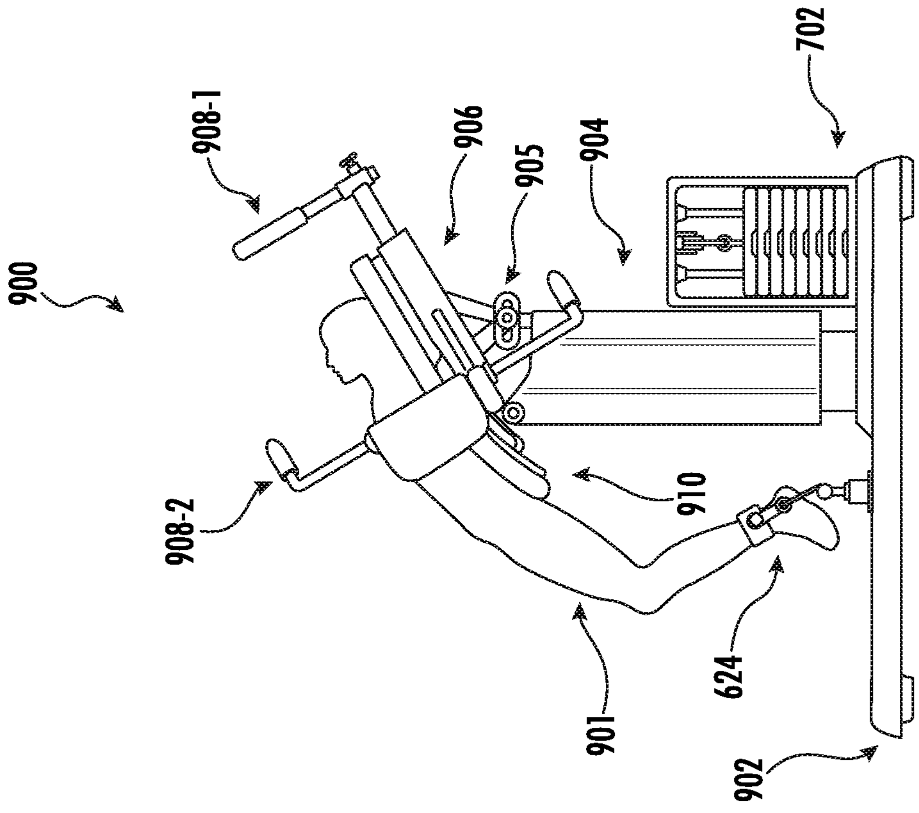

FIGS. 9A and 9B illustrate operation of the foot restraint 624 on a fitness device 900 by user 901. The fitness device 900, similar to fitness device 100, includes a base assembly 902, elevation assembly 904, table 906 and cushion assembly 910. Similar to the fitness device 800, the fitness device 900 includes a two-piece restraint and overhead bar including overhead grip bar 908-1 and underarm support bar 908-2. It should be appreciated that the fitness device 900 may include just one of the overhead grip bar 908-1 and the underarm support bar 908-2. For example, in some embodiments the overhead grip bar 908-1 is not used, or is removably attached to the fitness device 900 as an optional component. The underarm support bar 908-2 may also be optional, and may be removably attached to the fitness device 900. As illustrated in FIGS. 9A and 9B, the placement of hand grips and underarm supports on the two-piece restraint and overhead bar is different than that of the two-piece restraint and overhead bar of the fitness device 800. The fitness device 900 also includes a force application system 702 that is coupled to the foot restraint 624 to provide the selectable force or resistance of the foot restraint 624 as the table 906 lifts and/or rotates. The foot restraint 624, as shown in FIGS. 9A and 9B, includes an ankle cuff with a strap coupling the ankle cuff to a mushroom-shaped post on the base assembly 902. The force application system 702 is visualized in this embodiment as a pulley weight tensioning selection mechanism, though this is not a requirement.

In the fitness device 900, the elevation assembly 904 and table 906 have a slotted link assembly to eliminate the rotation rod of fitness devices 100 and 800. The rod in fitness device 900 is constrained to stay vertical. In order to remain vertical, the anchor point will translate relative to the anchor point as the table 906 rotates. Advantageously, such a configuration enables the elevation assembly 904 to be slimmer than the elevation assembly 804, because the actuator angles out as the table 806 rotates backwards in fitness device 800.

Figure 10B:
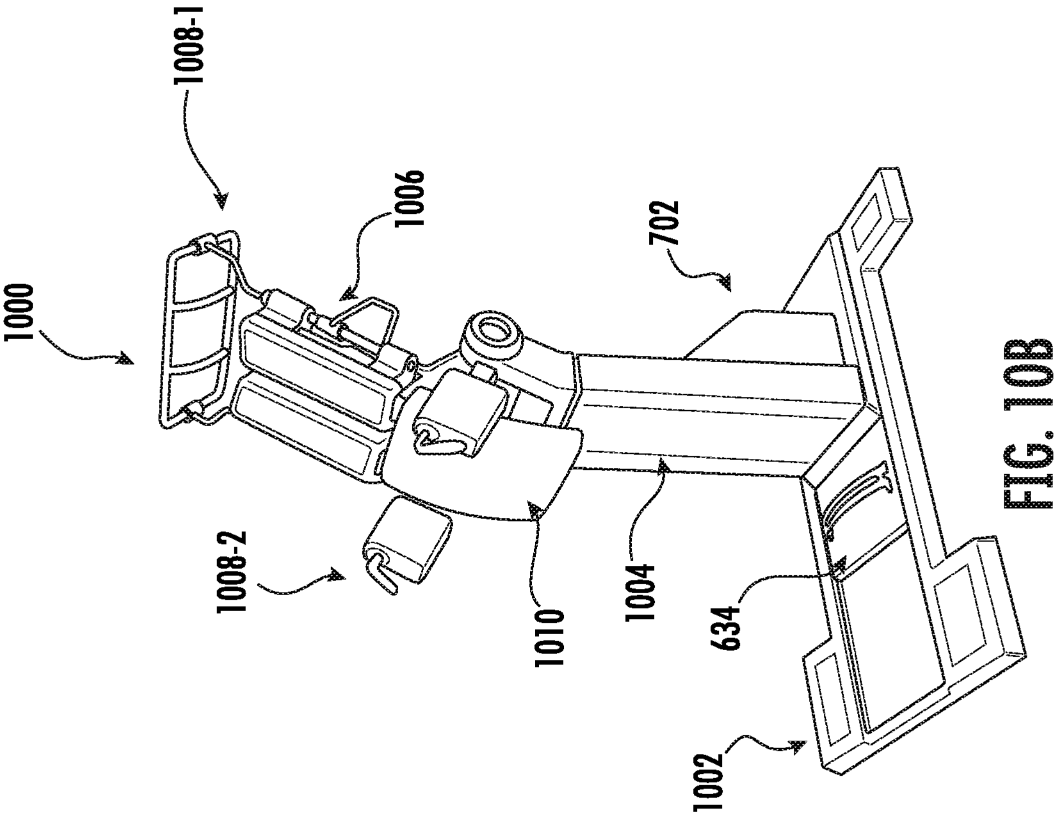
FIGS. 10A-10E depict operation of a foot restraint of a fitness device, according to an embodiment of the invention.
Figure 10A:
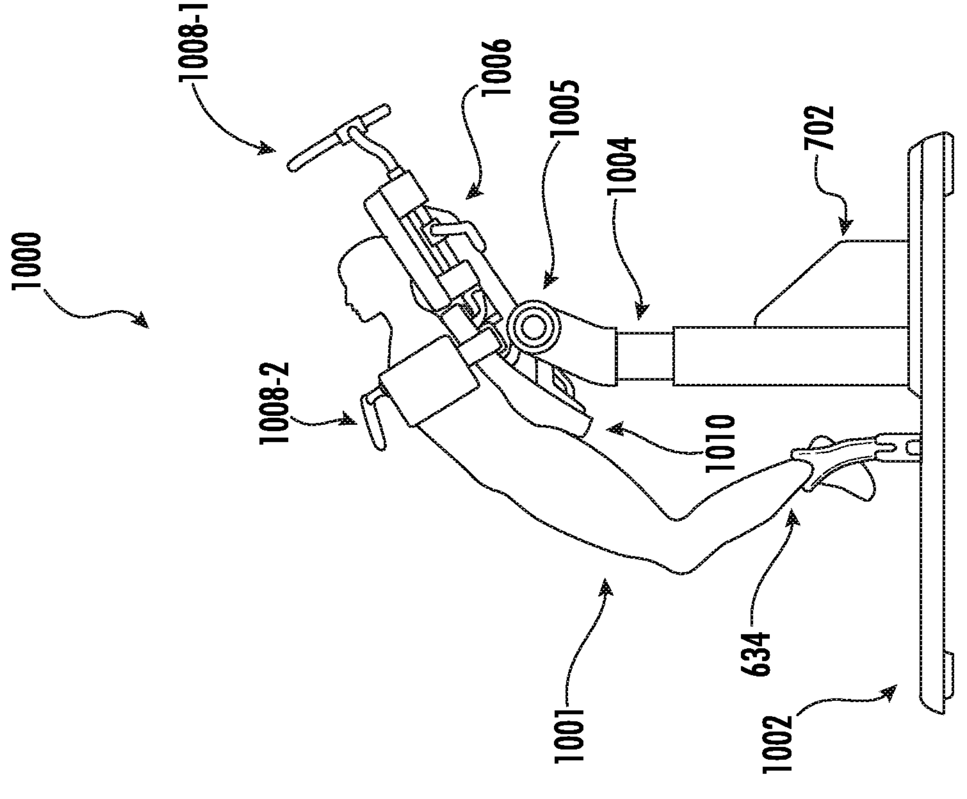
Figure 10C:
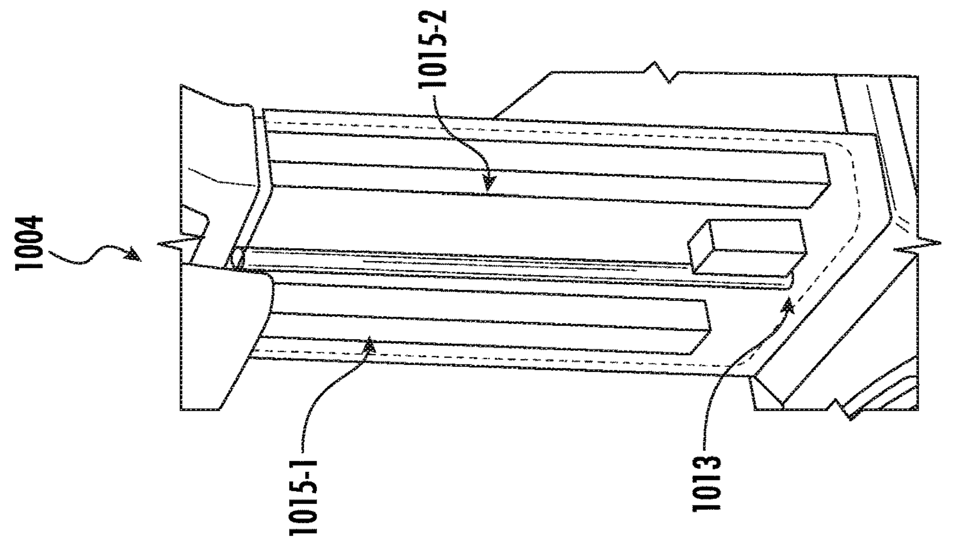
Figure 10D:
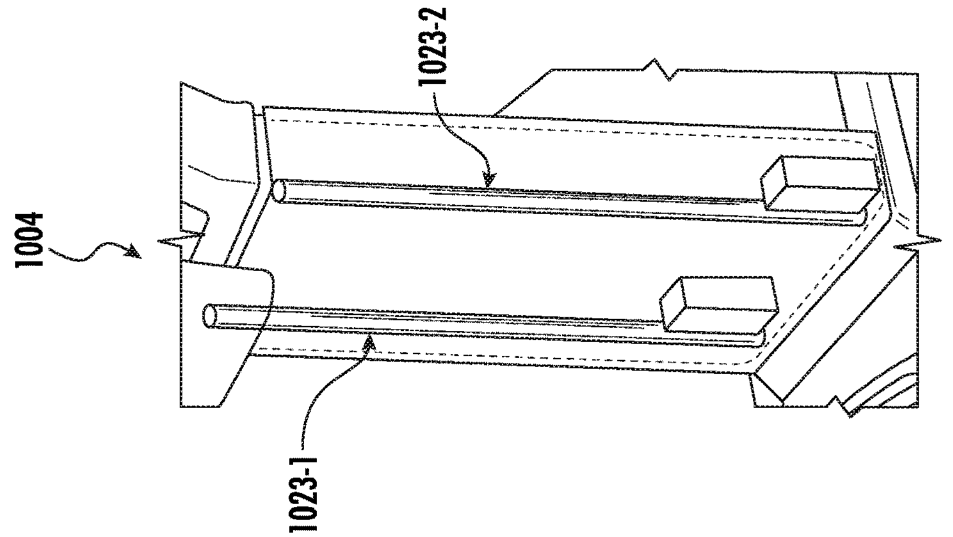
Figure 10E:
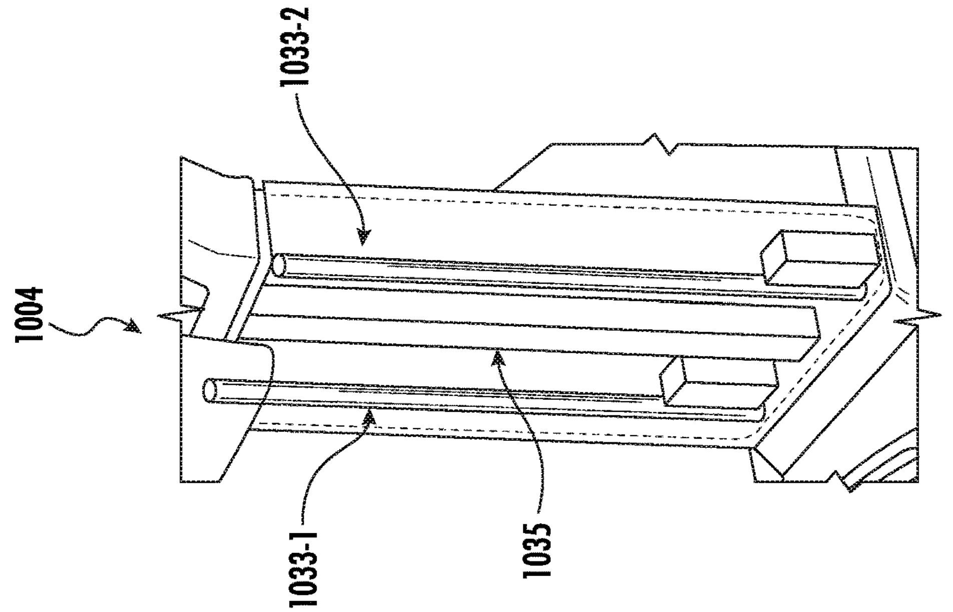

FIGS. 10A-10E illustrate operation of the foot restraint 634 on a fitness device 1000. The fitness device 1000, similar to fitness device 100, includes a base assembly 1002, elevation assembly 1004, table 1006 and cushion assembly 1010. Similar to the fitness device 800, the fitness device 1000 includes a two-piece restraint and overhead bar including overhead grip bar 1008-1 and underarm support bar 1008-2. It should be appreciated that the fitness device 1000 may include just one of the overhead grip bar 1008-1 and the underarm support bar 1008-2. For example, in some embodiments the overhead grip bar 1008-1 is not used, or is removably attached to the fitness device 1000 as an optional component. The underarm support bar 1008-2 may also be optional, and may be removably attached to the fitness device 1000. As illustrated in FIGS. 10A and 10B, the placement of hand grips and underarm supports on the two-piece restraint and overhead bar is different than that of the two-piece restraint and overhead bars of the fitness devices 800 and 900. The fitness device 1000 also includes a force application system 702 that is coupled to the foot restraint 634 to provide the selectable force or resistance of the foot restraint 634 as the table 1006 lifts and/or rotates. In the fitness device 1000, the cushion assembly 1010 includes a Cartesian pad solution where the pads of the cushion assembly 1010 are configured to telescope on two axes (e.g., on the craniocaudal (y) axis and the left-right lateral (x) axis) and slide on tracks. The foot restraint 634, as illustrated in FIGS. 10A and 10B, is provided on a platform that slides along the base assembly 1002 with a bungie-style strap that secures the feet of a user to the sliding foot platform.

The elevation assembly 1004 of the fitness device 1000 also separates higher, and the elevation assembly 1004 and table 1006 provide a different rotational linkage solution. The linkage solution of the elevation assembly 1004 may use any of the configurations shown in FIGS. 10C-10E. In the FIG. 10C configuration, there is a single linear actuator 1013, positioned vertically within the elevation assembly 1004 and proximate a middle of the elevation assembly 1004, and two guided columns 1015-1 and 1015-2 also positioned vertically within the elevation assembly 1004 on either side of the single linear actuator 1013. In the FIG. 10D configuration, two actuators 1023-1 and 1023-2 are utilized. The actuators 1023-1 and 1023-2 are disposed on lateral sides and positioned vertically within the elevation assembly 1004. The two actuators 1023-1 and 1023-2 in the second configuration are guided to stay vertical. In the FIG. 10E configuration, two actuators 1033-1 and 1033-2 are also utilized, disposed on lateral sides and positioned vertically within the elevation assembly 1004 similar to the FIG. 10D configuration. In the FIG. 10E configuration, however, a guided center column 1035 between the two actuators 1033-1 and 1033-2 is utilized.

Figure 11B:
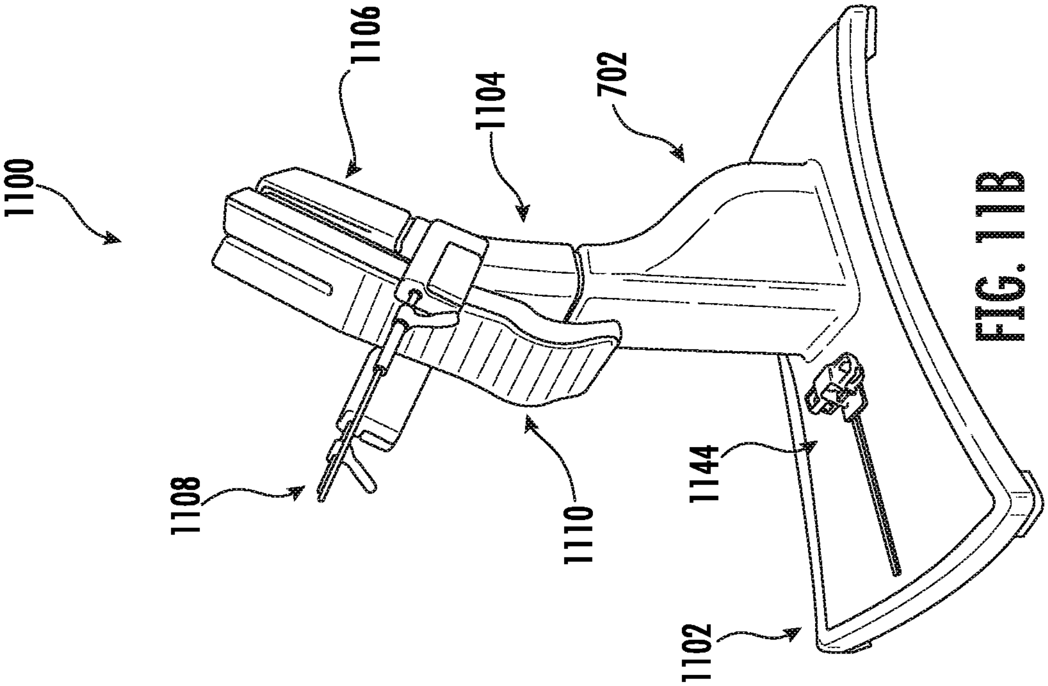
FIGS. 11A and 11B depict operation of a foot restraint of a fitness device, according to an embodiment of the invention.
Figure 11A:
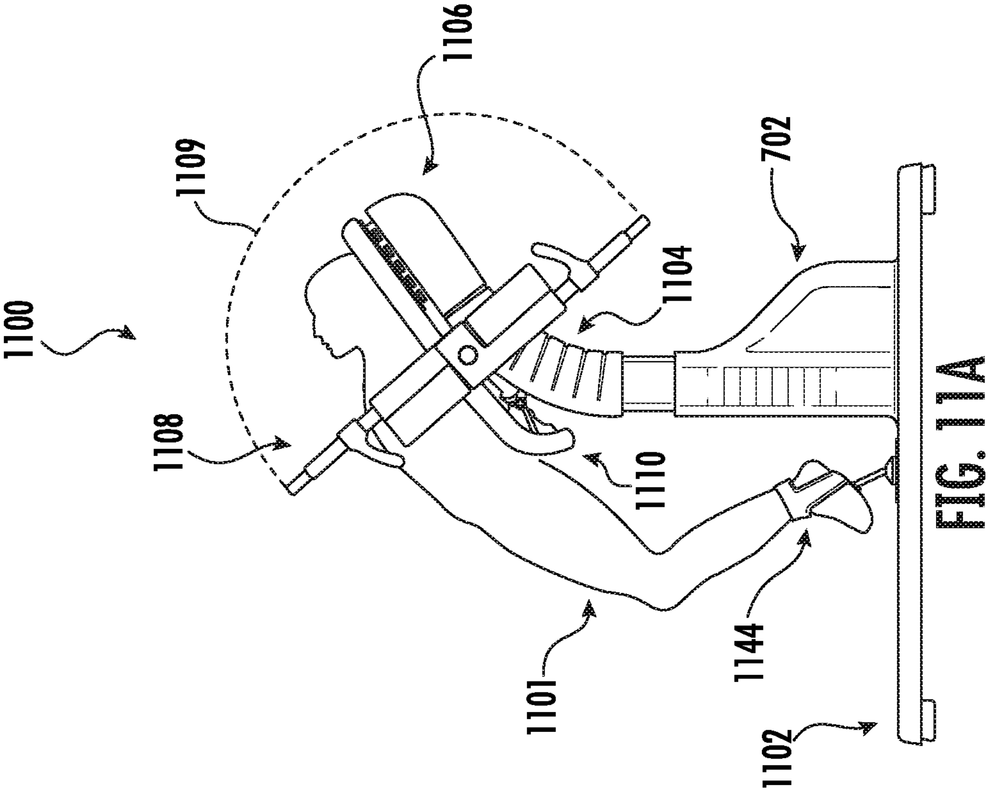

FIGS. 11A and 11B illustrate operation of a foot restraint 1144 on a fitness device 1100. The fitness device 1100, similar to fitness device 100, includes a base assembly 1102, elevation assembly 1104, table 1106 and cushion assembly 1110. The fitness device 1100 includes an underarm support bar 1108 but not an overhead support or grip bar. The placement of hand grips and underarm supports on the underarm support bar 1108 also differs from that of the fitness devices 100, 800, 900 and 1000 as illustrated in FIGS. 11A and 11B. The underarm support bar 1108 provides dual-use underarm support pads with flip-out elbow rests for the user in the prone position. The hoop-style grips of the underarm support bar 1108 are configured to slide upward and rotate (e.g., along arc 1109) for supine and prone use. The foot restraint 1144 has an ankle and heel cuff that is coupled to the base assembly 1102 via a strap as illustrated. The foot restraint 1144 is also configured to travel or provide translation motion along the slot in the base assembly 1102 as illustrated in FIG. 11B. The force application system 702 is coupled to the foot restraint 1144.

The elevation assembly 1104 and table 1106 provide a multi-link variable geometry in a main trunk that mimics the human spine. The elevation assembly 1104 also separates higher than that of the fitness devices 100, 800, 900 and 1000. The elevation assembly 1104 may achieve vertical lift in a manner similar to that described above with respect to elevation assembly 1004. For rotation, the elevation assembly 1104 includes multipole rotary actuators to provide a curved, contoured bending back as illustrated. In some embodiments, multiple linear actuators with respective hinge points may be utilized in place of one or more of (or all of) the rotary actuators.

It should be appreciated that features such as the locations of hand grips, the force application system 702, the type of restraint and/or overhead grip bars, underarm supports, cushion assemblies, table and elevation assembly linkages, foot restraints, etc. that are described with respect to one of the fitness devices 100, 800, 900, 1000 and 1100 may be combined in various ways. For example, the restraint and overhead bar 108 of the fitness device 100 may be replaced with any of the bars 808, 908, 1008 and 1108. Similarly, the type of foot restraint used in fitness device 100 may vary (e.g., the foot restraint 504 may be replaced with any of the foot restraints 604, 614, 624, 634 and 1144). This is also true for fitness devices 800, 900, 1000 and 1100. More generally, it should be appreciated that a particular feature described in conjunction with one of the fitness devices 100, 800, 900, 1000 and 1100 (as well as other fitness devices described below) may be used in combination with features of any other ones of the fitness devices 100, 800, 900, 1000 and 1100 (as well as other fitness devices described below) unless specifically noted otherwise.

Figure 12B:
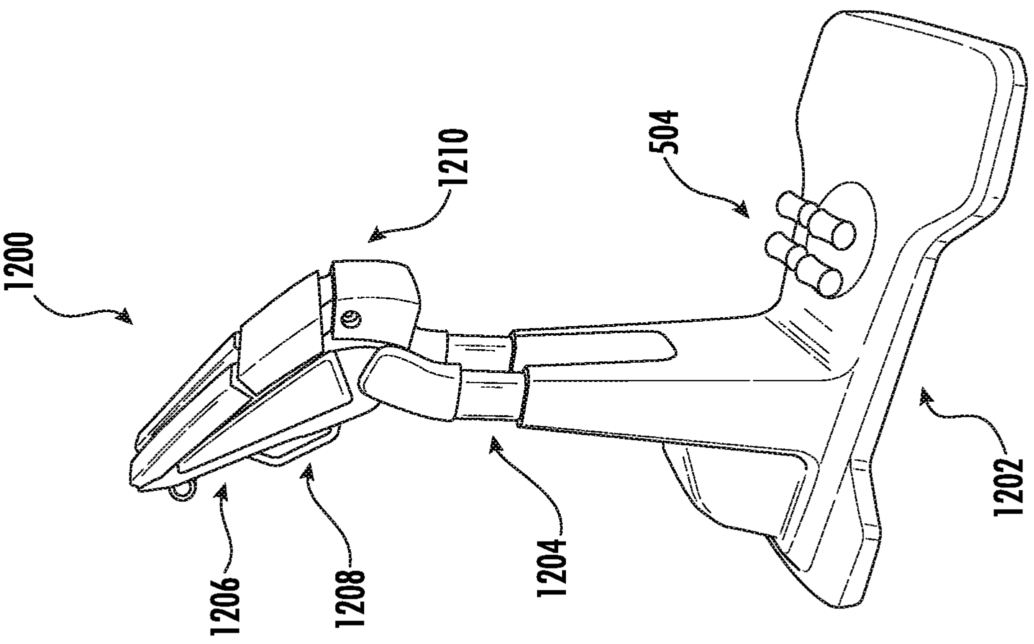
FIGS. 12A-12F depict operation of a fitness device, according to an embodiment of the invention.
Figure 12A:
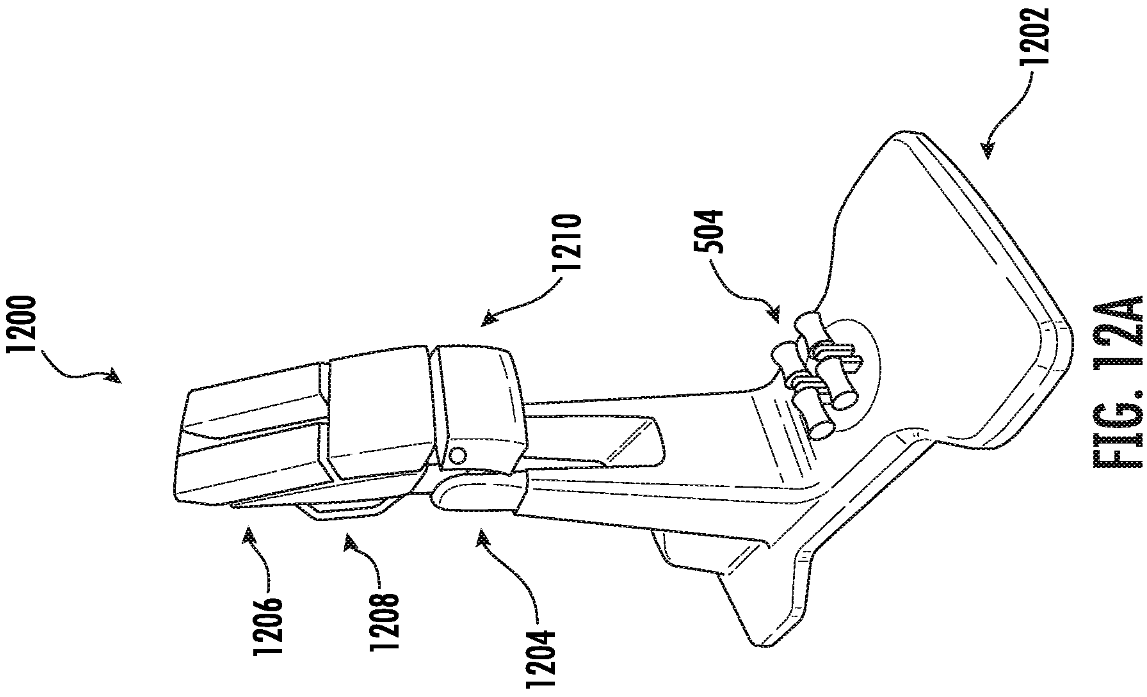
Figure 12C:
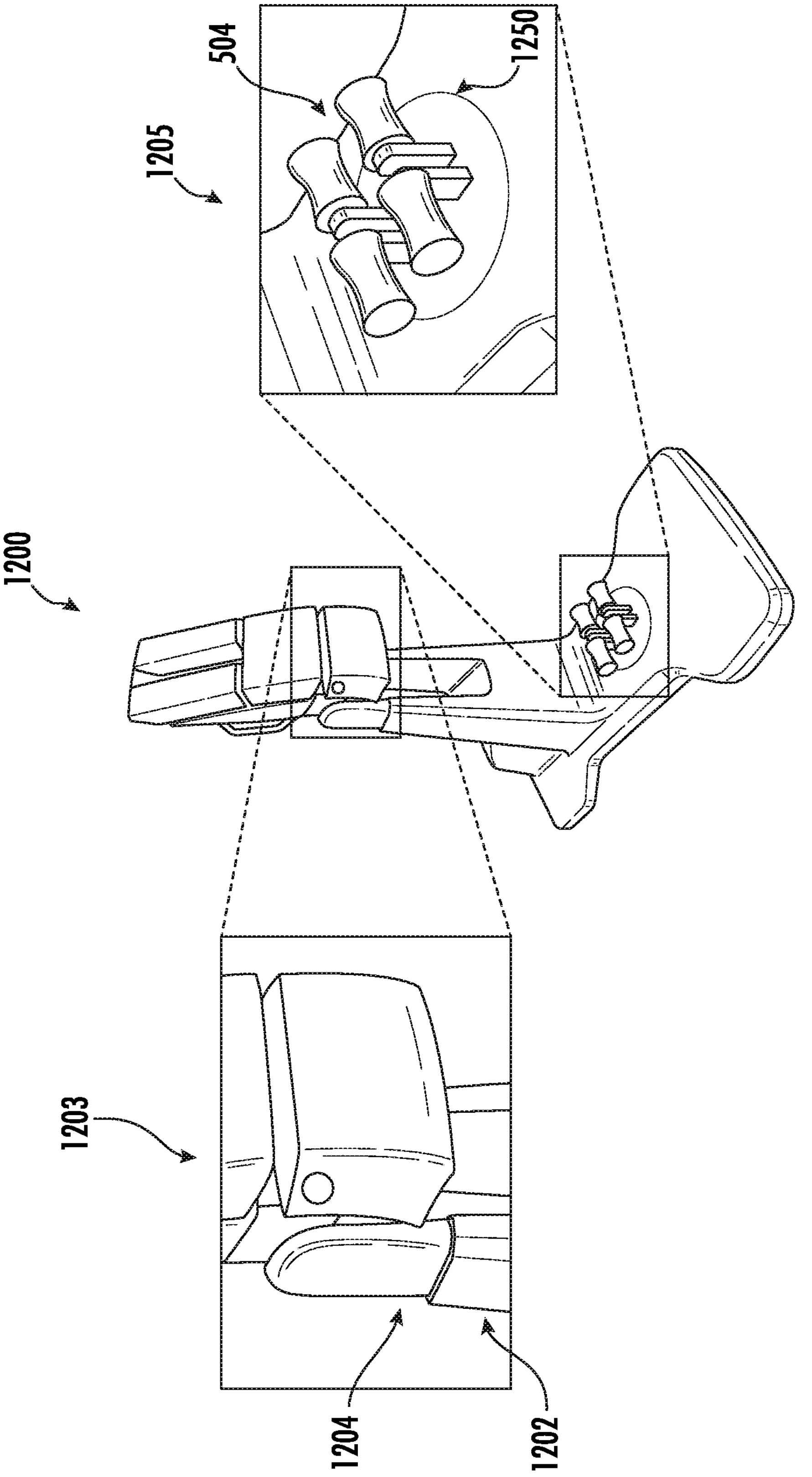
Figure 12D:
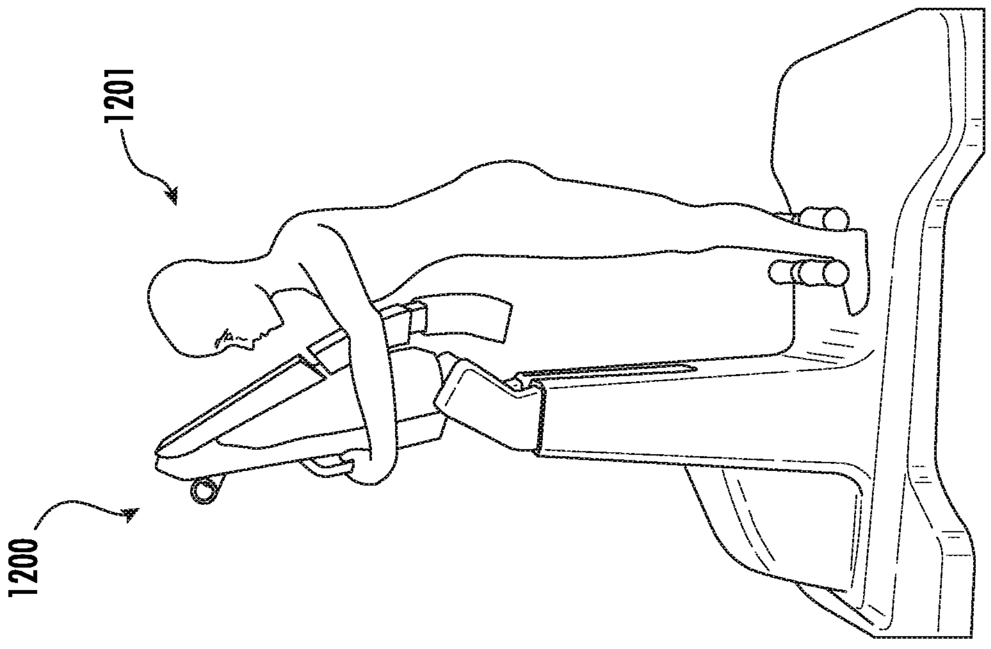
Figure 12E:
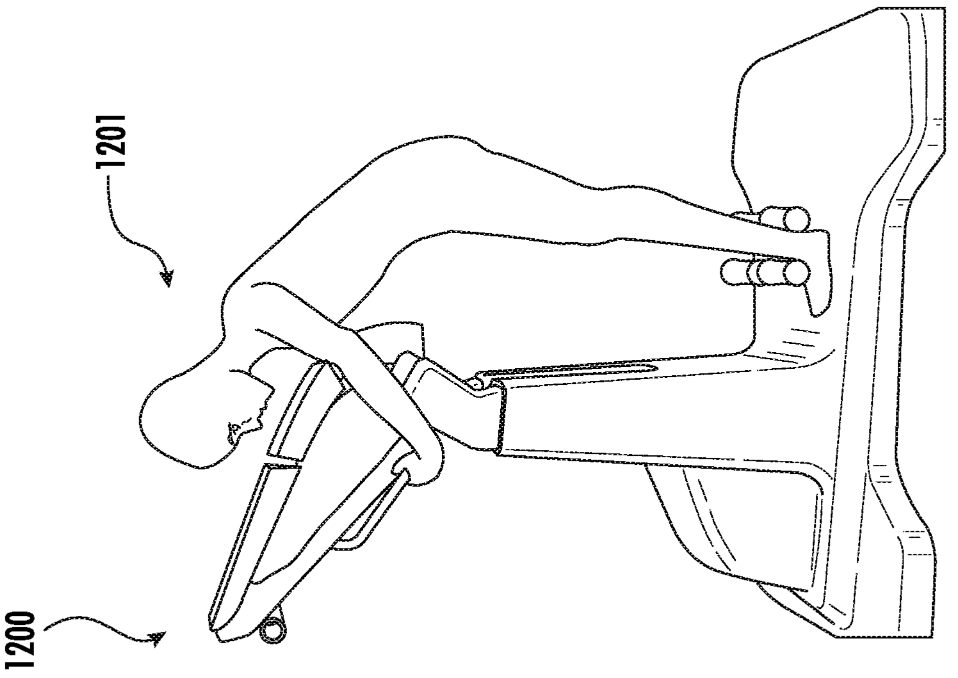
Figure 12F:
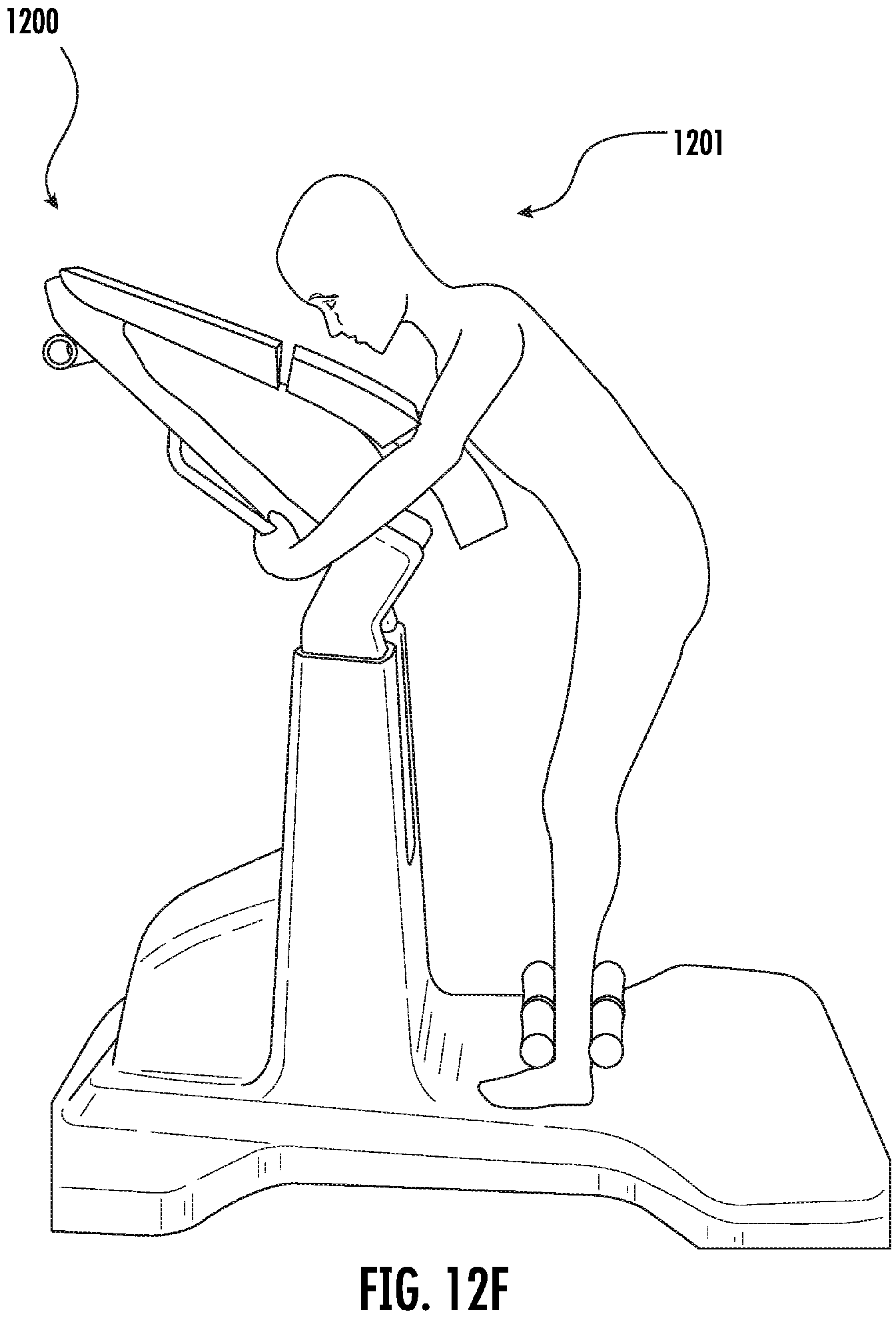

FIGS. 12A-12F depict operation of a fitness device 1200, which similar to fitness device 100 includes a base assembly 1202, elevation assembly 1204, table 1206 and cushion assembly 1210. The base assembly 1202 includes the foot restraint 504. The fitness device 1200, unlike the fitness device 100, does not include a restraint and overhead bar 108. Instead, the fitness device 1200 includes hand grips 1208 as illustrated. FIG. 12A depicts the fitness device 1200 in the starting or upright position, while FIG. 12B depicts the fitness device 1200 in the tilted or rotated position. FIG. 12C highlights aspects of the base assembly 1202 and elevation assembly 1204. As shown in the close-up view 1203, there is a split line between the base assembly 1202 and elevation assembly 1204. As shown in the close-up view 1205, the base assembly 1202 includes the foot restraint 504 that is mounted on a circular rotatable foot pivot 1250 coupled to the base assembly 1202. FIGS. 12D, 12E and 12F illustrate a user 1201 operating the fitness device 1200 in the prone position. More particularly, FIG. 12D illustrate the user 1201 upright, while FIGS. 12E and 12F illustrate the user 1201 in various stretch positions via rotation of the table 1206.

FIGS. 13A-13D illustrate operation of a fitness device 1300. The fitness device 1300 includes a base assembly 1302, an elevation assembly 1304, a table 1306, a two-piece restraint and overhead bar assembly including overhead bar 1308-1 and underarm bars 1308-2, and a cushion assembly 1310. The height of the table 1306 is adjustable to accommodate user height and proportions via the elevation assembly 1304. The table 1306 is configured to rotate backwards via an actuator (e.g., comprised within the elevation assembly 1304, the table 1306 or combinations thereof) to lift the user 1301 and provide a stretch due to gravity acting on the body of the user 1301. Although not shown in FIGS. 13A-13D, various foot restraints may be coupled to the base assembly 1302 for use in increasing the effective stretch of the user. Examples of foot restraints configured for coupling to the base assembly 1302 include the foot restraints 504, 604, 614, 624, 634 and 1144 described above, as well as the various foot restraints described in further detail below.

The overhead bar 1308-1 and underarm support bars 1308-2 are adjustable for accommodating different-sized users. The overhead bar 1308-1 and/or the underarm support bars 1308-2 are also configured to swing outwards or rotate to facilitate entry of a user 1301 onto the fitness device 1300, or for securing the user 1301 onto the fitness device 1300.

The cushion assembly 1310 includes a bottom lumbar cushion and a set of head and thoracic cushions, where the different cushions adjust or slide relative to one another to accommodate user height and proportions in addition to or instead of using the elevation assembly 1304. The lumbar cushion of the cushion assembly 1310 also rotates or translates to enhance stretch.

Figure 13A:
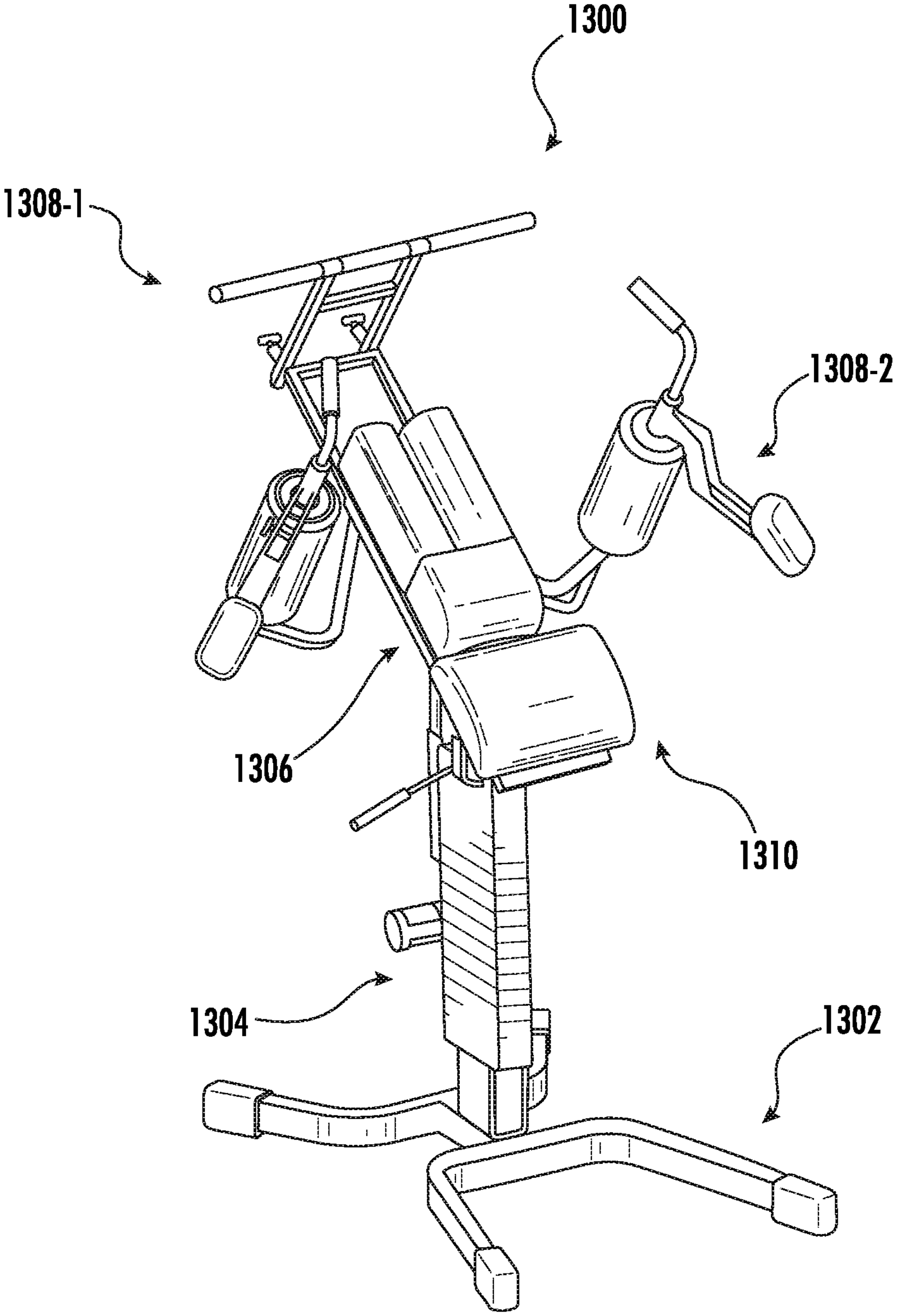
FIGS. 13A-13D depict operation of a fitness device, according to an embodiment of the invention.
Figure 13C:
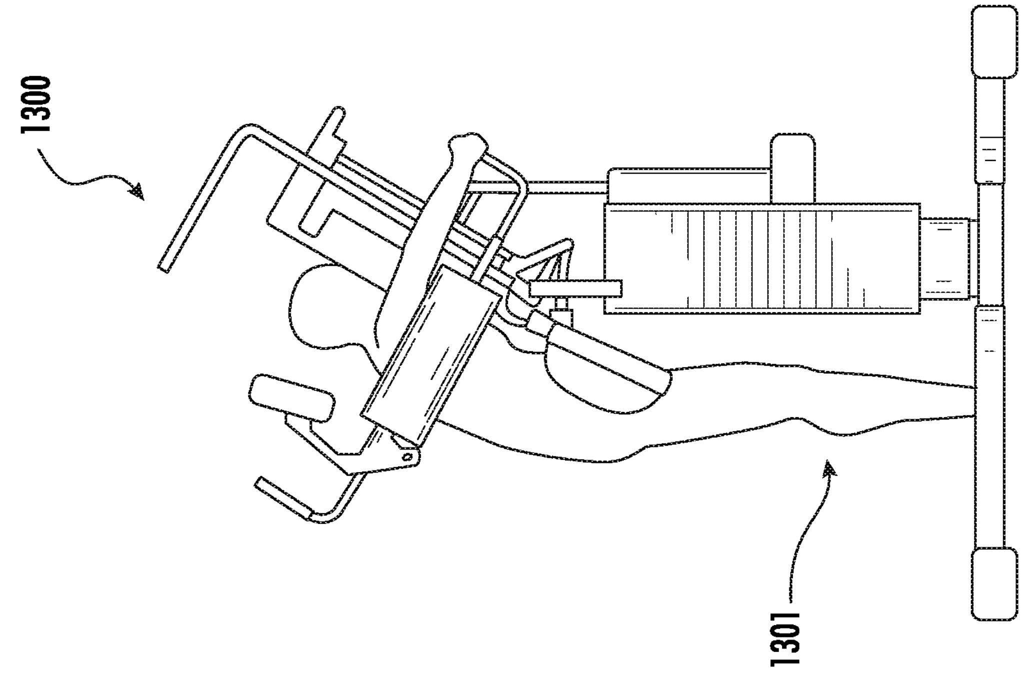
Figure 13B:
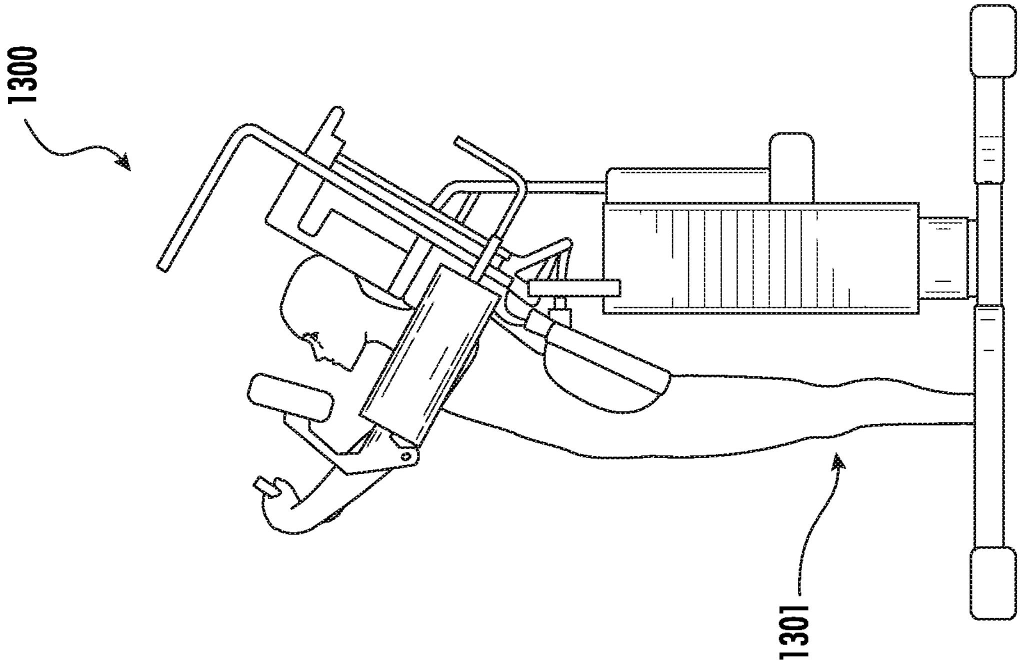
Figure 13D:
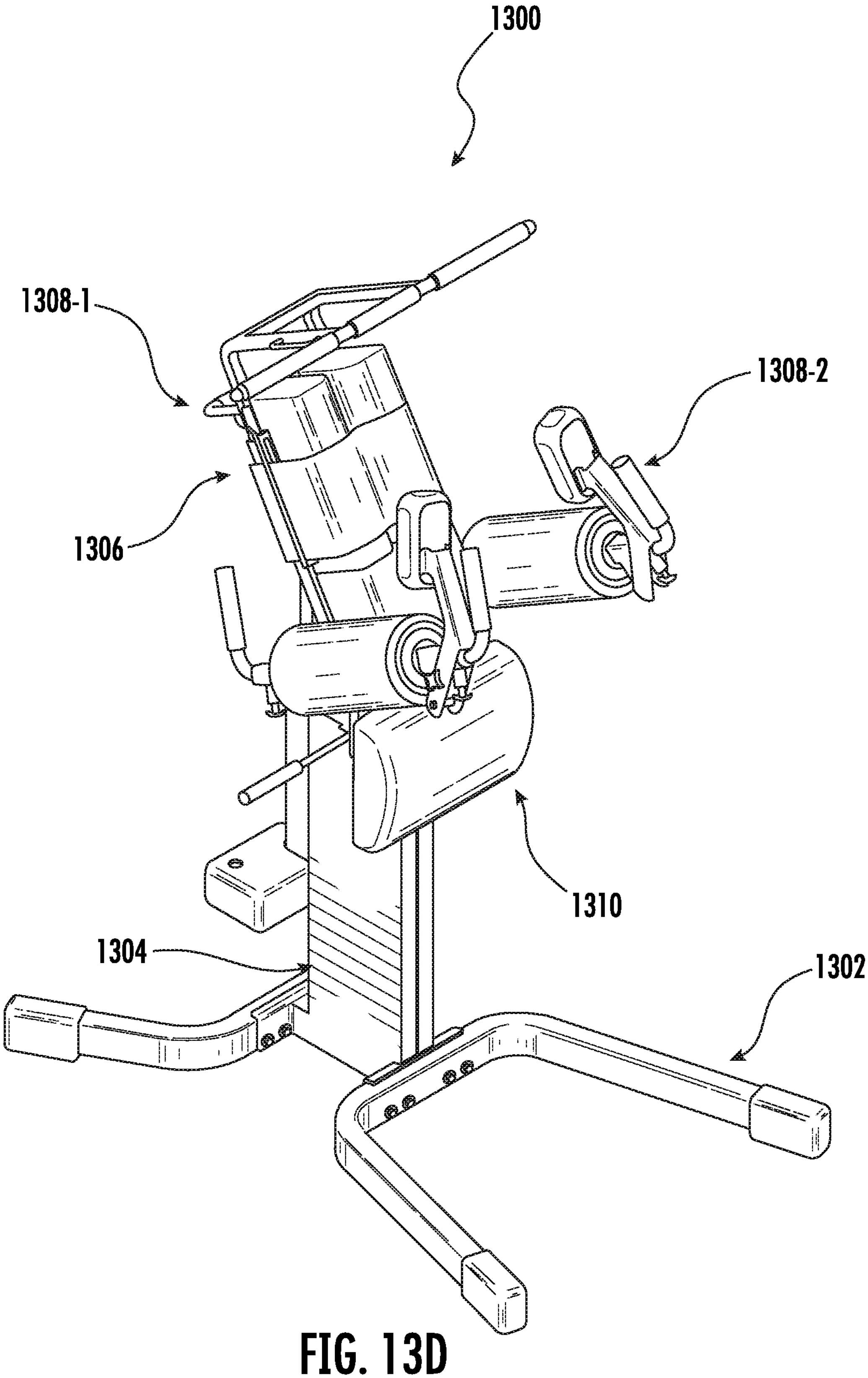

FIG. 13B illustrates the user 1301 on the fitness device 1300 in the supine position, while FIG. 13C illustrates the user 1301 on the fitness device 1300 in the prone position, both with partial rotation of the table 1306. FIG. 13D shows another perspective view of the fitness device 1300, with the underarm support bars 1308-2 in different positions and with the elevation assembly 1304 in a lower position than that shown in FIG. 13A.

The fitness device 1300 provides multifunctional exercise and conditioning, as controlled by the user 1301. The fitness device 1300 includes the elevation assembly 1304 and table 1306 that are rotationally connected to one another via a pivot point attachment. The lower portion of the fitness device 1300 includes the base assembly 1302 and the elevation assembly 1304. In this embodiment, the base assembly 1302 provides a single column rectangular support base sub-frame with four floor feet extensions to prevent tilting. It should be appreciated, however, that the base assembly of a fitness device may include a circular column support rather than a rectangular column support, a multiple column support, etc. The base assembly 1302 does not rotate with the user 1301. The elevation assembly 1304 is coupled to the column support of the base assembly 1302, and is configured to support and provide height selective adjustment as well as pivot and activation mechanisms for rotating the top portion of the fitness device 1300 (e.g., the table 1306, overhead bar 1308-1, underarm support bars 1308-2 and cushion assembly 1310) in a range (e.g., from 0 to 90 degrees, from 0 to 60 degrees, etc.). The table 1306 of the fitness device 1300 provides a metal support sub-frame, and the cushion assembly 1310 includes two individual user support cushions (e.g., a thoracic and head cushion, as well as a lumbar cushion). The top portion of the fitness device 1300 further includes underarm support bars 1308-2 with hand grips in both the front and rear (e.g., for use by the user 1301 in the supine and prone positions, respectively). The overhead bar 1308-1 also provides various hand grips (e.g., for use by the user 1301 in the lateral position, and optionally for use in the supine and/or prone positions). The table

1306, as noted above, is rotationally attached to the elevation assembly 1304 allowing rotation of the user 1301 from the vertical to the horizontal.

The table 1306 of the fitness device 1300 has, at its approximate upper third portion, a bend (e.g., of approximately 30 deg) in relation to the lower two thirds portions to provide backwards and forwards spine bending of the user 1301. The underarm support bars 1308-2 provide underarm tubular cushioned supports, which may be any desired shape for the comfort of the user. As noted above, the underarm support bars 1308-2 further include hand grips formed integrally therewith located in both the front and rear of the fitness device 1300. It should be appreciated that in some embodiments one or more hand grips are attached to or formed integrally with the table 1306 (e.g., such as on a back portion thereof for use by the user 1301 in the prone position). The overhead bar 1308-1 also includes various hand grips as illustrated. The hand grips of the fitness device 1300 are configured with controls (e.g., buttons, switches, etc.) to effect rotation of the table 1306 and optionally to provide lumbar extension and tilting. Such controls are configured for use by the user 1301 to adjust the tilt of the table 1306, to adjust force applied via optional foot restraints, to provide emergency stop switches for disabling motion of the fitness device 1300, etc. The underarm support bars 1308-2 are configured to rotate in and out on separate pivots for facilitating entry and exit of the user 1301 from the fitness device 1300. The hand grips on the underarm support bars 1308-2 in some embodiments are adjustable in and out to accommodate arm length size. The support pads of the underarm support bars 1308-2 in some embodiments are adjustable to provide additional securing of the user 1301 to the fitness device 1300.

As noted above, the bottom portion of the fitness device 1300 includes the base assembly 1302 providing a single column rectangular support sub-frame. The support sub-frame of the base assembly 1302 in some embodiments includes two self-contained air cylinders for providing the ability to adjust the top portion of the fitness device 1300 (e.g., via elevation assembly 1304) up or down without power or compressor functions. In other embodiments, however, the base assembly 1302 and elevation assembly 1304 are powered. The base assembly 1302 and elevation assembly 1304 in some embodiments comprise two pneumatic cylinders operated by hand-lever to provide an electric screw drive mechanism for permitting powered raising and lowering of the top portion of the fitness device 1300. This facilitates both height accommodation for the user 1301 and also allows for powered stretch functionality to move in the y-axis vertical direction as distinct and separate from power stretch (e.g., use of elastic bungees) from rotation of the table 1306. It should be appreciated that this functionality may also be used for isometric exercise by the user 1301, such as by requiring the user to hold or maintain a position or tilt of the table 1306 while a predetermined resistance (e.g., constant or variable) is provided through the powered mechanism of the base assembly 1302 and elevation assembly 1304.

The cushion assembly 1310 includes a fixed upper torso head and thoracic support cushion, which may in some cases be configured for rotation forward. The cushion assembly 1310 also includes the lumbar back support (e.g., which may be convex shaped) providing firm ergonomic support. The lumbar back support is also configured to extend outwardly (e.g., tilting) through powered mechanisms causing a change in the radius support favoring spinal extension and flexion of the lower back and pelvis of the user 1301, depending on the positioning of the user 1301 (e.g., prone or supine). In some embodiments, the lumbar back support is manually adjustable up and down to accommodate different user height by release of a locking slide mechanism.

The overhead bar 1308-1 extends outward to accommodate various positions of the user 1301, including prone, supine and lateral positioning. The overhead bar 1308-1 is manually adjustable up and down to accommodate different user height. The overhead bar 1308-1 is configured with controls for effecting rotation of the table 1306 and/or the lumbar back support of the cushion assembly 1310. The overhead bar 1308-1 also includes one or more emergency stop buttons and other types of user interface controls described herein.

As noted above, the fitness device 1300 is optionally coupled to one or more foot restraints, such as by coupling a foot restraint to the base assembly 1302 of the fitness device 1300. The foot restraints in some embodiments provide auxiliary mechanisms for strapping the ankles and/or feet of the user 1301 to provide increased traction effects that supplement gravity. The user 1301 utilizes their arms to self-pull against additional resistance provided by the foot restraint. The user 1301 also utilizes the pull created by active rotation and lift of the table 1306 to provide such increased traction effects. The fitness device 1300 during rotation in a backwards direction is configured to provide full and direct traction effects on muscles of the entire lower extremity of the user 1301, including the hamstrings, gluteal muscles, psoas muscles, etc., as well as the entire lower back musculature and the upper torso and arms of the user 1301.

Foot restraints in some embodiments utilize bungee strapping that originates at its proximal location from the sides or underneath an attachment point to one or multiple base sub-plates configured for attachment to the base assembly 1302 of the fitness device 1300. In some embodiments, the user 1301 places their feet in boots or cuffs with straps attached to one or more base sub-plates. In some embodiments, the user 1301 is secured to a foot restraint via straps or cuffs around the ankles of the user 1301 where the proximal end of a bungee cord attaches the ankle straps or cuffs to a sub-pedestal base, eliminating the need for base sub-plates.

Foot restraints in some embodiments utilize a bungee mechanism for attachment to the base assembly 1302 (e.g., via one or more base sub-plates, to a sub-pedestal base, or other type of base assembly mounting portion, etc.), with the bungee mechanism providing elastic recoil stretch with length and flexibility capabilities allowing full rotation of the table 1306 (e.g., to 60 degrees, to 90 degrees, etc.) as well as lift of the table 1306 relative to the base assembly 1302 (e.g., lift to 6 in, lift to 9 in, etc.). The bungee cords or straps of a foot restraint are interchangeable and configured for easy removal to enable the user 1301 to select amongst a variety of cords or straps with different (e.g., lighter and heavier) elastic strength to provide a wide range of customized resistance to accommodate users with different physical conditioning.

In some embodiments, the foot restraint includes separate right and left foot resistance cords or straps for attachment to one or more base sub-plates or sub-pedestal bases, allowing the user 1301 to select different resistance for the left foot and the right foot. The foot restraint, as noted above, may utilize ankle strapping for fastening to ankles of the user 1301 (e.g., a proximal strapping position) in various different configurations including but not limited to: one base sub-plate with fixed boots; two individual base sub-plates with separate straps; just boots or ankle straps attached directly to proximal bungees; one plate with one bungee; etc. Each end of a proximal bungee of the foot restraint is attached to the base assembly 1302 of the fitness device 1300 in various configurations, including configurations enabling sliding and/or rotation of the foot restraint. Sliding and rotation mechanisms of distal attachment of bungees (e.g., closest to the user 1301 via sub-plate and restraint straps) allow natural movement of the user 1301 during 0 to 60 degrees of full rotation of the table 1306 to accommodate changes in the position of the user 1301 (e.g., during lateral positioning of the user 1301 relative to the fitness device 1300).

The pedestal base of the foot restraint accepts a distal attachment point (e.g., in a center thereof, on left and right sides thereof, etc.), and provides forward and back translation movement so that as the table 1306 rotates in a backward direction towards 90 degrees, the bungees, cords or straps move forward and backward as necessary for comfort of the user 1301. The pedestal base attachment points in some embodiments are on a secured roller system or track that permits gliding movement. The pedestal base of the foot restraint may have various different design configurations providing attachment to sub-plates, directly to ankle straps, cords or bungees, etc. In some embodiments, the sub-base distal strap, cord or bungee attachment point of the foot restraint allows free rotation to accommodate a user 1301 (e.g., wearing boots, cuffs, straps, etc. attached to a sub-plate or directly to the pedestal base) enabling some side-to-side or lateral positioning of the feet of the user 1301 in addition to allowing face forward or prone positioning and face outward or supine positioning. The foot restraint includes safety mechanisms for safely applying additional traction to the user 1301, such as through a belt tensioning system, through dial control against a resistance sliding mechanism, etc.

Figure 14A:
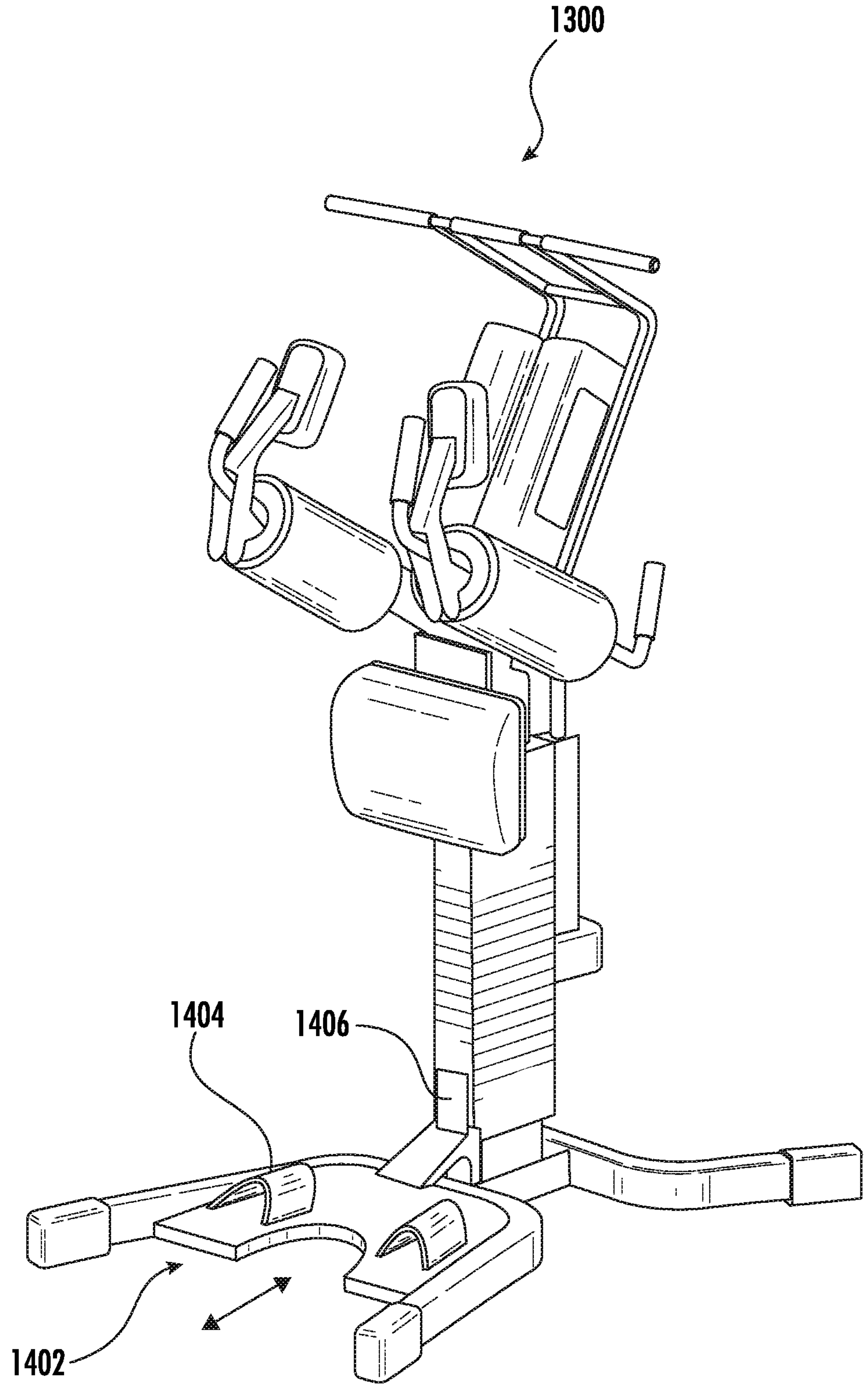
FIGS. 14A-14C depict a foot restraint coupled to a fitness device, according to an embodiment of the invention.
Figure 14B:
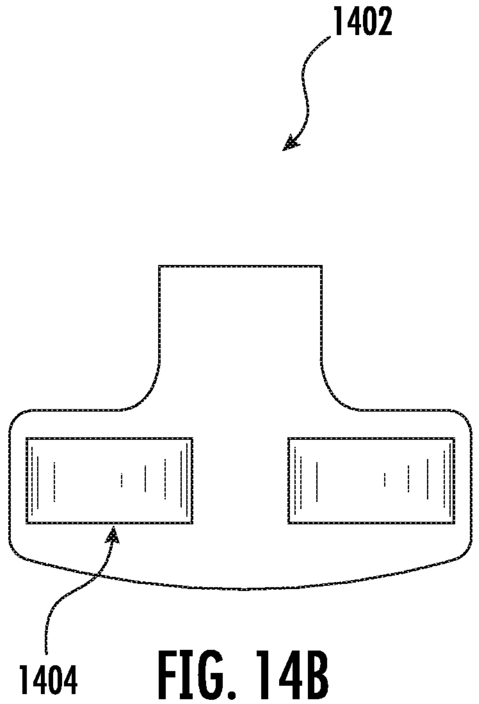
Figure 14C:
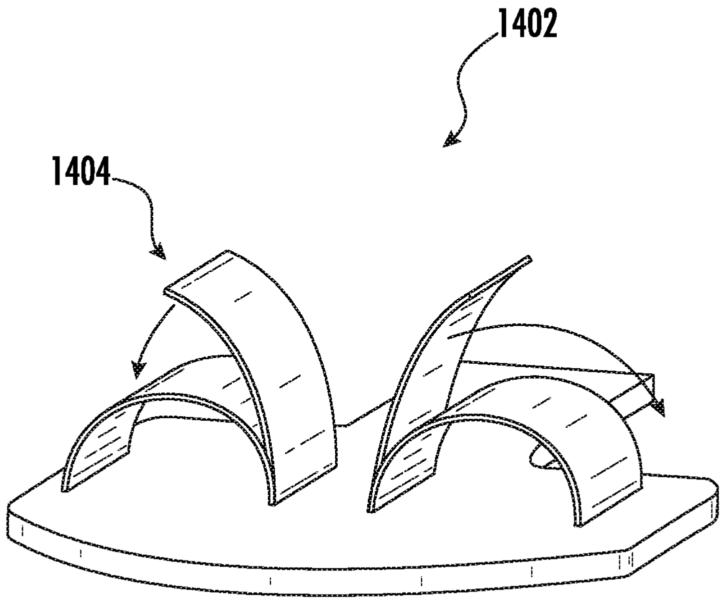

FIGS. 14A-14C illustrate a foot restraint 1402 coupled to the fitness device 1300. As shown in FIG. 14A, the foot restraint 1402 includes a pedestal base platform, individual foot holsters 1404, and linkage 1406 to the vertical travel of the elevation portion 1304 of the fitness device 1300 allowing the foot restraint 1402 to move up and down with the elevation portion 1304 as desired. FIG. 14B shows a profile top view of the foot restraint 1402, and FIG. 14C shows a perspective view of the foot restraint 1402 illustrating adjustment of the individual foot holsters 1404 (e.g., via hook and loop straps).

Figure 15A:
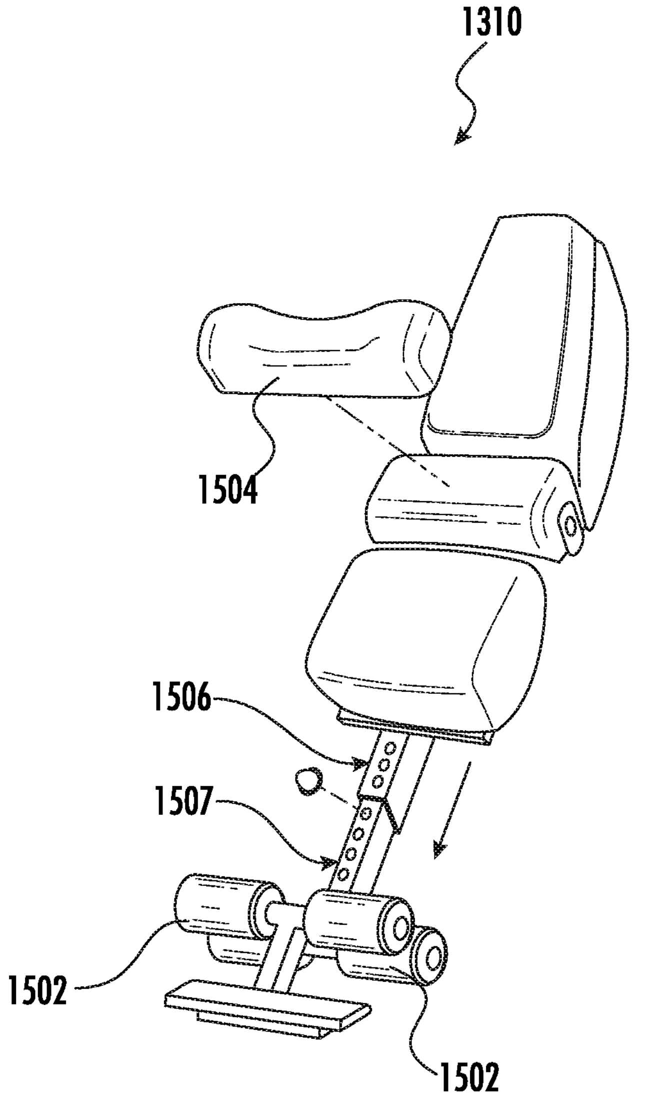
FIGS. 15A-15C depict a foot restraint extending from a cushion assembly of a fitness device, according to an embodiment of the invention.
Figure 15B:
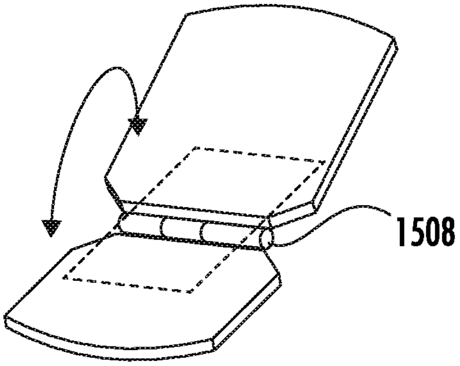
Figure 15C:
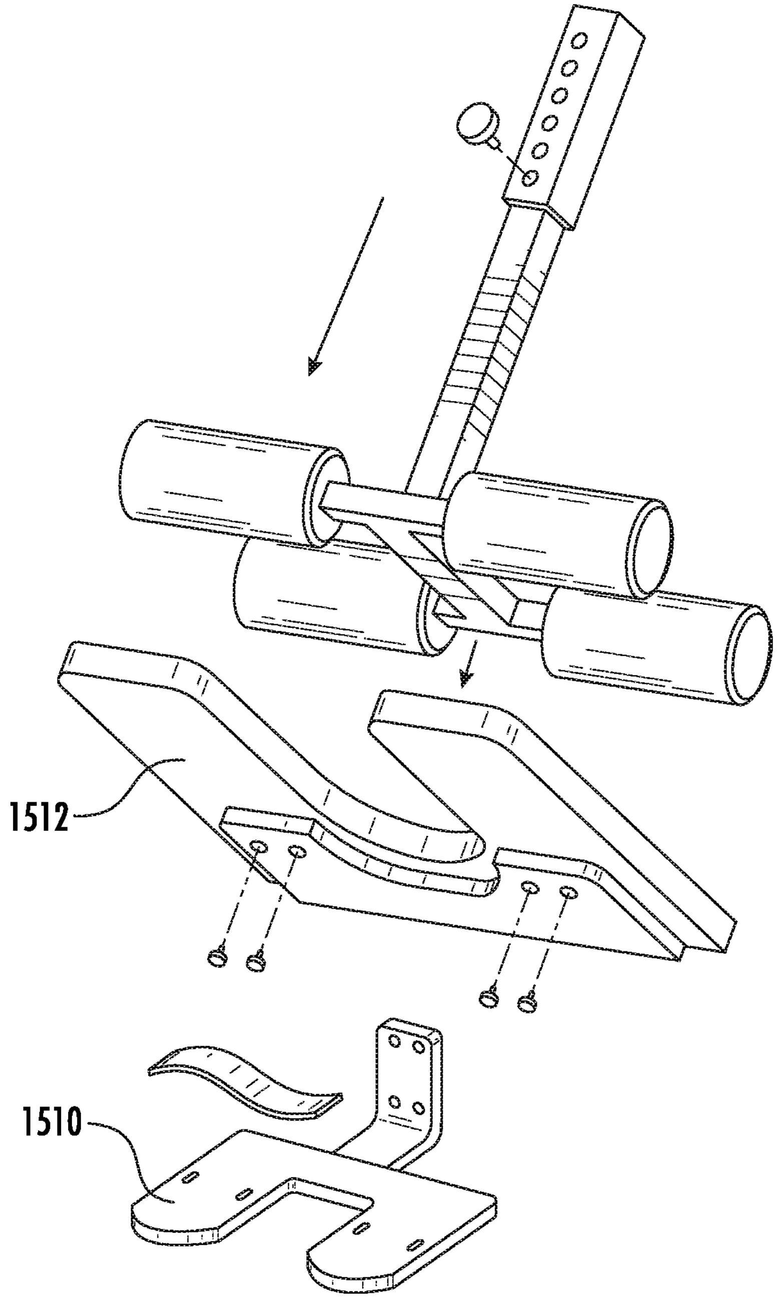

FIGS. 15A-15C illustrate a foot restraint 1502 coupled to the cushion assembly 1310 of the fitness device 1300. The foot restraint 1502 in this embodiment includes sets of cushioned bolsters for the user to slip their feet between and rest on the pedestal base, embodied as a laser cut steel plate 1510 and a lower stabilizing feature 1512 assembled as illustrated in FIG. 15C. The plate 1510 and lower stabilizing feature 1512 are rotatable to accommodate a user in prone, supine and lateral positions. The foot restraint 1502, as illustrated in FIGS. 15A and 15C, extends from the cushion assembly to accommodate different user height. The foot restraint 1502 may also or alternatively be configured for at least one of linear and rotational (e.g., angular) displacement of members 1506 and 1507 to facilitate stretch or other exercise of a user. Such linear and rotational displacement may be enabled by one or more actuators comprised within members 1506 and 1507. FIG. 15B shows that the head and thoracic and lumbar cushions of the cushion assembly 1310 rotate about pivot point 1508, which may pinch the user as the cushion assembly 1310 is lengthened to accommodate different-sized users. Thus, as illustrated in FIG. 15A, the cushion assembly 1310 includes a removable filler roller pad 1504 that is configured to compress and eliminate the possible pinch point shown in FIG. 15B.

Figure 16A:
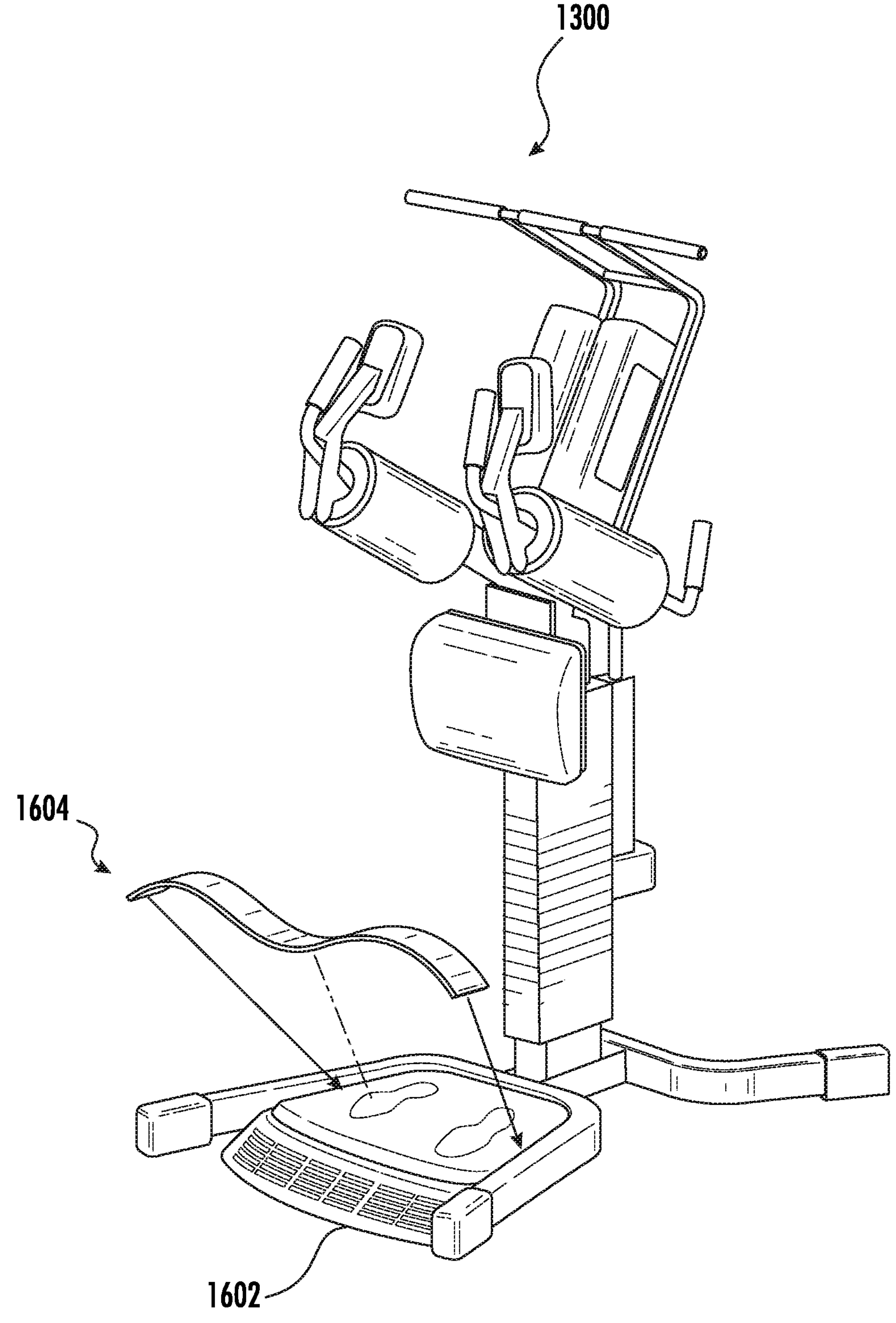
FIGS. 16A-16H depict a foot restraint coupled to a fitness device, according to an embodiment of the invention.
Figure 16B:
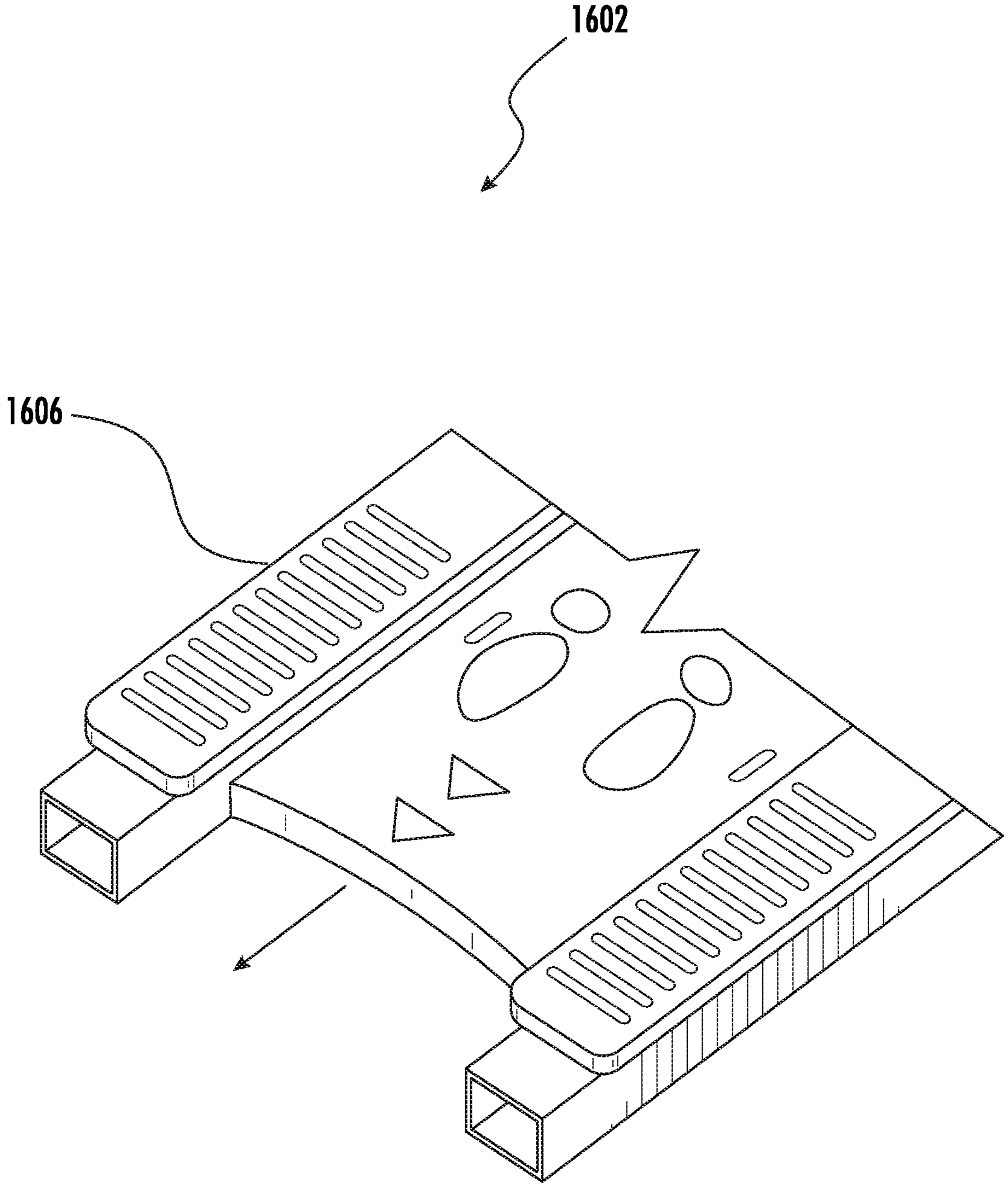
Figure 16C:
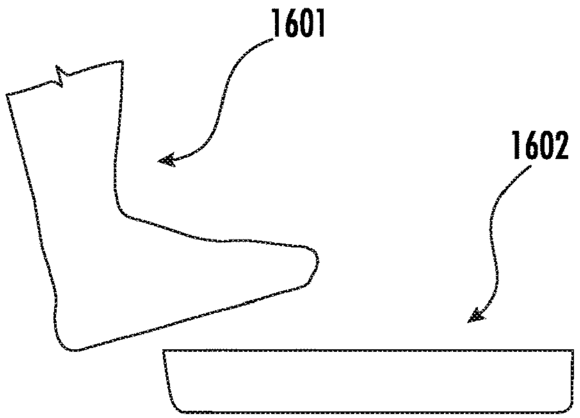
Figure 16D:
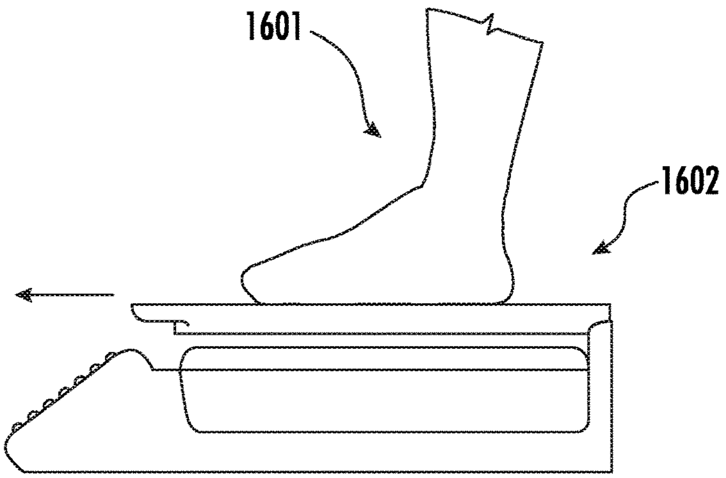
Figure 16E:
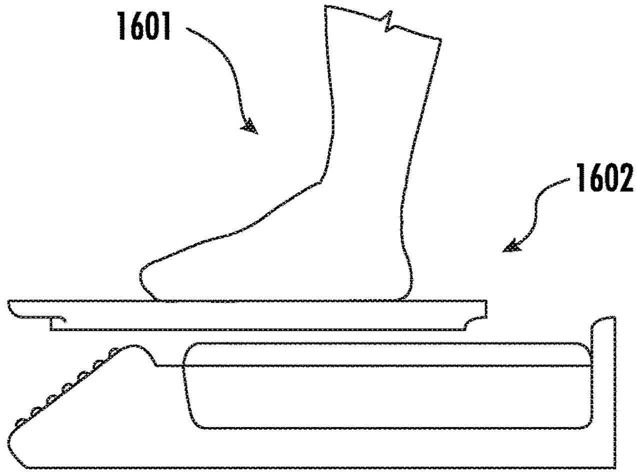
Figure 16H:
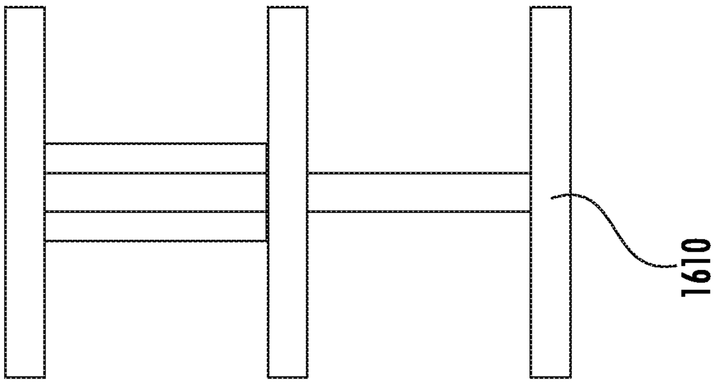
Figure 16G:
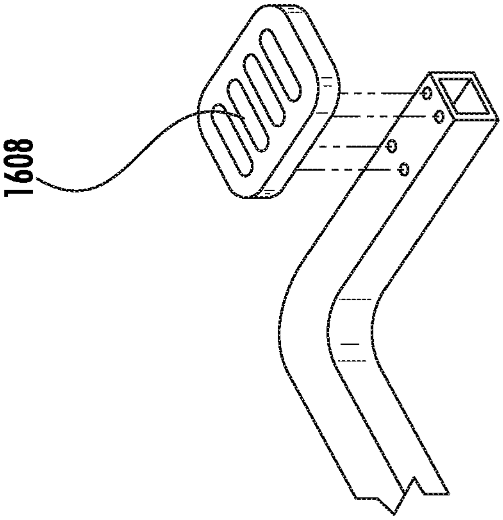
Figure 16F:
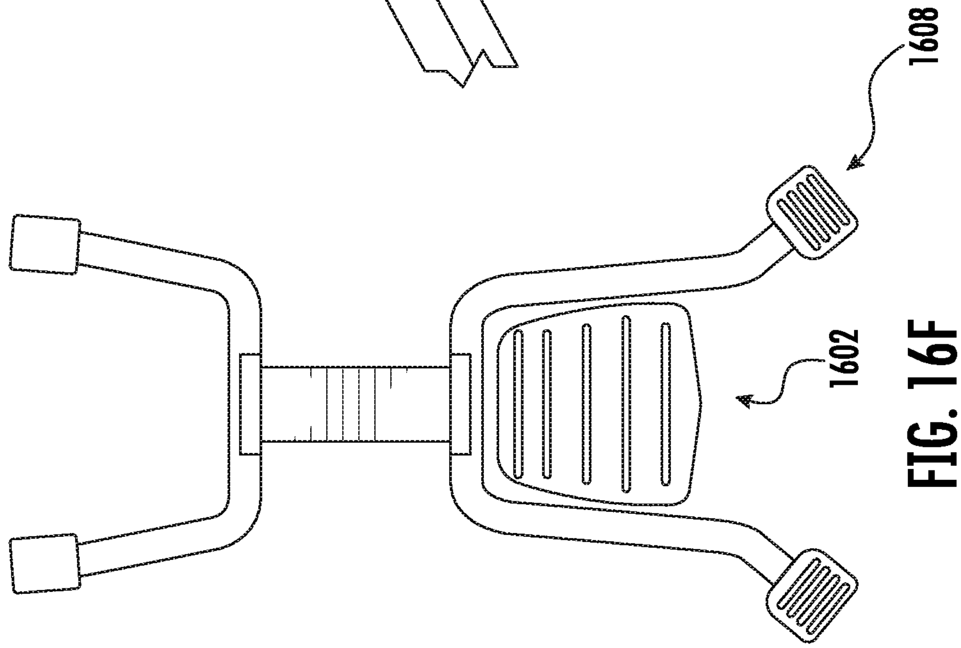

FIGS. 16A-16H illustrate a foot restraint 1602 coupled to the fitness device 1300. The foot restraint 1602, similar to the foot restraint 1402, is configured for removable coupling to the base assembly 1302 of the fitness device 1300, and includes a pedestal base. The foot restraint 1602 includes a strap, cord or bungee foot band 1604 that connects to the sides of the pedestal base to secure the feet of the user 1301 to the foot restraint 1602. As shown in FIG. 16B, the lateral sides 1606 of the pedestal base of the foot restraint 1602 also provide an area for the user 1301 to step on prior to securing their feet to the foot restraint 1602 using the foot band 1604. As shown in FIG. 16C, the pedestal base of the foot restraint 1602 includes a ramp so the foot 1601 of the user 1301 can easily walk onto the pedestal base. As illustrated in FIGS. 16D and 16E, the foot restraint 1602 permits front and back movement relative to the pedestal base. FIGS. 16F and 16G illustrate foot pedestals 1608 that further aid the user 1301 in getting into the fitness device 1300. FIG. 16H shows a base profile 1610.

Figure 17A:
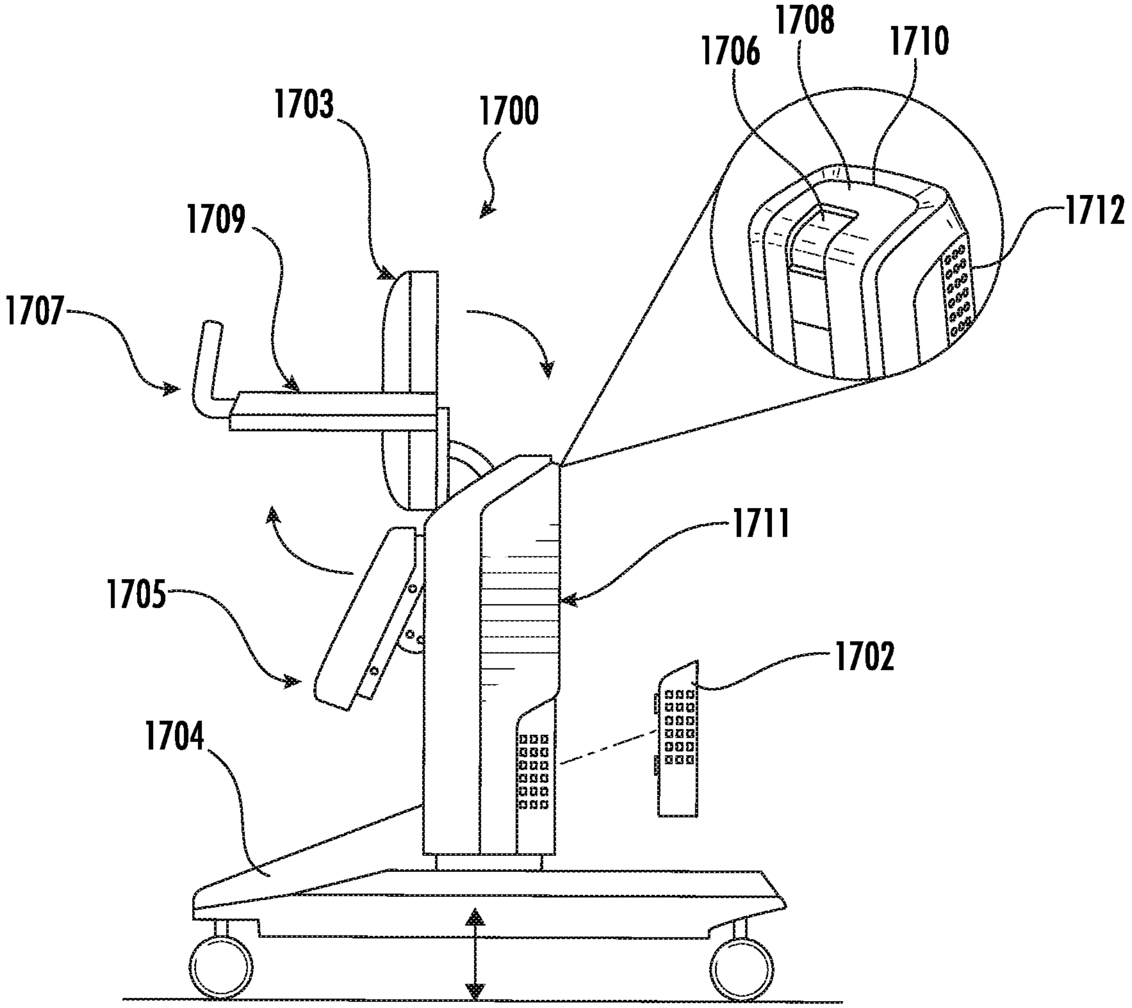
FIGS. 17A-17C depict a user platform for a fitness device, according to an embodiment of the invention.
Figure 17B:
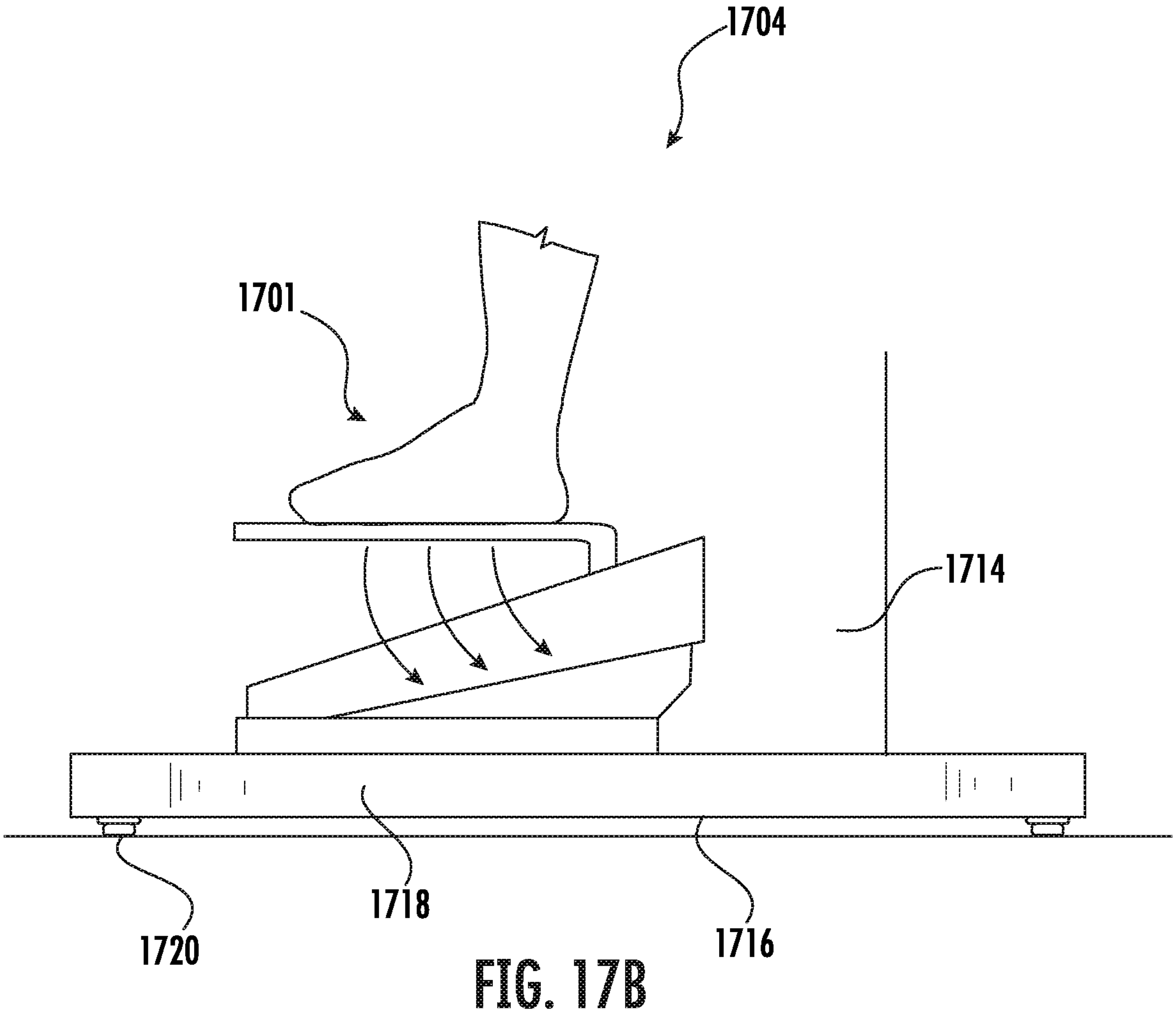
Figure 17C:
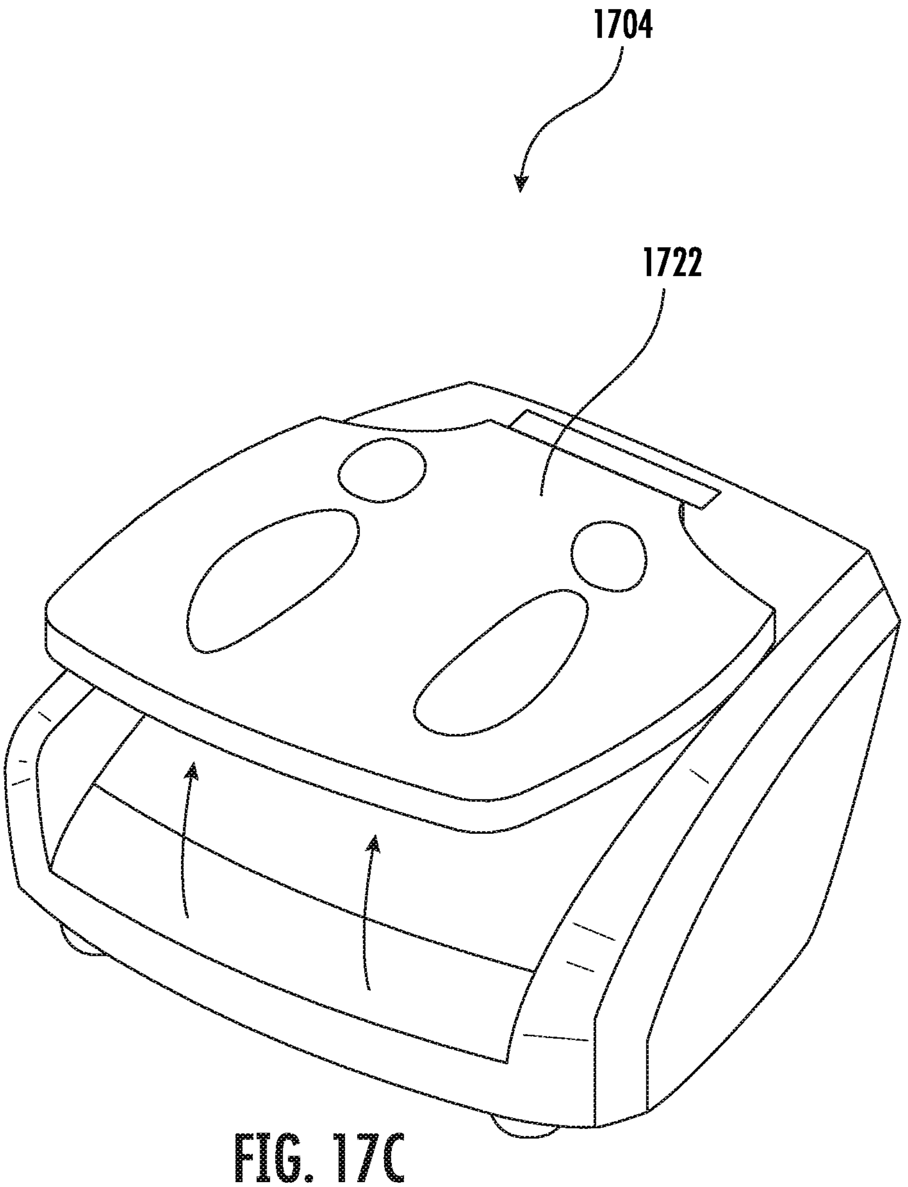

FIGS. 17A-17C illustrate a fitness device 1700 with a user platform 1704 facilitating entry of feet of a user 1701 onto the fitness device 1700. The fitness device 1700, as shown in FIG. 17A, includes an access panel at a rear thereof to facilitate servicing of the fitness device 1700, including the columnar mechanism of base and elevation assemblies thereof. FIG. 17A also shows a close-up view of a top of the columnar mechanism showing an opening 1706 for adjusting the lift mechanism of the fitness device 1700, a textured material region 1708 between the opening 1706 and a main housing 1710 of the columnar mechanism, and a ventilation panel 1712 on the main housing 1710. The lift mechanism of the fitness device 1700 is represented as lift assembly 1711. As shown in FIG. 17A, a thoracic cushion assembly 1703 pivots on the lift assembly 1711. Additionally, a lumbar cushion assembly 1705 pivots on the lift assembly 1711. The thoracic cushion assembly 1703 and lumbar cushion assembly 1705, in some embodiments, pivots or rotates separately or independent of one another. In other embodiments, the thoracic cushion assembly 1703 and lumbar cushion assembly 1705 rotate at least partially in coordination with one another. FIG. 17A also illustrates forearm supports 1709, on which a user can rest their forearms during use of the fitness device 1700. The forearm supports 1709 may also be used to allow the user to lift themselves as part of a stretch or other exercise, possibly while gripping handles or hand grips 1707.

As illustrated in FIG. 17B, the user platform 1704 provides a drop-out platform 1714 to facilitate user entry onto the fitness device 1700. The user platform 1704 itself may also be raised (as shown in FIG. 17B relative to FIG. 17A) during rotation of a table of the fitness device 1700 as described elsewhere herein. For example, although not shown in FIGS. 17A-17C, the user platform 1704 may have a foot restraint removably coupled thereto as described elsewhere herein. Movement of the user platform 1704 in such embodiment will adjust a relative position of the foot restraint and the thoracic cushion assembly 1703 and lumbar cushion assembly 1705 facilitating stretch or other exercise. The user platform 1704 may also be raised and lowered to accommodate differing user height. Further, the user platform 1704 in some embodiments includes a mechanism for rotating a plate 1722 on which the user 1701 stands as shown in FIG. 17C. In embodiments including a foot restraint, rotation of the plate 1722 may further facilitate stretch or other exercise in addition to or in place or raising or lowering the user platform 1704. FIG. 17B, as noted above, illustrates the user platform 1704 partially raised relative to the static base 1716 of the base assembly. The base assembly is at least partially hollow 1718 in some embodiments for adding weight as desired. A bottom of the static base 1716 also includes rubber feet 1720 (e.g., for use in a gym floor environment).

Figure 18A:
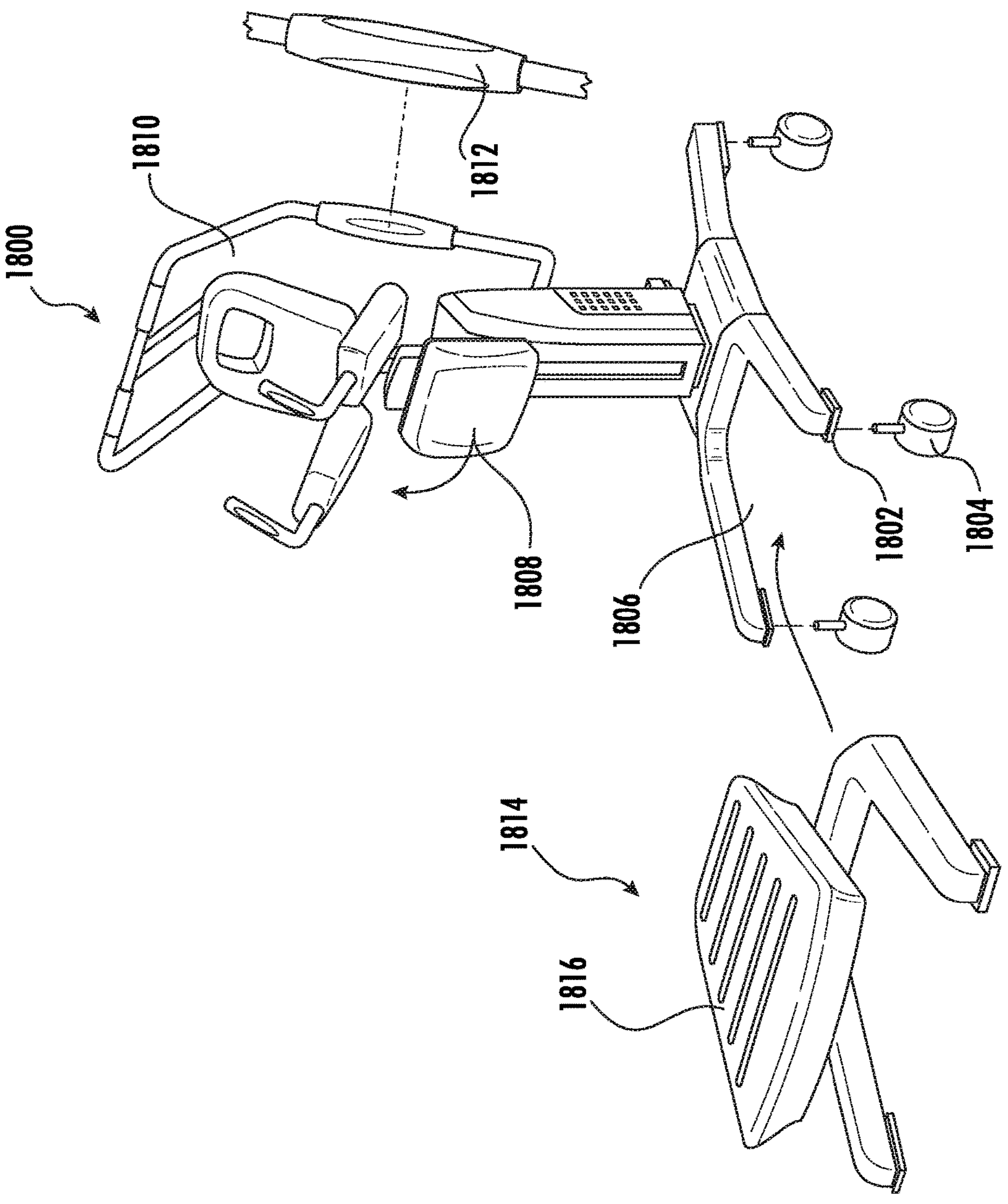
FIGS. 18A-18D depict a step ramp and modular cushions for a fitness device, according to an embodiment of the invention.
Figure 18C:
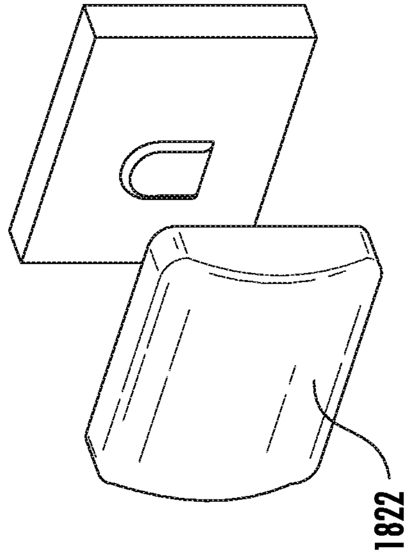
Figure 18D:
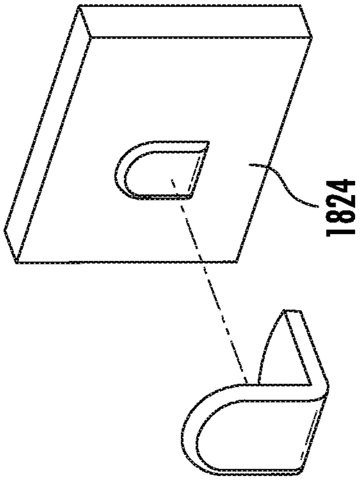
Figure 18B:
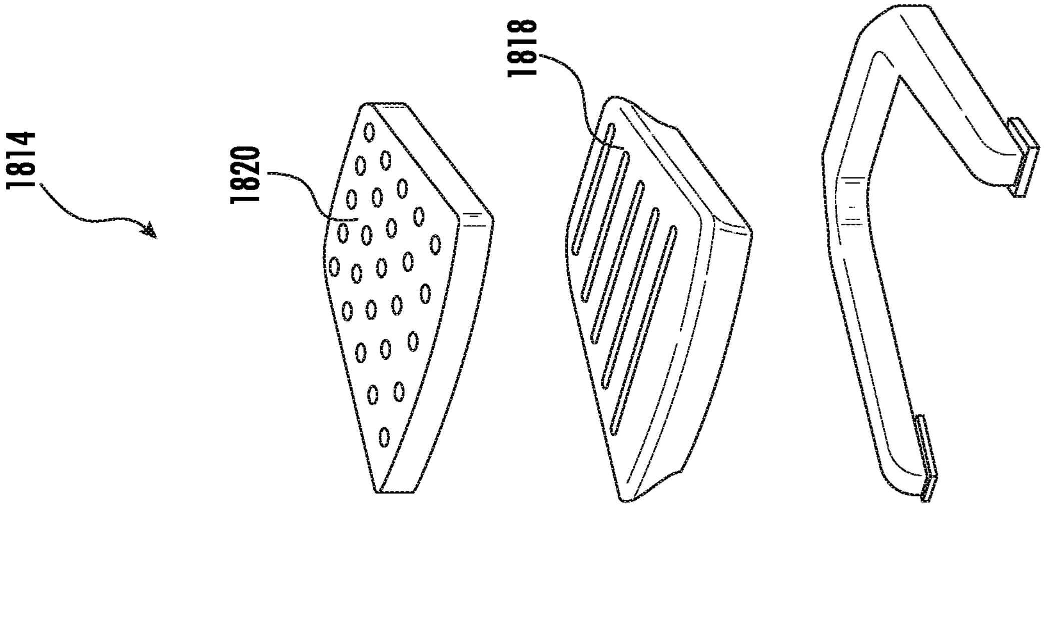

FIGS. 18A-18D illustrate a fitness device 1800. The fitness device 1800 includes rubber feet 1802 on the bottom of corners of the base assembly thereof (e.g., for static installation where the fitness device 1800 is not expected to move often). The rubber feet 1802, however, are removable in place of interchangeable casters 1804 for use in environments where the fitness device 1800 is expected to be repositioned (or for transport of the fitness device 1800). The base assembly of the fitness device 1800 includes a region 1806 where a removable step ramp 1814 is configured to fit in. The removable step ramp 1814 includes a platform 1816 that is raised or lowered to facilitate user entry onto the fitness device 1800. As shown in FIG. 18B, the removable step ramp 1814 is modular, permitting interchanging of the platform 1816 with different sized and textured step platforms such as platforms 1818 and 1820. The fitness device 1800 further includes modular support pads or cushions 1808 configured for attachment to a cushion assembly or table of the fitness device 1800 with magnets, cleats, etc. FIG. 18C, for example, illustrates removal of a cushion 1822 from the cushion assembly. FIG. 18D illustrates a male-female cleat feature 1824 for removing the cushion 1822 and other cushions and pads from the cushion assembly of the fitness device 1800. The fitness device 1800 also includes continuous tubing 1810 that provides an overhead bar and grips for the user in different positions. FIG. 18A shows a close-up view of a region of the tubing 1810 that is overmolded or otherwise formed to provide hand grips 1812 for a user of the fitness device 1800.

Figure 19A:
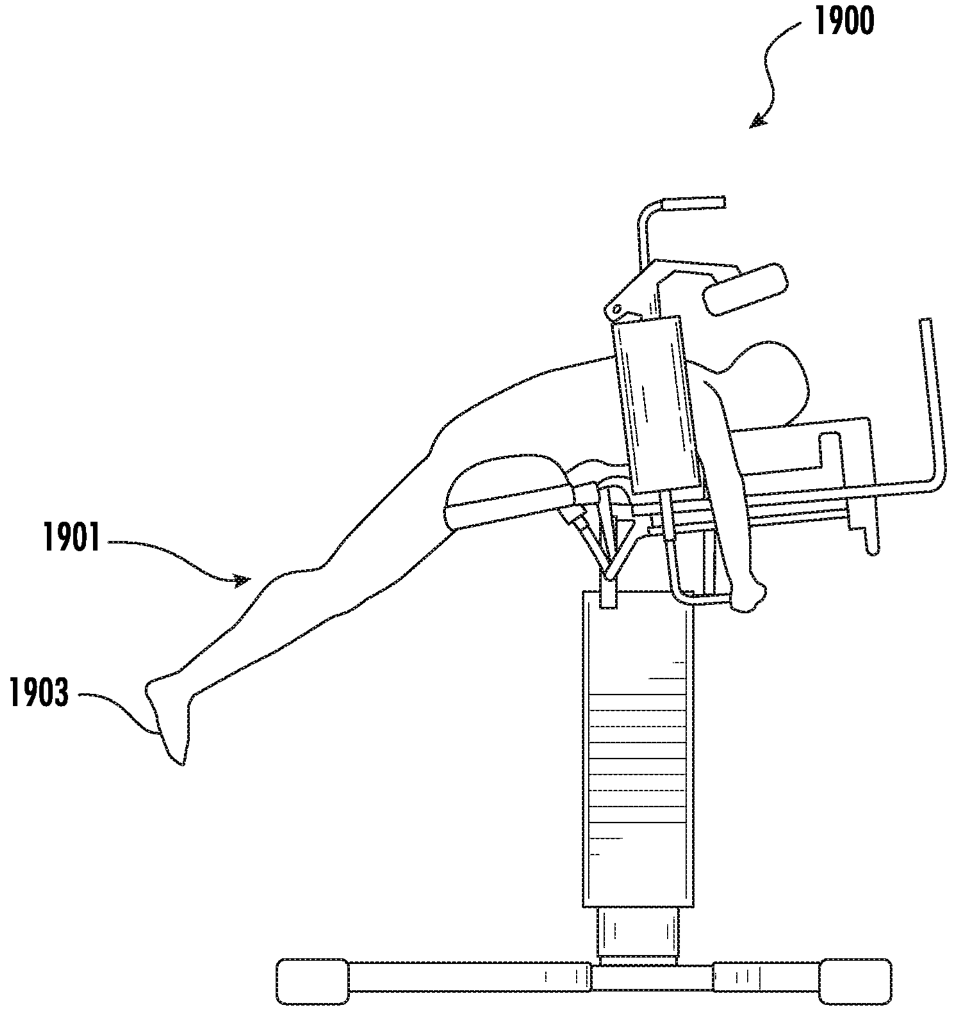
FIGS. 19A and 19B depict an extendable foot restraint configured for coupling with a fitness device, according to an embodiment of the invention.
Figure 19B:
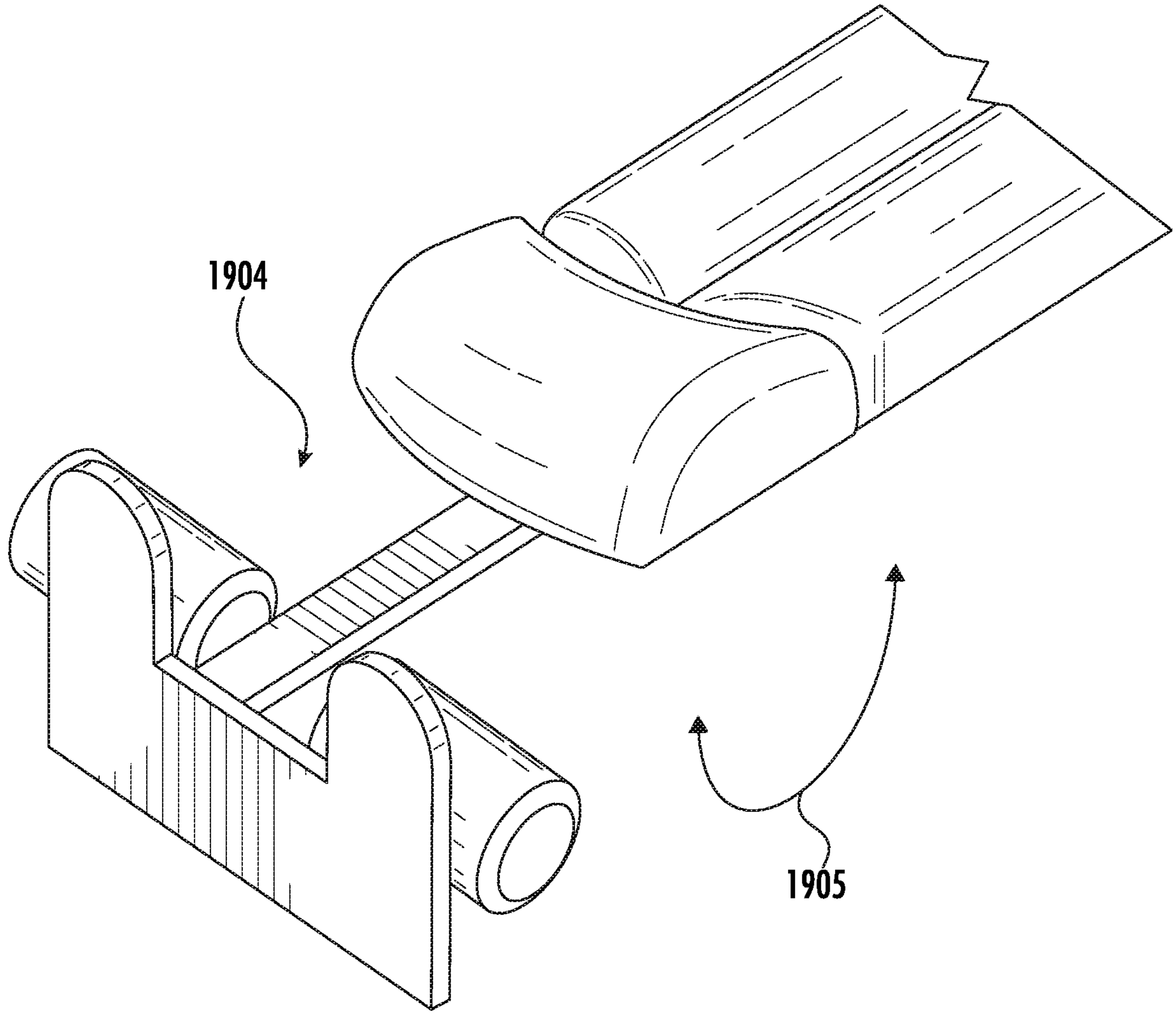

FIGS. 19A and 19B illustrate a fitness device 1900 configured for coupling with an extendable foot restraint 1904. FIG. 19A shows a user 1901 on the fitness device in the prone position while the table thereof is rotated. As shown, the feet 1903 of the user hang freely, which may be uncomfortable for the user. FIG. 19B shows an extendable foot restraint 1904 that is coupled to a base of the table and extends outward from a lumbar cushion of a cushion assembly of the fitness device 1900 on which the user 1901 may rest their feet 1903 during rotation of the table of the fitness device 1900. Although shown in FIG. 19B as extending straight out from the bottom of the lumbar cushion, in some embodiments the extendable foot restraint 1904 rotates about a pivot point on the table of the fitness device 1900, as illustrated by arrow 1905.

Figure 20A:
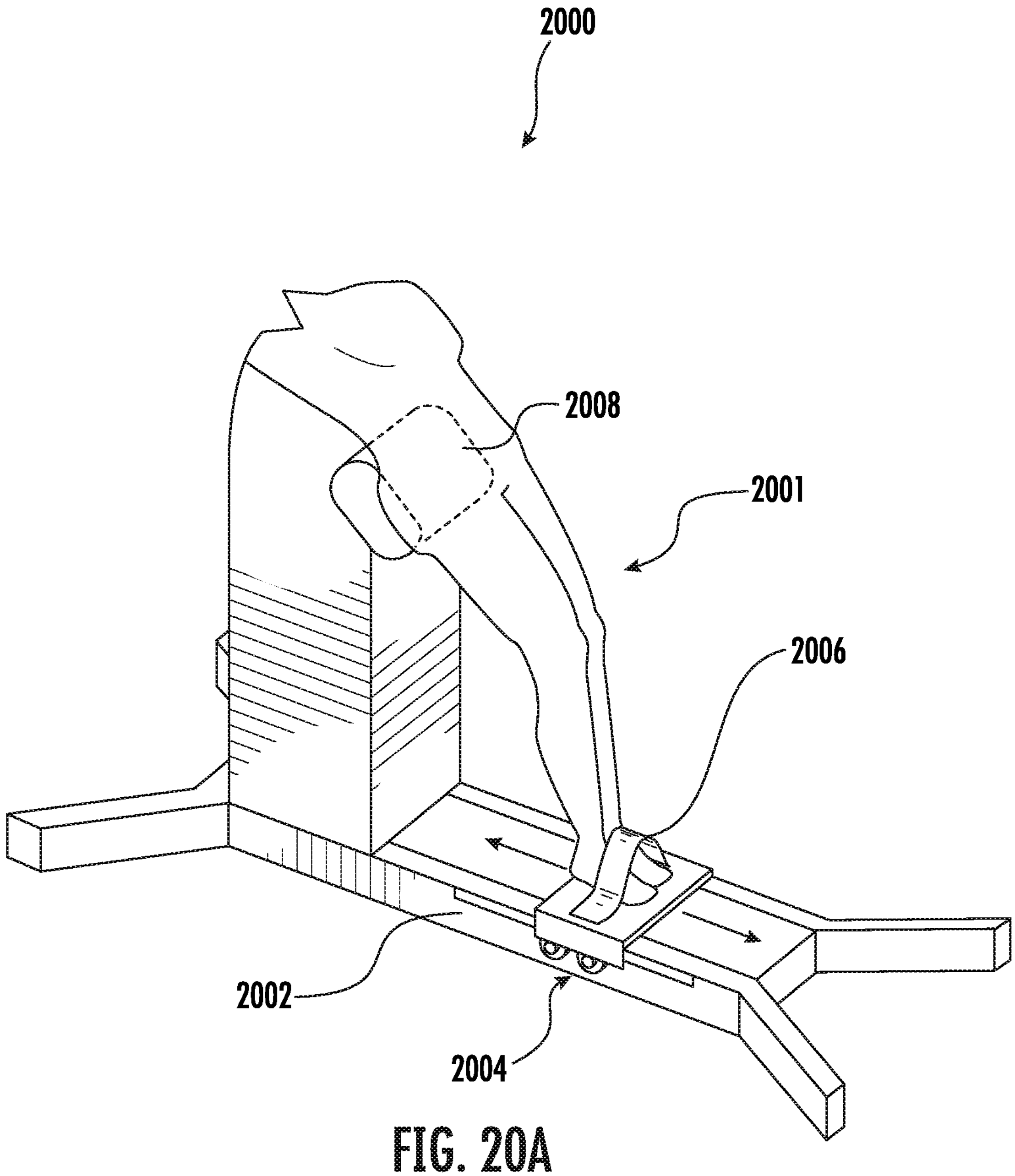
FIGS. 20A and 20B depict a foot restraint track system for a fitness device, according to an embodiment of the invention.
Figure 20B:
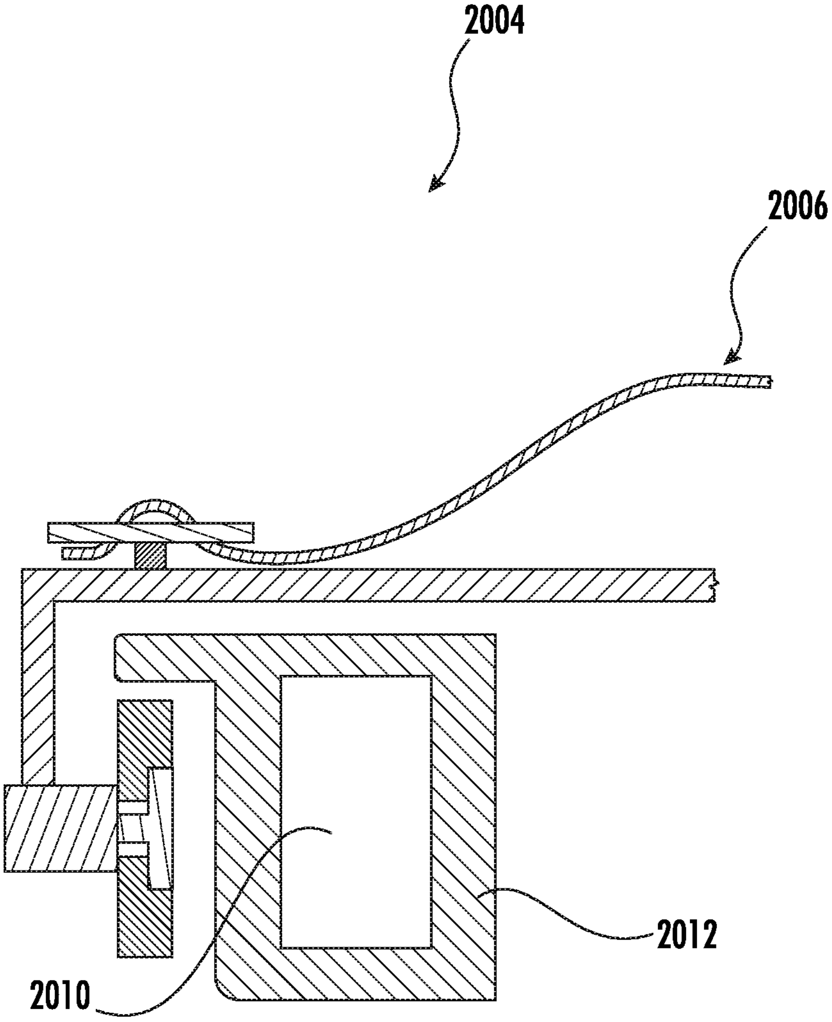

FIGS. 20A and 20B illustrate a fitness device 2000. The fitness device 2000 includes a track system 2002 on which a foot restraint 2004 is mounted and able to slide back and forth. The track system 2002, as well as other types of sliding tracks and track systems described herein, in addition to allowing motion during stretching or other exercise, may also provide a convenient method of storage of the foot restraint 2004 when not in use. FIG. 20A depicts a user 2001 on the fitness device 2000 resting on a lumbar support cushion 2008 and with their feet attached to the foot restraint 2004 via a bungie strap 2006. FIG. 20B shows a side cross-sectional view of the foot restraint 2004 on the track system, including an axis 2010 and a portion 2012 of the base assembly providing the track system 2002. Also shown in FIG. 20B is the bungie strap 2006.

Figure 21B:
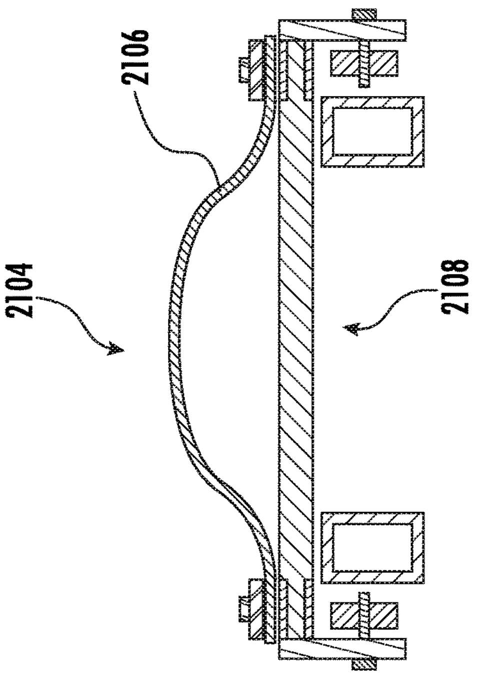
FIGS. 21A-21C depict a foot restraint track system for a fitness device, according to an embodiment of the invention.
Figure 21C:
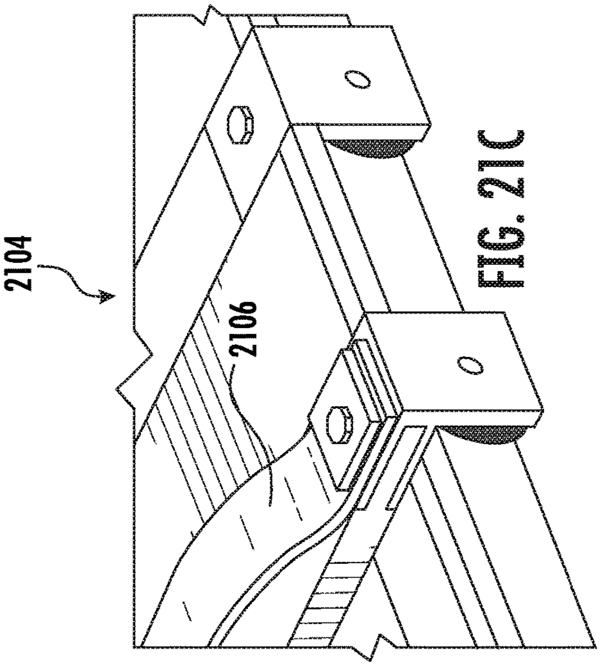
Figure 21A:
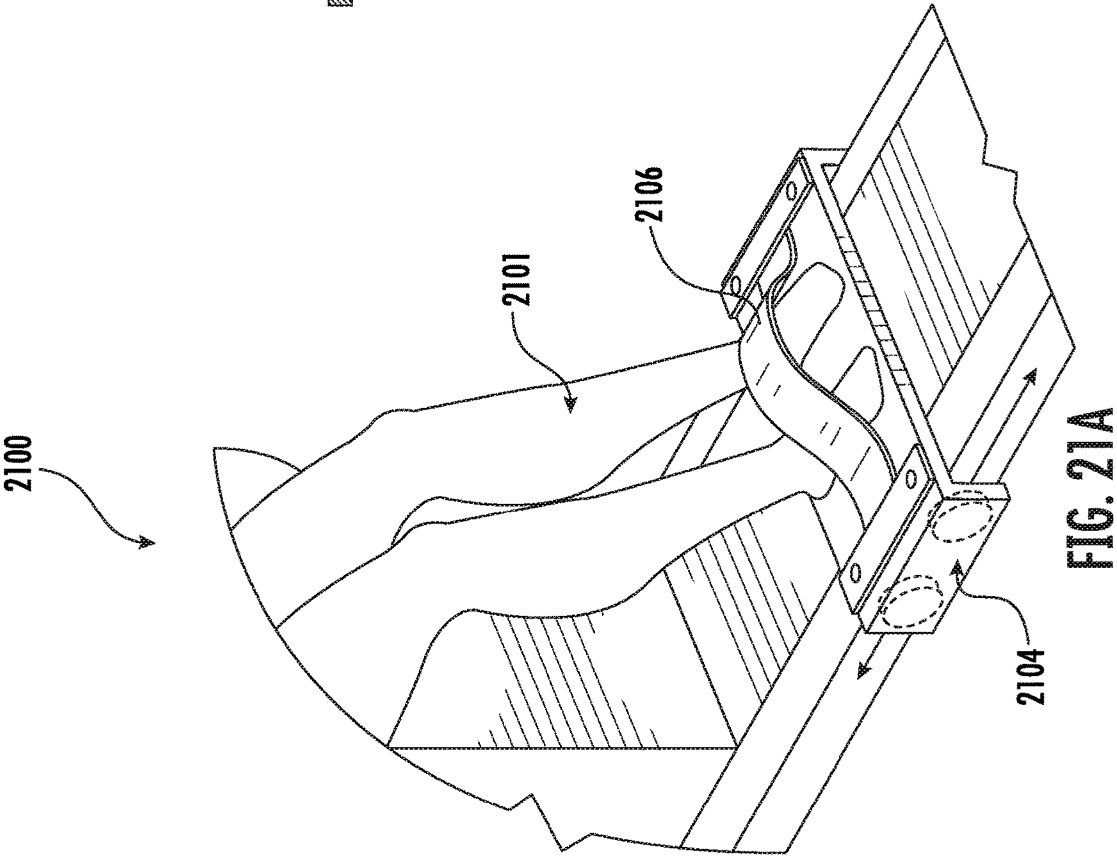

FIGS. 21A-21C illustrate another foot restraint 2104 on a track system of a fitness device 2100. The feet of a user 2101 are secured to the foot restraint 2104 via a bungie band 2106. FIG. 21B shows a side cross-sectional view of the foot restraint 2104, including a board or platform 2108 on which the feet of the user 2101 rest. FIG. 21C shows a perspective view of the foot restraint 2104 on the track system of the fitness device 2100.

Figure 22B:
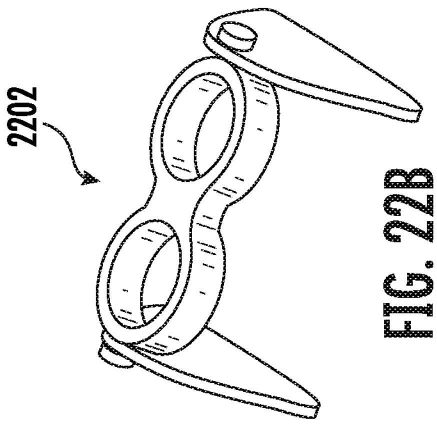
FIGS. 22A-22C depict a foot restraint for a fitness device, according to an embodiment of the invention.
Figure 22C:
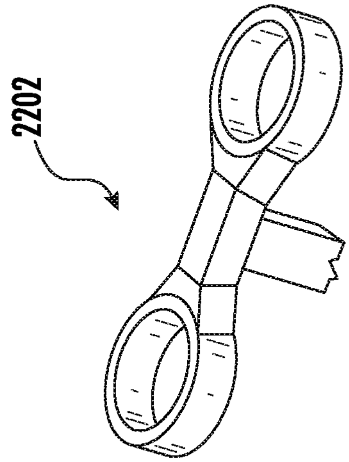
Figure 22A:
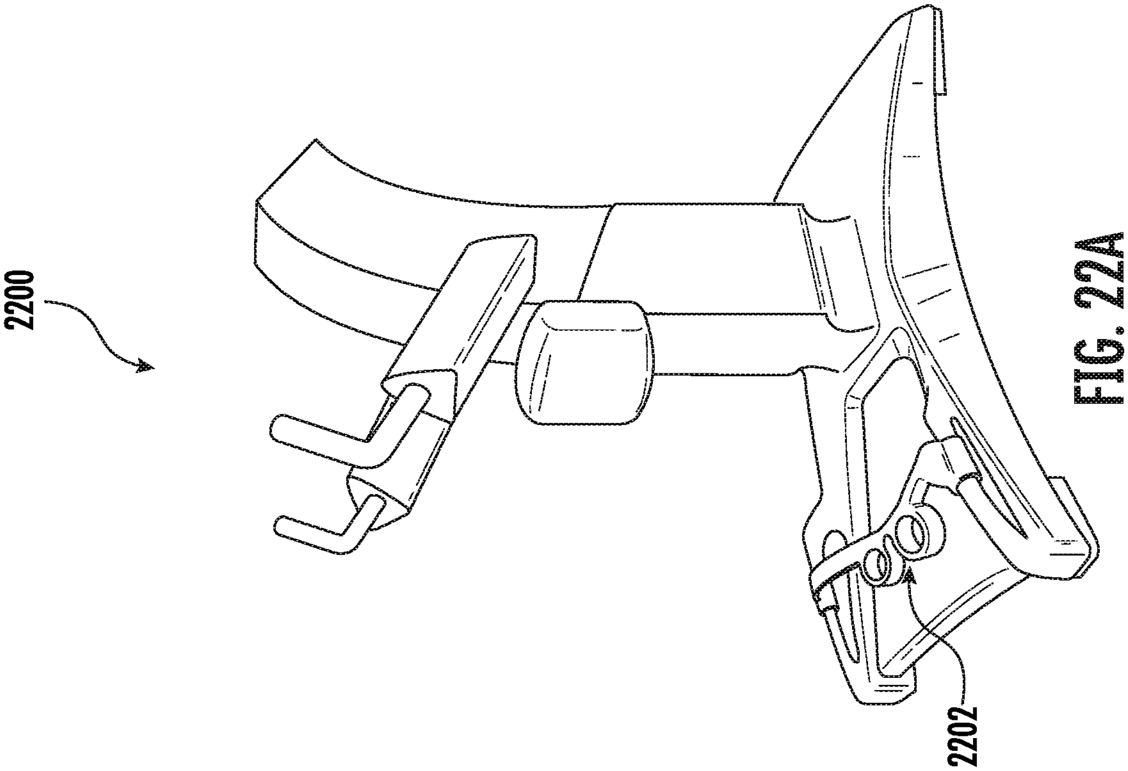

FIGS. 22A-22C illustrate a fitness device 2200 with a foot restraint 2202 providing a pair of ankle cuffs on which the feet of a user are secured. Sides of the ankle cuffs of the foot restraint 2202 are secured to a base assembly of the fitness device 2200 via straps, cords or bands that stretch, allowing some travel and flexibility in three dimensions. FIGS. 22B and 22C show perspective views of the foot restraint 2202. More particularly, FIG. 22B illustrates an embodiment where the foot restraint 2202 has two straps, one at each side of the ankle cuffs. FIG. 22C illustrates an embodiment where a single strap is coupled in the middle of the two ankle cuffs.

Figure 23:
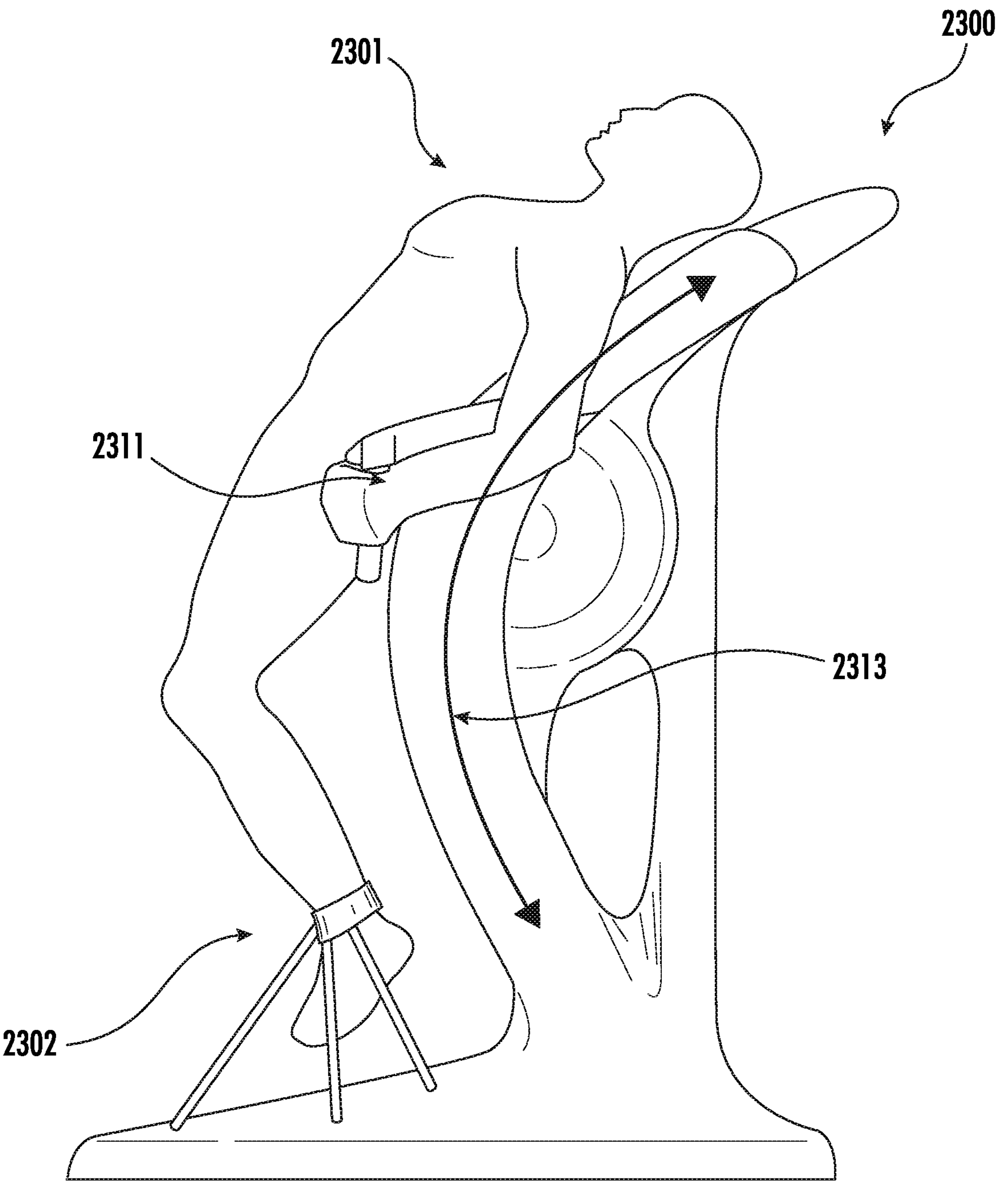
FIG. 23 depicts operation of a foot restraint for a fitness device, according to an embodiment of the invention.

FIG. 23 illustrates a fitness device 2300 on which a user 2301 is positioned. A table of the fitness device 2300 is tilted backwards, stretching the user 2301 as shown. The feet of the user 2301 are secured with foot restraint 2302, which enhances the stretch of the user 2301 as the table of the fitness device 2300 is rotated backwards. In the FIG. 23 embodiment, the foot restraint 2302 includes ankle cuffs affixed to a base assembly of the fitness device 2300 via multiple straps on the front and sides of the ankle cuffs. The fitness device 2300 includes hand grips 2311 facing downward (e.g., towards a base assembly of the fitness device 2300). The fitness device 2300 also includes a table which slides along a curved track 2313 that elevates and arches the user 2301 as illustrated.

Figure 24:
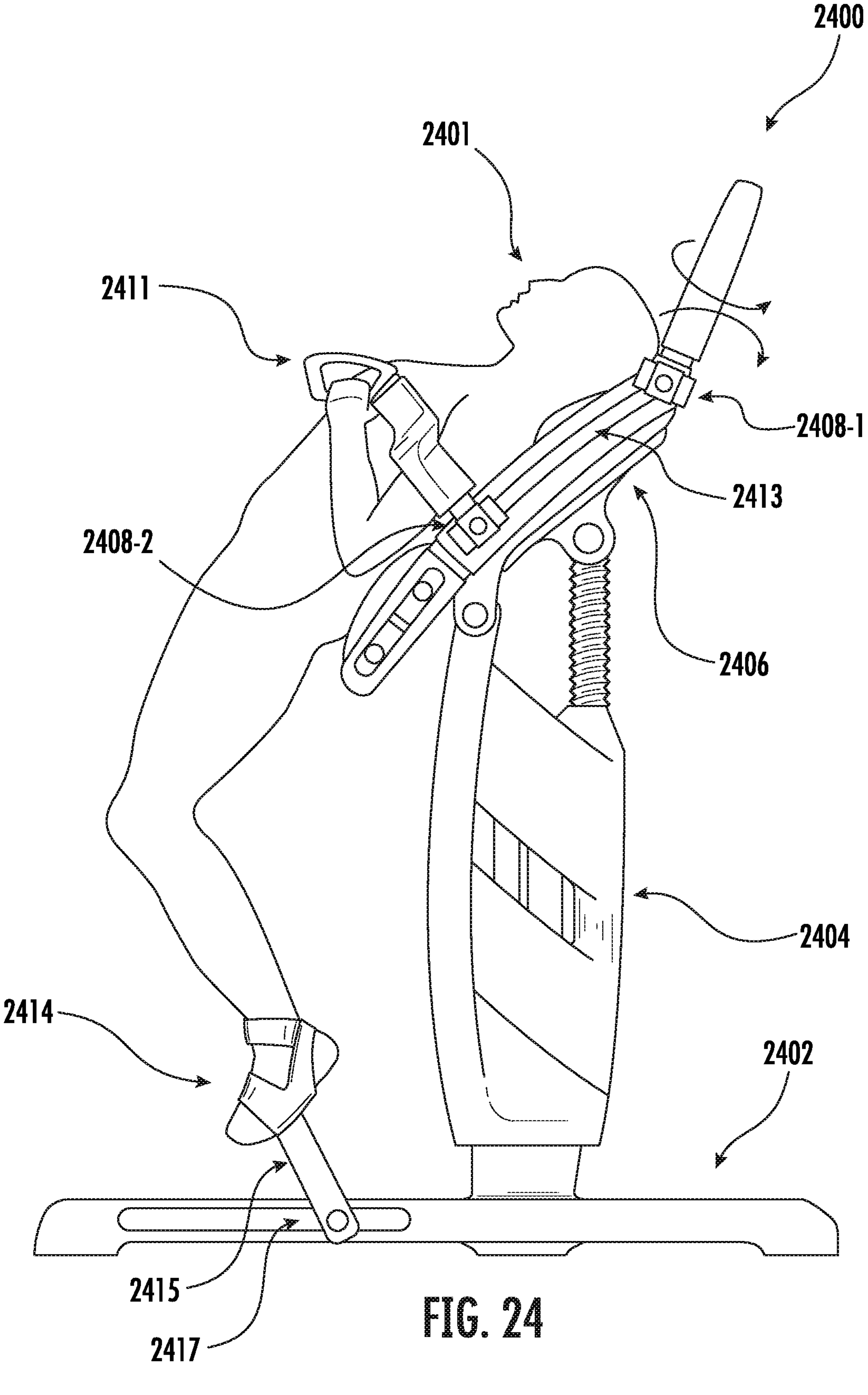
FIG. 24 depicts operation of a foot restraint for a fitness device, according to an embodiment of the invention.

FIG. 24 illustrates a fitness device 2400 on which a user 2401 is positioned. The fitness device 2400 includes a base assembly 2402, elevation assembly 2404 and a table 2406. The table 2406 of the fitness device 2400 is tilted backwards, stretching the user 2401 as shown. The fitness device 2400 also includes a two-piece restraint and overhead bar including overhead grip bar 2408-1 and underarm support bar 2408-2. It should be appreciated that the fitness device 2400 may include just one of the overhead grip bar 2408-1 and the underarm support bar 2408-2. For example, in some embodiments the overhead grip bar 2408-1 is not used, or is removably attached to the fitness device 2400 as an optional component. The underarm support bar 2408-2 may also be optional, and may be removably attached to the fitness device 2400.

The feet of the user 2401 are secured with foot restraint 2414, which enhances the stretch of the user 2401 as the table 2406 of the fitness device 2400 is rotated backwards. In the FIG. 24 embodiment, the foot restraint 2414 includes boot straps secured around the ankle, heel and foot of the user 2401 that are coupled to the base assembly 2402 of the fitness device 2400 via straps 2415. The straps 2415 are configured for translation movement along a track system 2417 in the base assembly 2402 as shown. In some embodiments, the straps 2415 are elastic members. In other embodiments, the straps 2415 are rigid elements. In other embodiments, the track 2417 is configured to give a determined amount of resistance as the connection to the straps 2415.

The fitness device 2400 includes underarm supports 2408-2 with hand grips 2411, where the underarm supports 2408-2 are configured to adjust for user height along a track 2413 within the table 2406 as illustrated. The overhead bar 2408-1 of the fitness device 2400 is also positioned along the track 2413, such that the overhead bar can be adjusted to suit a size of the user 2401 and desired stretch or other exercise type. The overhead bar 2408-1 of the fitness device 2400 may also rotate to accommodate size of the user 2401 and desired stretch or other exercise type.

Figure 25:
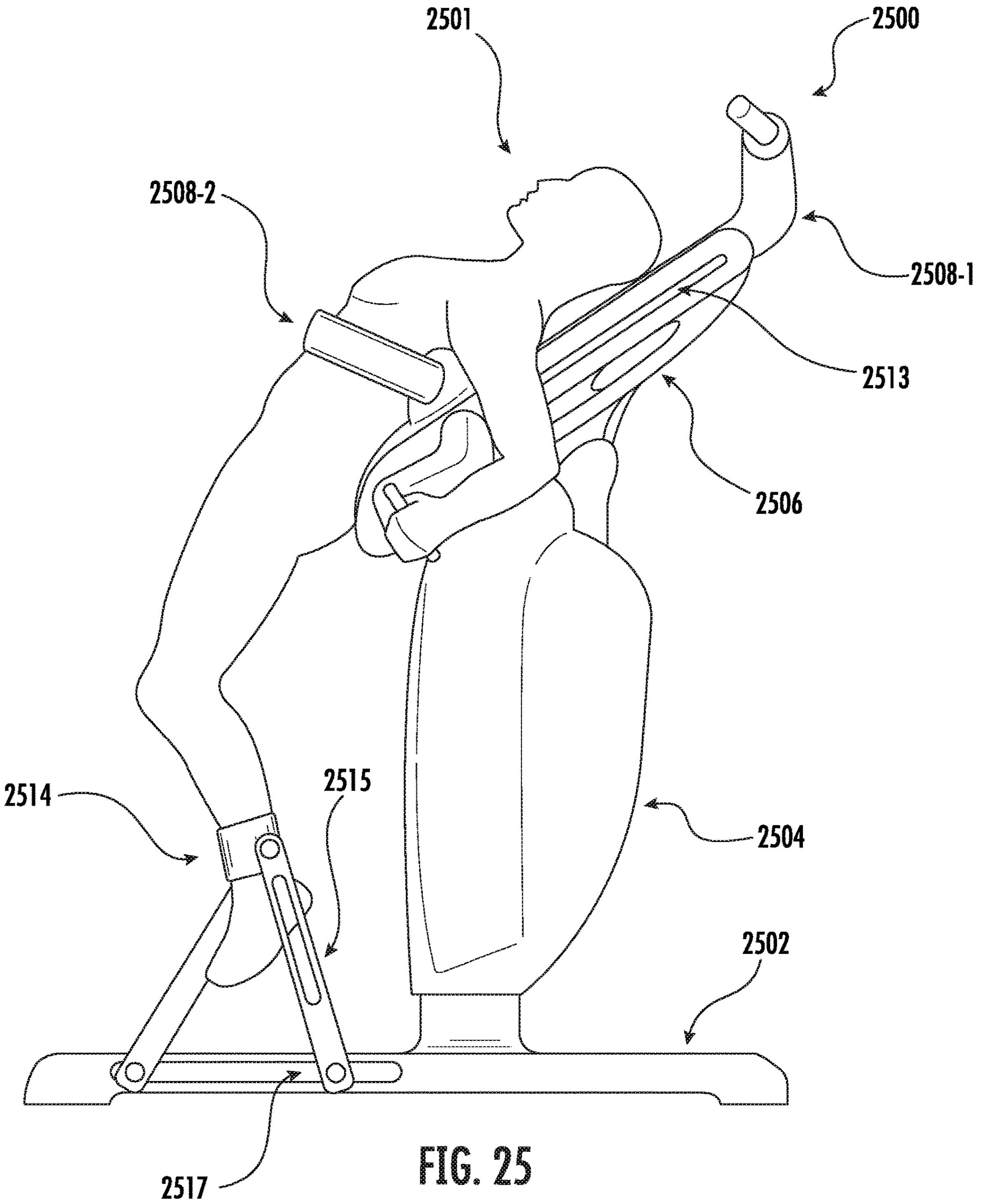
FIG. 25 depicts operation of a foot restraint for a fitness device, according to an embodiment of the invention.

FIG. 25 illustrates a fitness device 2500 on which a user 2501 is positioned. The fitness device 2500 includes a base assembly 2502, elevation assembly 2504 and a table 2506. The table 2506 of the fitness device 2500 is tilted backwards, stretching the user 2501 as shown. The fitness device 2500 also includes a two-piece restraint and overhead bar including overhead grip bar 2508-1 and belt support 2508-2. It should be appreciated that the fitness device 2500 may include just one of the overhead grip bar 2508-1 and the belt support 2508-2. For example, in some embodiments the overhead grip bar 2508-1 is not used, or is removably attached to the fitness device 2500 as an optional component. The belt support 2508-2 may also be optional, and may be removably attached to the fitness device 2500.

The feet of the user 2501 are secured with foot restraint 2514, which enhances the stretch of the user 2501 as the table 2506 of the fitness device 2500 is rotated backwards. In the FIG. 25 embodiment, the foot restraint 2514 includes ankle cuffs that are coupled to a base assembly of the fitness device 2500 via straps 2515 at the sides thereof. The straps 2515 are configured for translation movement along a track system 2517 in the base assembly 2502 as shown. The track system 2517 also accommodates translational motion during stretch or other exercise, such as lateral stretching when the use 2501 is positioned laterally with respect to the fitness device 2500. The compliance of the straps 2515 may be adjusted (e.g., from very stiff to very compliant) through modification of the type or number of straps 2515 used in parallel or in series. For example, additional straps 2515 may be added in parallel to increase stiffness, and straps 2515 may be removed to increase compliance. Alternatively or additionally, straps 2515 may be connected and removed in series with one another to control stiffness and compliance. In other embodiments, straps 2515 are not used in parallel but instead a single strap 2515 is used. The single strap 2515 may be swapped out as desired (e.g., to use a more compliant or a stiffer single strap). The straps 2515 may be allowed to slide freely within the track system 2517 of the base assembly 2502 during stretch or other exercise of the user 2501. Alternatively, the straps 2515 may be fixed at a particular point (or within some defined range of the track system 2517) for a particular stretch or other exercise of the user 2501. One or more of the straps 2515 (as well as other straps described herein) may be implemented as elastic bands, bungees, sets of springs, etc.

Similar to the fitness device 2400, the overhead bar support 2508-1 and the belt support 2508-2 of the fitness device 2500 are mounted in a track 2513 of the table 2506, permitting adjustment for user size and type of stretch or other exercise. In the fitness device 2500, the underarm supports are embodied as the belt support 2508-2 that holds the user 2502 in place. The overhead bar 2508-1 may include two distinct (left and right) portions that are mirror images of one another. The two portions of the overhead bar 2508-1 may, but are not required to be, connected to one another in the center.

Figure 26:
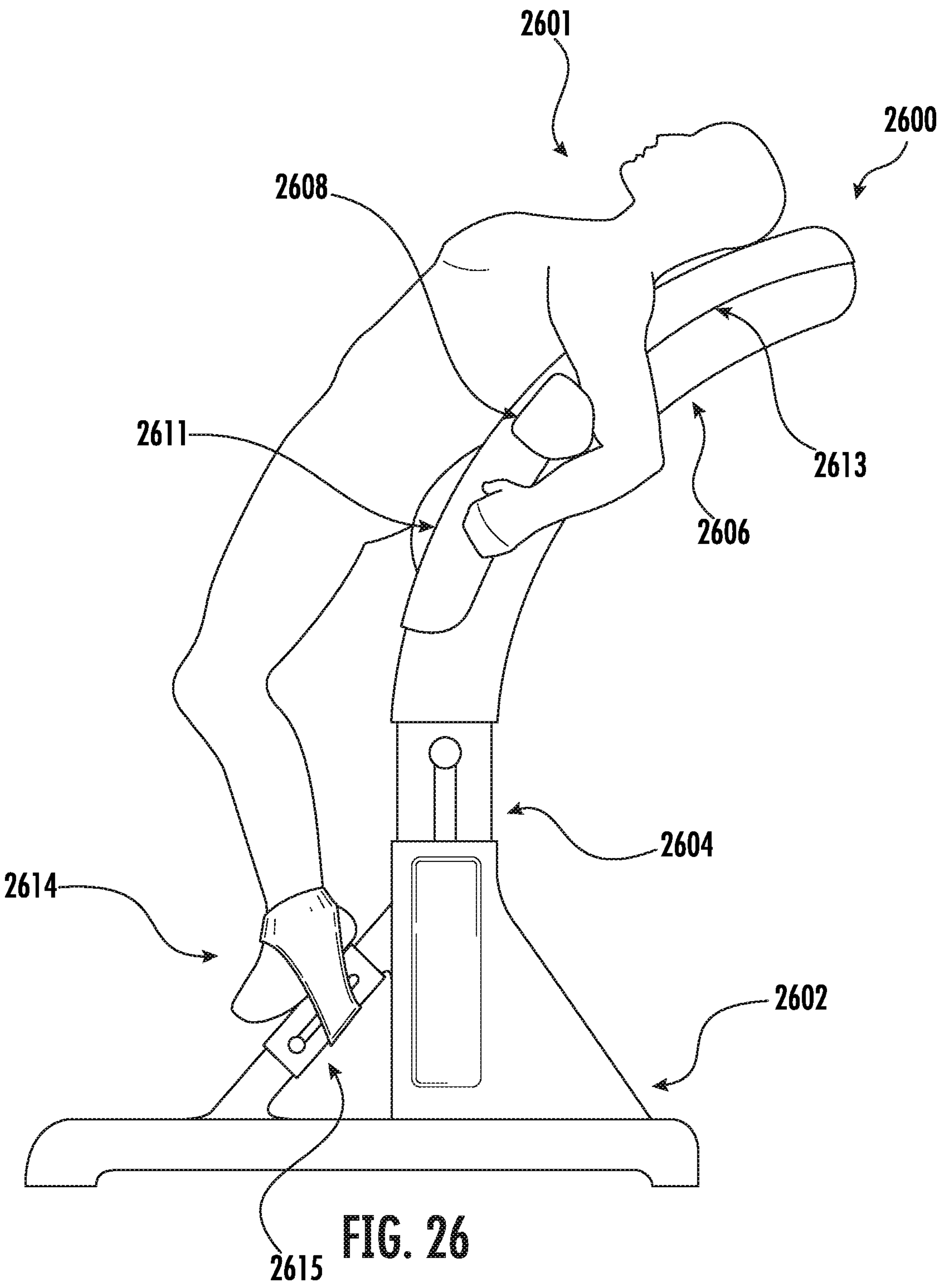
FIG. 26 depicts operation of a foot restraint for a fitness device, according to an embodiment of the invention.

FIG. 26 illustrates a fitness device 2600 on which a user 2601 is positioned. The fitness device 2600 includes a base assembly 2602, elevation assembly 2604 and a table 2606. The table 2606 of the fitness device 2600 is tilted backwards, stretching the user 2601 as shown. The fitness device 2600 is shown including only an underarm support 2608, which is configured to slide along track 2613 within the table 2606 to adjust for user size and comfort. Although not shown, the fitness device 2600 may also be equipped with an optional overhead bar support as described elsewhere herein. The feet of the user 2601 are secured with foot restraint 2614, which enhances the stretch of the user 2601 as the table 2606 of the fitness device 2600 is rotated backwards. In the FIG. 26 embodiment, the foot restraint 2614 includes a bungie strap that goes over tops of the feet of the user 2601 such that bottoms of the feet of the feet rest on a pedestal base 2615 that is raised and lowered to adjust its angle relative to the floor. The user 2601 positions hands on hand grips 2611 as shown.

Figure 27:
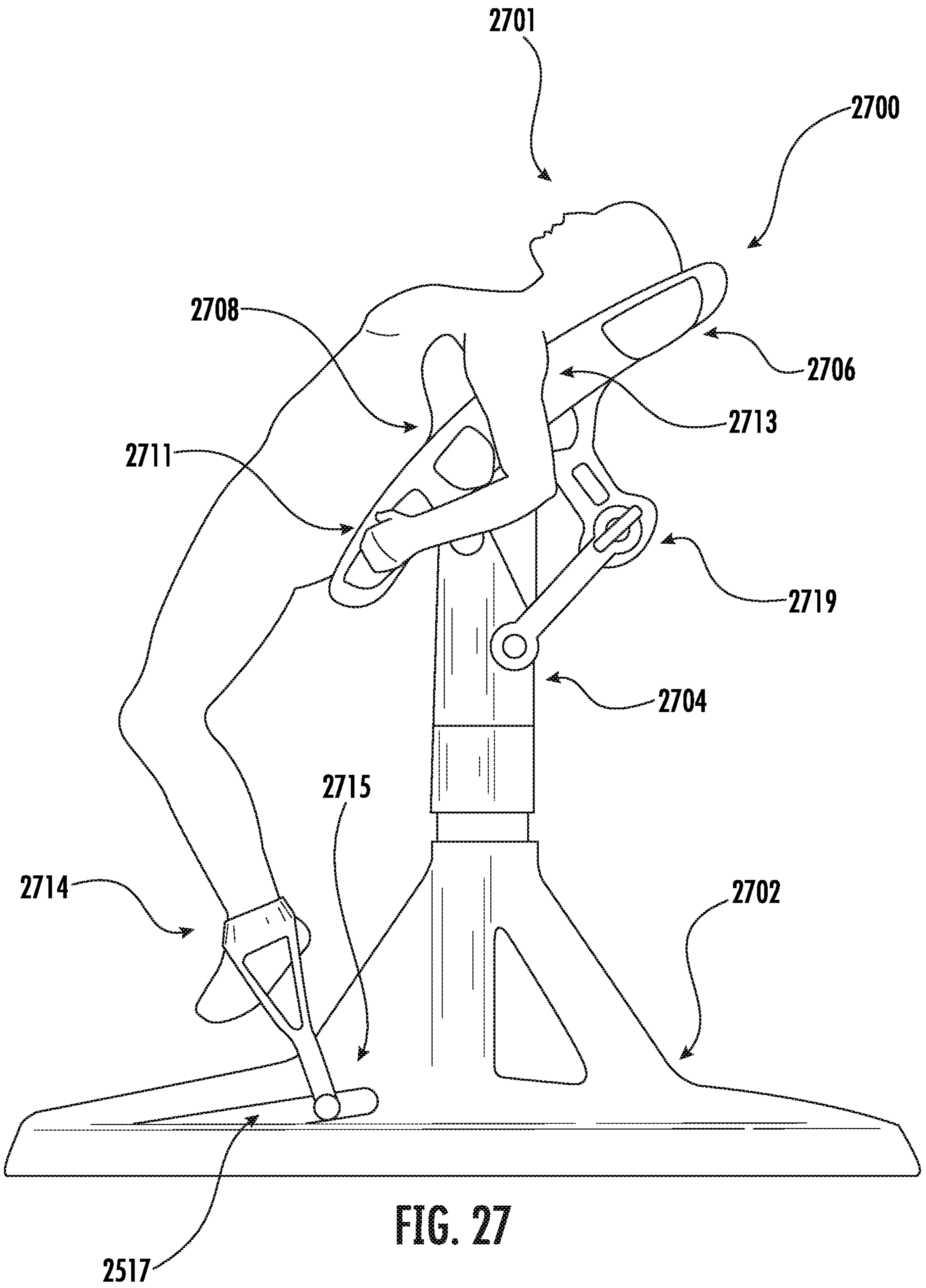
FIG. 27 depicts operation of a foot restraint for a fitness device, according to an embodiment of the invention.

FIG. 27 illustrates a fitness device 2700 on which a user 2701 is positioned. The fitness device 2700 includes a base assembly 2702, elevation assembly 2704 and a table 2706. The table 2706 of the fitness device 2700 is tilted backwards, stretching the user 2701 as shown. The fitness device 2700 is shown including only an underarm support 2708, which is configured to slide along track 2713 within the table 2706 to adjust for user size and comfort. Although not shown, the fitness device 2700 may also be equipped with an optional overhead bar support as described elsewhere herein. A link mechanism 2719 of the elevation assembly 2704 provides rotation of the table 2706. The link mechanism 2719 is coupled to actuators in the elevation assembly 2705 to control tilt of the table 2706. The user 2701 positions hands on hand grips 2711 as shown.

The feet of the user 2701 are secured with foot restraint 2714, which enhances the stretch of the user 2701 as the table 2706 of the fitness device 2700 is rotated backwards. In the FIG. 27 embodiment, the foot restraint 2714 includes ankle cuffs that are secured to the base assembly 2702 of the fitness device 2700 via bungie straps 2715. The straps 2715 are configured for translation movement along a track system 2717 in the base assembly 2702. The compliance of the straps 2715 may be adjusted (e.g., from very stiff to very compliant) through modification of the type or number of straps 2715 used in parallel. For example, additional straps 2715 may be added in parallel to increase stiffness, and straps 2715 may be removed to increase compliance. In other embodiments, straps 2715 are not used in parallel but instead a single strap 2715 is used. The single strap 2715 may be swapped out as desired (e.g., to use a more compliant or a stiffer single strap). The straps 2715 may be allowed to slide freely within the track system 2717 of the base assembly 2702 during stretch or other exercise of the user 2701. Alternatively, the straps 2715 may be fixed at a particular point (or within some defined range of the track system 2717) for a particular stretch or other exercise of the user 2701.

Figure 28A:
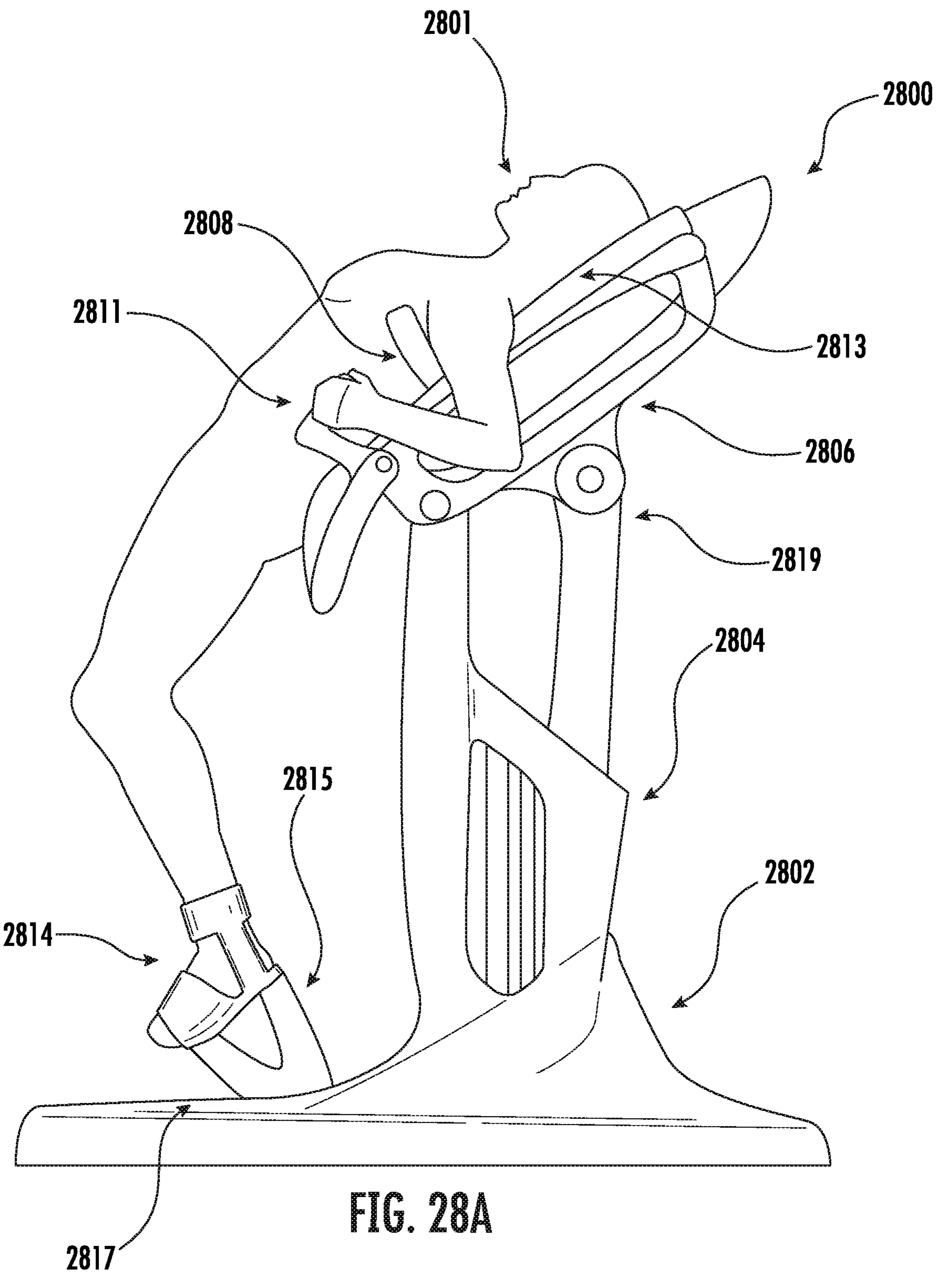
FIGS. 28A-28C depict operation of a foot restraint for a fitness device, according to an embodiment of the invention.
Figure 28C:
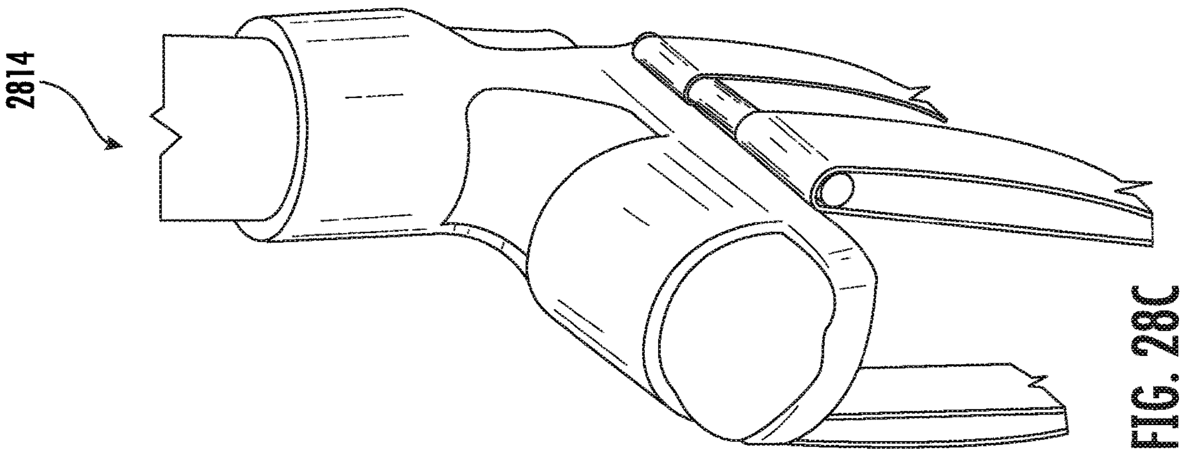
Figure 28B:
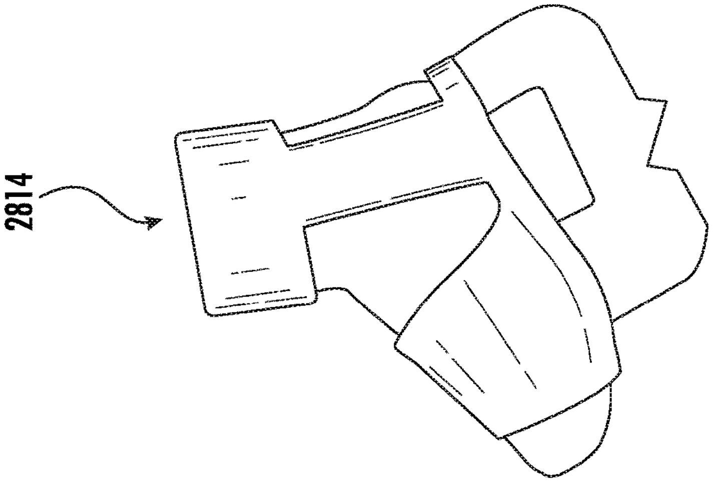

FIGS. 28A-28C illustrate a fitness device 2800 on which a user 2801 is positioned. The fitness device 2800 includes a base assembly 2802, elevation assembly 2804 and a table 2806. The table 2806 of the fitness device 2800 is tilted backwards, stretching the user 2801 as shown. The fitness device 2800 is shown including only an underarm support 2808, which is configured to slide along track 2813 within the table 2806 to adjust for user size and comfort. Although not shown, the fitness device 2800 may also be equipped with an optional overhead bar support as described elsewhere herein. A tilt actuator 2819 of the elevation assembly 2804 provides control of a tilt or rotation of the table 2806. The user 2801 positions hands on hand grips 2811 as shown for support.

The feet of the user 2801 are secured with foot restraint 2814, which enhances the stretch of the user 2801 as the table 2806 of the fitness device 2800 is rotated backwards.

In the FIG. 28 embodiment, the foot restraint 2814 includes boots that are secured to the base assembly 2802 of the fitness device 2800 via bungie straps 2815. The straps 2815 are configured for translation movement along a track system 2817 in the base assembly 2802. The compliance of the straps 2815 may be adjusted (e.g., from very stiff to very compliant) through modification of the type or number of straps 2815 used in parallel. For example, additional straps 2815 may be added in parallel to increase stiffness, and straps 2815 may be removed to increase compliance. In other embodiments, straps 2815 are not used in parallel but instead a single strap 2815 is used. The single strap 2815 may be swapped out as desired (e.g., to use a more compliant or a stiffer single strap). The straps 2815 may be allowed to slide freely within the track system 2817 of the base assembly 2802 during stretch or other exercise of the user 2801. Alternatively, the straps 2815 may be fixed at a particular point (or within some defined range of the track system 2817) for a particular stretch or other exercise of the user 2801. FIGS. 28B and 28C show side and perspective views, respectively, of a boot of the foot restraint 2814.

FIGS. 29A-29J illustrate operation of a foot restraint 2904 for use in a fitness device, such as fitness device 100 described above. The foot restraint 2904, similar to foot restraint 504, includes a set of cushion parallel bars or bolsters for a user to insert their feet between for securing the user to a base assembly of a fitness device via a circular platform 2902 that is configured to rotate. In some embodiments, the platform 2902 is configured to act as a wobble board, where the wobble board may be passive or provide feedback to a controller that assesses the balance of the user.

Figure 29B:
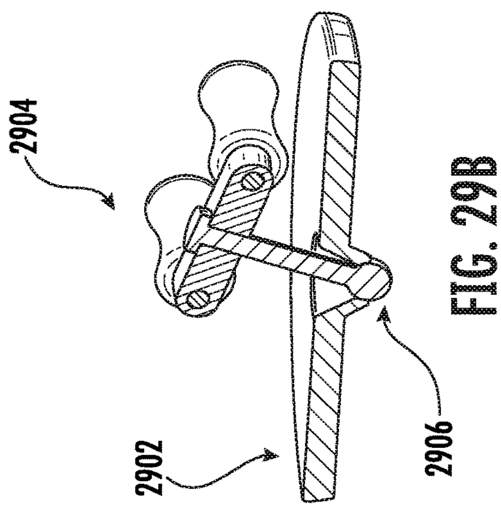
FIGS. 29A-29J depict operation of a foot restraint for a fitness device, according to an embodiment of the invention.
Figure 29D:
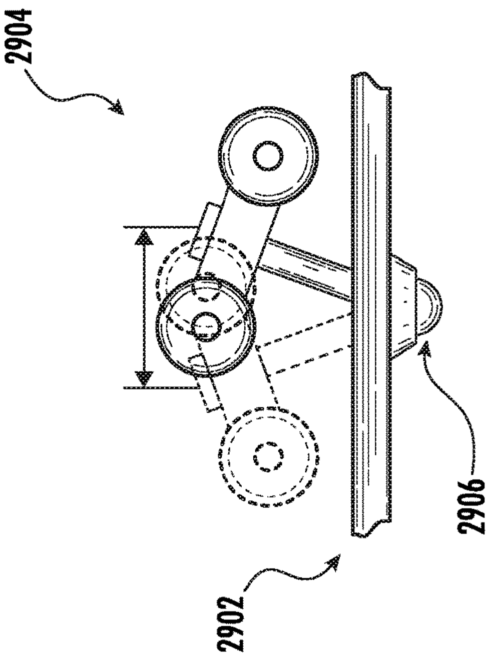
Figure 29A:
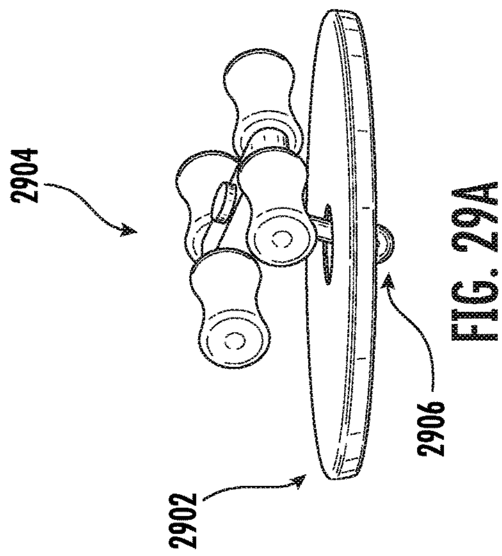
Figure 29C:
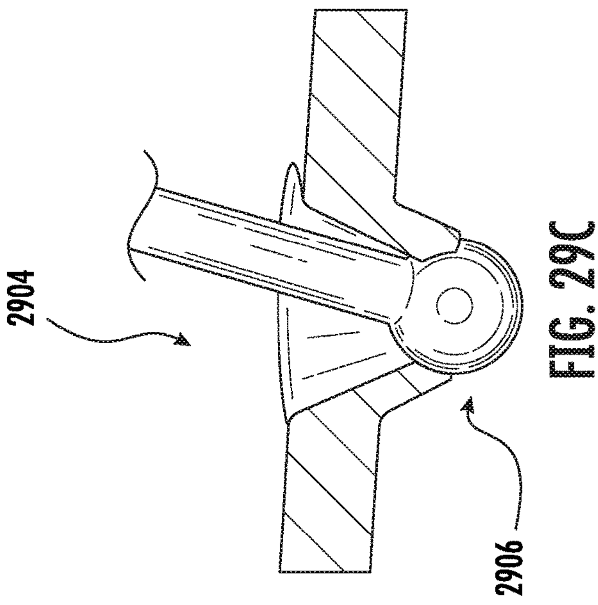
Figure 29E:
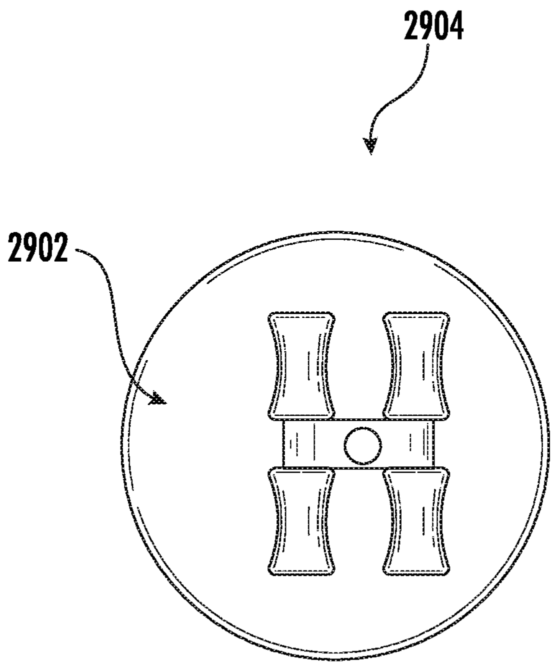
Figure 29F:
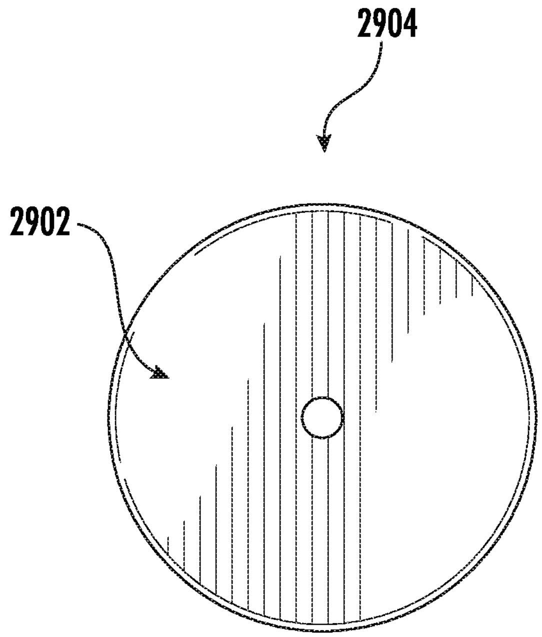
Figure 29H:
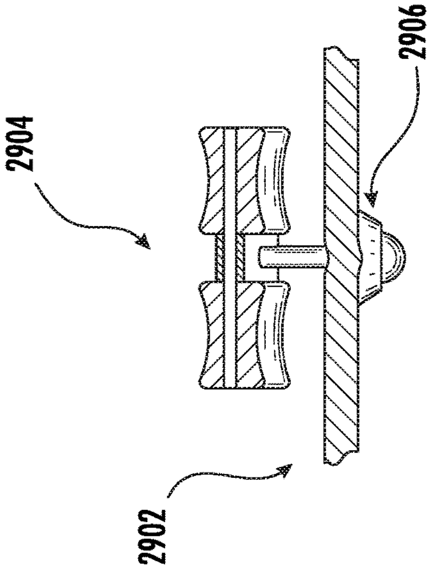
Figure 29J:
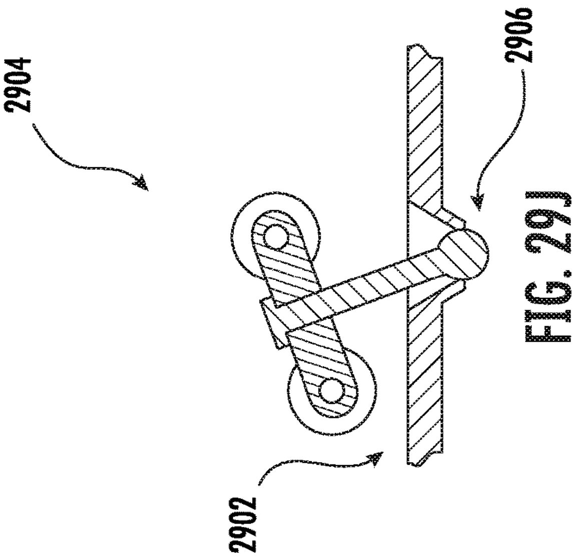
Figure 29G:
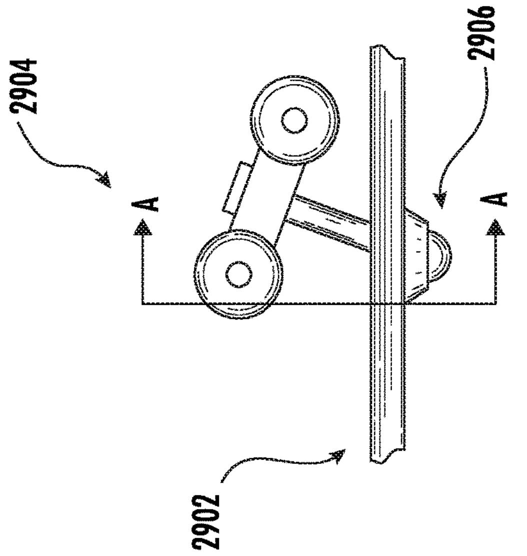
Figure 29I:
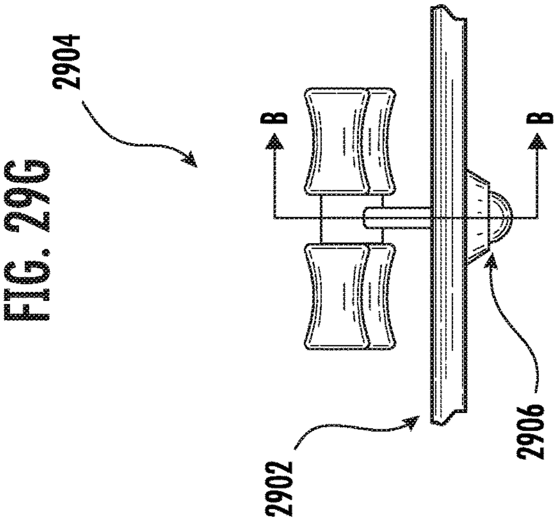

FIGS. 29A-29J further illustrate a round ball joint 2906 enabling rotation of the foot restraint 2904. The ball joint 2906 provides positioning flexibility for the foot restraint 2904. FIG. 29A shows a perspective view of the foot restraint 2904, while FIGS. 29B and 29C show cross-sectional views of the foot restraint 2904 illustrating aspects of the ball joint 2906. FIG. 29D depicts linear travel of the bolsters of the foot restraint 2904. FIG. 29E shows a top-down view of the foot restraint 2904, and FIG. 29F shows a bottom-up view of the foot restraint 2904. FIG. 29G shows a side view of the foot restraint 2904, and FIG. 29H shows a cross-sectional view of the foot restraint 2904 taken along the line A-A shown in FIG. 29G. FIG. 29I shows another side view of the foot restraint 2904, and FIG. 29J shows a cross-sectional view of the foot restraint 2904 taken along the line B-B shown in FIG. 29I.

FIGS. 30A-30H illustrate operation of a foot restraint 3004 for use in a fitness device, such as fitness device 100 described above. The foot restraint 3004 is similar to the foot restraint 2904, although the ball joint 3006 of the foot restraint 3004 is deeper than the ball joint 2906 of the foot restraint 2904, thus allowing increased linear travel of the bolsters of the foot restraint 3004 relative to the linear travel of the bolsters of the foot restraint 2904. The foot restraint 3004 includes a circular platform 3002 that is configured to rotate. In some embodiments, the platform 3002 is configured to act as a wobble board, where the wobble board may be passive or provide feedback to a controller that assesses the balance of the user. Although the platform 3002 is shown with a round shape in FIGS. 30A-30H, it should be appreciated that other shapes may be used for the platform 3002 in other embodiments.

Figure 30A:
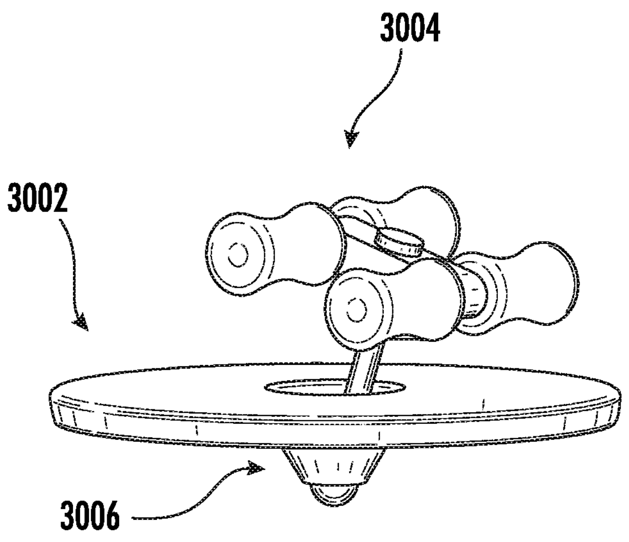
FIGS. 30A-30H depict operation of a foot restraint for a fitness device, according to an embodiment of the invention.
Figure 30B:
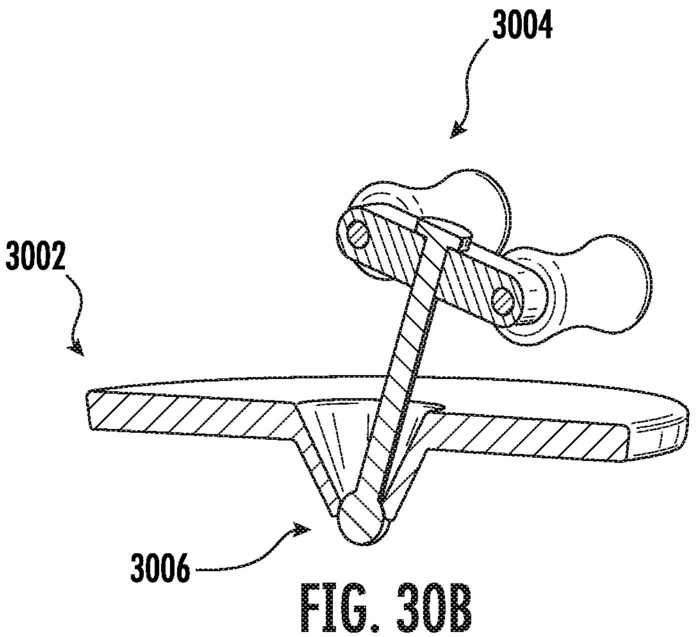
Figure 30C:
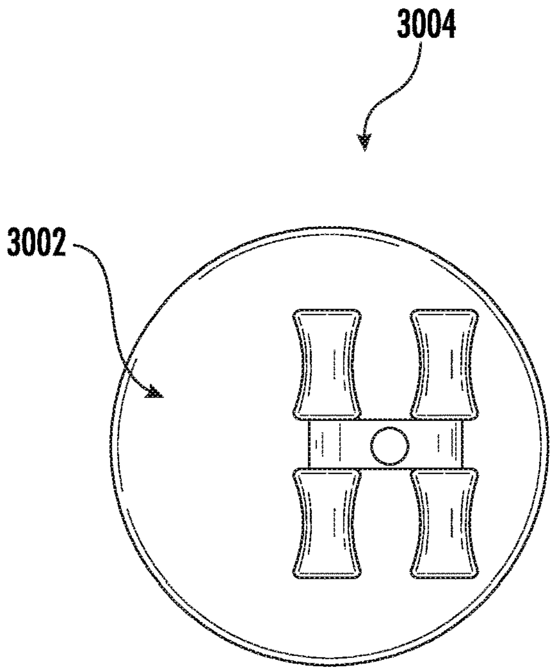
Figure 30D:
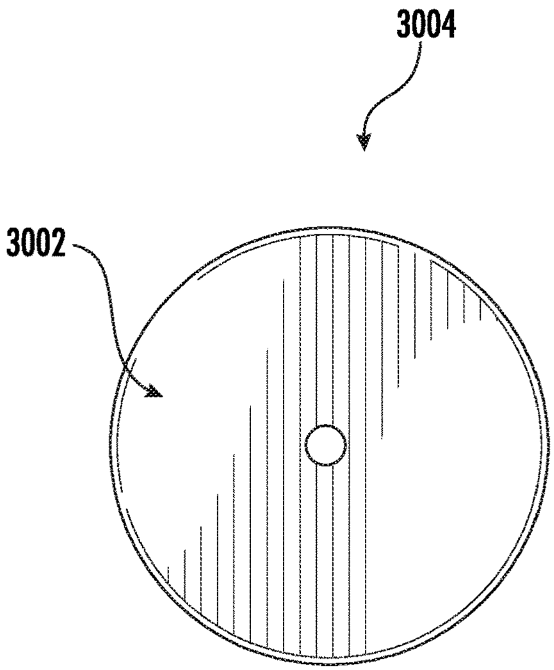
Figure 30E:
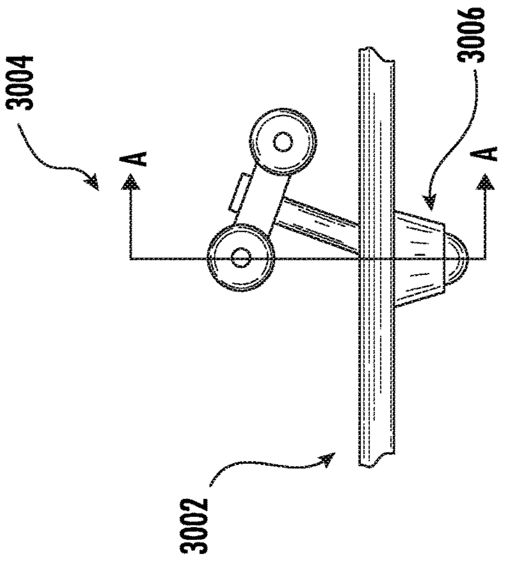
Figure 30F:
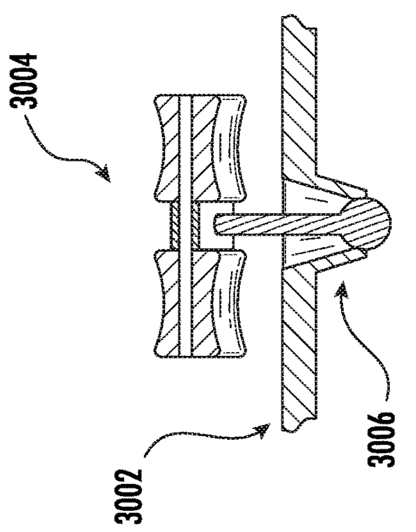
Figure 30G:
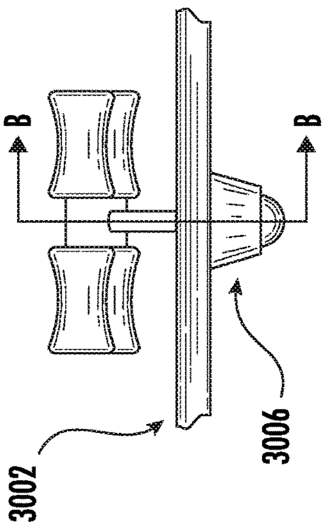
Figure 30H:
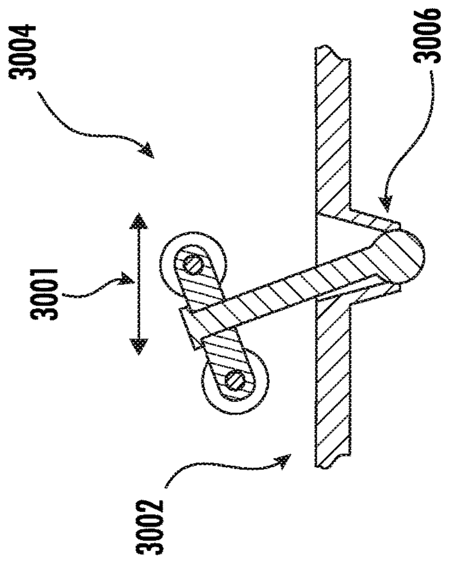

FIGS. 30A-30H further illustrate the deeper ball joint 3006 enabling rotation of the foot restraint 3004. FIG. 30A shows a perspective view of the foot restraint 3004, while FIG. 30B shows a cross-sectional view of the foot restraint 3004 illustrating aspects of the ball joint 3006. FIG. 30C shows a top-down view of the foot restraint 3004, and FIG. 30D shows a bottom-up view of the foot restraint 3004. FIG. 30E shows a side view of the foot restraint 3004, and FIG. 30F shows a cross-sectional view of the foot restraint 3004 taken along the line A-A shown in FIG. 30E. FIG. 30G shows another side view of the foot restraint 3004, and FIG. 30H shows a cross-sectional view of the foot restraint 3004 taken along the line B-B shown in FIG. 30G.

FIGS. 31A-31H illustrate operation of a foot restraint 3104 for use in a fitness device, such as fitness device 100 described above. The foot restraint 3104 is similar to the foot restraint 2904, although the platform 3102 of the foot restraint 3104 is oval rather than circular and includes an oblong slotted ball joint 3106 thus allowing increased linear travel of the bolsters of the foot restraint 3104 relative to the linear travel of the bolsters of the foot restraint 2904. The foot restraint 3104 includes the oval platform 3102 that is configured to rotate. In some embodiments, the platform 3102 is configured to act as a wobble board, where the wobble board may be passive or provide feedback to a controller that assesses the balance of the user.

Figure 31A:
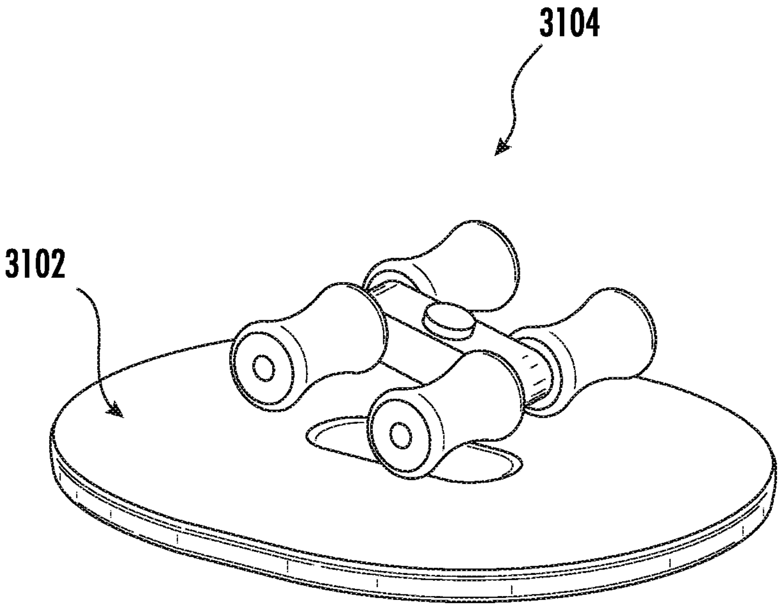
FIGS. 31A-31H depict operation of a foot restraint for a fitness device, according to an embodiment of the invention.
Figure 31B:
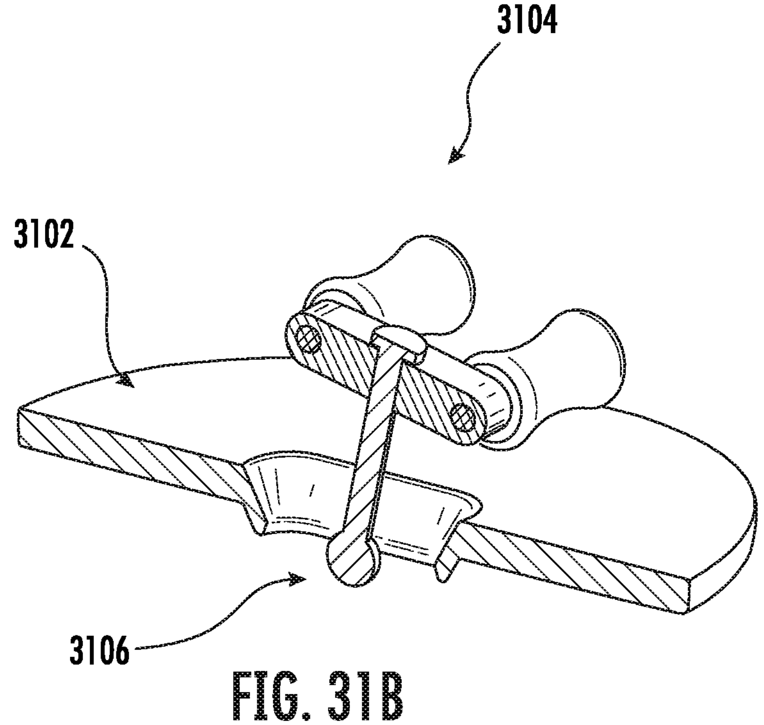
Figure 31C:
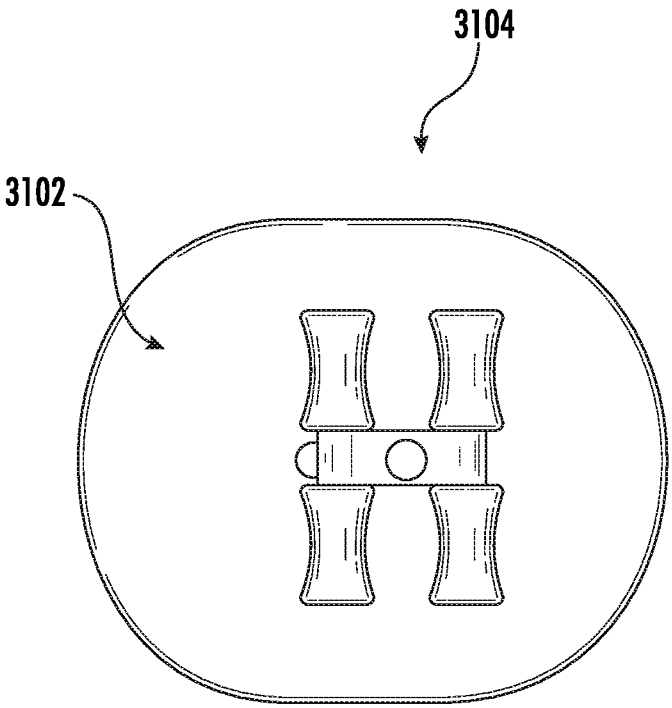
Figure 31D:
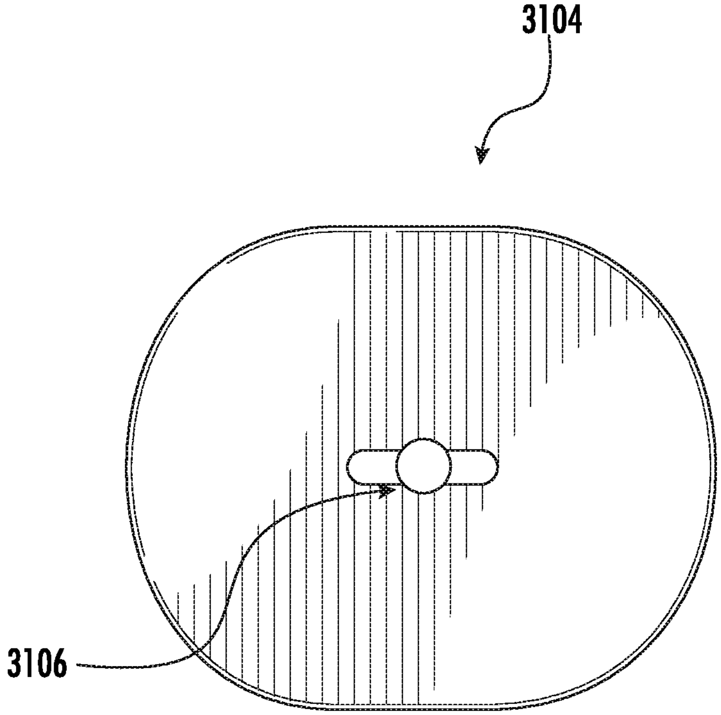
Figure 31E:
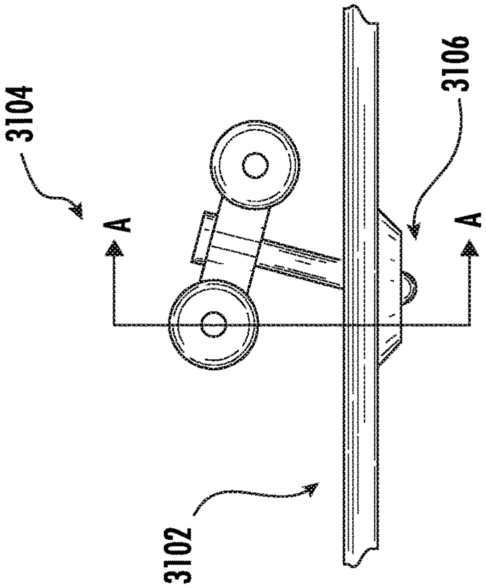
Figure 31F:
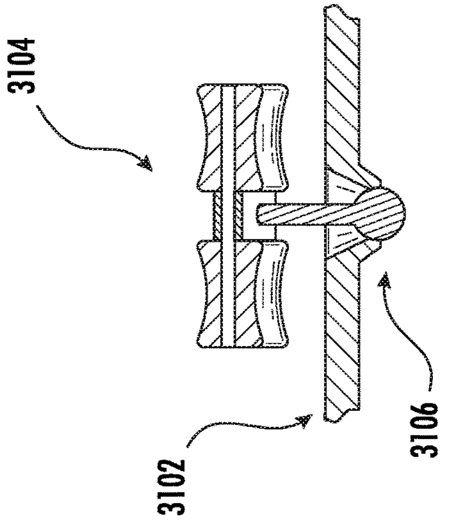
Figure 31G:
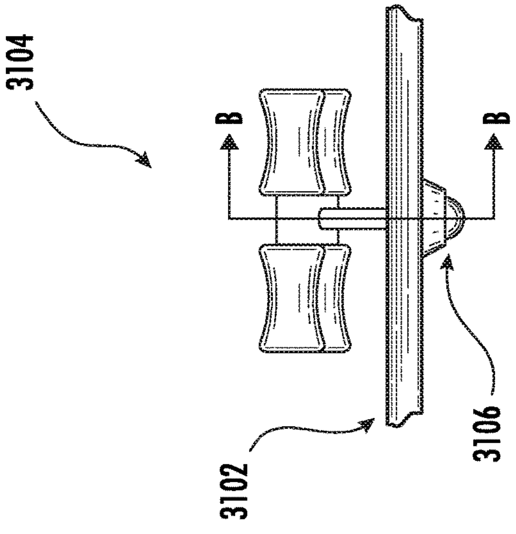
Figure 31H:
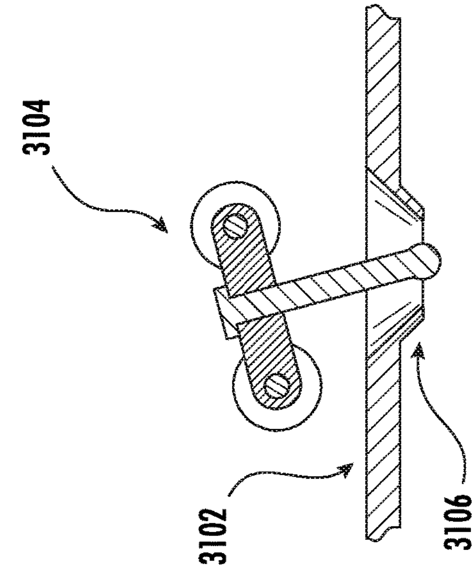

FIGS. 31A-31H further illustrate the oblong slotted ball joint 3106 enabling rotation of the foot restraint 3104. FIG. 31A shows a perspective view of the foot restraint 3104, while FIG. 31B shows a cross-sectional view of the foot restraint 3104 illustrating aspects of the ball joint 3106. FIG. 31C shows a top-down view of the foot restraint 3104, and FIG. 31D shows a bottom-up view of the foot restraint 3104. FIG. 31E shows a side view of the foot restraint 3104, and FIG. 31F shows a cross-sectional view of the foot restraint 3104 taken along the line A-A shown in FIG. 31E. FIG. 31G shows another side view of the foot restraint 3104, and FIG. 31H shows a cross-sectional view of the foot restraint 3104 taken along the line B-B shown in FIG. 31G.

Figure 32:
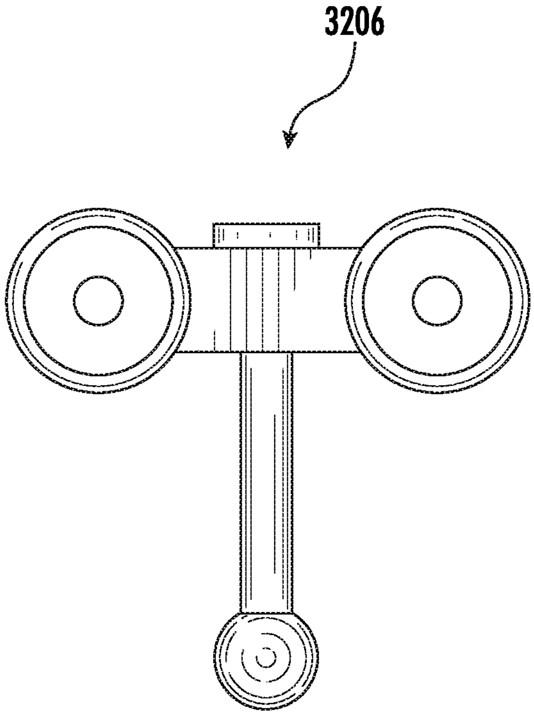
FIG. 32 depicts a ball joint in a foot restraint for a fitness device, according to an embodiment of the invention.
Figure 33:
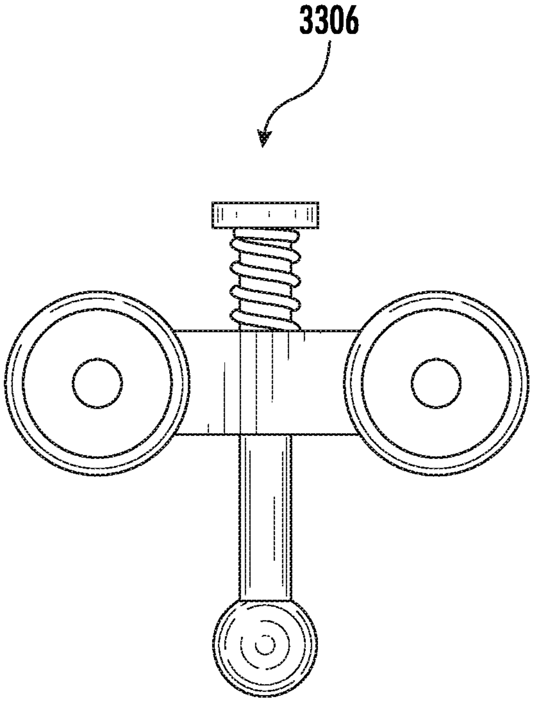
FIG. 33 depicts a ball joint in a foot restraint for a fitness device, according to an embodiment of the invention.
Figure 34C:
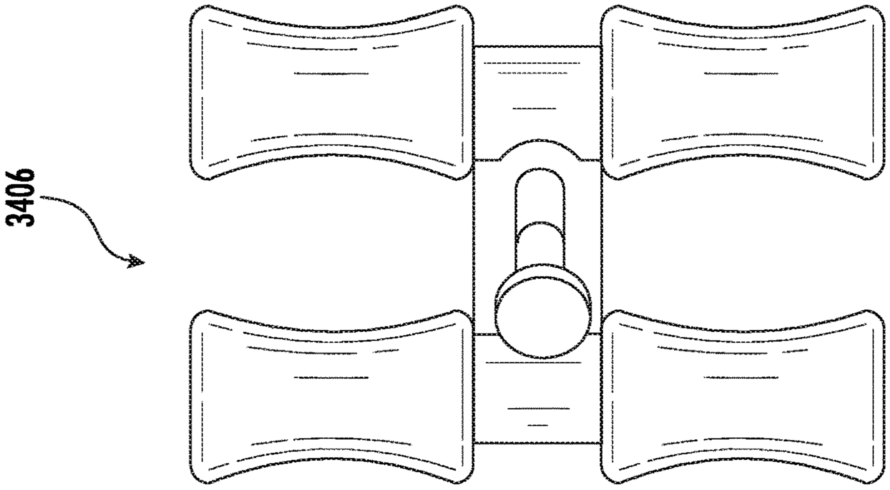
FIGS. 34A-34C depict a ball joint in a foot restraint for a fitness device, according to an embodiment of the invention.
Figure 34B:
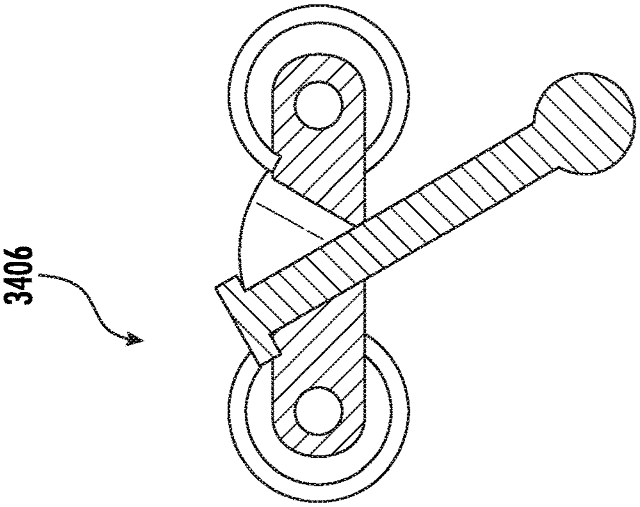
Figure 34A:
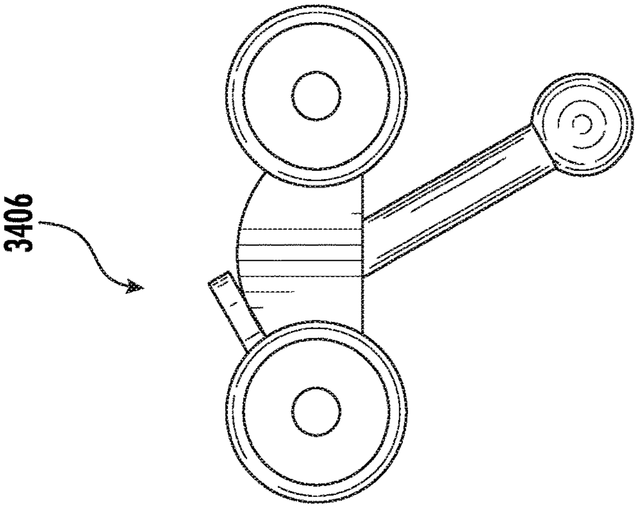

Ball joints may be connected to a foot restraint in various ways. FIG. 32 shows a ball joint 3206 configured for attachment to a foot restraint via a fixed shaft. FIG. 33 shows a ball joint 3306 configured for attachment to a foot restraint with translation along a shaft. Through translation along the shaft, the foot restraint is provided with resistance from an elastic element. FIGS. 34A-34C show a ball joint 3406 configured for attachment to a foot restraint via a slot with a cone shape at rounded ends, along the foot restraint to stay parallel to a platform of a base assembly of a fitness device during rotation. FIG. 34A shows a side view of the ball joint 3406, and FIG. 34B shows a cross-sectional side view of the ball joint 3406. FIG. 34C shows a bottom-up view of the ball joint 3406.

Figure 35B:
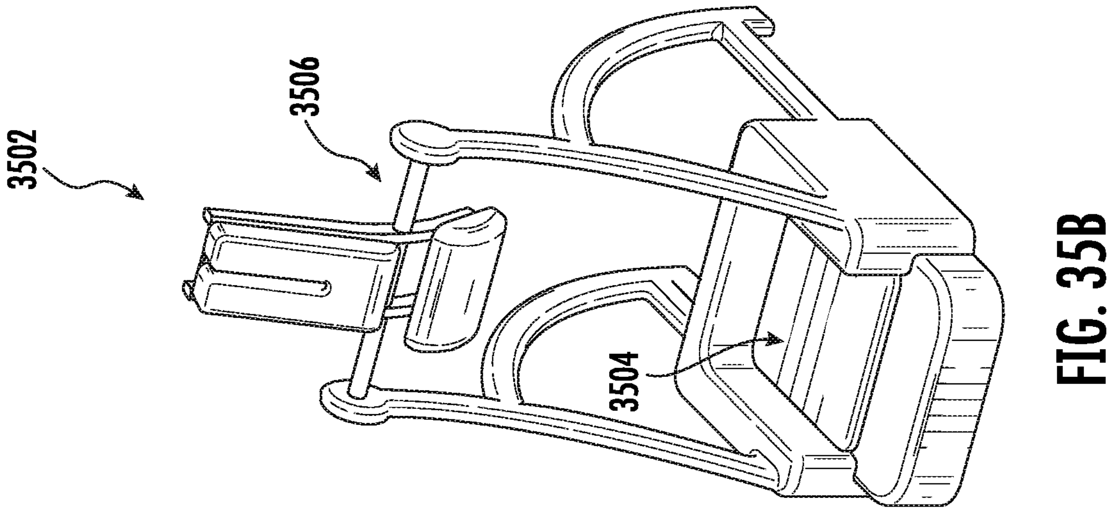
FIGS. 35A and 35B depict a movable platform for a fitness device, according to an embodiment of the invention.
Figure 35A:
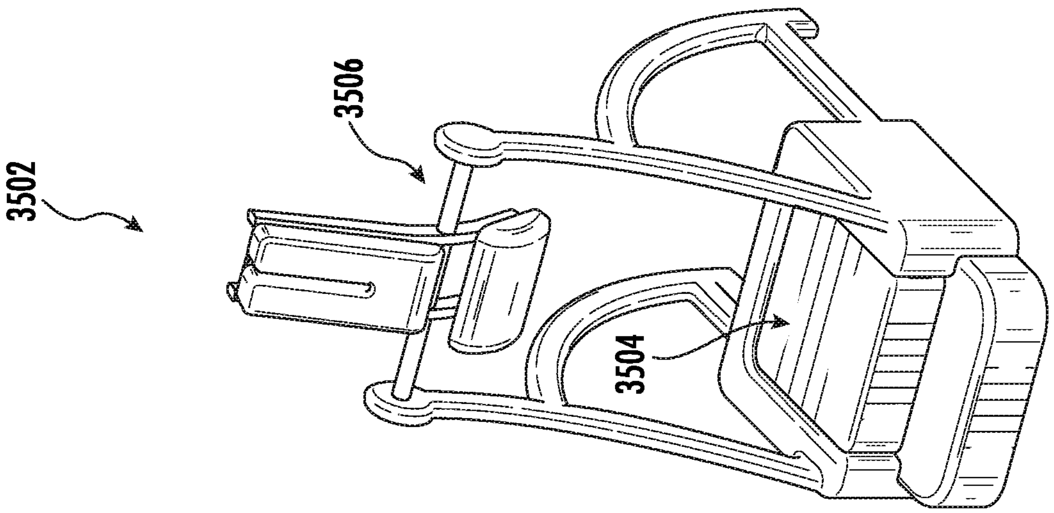

FIGS. 35A and 35B illustrate a movable platform 3504 that is part of a base assembly 3502 of a fitness device. The movable platform 3504 is configured to translate up and down, to pivot up and down, and to combination pivot and translate. The movable platform 3504, for example, may translate up and down to adjust for differing user height. The movable platform 3504 (and other platforms and foot restraints described herein) may be configured to be raised and lowered to provide stretching of the user with or without rotation of a table of a fitness device. Further, the movable platform 3504 (and other platforms and foot restraints described herein) may be configured to retract to provide stretching of the user with or without rotation of a table of a fitness device. The movable platform 3504, in some embodiments, is configured for use with a foot restraint as described herein. FIG. 35A depicts the movable platform 3504 raised up, while FIG. 35B depicts the movable platform 3504 in a lowered position. FIGS. 35A and 35B further depict table pivot point options for an upper bar 3506 of the base assembly 3502. The upper bar 3506 is configured in some embodiments to pivot only. In other embodiments, the upper bar 3506 is configured to pivot plus provide adjustment for differing user height.

Figure 36B:
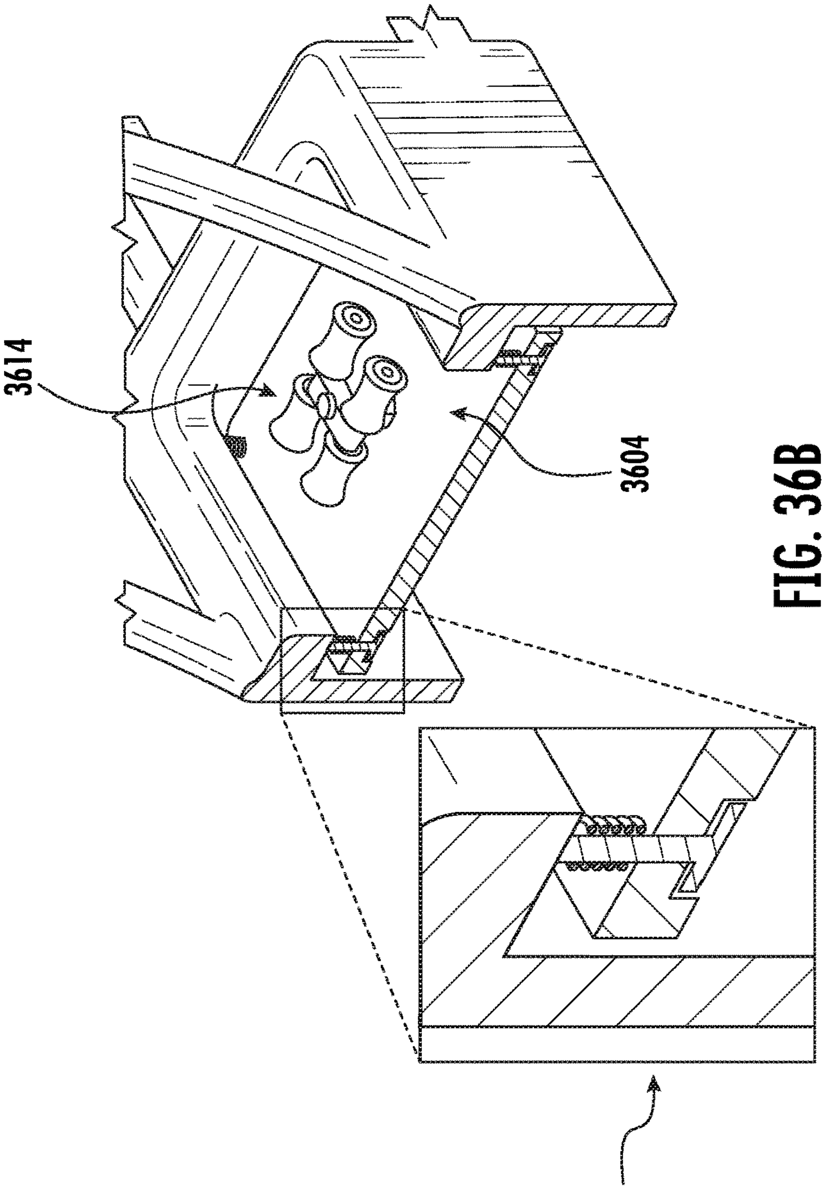
FIGS. 36A and 36B depict a movable platform for a fitness device, according to an embodiment of the invention.
Figure 36A:
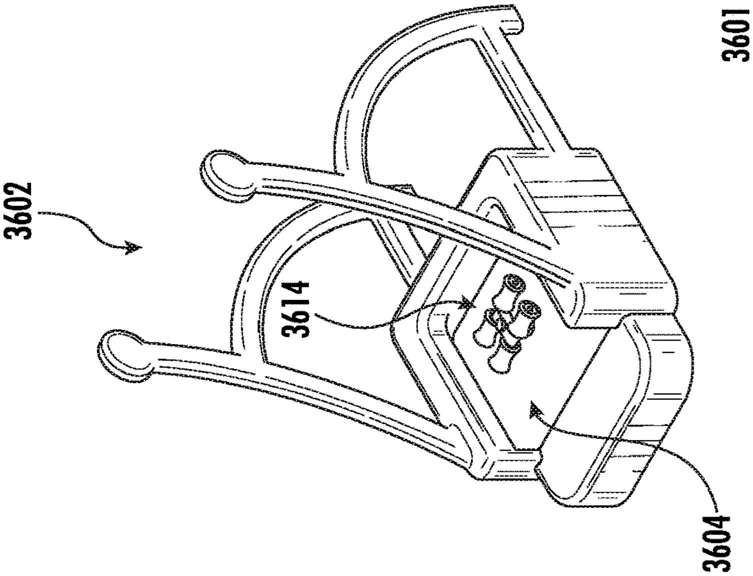

FIGS. 36A and 36B illustrate a resilient platform 3604 that is part of a base assembly 3602 of a fitness device. FIG. 36A shows the resilient platform 3604 spring loaded in a low position. FIG. 36B shows the resilient platform 3604 in a raised position, where the resilient platform 3604 lifts off the supports as the user is lifted, shown in the close-up view 3601. The resilient platform 3604 in FIGS. 36A and 36B is shown as including a foot restraint 3614, though this is not a requirement.

Figure 37A:
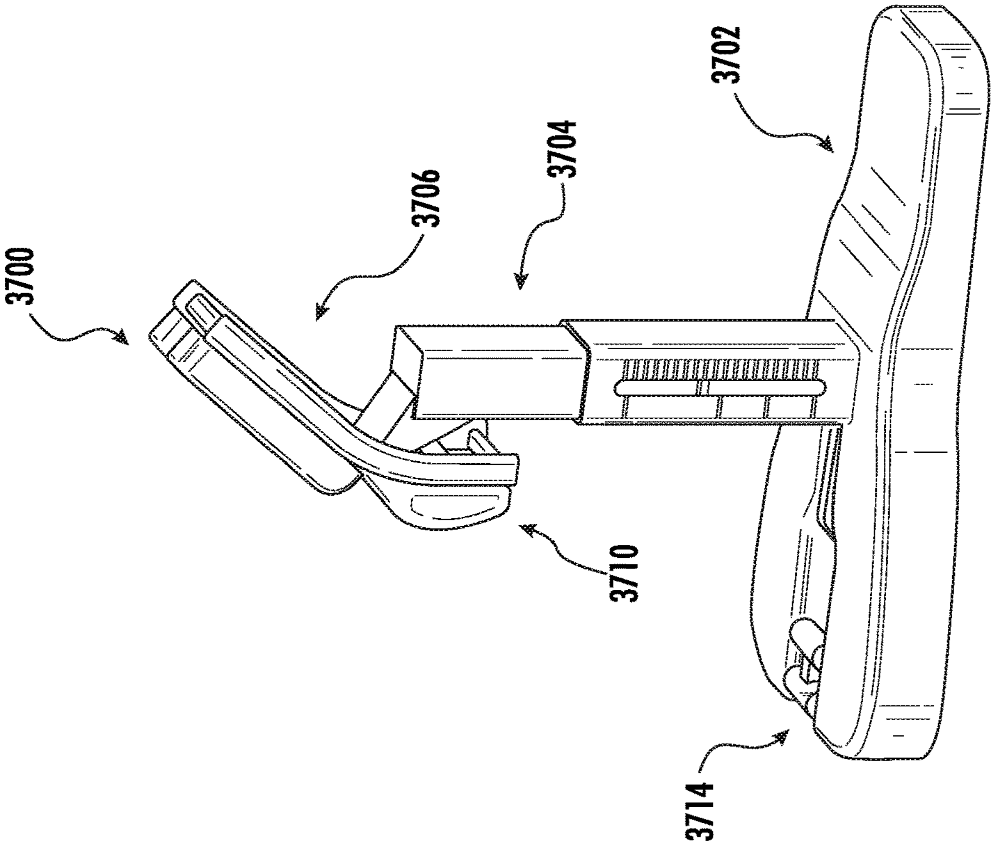
FIGS. 37A-37D depict operation of a foot restraint for a fitness device, according to an embodiment of the invention.
Figure 37B:
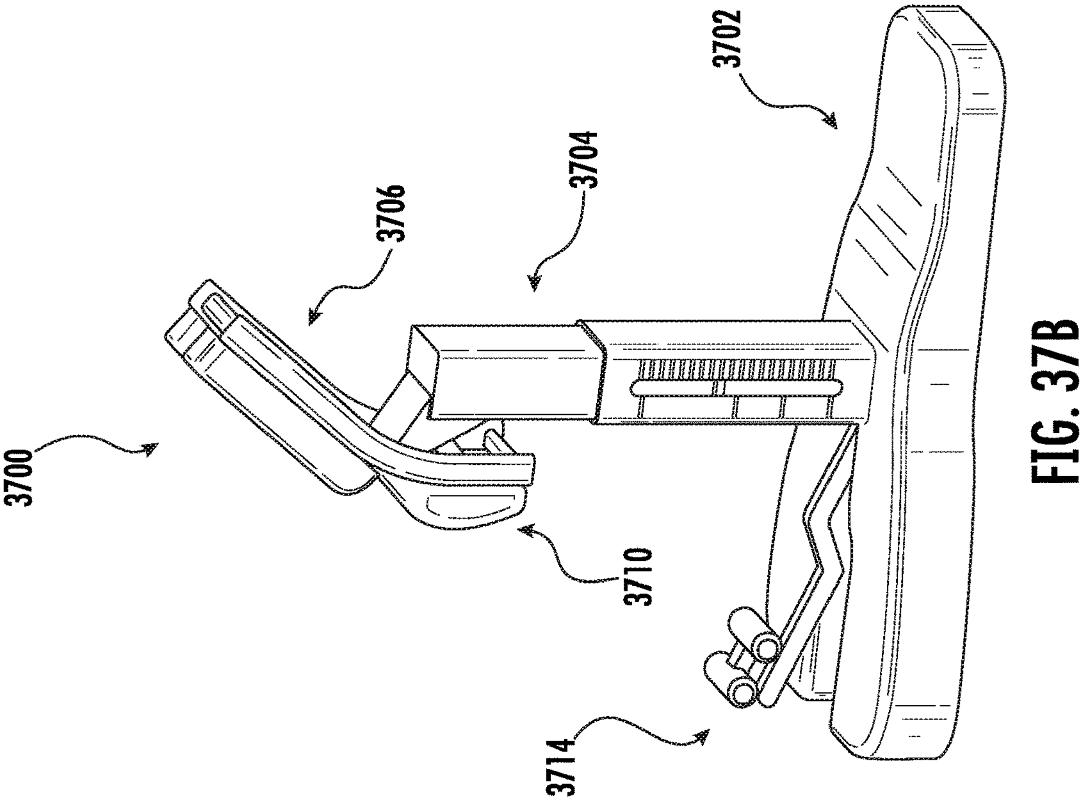
Figure 37C:
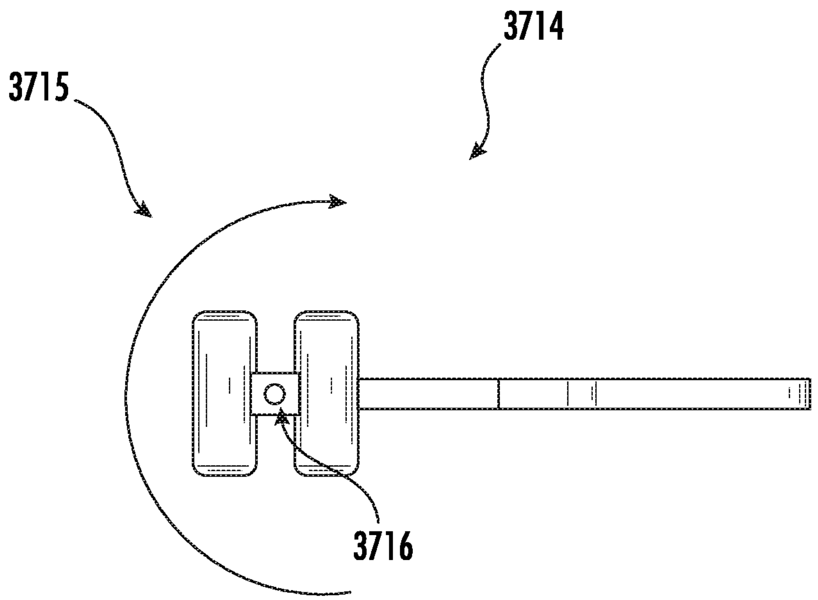
Figure 37D:
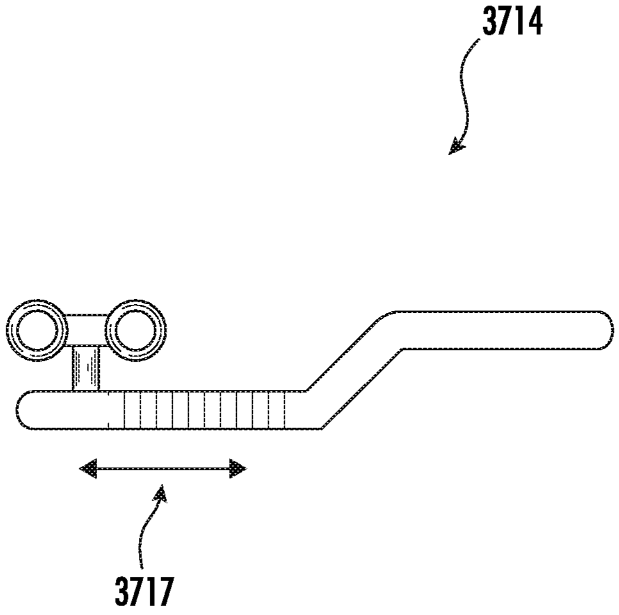

FIGS. 37A-37D illustrate a fitness device 3700 configured with a recessed pivoting foot restraint 3714. The fitness device 3700, as shown, includes a base assembly 3702, an elevation assembly 3704, a table 3706 and a cushion assembly 3710. The recessed pivoting foot restraint 3714 is shown retracted in FIG. 37A, and is shown extended in FIG. 37B. The foot restraint 3714 has a connecting link that pivots and provides resistance. FIG. 37C shows the foot restraint 3714 pivoting 3715 about a pivot axis 3716. FIG. 37D shows translation 3717 of the foot restraint 3714 along the connecting link. It should be noted that the foot restraint in other embodiments described herein may be configured to be retracted into a recess (e.g., of a base assembly of a fitness device, of a platform configured for attachment to a base assembly of a fitness device, etc.).

Figure 38A:
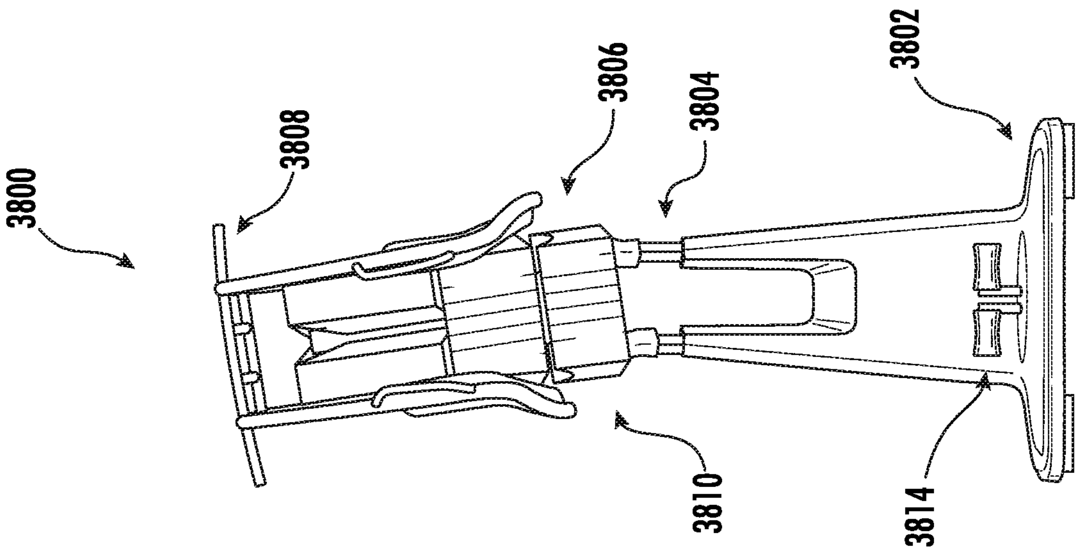
FIGS. 38A and 38B depict operation of an elevation assembly for a fitness device, according to an embodiment of the invention.
Figure 38B:
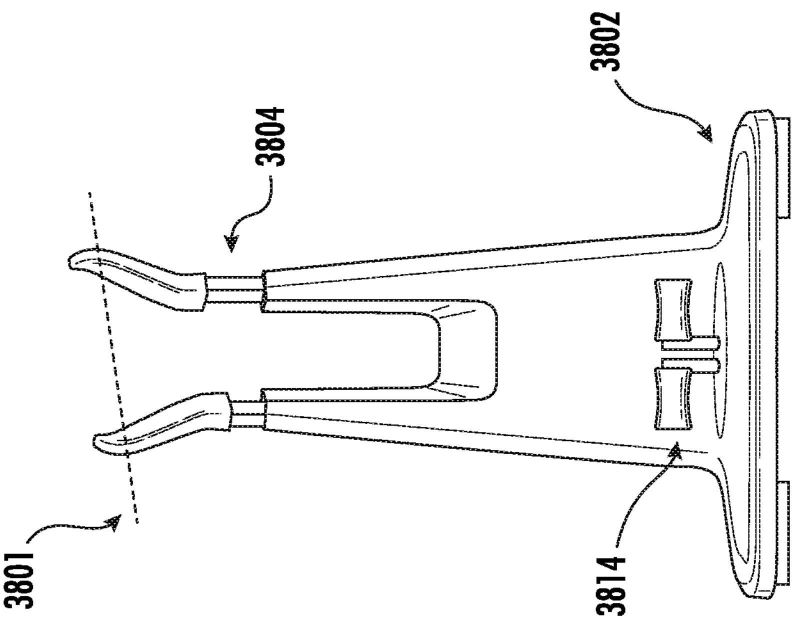

FIGS. 38A and 38B illustrate operation of a fitness device 3800. The fitness device 3800 includes a base assembly 3802, an elevation assembly 3804, a table 3806, an overhead bar and underarm restraint 3808, and a cushion assembly 3810. The fitness device 3800 also includes a foot restraint 3814 coupled to the base assembly 3802. As shown in FIG. 38A, the elevation assembly 3804 of the fitness device 3800 enables lateral flexion produced by tilting the table 3806 about the z-axis. The fitness device 3800, as well as other fitness devices described herein, may include a pivot point for rotation about the craniocaudal (y) axis for manual exercise as well as enhancing the effects of rotational stretching, stretching in flexion (facing forwards), extension (facing backwards), and lateral flexion (facing sideways) in combination with rotation of the human back and torso. FIG. 38B shows the angle 3801 produced by raising and lowering elevation posts of the elevation assembly 3804 to different heights to provide the lateral flexion.

Figure 39:
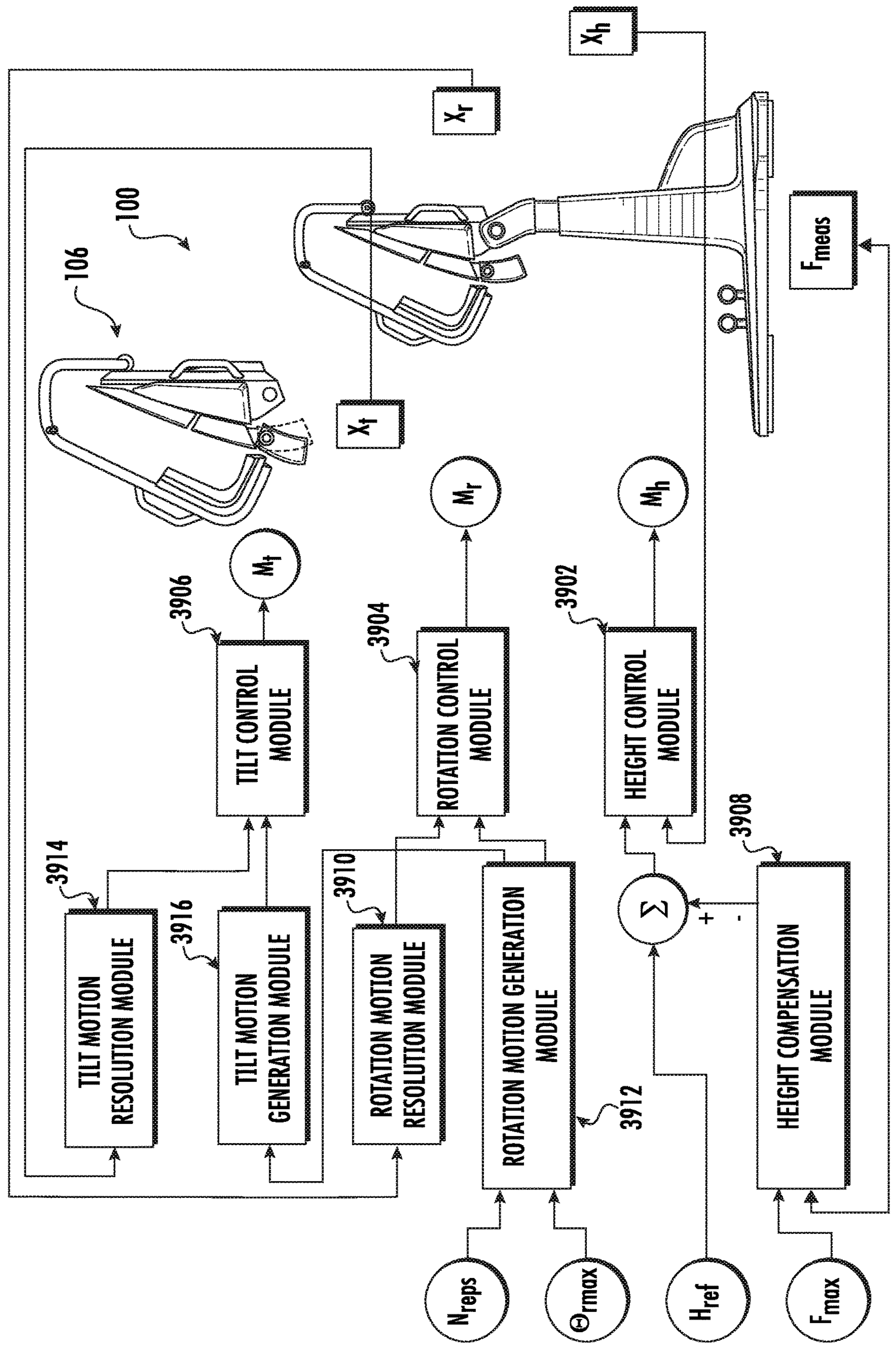
FIG. 39 depicts modules for controlling the elevation and rotation of a table of a fitness device, according to an embodiment of the invention.

FIG. 39 depicts a set of modules, including a height control module 3902, a rotation control module 3904, a tilt control module 3906, a height compensation module 3908, a rotation motion resolution module 3910, a rotation motion generation module 3912, a tilt motion resolution module 3914 and a tilt motion generation module 3916, for controlling the elevation and rotation of the table 106 of fitness device 100. The modules 3902 through 3916 utilize a set of operating or UI parameters, including: $N_{reps}$ denoting the number of exercise repetitions; $\theta_{rmax}$ denoting a maximum rotation angle; $H_{ref}$ denoting a reference height, which may be adjust to differing user heights; and $F_{max}$ denoting a maximum allowable applied force. The modules 3902 through 3916 also utilize various actuators and sensors, including: $M_t$ denoting a tilt angle actuator; $x_t$ denoting a tilt sensor for measuring tilt displacement; $M_r$ denoting a rotation angle actuator; $x_t$ denoting a rotation sensor for measuring rotation displacement; $M_h$ denoting a height actuator; $x_h$ denoting a height sensor for measuring height displacement; and $F_{meas}$ denoting a measured force, such as on a load cell or the foot restraint of the fitness device 100. The modules 3902 through 3916 further utilize a set of control state variables, including: $\theta_t$ denoting a measured tilt angle; $\theta_{tg}$ denoting a generated reference tilt angle; $\theta_r$ denoting a measured rotation angle; $\theta_{rg}$ denoting a generated reference rotation angle; and $H_{comp}$ denoting a height compensation value for limiting an applied force on a user of the fitness device 100.

In some embodiments, the height control module 3902, rotation control module 3904 and tilt control module 3906 are implemented as proportional-integral-derivative (PID) control modules that operate according to the equation:

$$u(t) = K_p e(t) + K_i \int e(t)dt + K_d \frac{de(t)}{dt},$$

where u(t) is the control output, e(t) is the difference between reference and measured control input state ("error"), and $K_p$, $K_i$, and $K_d$ are control coefficients (proportional, integral, and derivative, respectively).

The height compensation module 3908 is configured to reduce the reference height, $H_{ref}$ to limit the applied force on the user by the foot restraint. The height compensation module 3908 takes as input the maximum allowable applied force $F_{max}$ and the measured force $F_{meas}$, and provides an output height $H_{comp}$ according to the equation $H_{comp}=f_{hc}(F_{meas},F_{max})$, where $f_{hc}$ denotes a height compensation function. The output height $H_{comp}$ and the reference height $H_{ref}$ are provided to a summer, the output of which is supplied to the height control module 3902 along with the displacement height measured by the height sensor $x_h$. The height control module 3902 in turn activates the height actuator $M_h$ to adjust the height of the table 106 of the fitness device 100 (e.g., using the base assembly 102 and/or elevation assembly 104).

The rotation motion resolution module 3910 and tilt motion resolution module 3914 are each configured to convert a measured rotational or linear displacement to a measured angle. The rotation motion resolution module 3910 takes as input the measured rotation displacement from the rotation sensor $x_r$, and outputs the measured rotation angle $\theta_r$ according to the equation $\theta_r(t)=f_{rm}(x_r(t))$ where $f_{rm}$ denotes a function for conversion of the measured rotation displacement and t denotes time. It should be noted that the measured rotation angle $\theta_r$ may be independent of any feedback from displacement height sensors or feedback from sensors measuring resistance from the foot restraint or base assembly sensors. The tilt motion resolution module 3914 takes as input the measured tilt displacement from the tilt sensor $x_t$, and outputs the measured tilt angle $\theta_t$ according to the equation $\theta_t(t)=f_{tm}(x_t(t))$ where $f_{tm}$ denotes a function for conversion of the measured tilt displacement.

The rotation motion generation module 3912 and tilt motion generation module 3916 create the exercise motion profile of the table 106 of fitness device 100. The rotation motion generation module 3912 takes as input the parameters $N_{reps}$ denoting the number of exercise repetitions and $\theta_{rmax}$ denoting the maximum rotation angle, and outputs the generated reference rotation angle $\theta_{rg}$ according to the equation $\theta_{rg}(t)=f_{rg}(\theta_{rmax}, N_{rep}, S_l, S_r)$ where $f_{rg}$ denotes a function for generating the reference rotation angle, and $S_t$ and $S_r$ denote logic states (e.g., on/off) for left and right user switch controls, respectively. The tilt motion generation module 3916 takes as input the generated reference rotation angle $\theta_{rg}$ and generates the reference tilt angle $\theta_{tg}$ according to the equation $\theta_{tg}(t)=f_{tg}(\theta_{rg}(t))$ where $f_{tg}$ denotes a function for generating the reference tilt angle. The reference rotation angle may be based at least in part on feedback from sensors of a selected maximum ankle resistive force, or may allow rotation to the maximum limits of table rotation and limits of foot restraint motion.

The outputs of the rotation motion resolution module 3910 and rotation motion generation module 3912 are provided to the rotation control module 3904 to activate the rotation angle actuator $M_r$. The outputs of the tilt motion resolution module 3914 and tilt motion generation module 3916 are provided to the tilt control module 3906 to activate the tilt angle actuator $M_t$.

Figure 40B:
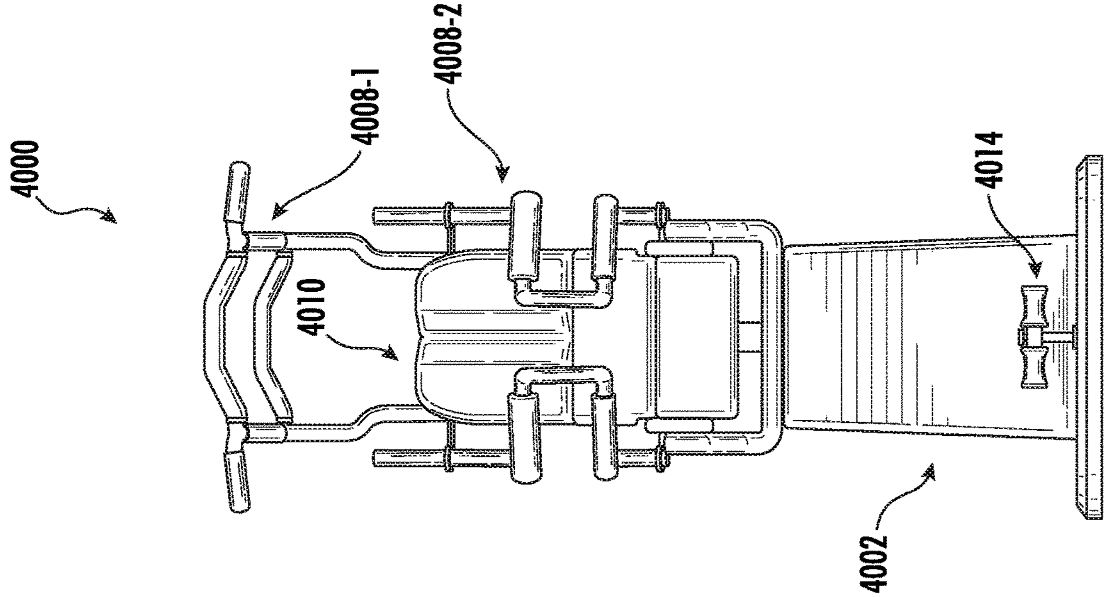
FIGS. 40A-40L depict operation of a fitness device, according to an embodiment of the invention.
Figure 40A:
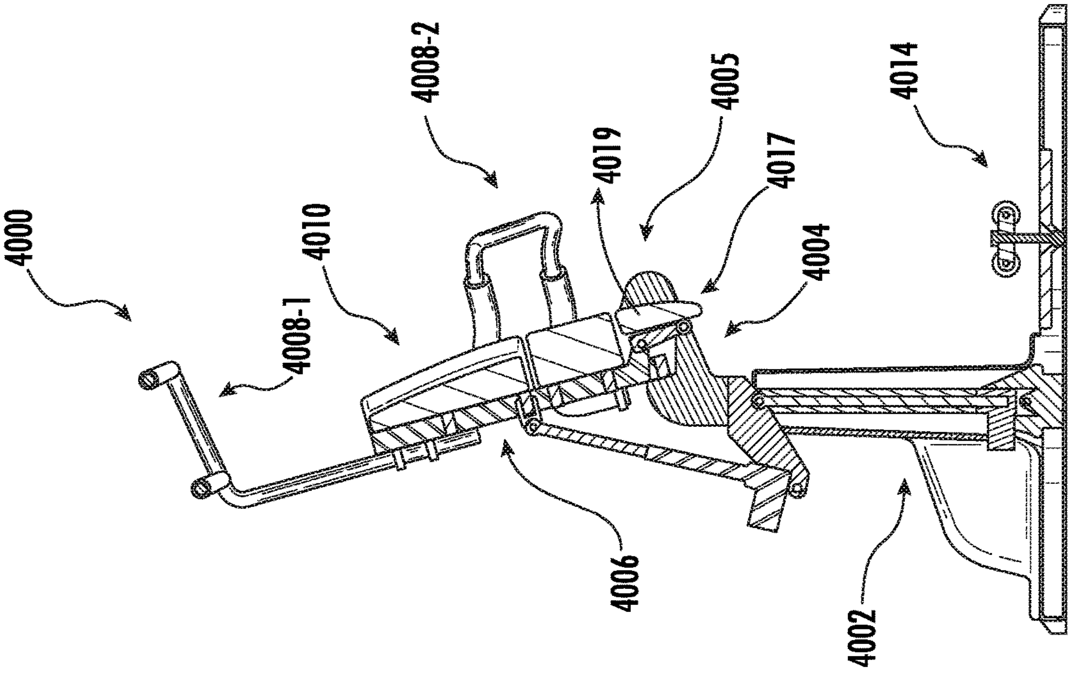

FIGS. 40A-40L illustrate operation of a fitness device 4000. The fitness device 4000 includes a base assembly 4002, an elevation assembly 4004, a table 4006, a two-piece restraint and overhead bar assembly including overhead bar 4008-1 and underarm bars 4008-2, and a cushion assembly 4010. FIG. 40A shows a lumbar or pelvic cushion 4017 of the cushion assembly 4010, where the pelvic cushion 4017 may be coupled to one or more actuators that allow the pelvic cushion 4017 to extend outwards in direction 4019. The base assembly 4002 is also shown including an optional foot restraint 4014. Although shown in FIGS. 40A-40L as utilizing a configuration similar to that described above with respect to foot restraint 504, it should be appreciated that the foot restraint 4014 may utilize any other type of foot restraint configuration described above or elsewhere herein.

In the fitness device 4000, the pivot point or table rotation axis 4005 is positioned in front of the cushions of the cushion assembly 4010, which offers the advantage of a smaller change in height of the user for a similar rotation, versus embodiments where the pivot point is behind the cushions of a cushion assembly. This is compared with, for example, the fitness device 100 of FIGS. 1A-1F, where the table rotation axis 105 is positioned behind the cushions of the cushion assembly 110. Although FIGS. 40A-40L illustrate an example where a two-column approach is used for elevation means (e.g., similar to other figures such as FIGS. 1A-1F), a single-column approach may alternatively be used.

Figure 40C:
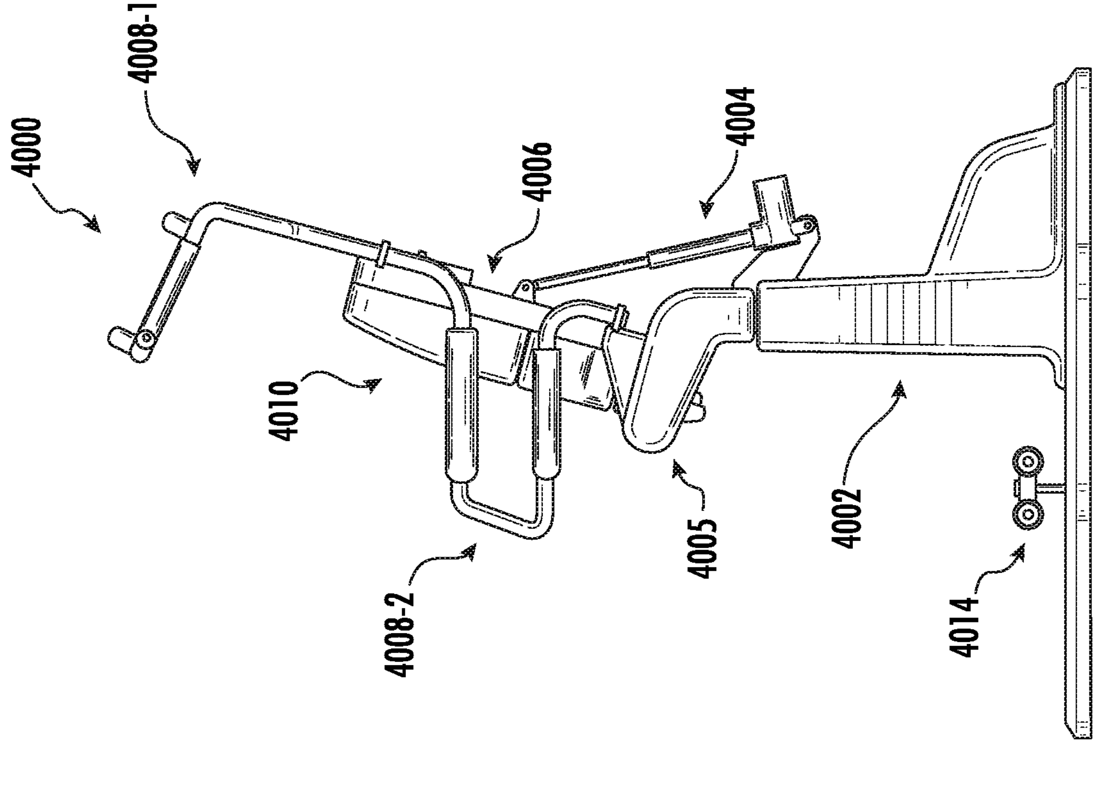
Figure 40D:
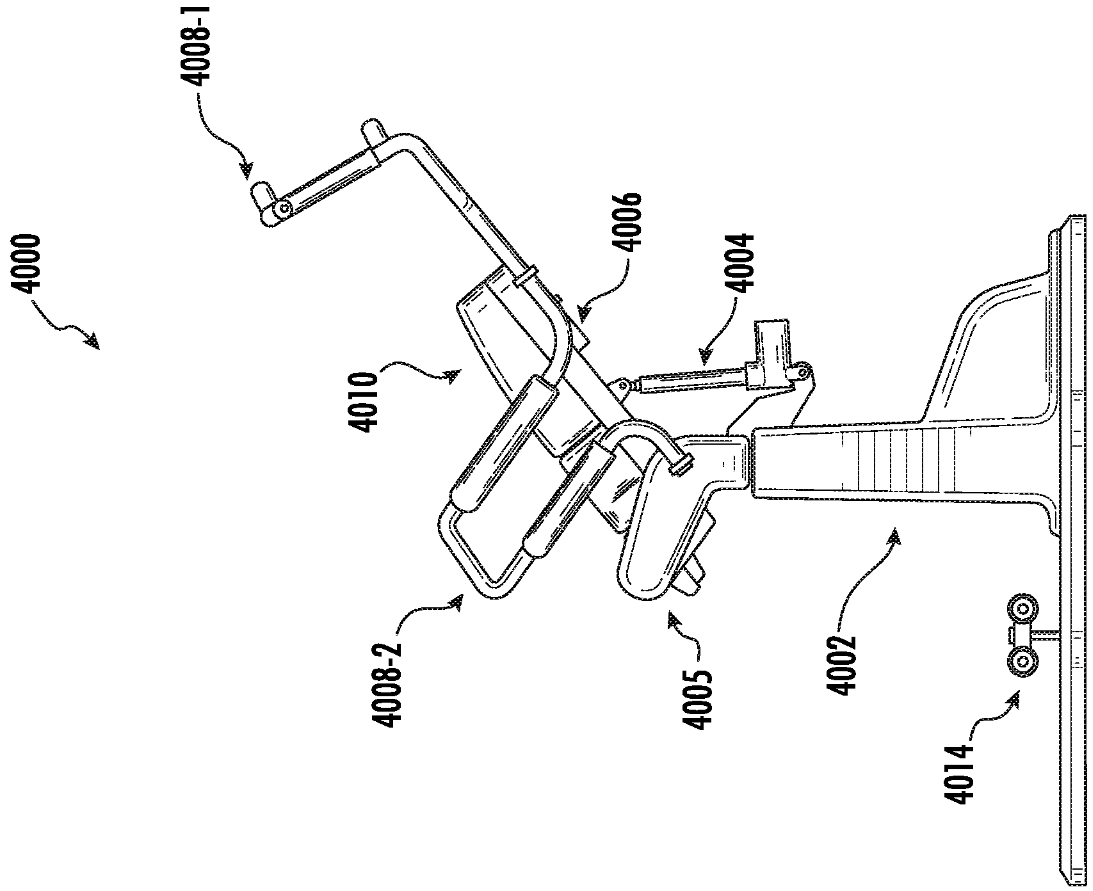

FIG. 40A shows a side cross-sectional view of the fitness device 4000, illustrating internal actuators of the base assembly 4002 configured for adjusting a height of the table 4006. Rotation or tilt of the table 4006 is enabled via actuators of the elevation assembly 4004. The actuators couple the elevation assembly 4004 to the back of the table 4006. Such actuators may comprise electric motor-powered linear actuators, pneumatic actuators, hydraulic actuators, etc. FIG. 40B shows a front view of the fitness device 4000. FIG. 40C shows a side view of the fitness device 4000 with the table 4006 in an upright or starting position, while FIG. 40D shows a side view of the fitness device 4000 with the table 4006 in a reclined position.

Figure 40E:
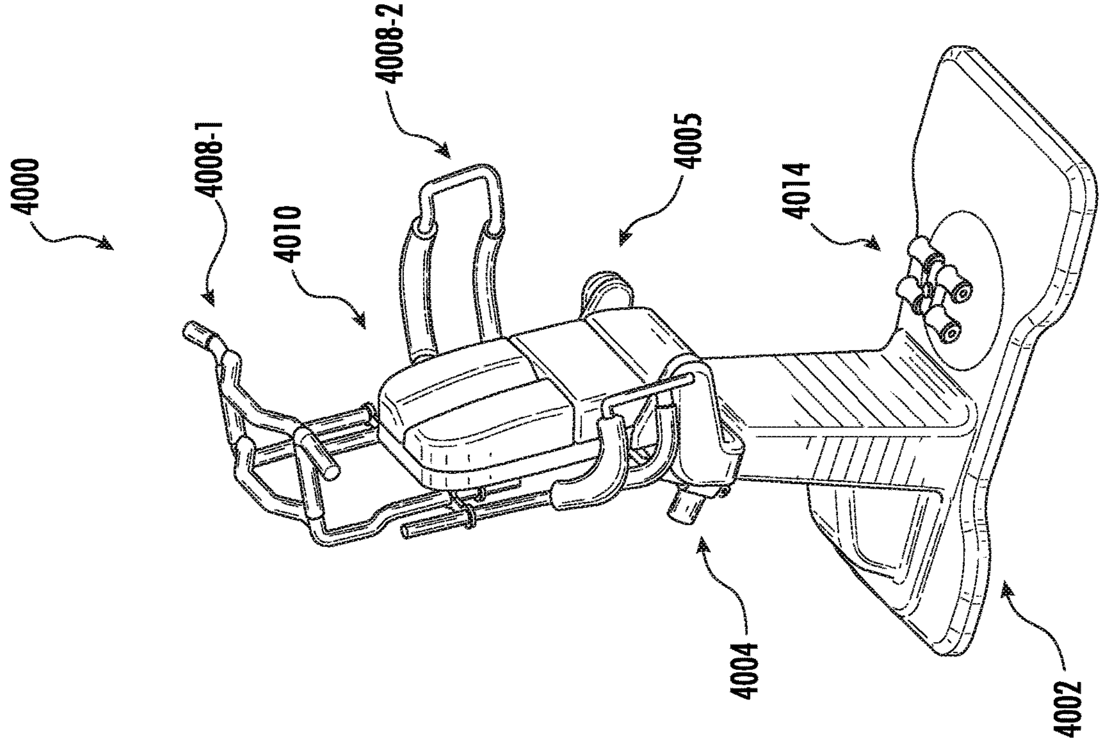
Figure 40F:
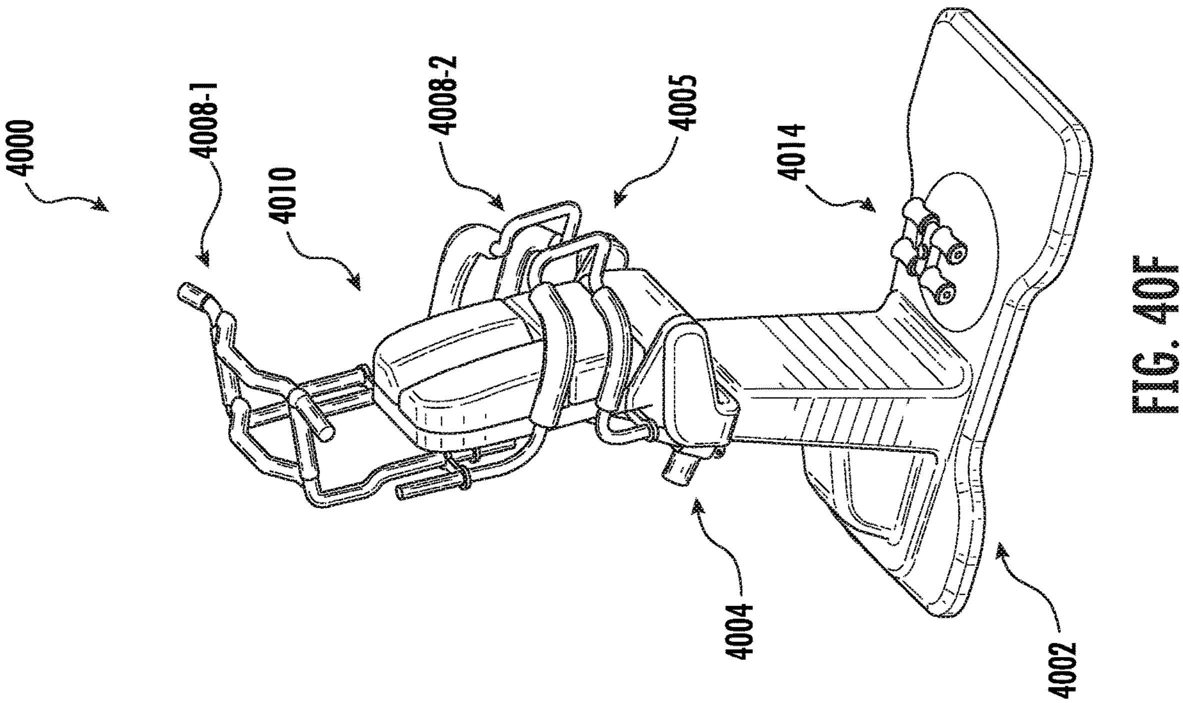
Figure 40H:
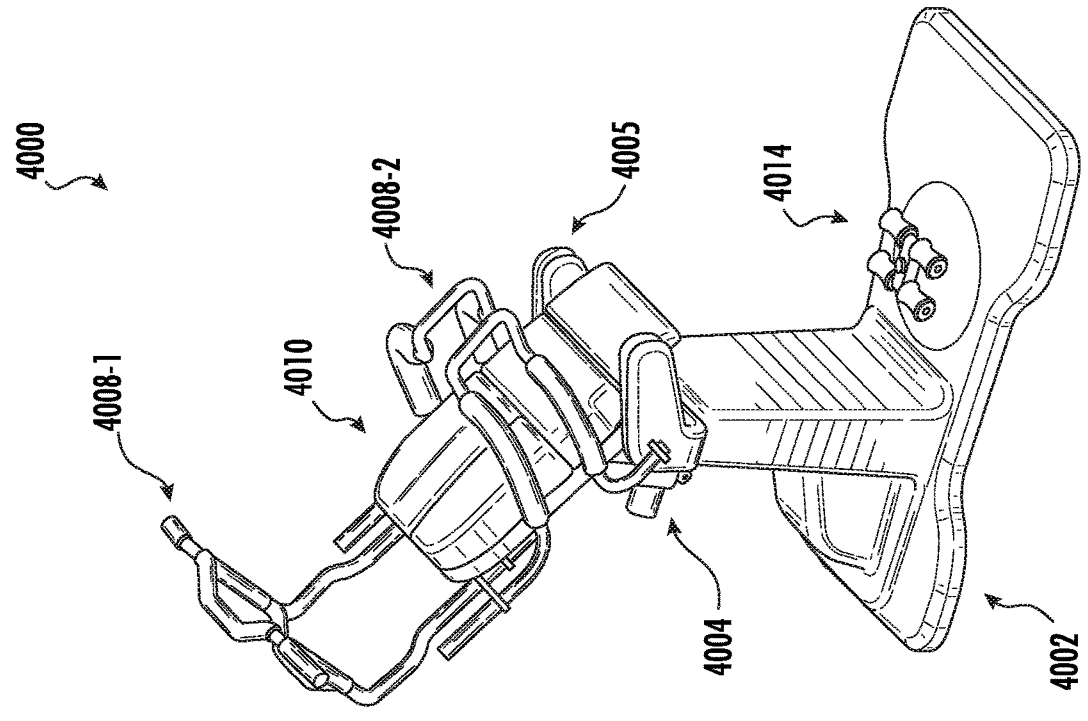
Figure 40G:
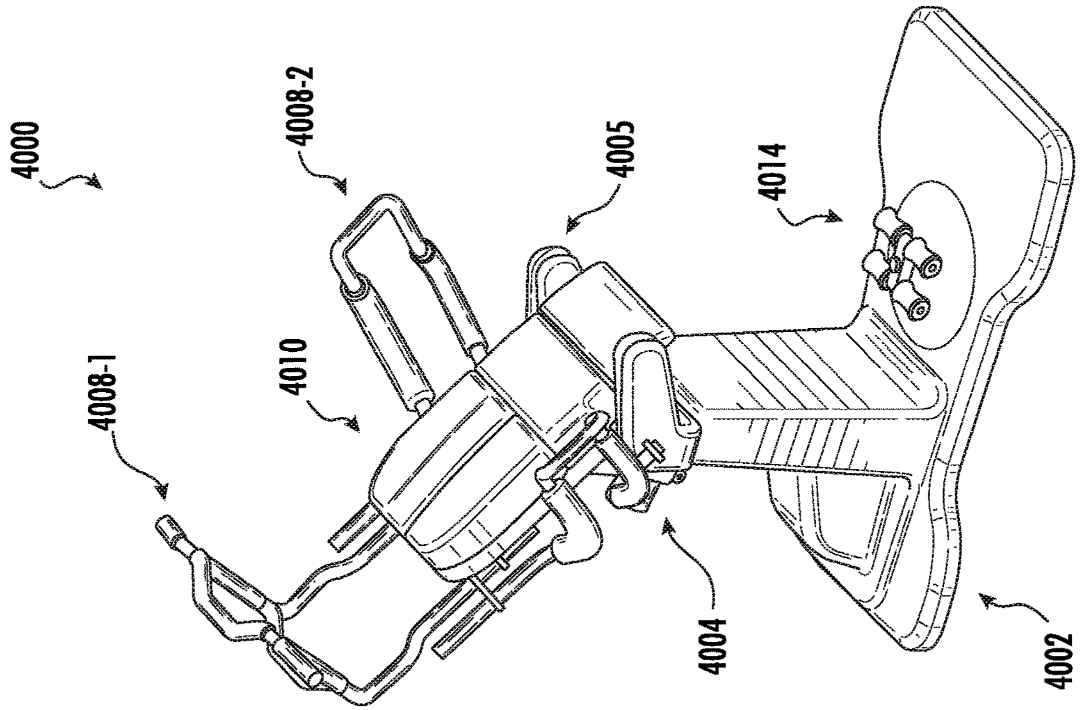
Figure 40J:
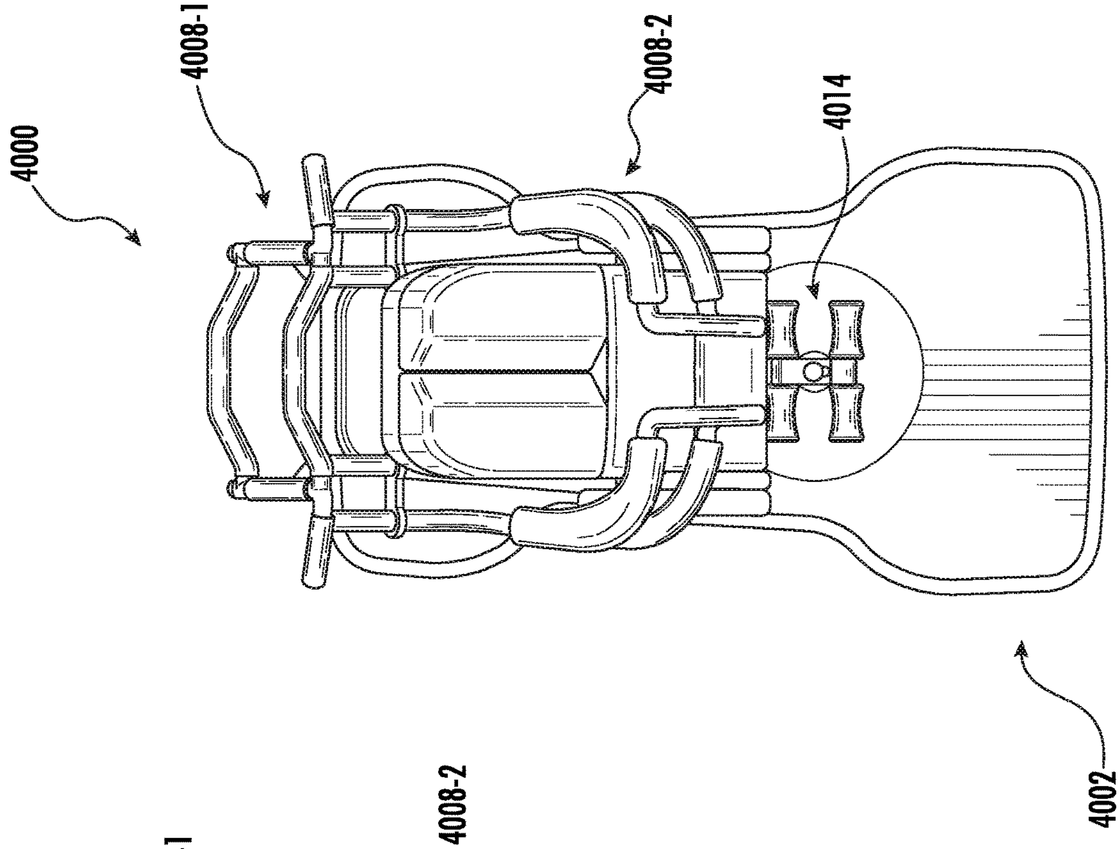
Figure 40I:
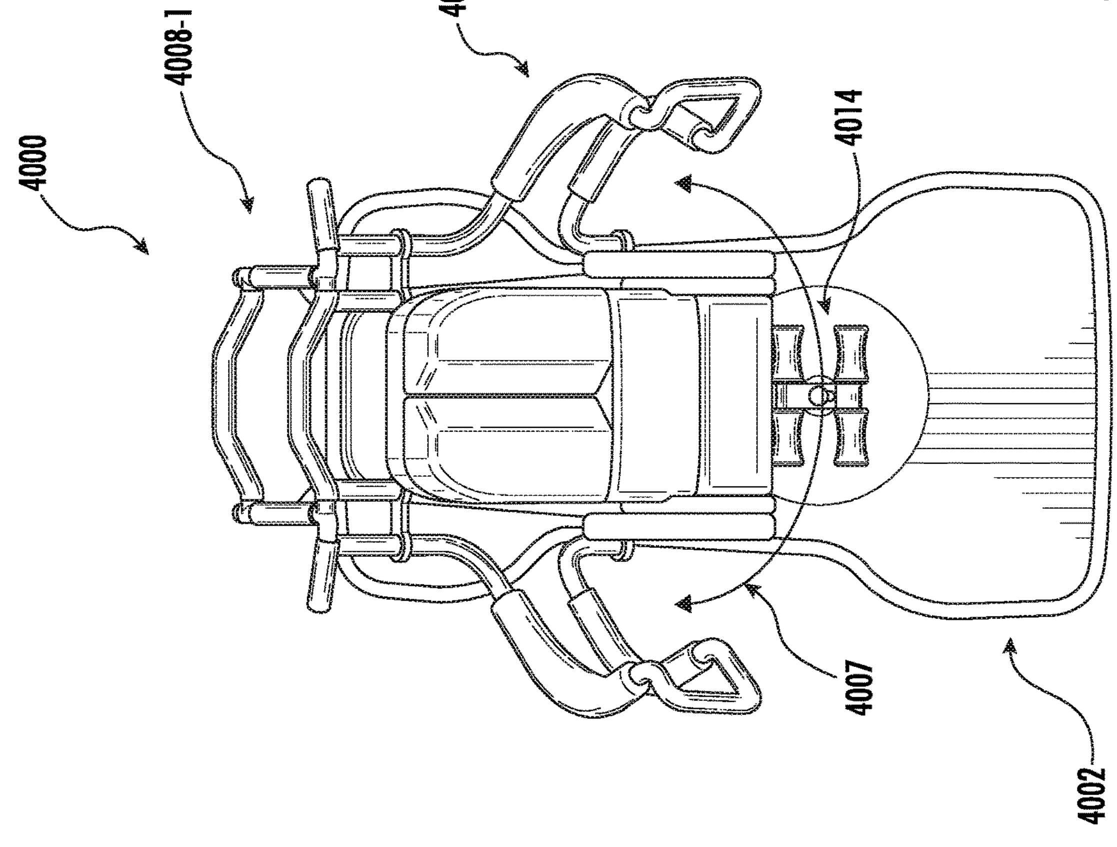

FIGS. 40E and 40F show perspective views of the fitness device 4000 in the upright position with the underarm bars 4008-2 in open and closed positions, respectively. The underarm bars 4008-2, as shown, are configured to swing outward to accommodate a user entering and exiting the fitness device 4000, or for comfort of the user while using the fitness device 4000. FIGS. 40G and 40H show perspective views of the fitness device 4000 in a reclined position with the underarm bars 4008-2 in open and closed positions, respectively. FIGS. 401 and 40J show top-down views of the fitness device 4000 with the underarm bars 4008-2 in open and closed positions, respectively. FIG. 401 also illustrates lateral rotation 4007, which may include lateral rotation of the table 4006 or portions of the cushion assembly together with other components such as underarm bars 4008-2.

Figure 40L:
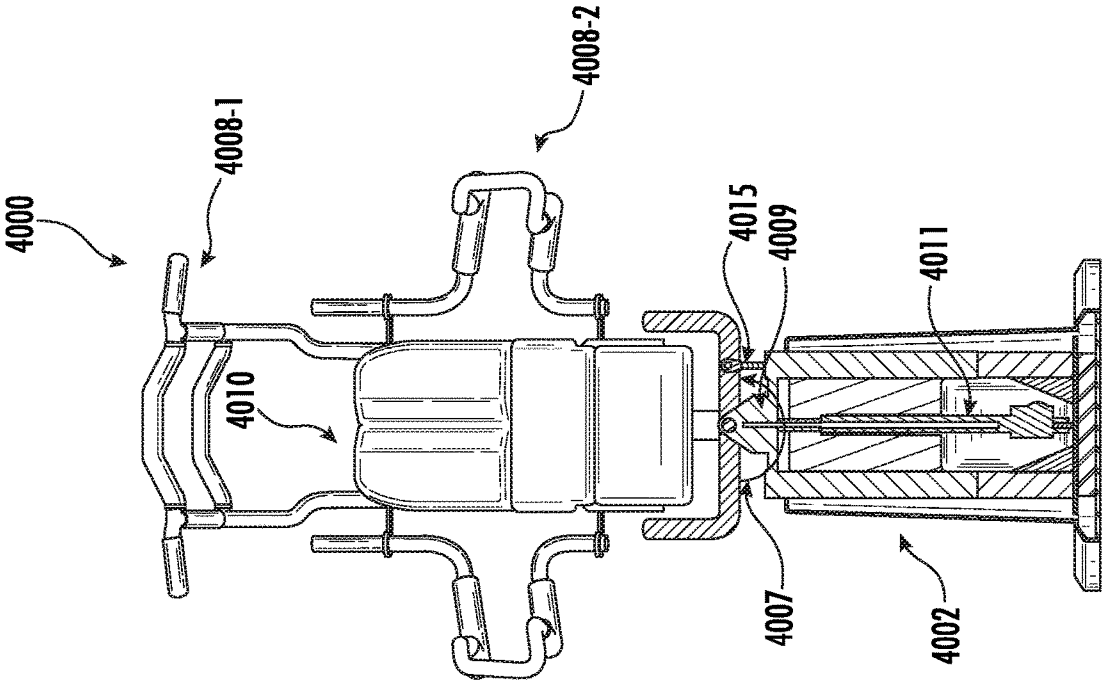
Figure 40K:
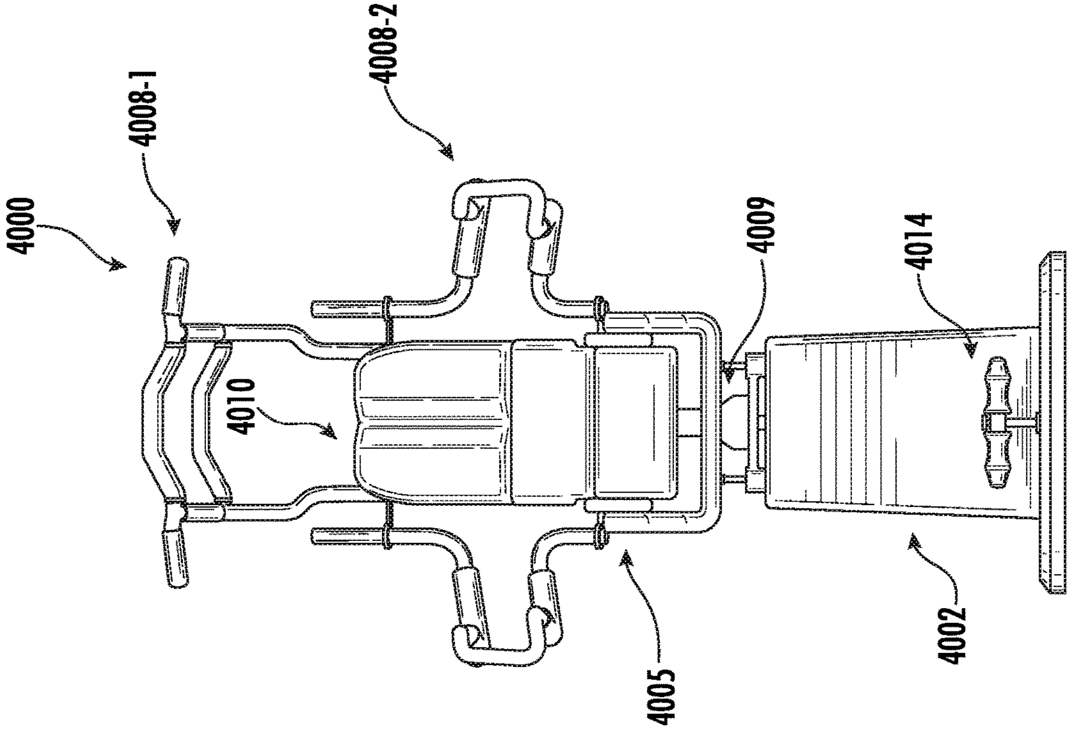

FIG. 40K shows a front view of the fitness device 4000, where the base assembly 4002 provides a lateral pivot point 4009 for lateral rotation of the table 4006. FIG. 40L shows a front cross-sectional view of the fitness device 4000, illustrating internal actuator 4011 and actuator 4015 (e.g., each of which may be an electric motor-powered linear actuator, a pneumatic actuator, a hydraulic actuator, etc.). The actuator 4015 is configured to provide rotation 4007 about the lateral pivot point 4009. Internal actuator 4011 raises the elevation assembly 4004. The lateral pivot point 4009, in some embodiments, comprises a torsional spring, a flywheel and clutch, or another mechanism that is configured to provide variable resistance to different types of rotation (e.g., about the y-axis) during stretch or other exercise. It should be noted that the lateral pivot point 4009 illustrated in FIGS. 40K and 40L is optional, and that in other embodiments the fitness device 4000 does not provide or utilize the lateral pivot point 4009.

FIGS. 41A-41J illustrate operation of a foot restraint 4124 of a fitness device 4100. The fitness device 4100, similar to fitness device 4000, includes a base assembly 4102, an elevation assembly 4104, a table (not labeled for clarity), a two-piece restraint and overhead bar assembly including overhead bar 4108-1 and underarm bars 4108-2, and a cushion assembly 4110. Also similar to the fitness device 4000, the fitness device 4100 includes a pivot point or table rotation axis 4105 that is positioned in front of the cushions of the cushion assembly 4110. The base assembly 4102 includes the foot restraint 4124, which has a different configuration relative to the foot restraint 4014 of fitness device 4000.

Figure 41B:
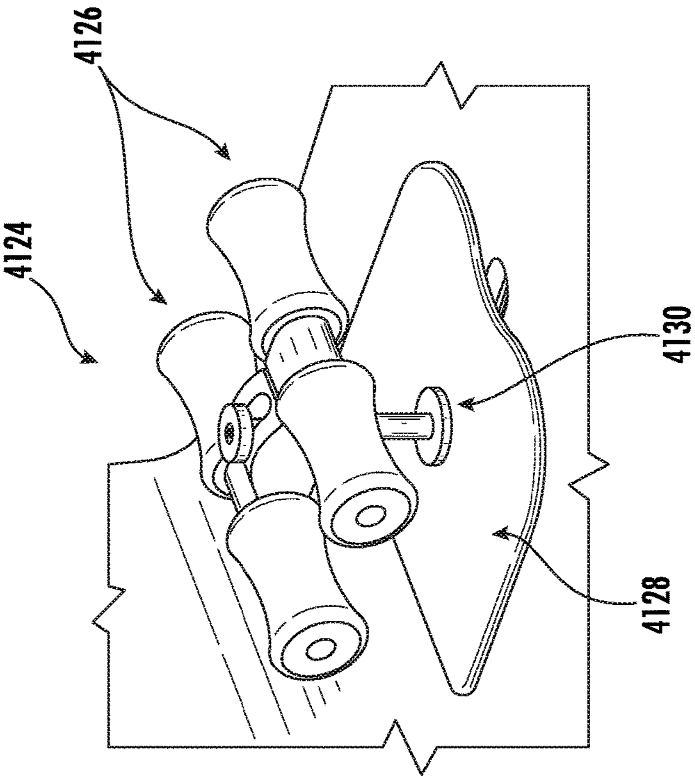
FIGS. 41A-41J depict operation of a foot restraint of a fitness device, according to an embodiment of the invention.
Figure 41A:
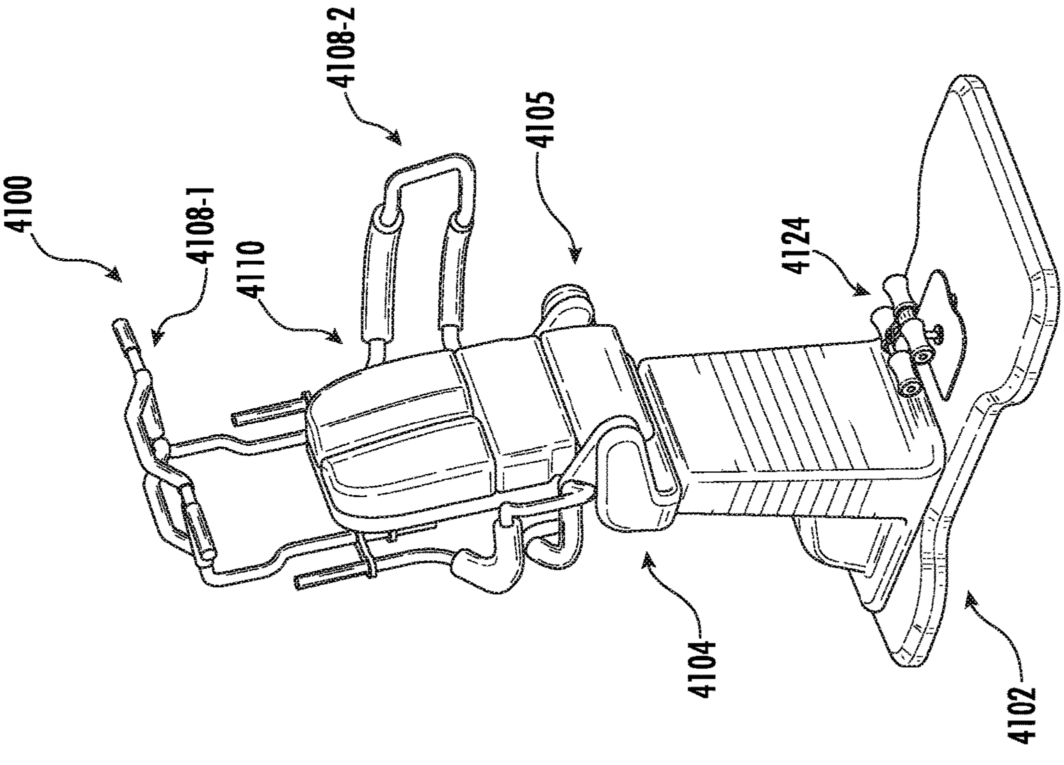
Figure 41C:
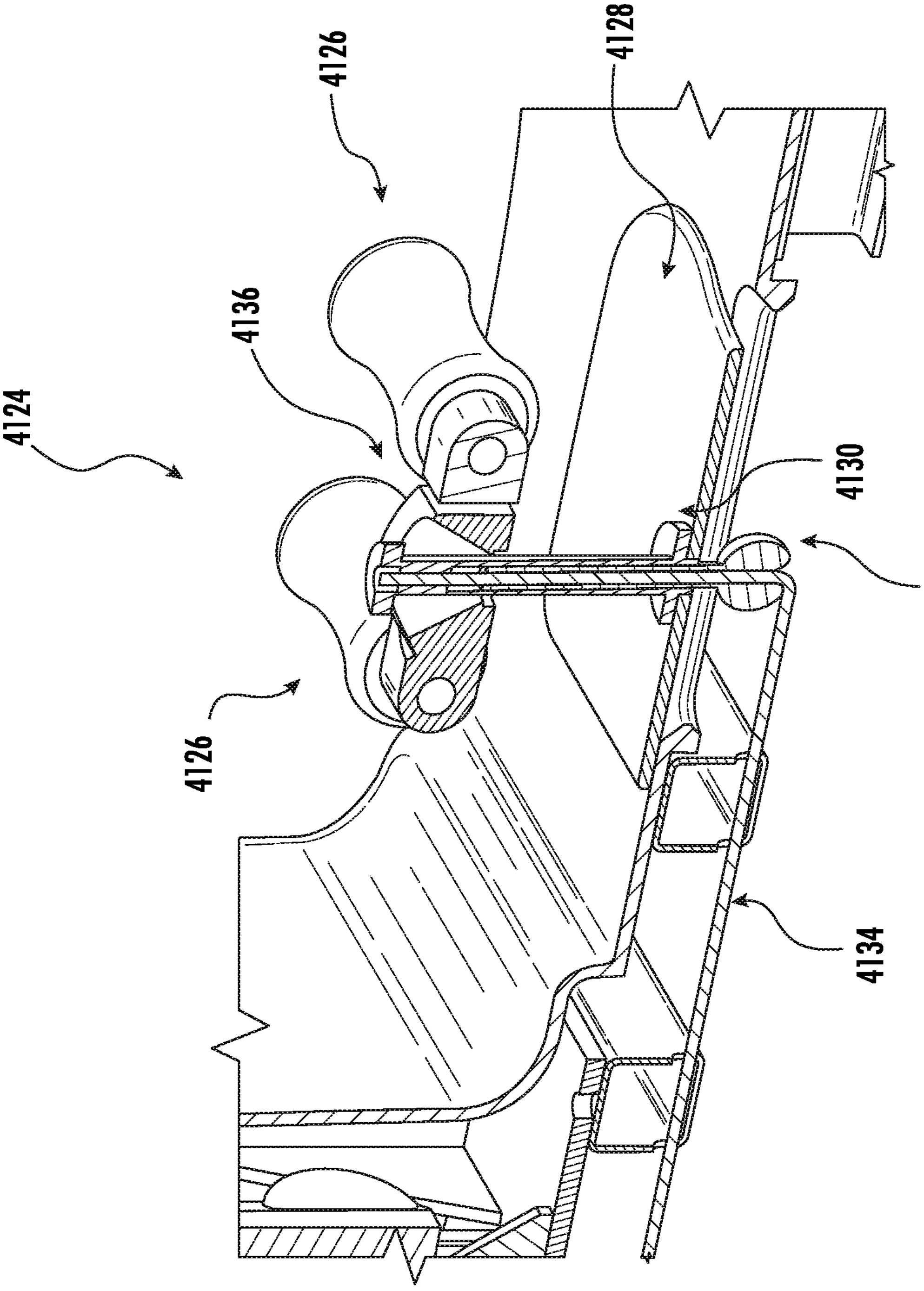

FIG. 41A shows a perspective view of the fitness device 4100, and FIG. 41B shows a close-up view of the foot restraint 4124. FIG. 41C shows a close-up cross-sectional view of the foot restraint 4124. The foot restraint 4124 includes a set of parallel bars with bolsters 4126, a base plate 4128, and a peg interconnection 4130. The base plate 4128 and peg interconnection 4130, in some embodiments, may be a single piece. In other embodiments, the base plate 4128 and peg interconnection 4130 are distinct pieces. The peg interconnection 4130, as detailed in the cross-sectional view of FIG. 41C, has a wire 4134 that provides tension or resistive force. The wire 4134 runs through a guide 4132 below the base plate 4128. The wire 4134 may be connected to a force application system (e.g., force application system 702), or could by a compliant member and may be adjusted from very stiff to very compliant by changing out the type of wire used, adding springs along the length of the wire, adding springs at the attachment point of the wire to the structure, or adding or subtracting the number of wires used in series or in parallel.

Figure 41D:
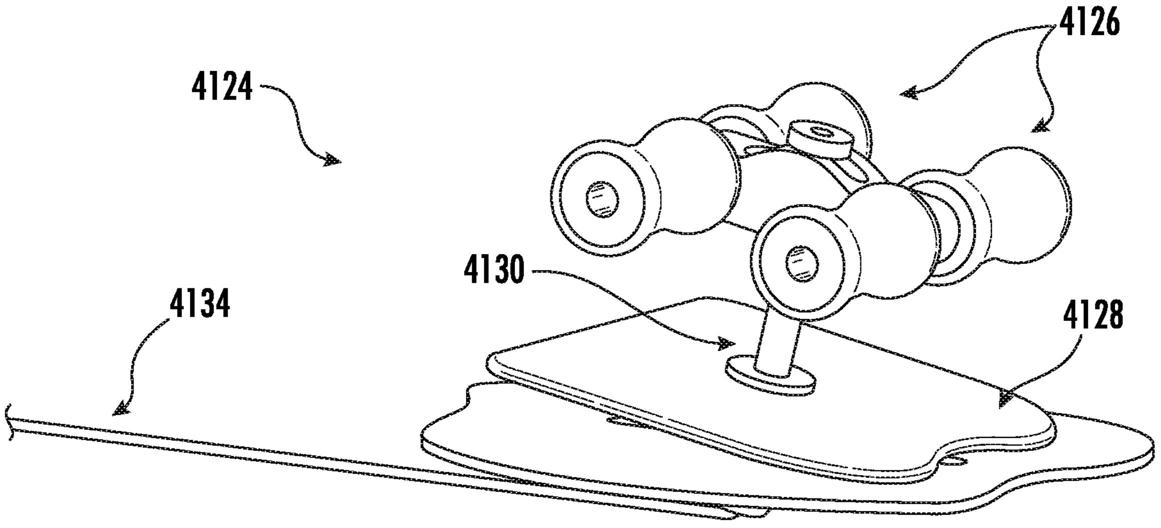

FIG. 41D shows a close up view of the foot restraint 4124 where the base plate 4128 is elevated relative to a platform of the base assembly 4102. The base plate 4128 is an example of what is more generally referred to herein as a base assembly mounting portion. The base plate 4128, and other base assembly mounting portions, may be removable and configured for easy reattachment to the base assembly 4102 as required or desired by the user. The base plate 4128 elevates as the user is lifted during stretch or exercise of a user of the fitness device 4100. The wire 4134 provides a controllable amount of tension or resistive force to such lifting or rotation of the base plate 4128. The controllable amount of tension or resistive force may be implemented in a manner similar to that described above with respect to FIG.

Figure 41E:
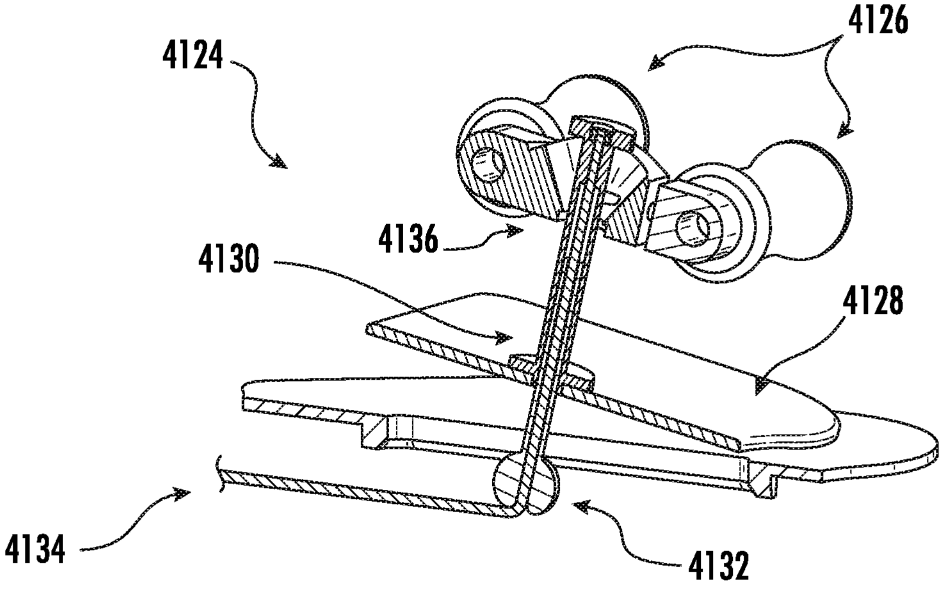

39. FIG. 41E shows a close-up cross-sectional view of the foot restraint 4124 during the elevation described above with respect to FIG. 41D.

Figure 41F:
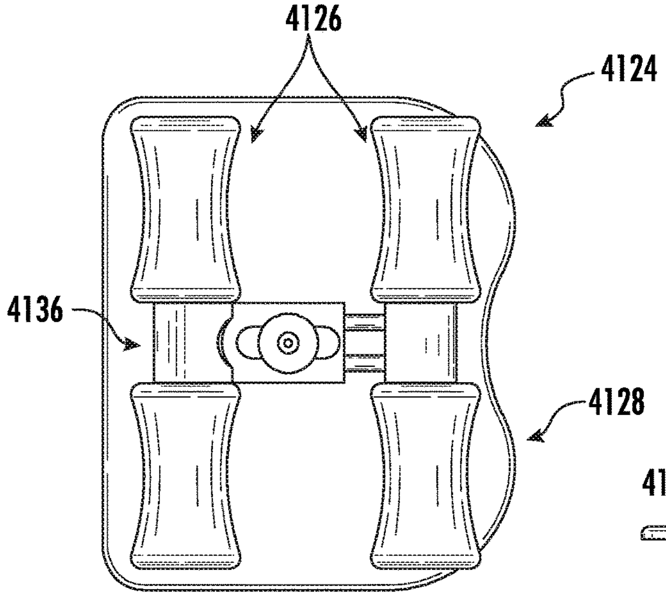
Figure 41G:
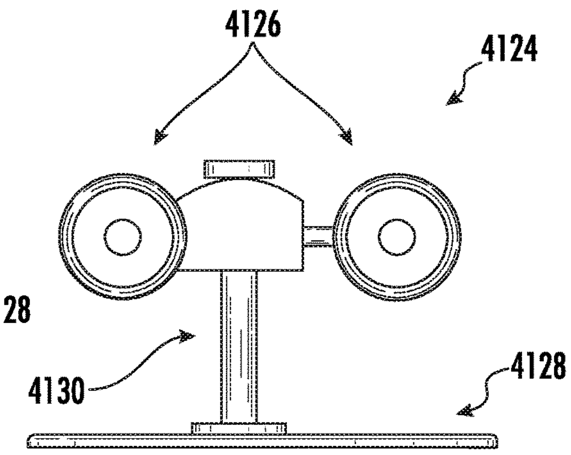
Figure 41H:
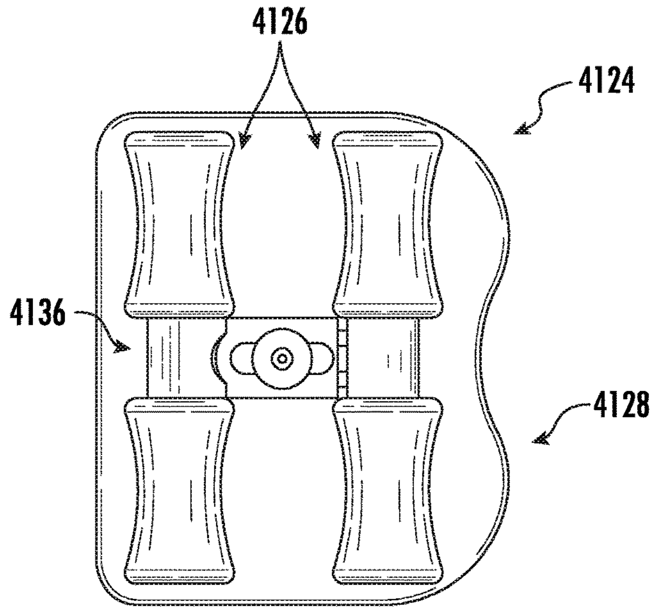
Figure 41I:
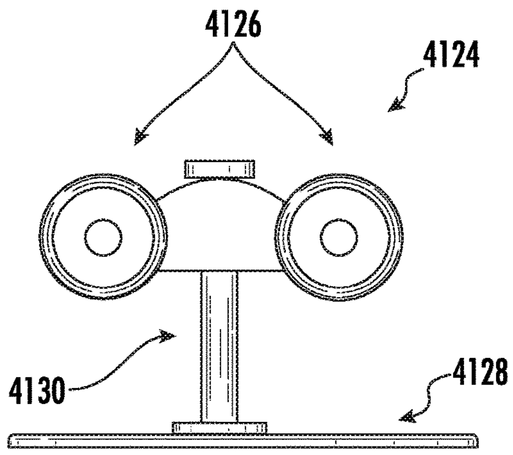

FIGS. 41F-41I illustrate linear travel of the parallel bars and bolsters 4126 of the foot restraint 4124. FIG. 41F shows a top-down view of the foot restraint 4124 while the parallel bars and bolsters 4126 are extended outward from the sliding track 4136, and FIG. 41G shows a side view of the foot restraint 4124 during such linear extension outward from the sliding track 4136. FIG. 41H shows a top-down view of the foot restraint 4124 where the parallel bars and bolsters 4126 are not extended outward from the sliding track 4136, and FIG. 41I shows a side view of the foot restraint 4124 without the linear extension outward from the sliding track 4136. The outward extension of parallel bars and bolsters 4126 may be spring loaded, moved by a linear actuator, moved by a lever or other means, in order to open up to allow the user to insert the user's ankles and then retract to capture the ankles.

Figure 41J:
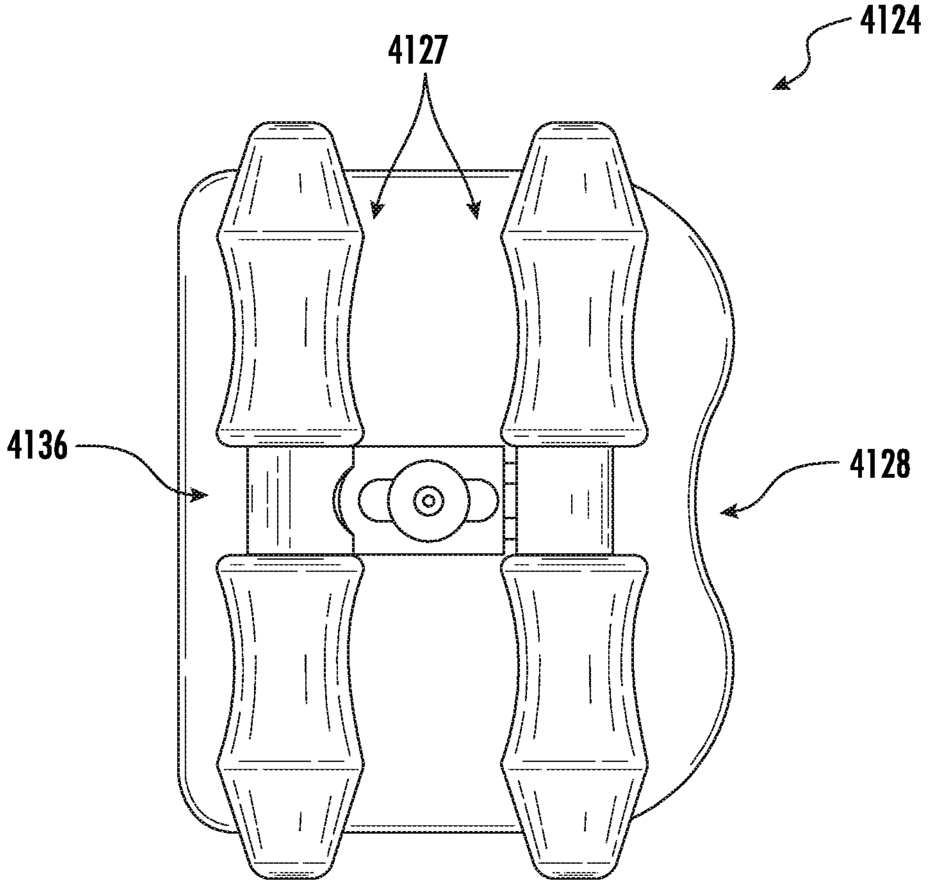

FIG. 41J shows a top-down view of the foot restraint 4124 with different shaped bolsters 4127 relative to the parallel bars and bolsters 4126 shown in FIGS. 41A-41I. It is to be appreciated that the particular size and shape of the bolsters in foot restraints may be varied as desired for comfort of the user. In some embodiments, for example, the bolsters are made modular such that different users of a fitness device can adjust the type and size of bolsters utilized. A user may also remove the bolsters altogether, such that the parallel bars are bare or exposed. The different shaped bolsters 4127 have a taper that would allow the user to more easily slide the ankles into the foot restraint 4124. This would be particularly helpful when the outward extension of parallel bars and bolsters 4127 is spring loaded.

FIGS. 42A-42H illustrate operation of a fitness device 4200. The fitness device 4200 includes a base assembly 4202, an elevation assembly 4204, a table 4206, a two-piece restraint and overhead bar assembly including overhead bar 4208-1 and underarm bars 4208-2, and a cushion assembly 4210. The fitness device 4200 includes a pivot point or table rotation axis 4205 that is positioned behind the cushions of the cushion assembly 4210, although this is not a requirement. In other embodiments, the pivot point or table rotation axis may be in front of (or in line with) the cushions of the cushion assembly as described above in conjunction with, for example, FIGS. 40A-40L. The base assembly 4202 includes optional foot restraint 4214. Although shown in FIGS. 42A-42H as utilizing a configuration similar to that described above with respect to foot restraint 504, it should be appreciated that the foot restraint 4214 may utilize any other type of foot restraint configuration described above or elsewhere herein.

Figure 42B:
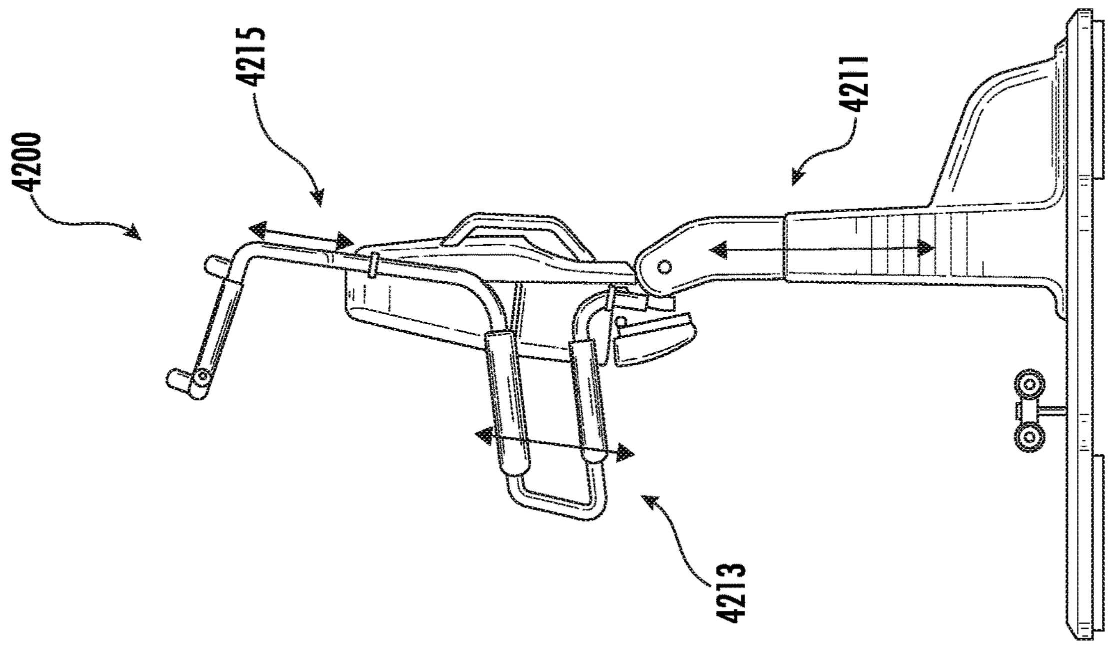
FIGS. 42A-42H depict operation of a fitness device, according to an embodiment of the invention.
Figure 42A:
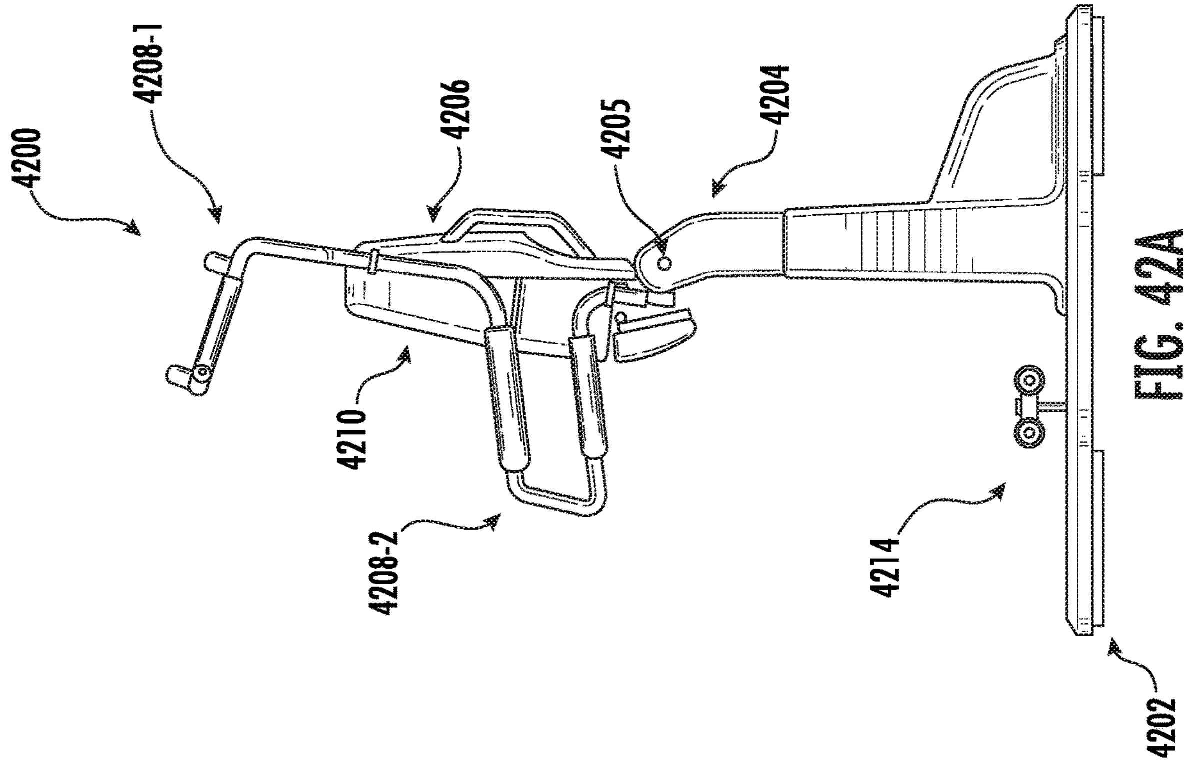

FIG. 42A shows a side view of the fitness device 4200. FIG. 42A shows the fitness device 4200 in what is referred to herein as a starting, ready or default position that the fitness device 4200 returns to after a user has exited.

FIG. 42B also shows a side view of the fitness device 4200, but FIG. 42B omits element labels for components of the fitness device 4200 so as to illustrate adjustability of the fitness device as shown with reference numerals 4211, 4213 and 4215. Element 4211 illustrates height adjustment provided by the base assembly 4202 and elevation assembly 4204, so as to accommodate user height. Element 4213 illustrates height adjustment of the underarm bars 4208-2, and element 4215 illustrates height adjustment of the overhead bar 4208-1. The overhead bar 4208-1 and underarm bars 4208-2 are advantageously configured for independent adjustment for accommodating different sized users as well as user preference and comfort. The fitness device 4200 is thus configured for adjustment to fit and accommodate different users. Users, for example, may first lock or otherwise position their feet in the foot restraint 4214, then close the underarm support bars 4208-2 (e.g., which may swing outward and close as described above). Users may then grasp hand grips on the underarm support bars 4208-2 providing controls for actuating the various height adjustments 4211, 4213 and 4215. Hand grips on the underarm support bars 4208-2 may also or alternatively be used for initiation and manual controlled operation of any or all rotational movement and stretching of the table 4206. Users can also utilize such controls to initiate stretch or other exercise (e.g., by pressing or activating controls as described elsewhere herein).

Figure 42D:
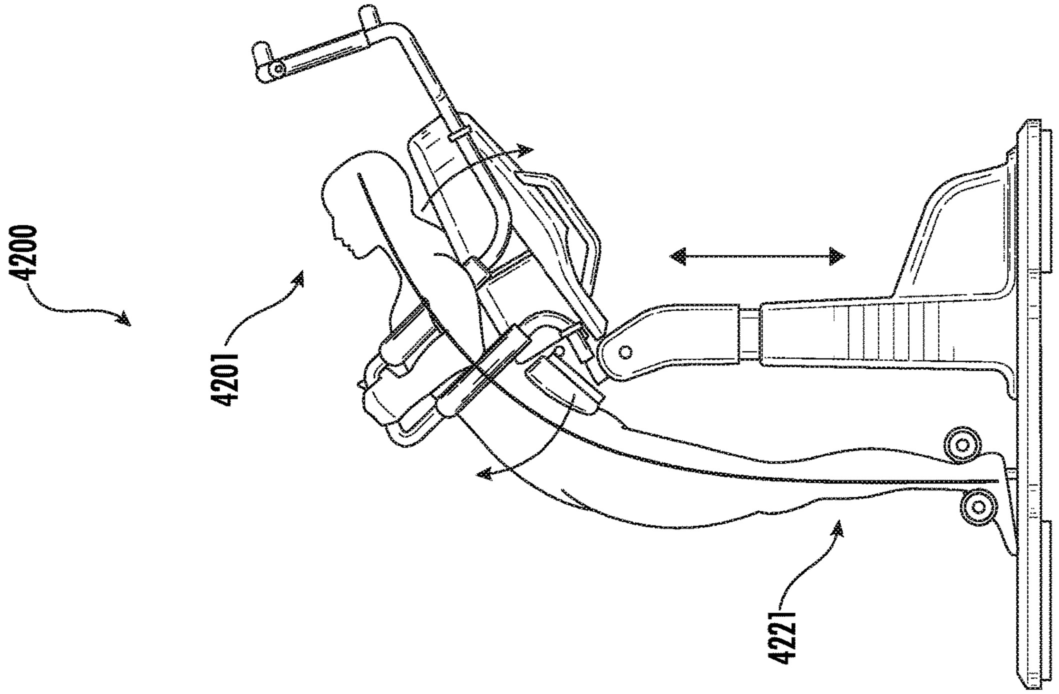
Figure 42C:
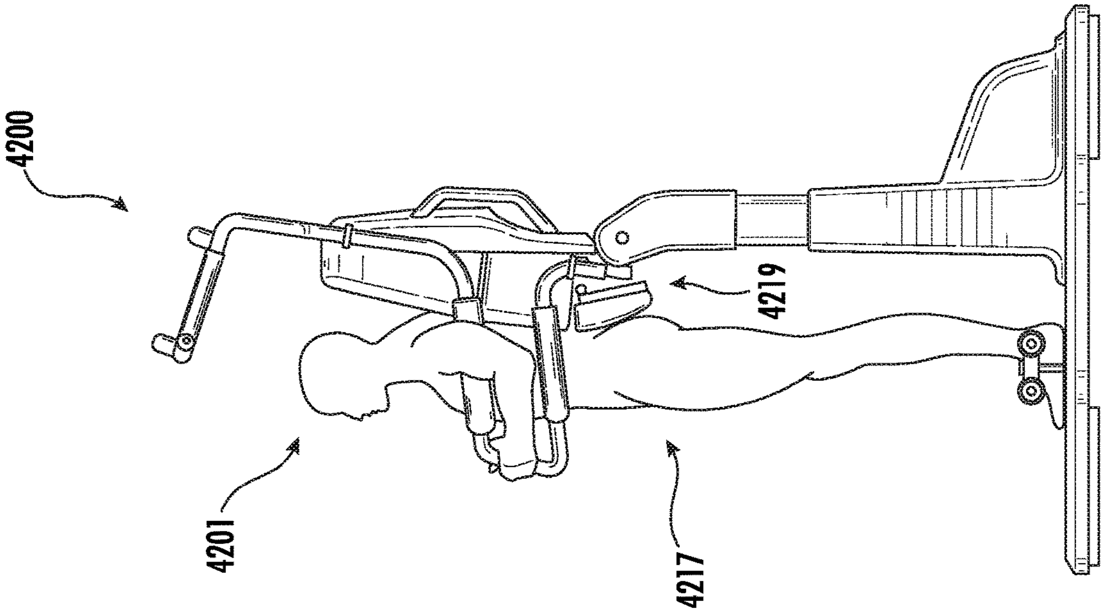

FIG. 42C shows a side view of the fitness device 4200 with a user 4201 positioned therein. As illustrated, an approximate center of a lumbar or pelvic cushion 4219 of the cushion assembly 4210 is aligned with a belly button 4217 of the user 4201 via height adjustment using the base assembly 4202 and the elevation assembly 4204. The underarm support bars 4208-2 may also be height-adjusted as desired by the user 4201. FIG. 42D shows the user 4201 positioned in the fitness device 4200 in a reclined position. FIG. 42D labels with element 4221 an approximate centerline of a body of the user 4201.

Figure 42F:
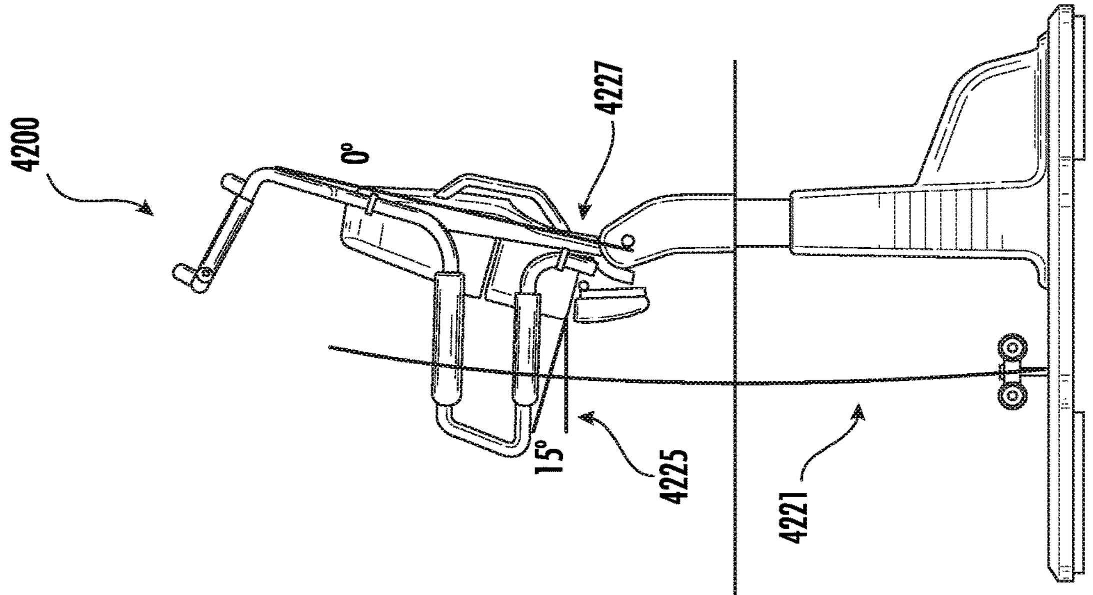
Figure 42E:
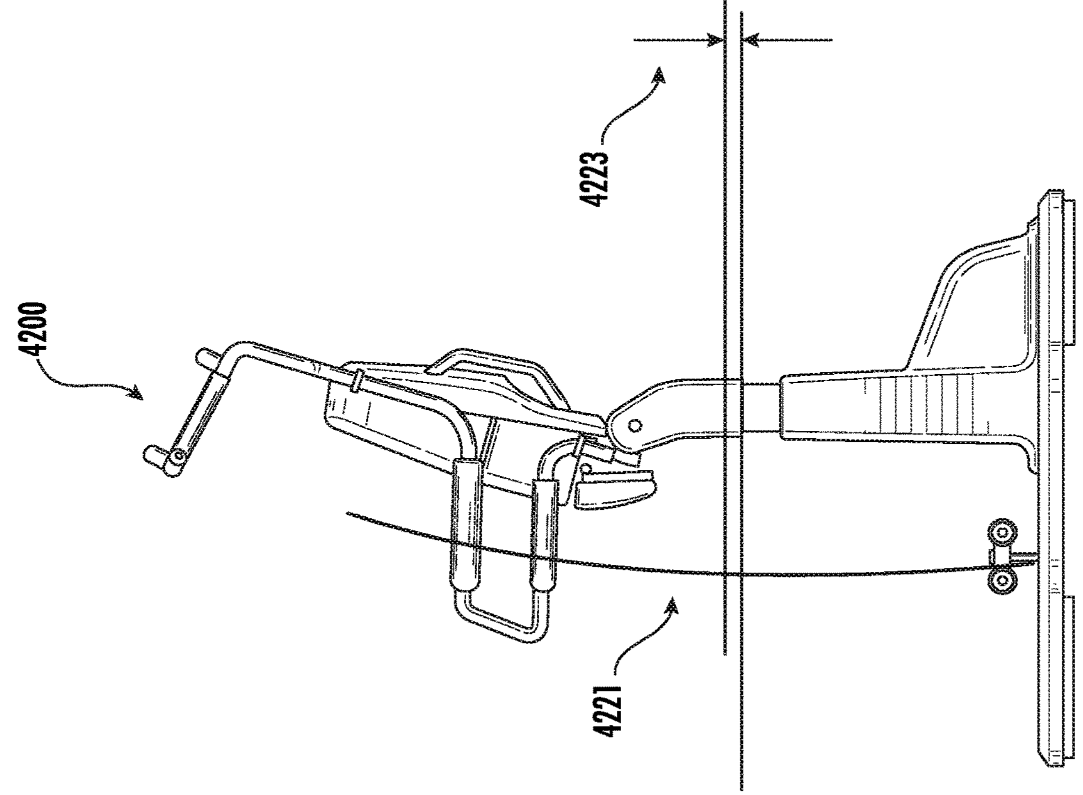

FIGS. 42E-42H illustrate a supine exercise and stretch sequence. For clarity of illustration, the user 4201 is not shown in the views of FIGS. 42E-42H, but the approximate centerline 4221 of the body of the user 4201 is shown. More particularly, FIG. 42E shows a view similar to that of FIG. 42D, but with the user 4201 not shown only the approximate centerline 4221 thereof. FIG. 42F illustrates core stretch of the user 4201, where the feet of the user 4201 lift slightly off a platform of the base assembly 4202 while remaining in the foot restraint 4214. This lift is enabled via actuators in the base assembly 4202 and/or elevation assembly 4204, with the amount of lift shown as element 4223. FIG. 42F also illustrates angular reference lines 4225 and 4227. The angular reference line 4225 in FIG. 42F shows an approximate 15-degree gap between a thoracic cushion and a pelvic or lumbar cushion of the cushion assembly 4210. The thoracic section of the cushion assembly 4210 is at a zero-degree position as shown with angular reference line 4227.

Figure 42G:
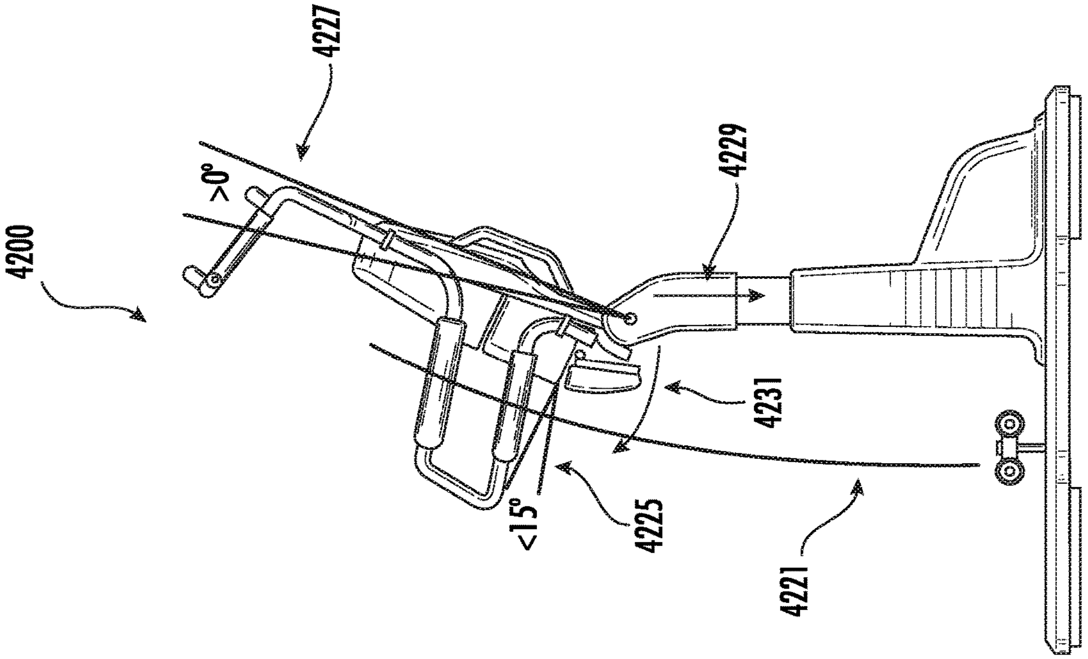

FIG. 42G illustrates rotation of the table 4206 backwards, while the lumbar and pelvis section or cushion of the cushion assembly 4210 rotates outwardly or extends directly outwardly relative to the thoracic section of the cushion assembly 4210 in direction 4231. The 15-degree gap (e.g., of angular reference line 4225) between the thoracic cushion and the lumbar or pelvic cushion starts to decrease proportionally to the thoracic section angular reference line 4227, at the rate of approximately 1 degree to every 3 degrees that the thoracic section moves. Simultaneously, or otherwise in conjunction with such rotation of the table 4206 backwards, the upper section of the fitness device 4200 (e.g., the table 4206) lowers 4229 to keep the feet of the user 4201 on or very close to a platform of the base assembly 4202. The legs and feet of the user 4201 lift off the platform of the base assembly 4202, and move outward with the thighs and hips of the user 4201 in an alternate configuration. A fluid motion of the upper body, lower body, thighs legs, and feet of the user 4201 are thus enabled following a gentle, graceful arc. It should be appreciated that any proportional rate or direction of movement between thoracic section angular reference line 4227 and the thoracic section of the cushion assembly 4210 in direction 4231 or the opposite direction can be programmed into the fitness device 4200. Additionally, the downward movement 4229 can be preprogrammed to a predetermined rate as desired.

Figure 42H:
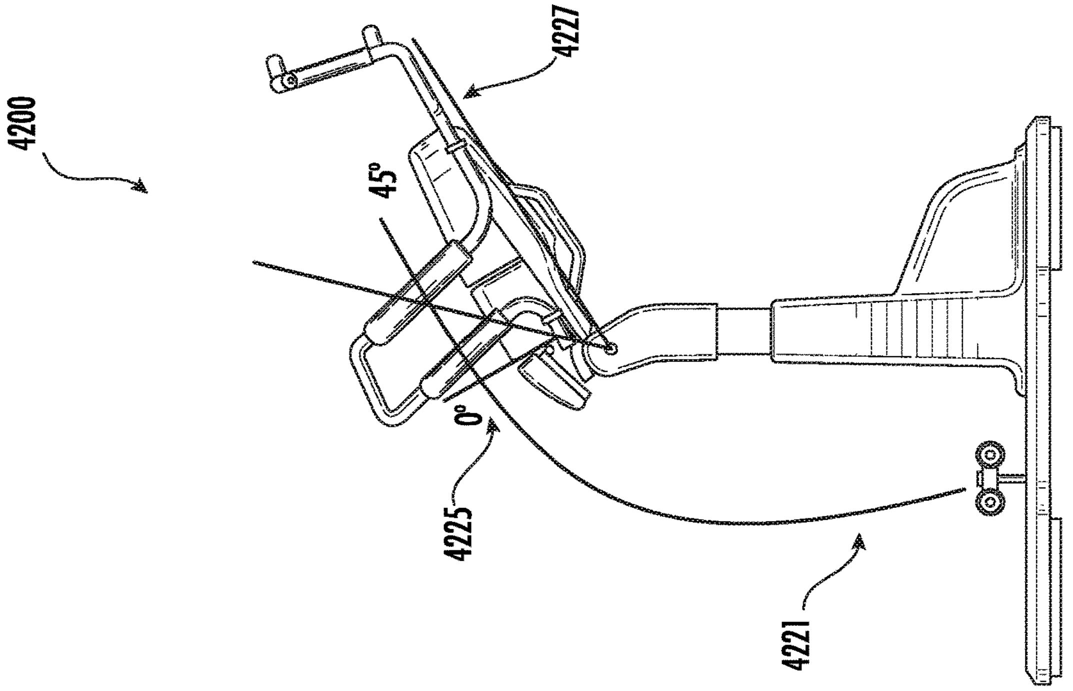

FIG. 42H illustrates further rotation of the table 4206 backwards relative to FIG. 42G. The rotation described above with respect to FIG. 42G continues to the position shown in FIG. 42H, with the angular reference line 4225 at 0 degrees and the angular reference line 4227 at 45 degrees. The position of FIG. 42H may correspond to a full supine stretch of the user 4201 enabled by the fitness device 4200. The user 4201 can dwell at the full stretch position for some desired time period, until the user 4201 reverses the rotation action by activating user interface controls of the fitness device 4200 (e.g., pressing a down button or other control on hand grips of the underarm support bars 4208-2). The fitness device 4200 will then revert to the starting position illustrated in FIG. 42E.

It should be appreciated that the supine stretch and exercise sequence shown in FIGS. 42E-42H may be repeated by the user 4201 as desired. It should also be appreciated that the user 4201 is not required to go to the full stretch position shown in FIG. 42H in each or in any repetition of the supine stretch and exercise sequence. Instead, the user 4201 may control the range of motion of the fitness device 4200 as desired, including where different repetitions provide different amounts of rotation.

It should be further appreciated that FIGS. 42E-42H illustrate just one example stretch and exercise that is enabled using the fitness device 4200 in the supine position. When the user is in a prone or lateral position, other types of stretch are enabled via lift and rotation of the table 4206. When in such other positions, the user 4201 may utilize different sets of controls of the fitness device 4200. For example, when the user 4201 is in the prone position, controls provided on hand grips on a back or side of the cushion assembly 4210 or table 4206 may be used to activate the stretch or other exercise. When the user 4201 is in the lateral position, the user 4201 may adjust the foot restraint 4214 (e.g., via rotation of a base plate of the foot restraint 4214 in the platform of the base assembly 4202) and does not close the underarm support bars 4208-2. In the lateral position, the user 4201 may utilize controls on the overhead bar 4208-1 for activating the stretch or other exercise.

FIGS. 42A-42H, as detailed above, illustrate core muscle stretching exercises performed on fitness device 4200. The fitness device 4200, as well as other fitness devices described herein, however, are not limited solely for use with core stretching. Various other types of stretching and exercise motions are enabled using the fitness devices described herein.

Figure 43:
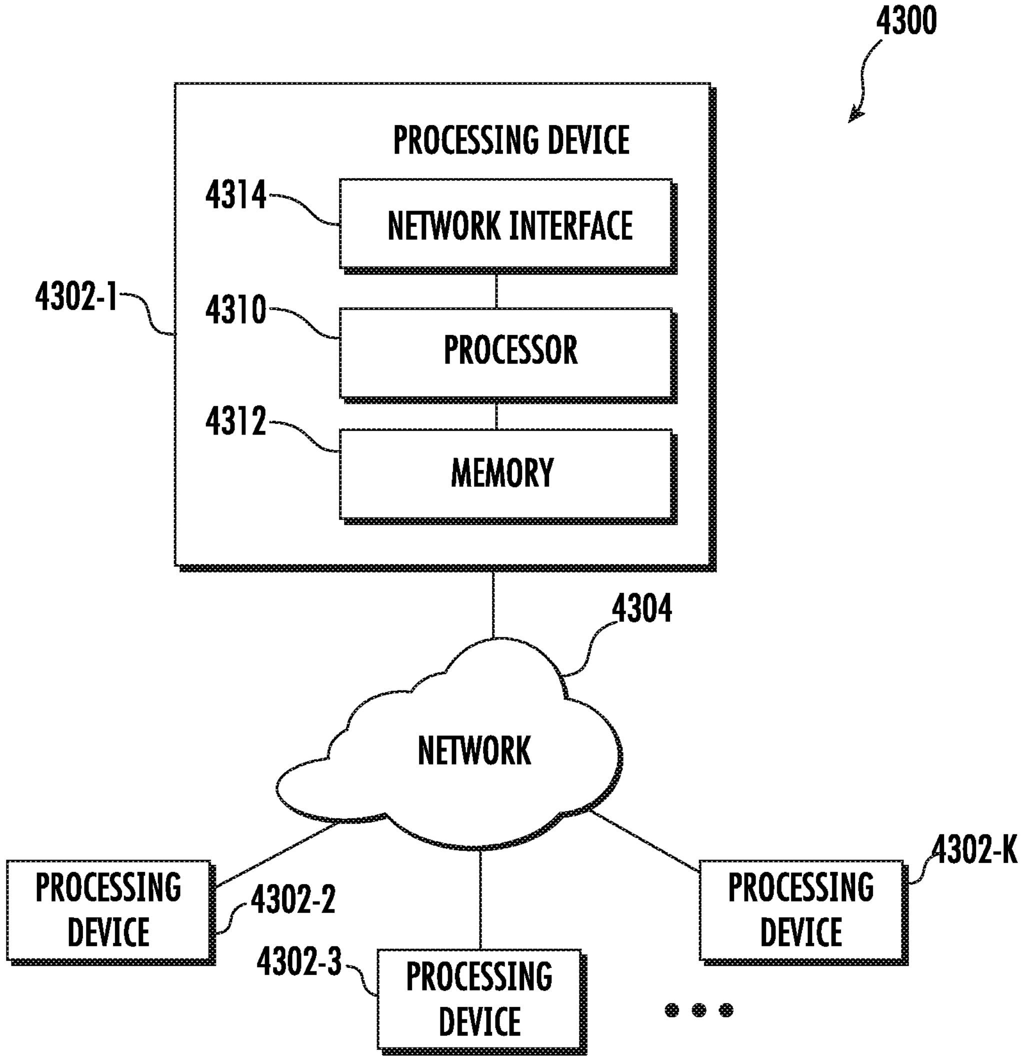
FIG. 43 shows an example of an information processing system that may be utilized to implement at least a portion of a fitness device, according to an embodiment of the invention.

In various embodiments, aspects of a fitness device may be implemented using one or more information processing systems. For example, controls and the user interface of the fitness device, as well as the various modules described above with respect to FIG. 39, may be implemented at least in part using one or more information processing systems. In addition, controllers and control mechanisms for actuators may also be implemented at least in part using one or more information processing systems. FIG. 43 shows an example of an information processing system 4300 that may be utilized to implement the controls, user interface, FIG. 39 modules, controllers and control mechanisms, and other aspects of the fitness devices described herein. The information processing system 4300 in FIG. 43 includes a plurality of processing devices 4302-1, 4302-2, 4302-3, . . . 4302-K (collectively, processing devices 4302), which communicate with one another over a network 4304.

The controls or user interface of a fitness device described herein may be configured using one or more of the processing devices 4302 to implement its associated functionality. For example, algorithms for controlling and coordinating the elevation and tilt or rotation of the table of a fitness device may be implemented using one or more of the processing devices 4302, such as processing device 4302-1, which comprises a processor 4310 and a memory 4312. The processing device 4302-1 may be suitably coupled to other hardware of a fitness device (e.g., actuators) that support various functionality of the fitness device. The processor 4310 executes software program code stored in the memory 4312 in order to control the performance of processing operations and other functionality. Such functionality includes, but is not limited to, controlling the lift and rotation of a table of the fitness device, controlling the rotation of a lumbar support, raising and rotating a foot restraint, varying a resistance of a foot restraint, controlling movement of overhead bars and underarm support bars, implementing controls and the user interface of a fitness device, etc. The processing device 4302-1 also comprises a network interface 4314 that supports communication over one or more networks such as network 4304.

The processor 4310 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory 4312 stores software program code for execution by the processor 4310 in implementing portions of the functionality of the processing device 4302-1. A given such memory that stores such program code for execution by a corresponding processor is an example of what is more generally referred to herein as a processor-readable storage medium having program code embodied therein, and may comprise, for example, electronic memory such as static random-access memory (SRAM), dynamic random-access memory (DRAM) or other types of random-access memory (RAM), read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

Although not shown in FIG. 43, other ones of the processing devices 4302-2 through 4302-K are assumed to be similarly configured with respective processors, memories and network interfaces.

One or more of the processing devices 4302 in a given embodiment can include, for example, laptop, tablet or desktop personal computers, mobile telephones, or other types of computers or communication devices, in any combination.

Communications between the various elements of an information processing system 4300 comprising processing devices 4302 associated with respective components or assemblies of a fitness device may take place over one or more networks, represented in FIG. 43 as network 4304. Such networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network as in the FIG. 43 information processing system.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of, or in addition to, virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components or functionality of the system as disclosed herein can be implemented at least in part in the form of one or more software programs stored in memory and executed by a processor of a processing device.

Accordingly, a given component of an information processing system implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of components of a fitness device, including combinations of features described in conjunction with different ones of the figures. Also, the particular types and configurations of base assemblies, elevation assemblies, tables, overhead bars, underarm support bars, hand grips, user interfaces, controls, cushion assemblies, foot restraints, etc. can be varied in other embodiments. Furthermore, the way in which a particular fitness device is utilized can be varied, such as between providing powered stretching and isometric exercises. In addition, the particular assumptions made herein in the context of describing certain embodiments need not apply in other embodiments. These and numerous other alternative embodiments will be readily apparent to those skilled in the art.

What is claimed is:

1. A fitness device, comprising:

a base assembly;

a table coupled to the base assembly; and a foot restraint coupled to the base assembly, the foot restraint permitting movement relative to a platform of the base assembly;

wherein the foot restraint, responsive to a change in a relative position of the foot restraint with respect to the table, is configured to apply a resistive force to at least one of one or more feet and one or more ankles of a user positioned in the fitness device, the resistive force providing a resistance to the movement; and wherein the foot restraint comprises a base plate, a peg interconnection coupled to the base plate, and a set of parallel bars coupled to the peg interconnection, the peg interconnection comprising a wire connected to a force application system configured to apply the resistive force during elevation and rotation of the base plate relative to the platform of the base assembly.

2. The fitness device of claim 1 further comprising:

one or more rotation actuators comprised within at least one of the base assembly and the table; and a controller configured to adjust a rotation of the table relative to the foot restraint utilizing the one or more rotation actuators.

3. The fitness device of claim 2 further comprising an elevation assembly coupled between the base assembly and the table, wherein at least one of the one or more rotation actuators is comprised at least partially within the elevation assembly.

4. The fitness device of claim 1 further comprising:

one or more height actuators comprised within at least one of the base assembly, the table, and the foot restraint; and a controller configured to adjust a height of the table relative to the foot restraint utilizing the one or more height actuators.

5. The fitness device of claim 4 further comprising an elevation assembly coupled between the base assembly and the table, wherein at least one of the one or more height actuators is comprised at least partially within the elevation assembly.

6. The fitness device of claim 1 further comprising:

one or more height actuators comprised within at least one of the base assembly and the foot restraint;

one or more rotation actuators comprised within at least one of the base assembly and the table; and a controller configured to adjust at least one of (i) a height of the table utilizing the one or more height actuators and (ii) a rotation of the table utilizing the one or more rotation actuators.

7. The fitness device of claim 6 further comprising an elevation assembly coupled between the base assembly and the table, wherein at least one of the one or more rotation actuators and the one or more height actuators is comprised at least partially within the elevation assembly.

8. The fitness device of claim 6 further comprising one or more sensors, the controller being configured to adjust said at least one of the height of the table and the rotation of the table based at least in part on readings obtained from the one or more sensors.

9. The fitness device of claim 8 wherein the one or more sensors comprise at least one force sensor configured to obtain one or more measurements of the resistive force applied by the foot restraint, and wherein adjusting said at least one of the height of the table and the rotation of the table is based at least in part on the one or more measurements of the resistive force applied by the foot restraint.

10. The fitness device of claim 9 wherein the controller is configured to adjust said at least one of the height of the table and the rotation of the table based at least in part on the one or more measurements of the resistive force applied by the foot restraint to maintain the resistive force applied by the foot restraint within a specified range.

11. The fitness device of claim 10 wherein the controller is configured to adjust said at least one of the height of the table and the rotation of the table based at least in part on the one or more measurements of the resistive force applied by the foot restraint to maintain the resistive force applied by the foot restraint within the specified range during a sequence of motion of the user positioned in the fitness device.

12. The fitness device of claim 11 wherein the sequence of motion of the user positioned in the fitness device comprises:

raising a height of the table to provide a linear stretch on the user; and rotating the table after the linear stretch to apply additional stretch to a targeted area of a torso of the user.

13. The fitness device of claim 12 wherein the sequence of motion of the user positioned in the fitness device further comprises at least one of reversing a rotation of the table and lowering the height of the table.

14. The fitness device of claim 12 wherein the additional stretch comprises at least one of flexion, extension and lateral flexion of the torso of the user.

15. The fitness device of claim 11 further comprising a cushion assembly coupled to the table, and wherein the sequence of motion of the user positioned in the fitness device further comprises displacing at least a portion of the cushion assembly based at least in part on a rotation of the table to provide further stretch of a targeted area of a torso of the user.

16. The fitness device of claim 9 wherein the one or more sensors further comprise at least one height sensor configured to obtain one or more measurements of a displacement height of the table, and wherein the controller is further configured:

to generate one or more height compensation values based at least in part on a comparison of the one or more measurements of the resistive force applied by the foot restraint and a maximum allowable resistive force; and to adjust said at least one of the height of the table and the rotation of the table based at least in part on the one or more measurements of the displacement height of the table and the generated one or more height compensation values.

17. The fitness device of claim 8 wherein the one or more sensors comprise at least one rotation sensor configured to obtain one or more measurements of rotational displacement of the table, and wherein the controller is further configured to generate a measured rotation angle of the table based at least in part on the one or more measurements of the rotational displacement of the table.

18. The fitness device of claim 17 wherein the controller is further configured:

to generate a reference rotation angle based at least in part on a maximum rotation angle of the table, a number of exercise repetitions of an exercise being performed by the user, and input controls;

to determine a difference between the reference rotation angle and the measured rotation angle; and to adjust said at least one of the height of the table and the rotation of the table based at least in part on the determined difference between the reference rotation angle and the measured rotation angle.

19. The fitness device of claim 18 wherein the input controls comprise a first input control and at least a second input control, wherein the reference rotation angle comprises a value larger than the measured rotation angle responsive to user activation of the first input control and the second input control, wherein the reference rotation angle comprises the measured rotation angle responsive to user activation of one of the first input control and the second input control, and wherein the reference rotation angle comprises a value smaller than the measured rotation angle responsive to user deactivation of the first input control and the second input control.

20. The fitness device of claim 8 further comprising:

a cushion assembly coupled to the table, at least a given portion of the cushion assembly being configured to tilt relative to the table; and one or more tilt actuators comprised within at least one of the table and the cushion assembly;

wherein the controller is further configured to adjust a tilt of the given portion of the cushion assembly based at least in part on the obtained sensor readings.

21. The fitness device of claim 20 wherein the given portion of the cushion assembly comprises at least one of a pelvic cushion and a lumbar cushion of the cushion assembly.

22. The fitness device of claim 20 wherein the one or more sensors comprise at least one tilt sensor configured to obtain one or more measurements of linear displacement of the given portion of the cushion assembly, and wherein the controller is further configured to generate a measurement of a tilt angle of the given portion of the cushion assembly based at least in part on the one or more measurements of linear displacement of the given portion of the cushion assembly.

23. The fitness device of claim 22 wherein the controller is further configured:

to generate a reference rotation angle based at least in part on a maximum rotation angle of the table, a number of exercise repetitions of an exercise being performed by the user, and input controls; and to adjust the tilt of the given portion of the cushion assembly based at least in part on the reference rotation angle and the measured tilt angle.

24. The fitness device of claim 1 wherein the table is configured for lateral rotation about a craniocaudal axis of the user positioned in the fitness device.

25. The fitness device of claim 1 wherein at least a portion of the foot restraint is removably coupled to the base assembly.

26. The fitness device of claim 1 wherein the foot restraint comprises a user attachment portion coupled to a base assembly mounting portion.

27. The fitness device of claim 26 wherein the user attachment portion comprises at least one of:

the set of parallel bars;

the peg interconnection; and the wire.

28. The fitness device of claim 26 wherein the base assembly mounting portion is coupled to one or more fixed points on the platform of the base assembly.

29. The fitness device of claim 26 wherein the base assembly mounting portion comprises the base plate rotatably affixed to the platform of the base assembly.

30. The fitness device of claim 29 wherein the base assembly mounting portion further comprises a ball joint coupling the peg interconnection to the base plate, the ball joint being configured for at least one of rotation and linear travel of the peg interconnection relative to the platform of the base assembly.

31. The fitness device of claim 26 wherein the base assembly mounting portion comprises one or more sliding tracks affixed to the platform of the base assembly.

32. The fitness device of claim 31 wherein the one or more sliding tracks are configured for linear travel of the peg interconnection relative to the platform of the base assembly.

33. A method of operating a fitness device comprising:

detecting, by a controller of the fitness device, a change in a relative position of a foot restraint with respect to a table of the fitness device, the foot restraint being coupled to a base assembly of the fitness device, the foot restraint permitting movement relative to a platform of the base assembly; and responsive to detecting the change in the relative position of the foot restraint with respect to the table, adjusting, using the controller of the fitness device, at least one of (i) a height of the table and (ii) a rotation of the table to apply a resistive force with the foot restraint to at least one of one or more feet and one or more ankles of a user positioned in the fitness device, the resistive force providing a resistance to the movement;

wherein the foot restraint comprises a base plate, a peg interconnection coupled to the base plate, and a set of parallel bars coupled to the peg interconnection, the peg interconnection comprising a wire connected to a force application system configured to apply the resistive force during elevation and rotation of the base plate relative to the platform of the base assembly.

34. The method of claim 33 wherein adjusting said at least one of the height of the table and the rotation of the table is based at least in part on readings obtained from one or more sensors of the fitness device.

35. The method of claim 34 wherein the one or more sensors comprise at least one force sensor configured to obtain one or more measurements of the resistive force applied by the foot restraint, and wherein adjusting said at least one of the height of the table and the rotation of the table is based at least in part on the one or more measurements of the resistive force applied by the foot restraint.

36. A computer program product comprising a non-transitory processor-readable storage medium having stored therein program code of one or more software programs, wherein the program code when executed by a controller of a fitness device causes the controller to perform steps of:

detecting a change in a relative position of a foot restraint with respect to a table of the fitness device, the foot restraint being coupled to a base assembly of the fitness device, the foot restraint permitting movement relative to a platform of the base assembly; and responsive to detecting the change in the relative position of the foot restraint with respect to the table, adjusting at least one of (i) a height of the table and (ii) a rotation of the table to apply a resistive force with the foot restraint to at least one of one or more feet and one or more ankles of a user positioned in the fitness device, the resistive force providing a resistance to the movement;

wherein the foot restraint comprises a base plate, a peg interconnection coupled to the base plate, and a set of parallel bars coupled to the peg interconnection, the peg interconnection comprising a wire connected to a force application system configured to apply the resistive force during elevation and rotation of the base plate relative to the platform of the base assembly.

37. The computer program product of claim 36 wherein adjusting said at least one of the height of the table and the rotation of the table is based at least in part on readings obtained from one or more sensors of the fitness device.

38. The computer program product of claim 37 wherein the one or more sensors comprise at least one force sensor configured to obtain one or more measurements of the resistive force applied by the foot restraint, and wherein adjusting said at least one of the height of the table and the rotation of the table is based at least in part on the one or more measurements of the resistive force applied by the foot restraint.

* * * * *